US011192979B2

(12) United States Patent
Ieda et al.

(10) Patent No.: US 11,192,979 B2
(45) Date of Patent: Dec. 7, 2021

(54) POLYAMIDE COMPOSITION AND MOLDED ARTICLE

(71) Applicant: ASAHI KASEI KABUSHIKI KAISHA, Tokyo (JP)

(72) Inventors: Shinji Ieda, Tokyo (JP); Koichi Nagase, Tokyo (JP); Hisho Yamada, Tokyo (JP); Jun Mikami, Tokyo (JP); Takayuki Wakita, Tokyo (JP); Yoshifumi Araki, Tokyo (JP); Kimiaki Kawatani, Tokyo (JP); Tomoyo Okumura, Tokyo (JP); Yoshikimi Kondo, Tokyo (JP); Kazunori Terada, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/495,254

(22) PCT Filed: Mar. 30, 2018

(86) PCT No.: PCT/JP2018/013907
§ 371 (c)(1),
(2) Date: Sep. 18, 2019

(87) PCT Pub. No.: WO2018/181995
PCT Pub. Date: Oct. 4, 2018

(65) Prior Publication Data
US 2020/0087458 A1 Mar. 19, 2020

(30) Foreign Application Priority Data
Mar. 30, 2017 (JP) .............................. JP2017-068946

(51) Int. Cl.
| | |
|---|---|
| C08G 69/26 | (2006.01) |
| C08K 3/013 | (2018.01) |
| C08K 3/04 | (2006.01) |
| C08K 3/22 | (2006.01) |
| C08K 3/32 | (2006.01) |
| C08K 5/00 | (2006.01) |
| C08K 5/51 | (2006.01) |
| C08K 7/06 | (2006.01) |
| C08L 71/12 | (2006.01) |
| C08L 77/06 | (2006.01) |
| B29C 45/00 | (2006.01) |

(52) U.S. Cl.
CPC .............. *C08G 69/26* (2013.01); *C08K 3/013* (2018.01); *C08K 3/04* (2013.01); *C08K 3/22* (2013.01); *C08K 3/32* (2013.01); *C08K 5/005* (2013.01); *C08K 5/0066* (2013.01); *C08K 5/51* (2013.01); *C08K 7/06* (2013.01); *C08L 71/12* (2013.01); *C08L 77/06* (2013.01); *B29C 45/0001* (2013.01); *C08K 2003/2241* (2013.01); *C08L 2203/20* (2013.01); *C08L 2205/02* (2013.01)

(58) Field of Classification Search
CPC ........... C08L 77/00–10; C08L 2205/02; C08L 2205/025
See application file for complete search history.

(56) References Cited

U.S. PATENT DOCUMENTS

| | | |
|---|---|---|
| 2002/0151625 A1 | 10/2002 | Yakabe |
| 2003/0023008 A1 | 1/2003 | Uchida et al. |
| 2007/0072970 A1 | 3/2007 | Schneider |
| 2008/0026245 A1 | 1/2008 | Saga |
| 2008/0194751 A1 | 8/2008 | Rexin et al. |
| 2012/0165445 A1 | 6/2012 | Lee et al. |
| 2012/0165448 A1 | 6/2012 | Lee et al. |
| 2013/0022786 A1 | 1/2013 | Topoulos |
| 2013/0172453 A1 | 7/2013 | Lee et al. |
| 2013/0261256 A1 | 10/2013 | Ieda et al. |
| 2016/0272767 A1 | 9/2016 | Hussein et al. |
| 2017/0029621 A1 | 2/2017 | Hyun et al. |
| 2017/0081514 A1 | 3/2017 | Lee et al. |
| 2017/0190838 A1 | 7/2017 | Ting |

FOREIGN PATENT DOCUMENTS

| | | |
|---|---|---|
| CN | 103314034 A | 9/2013 |
| EP | 1244128 A2 | 9/2002 |
| JP | 63-205353 A | 8/1988 |

(Continued)

OTHER PUBLICATIONS

Eersels K. L. L. et al: "Influence of transreaction processes on the morphology of semicrystalline aliphatic/aromatic polyamide blends", Polymer, Elsevier Science Publishers B.V, GB, vol. 39, No. 17, Aug. 1, 1998 (Aug. 1, 1998), pp. 3893-3900, XP004120935, ISSN: 0032-3861, DOI: 10.1016/S0032-3861 (97)10092-1.

(Continued)

*Primary Examiner* — Ana L. Woodward
(74) *Attorney, Agent, or Firm* — Greenblum & Bernstein P.L.C.

(57) ABSTRACT

The present invention provides a polyamide composition containing 50 to 99 parts by mass of an aliphatic polyamide (1A) formed from a diamine and a dicarboxylic acid, and 1 to 50 parts by mass of a semi-aromatic polyamide (1B) containing a dicarboxylic acid unit that includes at least 75 mol % of isophthalic acid and a diamine unit that includes at least 50 mol % of a diamine of 4 to 10 carbon atoms, wherein the tan δ peak temperature of the polyamide composition is at least 90° C., and the weight average molecular weight Mw of the polyamide composition satisfies 15,000≤Mw≤35,000. The invention also provides a molded article or the like formed using the polyamide composition.

20 Claims, No Drawings

(56) References Cited

FOREIGN PATENT DOCUMENTS

| | | |
|---|---|---|
| JP | 06-032980 A | 2/1994 |
| JP | 06-263895 A | 9/1994 |
| JP | 07-138476 A | 5/1995 |
| JP | 11-349806 A | 12/1999 |
| JP | 2000-154316 A | 6/2000 |
| JP | 2000-204241 A | 7/2000 |
| JP | 2001-115014 A | 4/2001 |
| JP | 2002-155203 A | 5/2002 |
| JP | 2002-284988 A | 10/2002 |
| JP | 2002-284989 A | 10/2002 |
| JP | 2002-289083 A | 10/2002 |
| JP | 2003-041117 A | 2/2003 |
| JP | 2003-128913 A | 5/2003 |
| JP | 2005-194513 A | 7/2005 |
| JP | 2005-271977 A | 10/2005 |
| JP | 2008-111064 A | 5/2008 |
| JP | 2008-189929 A | 8/2008 |
| JP | 2008-202693 A | 9/2008 |
| JP | 2009-007557 A | 1/2009 |
| JP | 2009-544799 A | 12/2009 |
| JP | 2010-031199 A | 2/2010 |
| JP | 2010-189467 A | 9/2010 |
| JP | 2010-248402 A | 11/2010 |
| JP | 2012-140619 A | 7/2012 |
| JP | 2013-067705 A | 4/2013 |
| JP | 2013-095788 A | 5/2013 |
| JP | 2013-119610 A | 6/2013 |
| JP | 2014-122329 A | 7/2014 |
| JP | 2015-028155 A | 2/2015 |
| JP | 2015-159035 A | 9/2015 |
| JP | 2016-084399 A | 5/2016 |
| JP | 2016-138163 A | 8/2016 |
| JP | 2017-514971 A | 6/2017 |
| JP | 2017-515951 A | 6/2017 |
| JP | 2017-165935 A | 9/2017 |
| WO | 2005/035664 A | 4/2005 |
| WO | 2008/013640 A | 1/2008 |
| WO | 2015/171394 A | 11/2015 |

OTHER PUBLICATIONS

European Search Report, European Patent Office, Application No. 18776422.0 dated Apr. 2, 2020.
International Search Report issued in International Patent Application No. PCT/JP2018/013907, dated Jun. 19, 2018, along with an English translation thereof.
Written Opinion of the International Searching Authority issued in International Application No. PCT/JP2018/013907, dated Jun. 19, 2018, along with an English translation thereof.
English translation of IPRP issued in International Patent Application No. PCT/JP2018/013907, dated Oct. 1, 2019 (English translation).
European Search Report, European Patent Office, Application No. 18776422.0, dated Jul. 3, 2020.

POLYAMIDE COMPOSITION AND MOLDED ARTICLE

TECHNICAL FIELD

The present invention relates to a polyamide composition and a molded article.

Priority is claimed on Japanese Patent Application No. 2017-068946, filed Mar. 30, 2017, the content of which is incorporated herein by reference.

BACKGROUND ART

Polyamides typified by polyamide 6 (hereafter sometimes abbreviated as "PA6") and polyamide 66 (hereafter sometimes abbreviated as "PA66") and the like exhibit excellent molding workability, mechanical properties and chemical resistance, and are therefore widely used as various component materials for vehicles, electrical and electronic materials, industrial materials, engineering materials, everyday materials, and household items and the like.

In recent years, the environments in which polyamides are being used have become thermally and mechanically more severe, and polyamide materials having improved mechanical properties, and particularly rigidity following water absorption (hereafter sometimes referred to as "water absorption rigidity") and rigidity under use at high temperature (hereafter sometimes referred to as "thermal rigidity"), and exhibiting little variation in physical properties under all manner of environments are now being demanded.

Further, in order to improve productivity, polyamide molded articles are sometimes molded under high-cycle molding conditions in which the molding temperature is increased and the mold temperature is lowered.

On the other hand, when molding is performed under high-temperature conditions, a problem arises in that molded articles cannot be obtained in a stable manner due to decomposition of the polyamide and changes in the fluidity.

A polyamide that exhibits excellent stability of the surface appearance of molded articles even under the types of severe molding conditions described above would be particularly desirable.

In order to satisfy these types of demands, polyamide compositions composed of a polyamide 66/6I containing an introduced isophthalic acid component have been disclosed as materials capable of improving the surface appearance and mechanical properties of molded articles (for example, see Patent Document 1). Further, polyamide compositions composed of a polyamide 6T/6I containing an introduced terephthalic acid component and isophthalic acid component have been disclosed as materials capable of improving the mechanical properties, fluidity, and surface appearance and the like (for example, see Patent Documents 2 and 3).

Further, polyamide compositions composed of an alloy of a polyamide 6T/6I containing an introduced terephthalic acid component and isophthalic acid component, and a polyamide 66 have been disclosed as materials capable of improving the surface appearance and mechanical properties of molded articles (for example, see Patent Document 5).

Moreover, in order to improve the mechanical properties, and particularly the rigidity, polyamide compositions containing carbon fiber have also been disclosed (for example, see Patent Documents 4 and 5).

PRIOR ART LITERATURE

Patent Documents

Patent Document 1: Japanese Unexamined Patent Application, First Publication No. Hei 06-032980

Patent Document 2: Japanese Unexamined Patent Application, First Publication No. 2000-154316

Patent Document 3: Japanese Unexamined Patent Application, First Publication No. Hei 11-349806

Patent Document 4: Japanese Unexamined Patent Application, First Publication No. 2013-119610

Patent Document 5: International Patent Publication No. 2005/035664

DISCLOSURE OF INVENTION

Problems to be Solved by the Invention

However, with the polyamide compositions disclosed in Patent Documents 1, 3 and 4, although the rigidity under normal usage conditions improves, the rigidity following water absorption (and particularly the Rockwell hardness) still had room for improvement.

Further, polyamide compositions produced using the production methods disclosed in Patent Documents 2 and 5 exhibit improved rigidity following water absorption, and the surface appearance of molded articles produced under typical molding conditions is also improved. However, under more severe molding conditions such as high-cycle molding conditions, a problem arose in that the external appearance and stability of the molded article surface tended to deteriorate.

Furthermore, particularly in the case of application to exterior members for vehicles, because the composition is exposed outdoors for long periods under severe conditions, a change in the color tone tends to also be problematic, and resolving these problems with the polyamide compositions disclosed in Patent Documents 1 to 5 has proven difficult.

In this manner, within the conventional technology, a polyamide-based material that exhibits excellent rigidity following water absorption (and particularly Rockwell hardness) and excellent rigidity under use at high temperature, and also suffers little change in physical properties when used under all manner of conditions is currently still unknown. Further, suppressing any deterioration in the rigidity following water absorption and under use at high temperature while maintaining a good balance between the mechanical strength and rigidity that represent the characteristic features of polyamide-based materials is difficult, and a polyamide copolymer or a composition containing a polyamide and a molded article that exhibit these types of physical properties are keenly sought.

The present invention has been developed in light of the above circumstances, and has an object of providing, in a stable manner, a polyamide composition and a molded article that exhibit excellent mechanical properties, and in particular, superior rigidity upon water absorption (hereafter referred to as "water absorption rigidity"), rigidity under use at high temperature (hereafter referred to as "thermal rigidity"), fluidity, and surface appearance and the like.

Further, the invention also has an object of providing, in a stable manner, a polyamide composition and a molded article that exhibit excellent mechanical properties (and particularly weld strength and Rockwell hardness), surface appearance and flame retardancy.

Furthermore, the invention also has an object of providing, in a stable manner, a polyamide composition and a molded article that exhibit excellent mechanical properties (and particularly tensile strength, flexural modulus and Charpy impact) and surface appearance.

Moreover, in light of the above circumstances, the present invention also provides a polyamide composition capable of forming a molded article that exhibits favorable weld strength and Rockwell hardness upon water absorption, as well a favorable surface appearance and weathering discoloration resistance. Furthermore, the present invention also provides a molded article that exhibits favorable weld strength and Rockwell hardness upon water absorption, as well as favorable surface appearance and weathering discoloration resistance.

Moreover, in light of the above circumstances, the present invention also provides a polyamide composition capable of forming a molded article having an excellent pellet shape, reduced cutting chip generation, and superior surface appearance. Further, the invention also provides a molded article having excellent surface appearance formed using this polyamide composition.

Further, the present invention also provides a polyamide composition capable of forming a molded article having favorable tensile strength, flexural modulus, surface appearance and weathering discoloration resistance. Furthermore, the invention also provides a molded article having favorable tensile strength, flexural modulus, surface appearance and weathering discoloration resistance that contains this polyamide composition.

Means for Solving the Problems

As a result of intensive investigation aimed at addressing the issues described above, the inventors of the present invention discovered that a polyamide composition containing a specific plurality of polyamides was able to resolve the above issues, enabling them to complete the present invention.

In other words, the present invention includes the following aspects.

A polyamide composition according to an aspect 1-1 of the present invention is a polyamide composition containing 50 to 99 parts by mass of an aliphatic polyamide (1A) formed from a diamine and a dicarboxylic acid, and 1 to 50 parts by mass of a semi-aromatic polyamide (1B) containing a dicarboxylic acid unit that includes at least 75 mol % of isophthalic acid and a diamine unit that includes at least 50 mol % of a diamine of 4 to 10 carbon atoms, wherein
the tan δ peak temperature of the polyamide composition is at least 90° C., and
the weight average molecular weight Mw of the polyamide composition satisfies 15,000≤Mw≤35,000.

In the polyamide composition according to the above aspect 1-1, the total amount of polyamide having a number average molecular weight Mn of at least 500 but not more than 2,000 is preferably at least 0.5% by mass but less than 2.5% by mass relative to the total mass of polyamide in the polyamide composition.

The molecular weight distribution Mw/Mn for the polyamide composition according to the above aspect 1-1 is preferably not more than 2.6.

The total of the amount of amino ends and the amount of carboxyl ends, expressed as a number of equivalents per 1 g of polyamide in the polyamide composition according to the above aspect 1-1, is preferably from 100 to 175 µeq/g.

In the polyamide composition according to the above aspect 1-1, the ratio of the amount of amino ends relative to the total of the amount of amino ends and the amount of carboxyl ends (amount of amino ends/(amount of amino ends+amount of carboxyl ends)) is preferably at least 0.25 but less than 0.4.

In the polyamide composition according to the above aspect 1-1, the aliphatic polyamide (1A) is preferably a polyamide 66 or a polyamide 610.

In the semi-aromatic polyamide (1B) of the polyamide composition according to the above aspect 1-1, the amount of isophthalic acid in the dicarboxylic acid unit is preferably 100 mol %.

In the polyamide composition according to the above aspect 1-1, the semi-aromatic polyamide (1B) is preferably a polyamide 6I.

In the polyamide composition according to the above aspect 1-1, the weight average molecular weight Mw of the semi-aromatic polyamide (1B) preferably satisfies 10,000≤Mw≤25,000.

In the polyamide composition according to the above aspect 1-1, the molecular weight distribution Mw/Mn of the semi-aromatic polyamide (1B) is preferably not more than 2.4.

In the polyamide composition according to the above aspect 1-1, the difference {Mw(1A)−Mw(B)} between the weight average molecular weight Mw(1A) of the aliphatic polyamide (1A) and the weight average molecular weight Mw(1B) of the semi-aromatic polyamide (1B) is preferably at least 10,000.

The polyamide composition according to the above aspect 1-1 preferably also contains a metal phosphite salt and/or a metal hypophosphite salt.

The polyamide composition according to the above aspect 1-1 preferably also contains a phosphite ester compound.

The polyamide composition according to the above aspect 1-1 preferably also contains from 5 to 250 parts by mass of an inorganic filler (1C) per 100 parts by mass of the total of the aliphatic polyamide (1A) and the semi-aromatic polyamide (1B).

A molded article according to an aspect 1-2 of the present invention is obtained by molding the polyamide composition according to the above aspect 1-1, and has a surface gloss value of at least 50.

A semi-aromatic polyamide according to an aspect 1-3 of the present invention is a semi-aromatic polyamide containing a dicarboxylic acid unit that includes at least 75 mol % of isophthalic acid and a diamine unit formed from a chain-like aliphatic diamine of 4 to 10 carbon atoms, wherein
the tan δ peak temperature is at least 90° C., and the weight average molecular weight Mw satisfies 10,000≤Mw≤35,000.

A semi-aromatic polyamide according to an aspect 1-4 of the present invention is a semi-aromatic polyamide containing a dicarboxylic acid unit that includes at least 75 mol % of isophthalic acid and a diamine unit formed from a chain-like aliphatic diamine of 4 to 10 carbon atoms, wherein
the total of the amount of amino ends and the amount of carboxyl ends, expressed as a number of equivalents per 1 g of the semi-aromatic polyamide, is from 160 to 300 µeq/g.

The semi-aromatic polyamides according to the above aspect 1-3 and aspect 1-4 preferably have a molecular weight distribution Mw/Mn of not more than 2.6.

A polyamide composition according to an aspect 2-1 of the present invention contains:
(2A) an aliphatic polyamide formed from a diamine and a dicarboxylic acid,
(2B) a semi-aromatic polyamide containing a dicarboxylic acid unit that includes at least 75 mol % of isophthalic acid and a diamine unit that includes a diamine of at least 4 but not more than 10 carbon atoms, (2C) a pigment,
(2D1) a flame retardant, and
(2D2) a flame retardant auxiliary, wherein
the tan δ peak temperature of the polyamide composition is at least 90° C., and
the weight average molecular weight Mw of the polyamide composition satisfies 10,000≤Mw≤40,000.

The polyamide composition according to the aspect 2-1 of the present invention may also contain:
(2E) a polymer containing an α,β-unsaturated dicarboxylic acid anhydride as a structural unit.

In the polyamide composition according to the aspect 2-1 of the present invention, the total amount of the aliphatic polyamide (2A) and the semi-aromatic polyamide (2B) having a number average molecular weight Mn of at least 500 but not more than 2,000 is preferably at least 0.5% by mass but less than 2.5% by mass relative to the total mass of all polyamides in 100% by mass of the polyamide composition.

The molecular weight distribution Mw/Mn of the polyamide composition is preferably not more than 2.4.

In the polyamide composition, the ratio of the amount of amino ends relative to the total of the amount of amino ends and the amount of carboxyl ends (amount of amino ends/(amount of amino ends+amount of carboxyl ends)) is preferably at least 0.1 but less than 0.4.

The aliphatic polyamide (2A) is preferably a polyamide 66.

The amount of isophthalic acid in the dicarboxylic acid unit of the semi-aromatic polyamide (2B) is preferably 100 mol %.

The weight average molecular weight Mw of the semi-aromatic polyamide (2B) preferably satisfies 10,000≤Mw≤25,000.

The molecular weight distribution Mw/Mn of the semi-aromatic polyamide (2B) is preferably not more than 2.4.

The value of Mw/VR for the semi-aromatic polyamide (2B) is preferably at least 1,000 but not more than 2,000.

The semi-aromatic polyamide (2B) is preferably a polyamide 6I.

The amount of the semi-aromatic polyamide (2B) is preferably at least 30% by mass but not more than 50% by mass relative to 100% by mass of all of the polyamide constituent components in the polyamide composition.

The difference {Mw(2A)−Mw(2B)} between the weight average molecular weight Mw(2A) of the aliphatic polyamide (2A) and the weight average molecular weight Mw(2B) of the semi-aromatic polyamide (2B) is preferably at least 10,000.

The ends of the semi-aromatic polyamide (2B) are preferably capped with acetic acid.

The pigment (2C) is preferably a white pigment, and the amount of the white pigment is preferably at least 0.5% by mass but not more than 5% by mass relative to 100% by mass of the polyamide composition.

The white pigment is preferably at least one compound selected from among ZnS and ZnO.

It is preferable that the flame retardant (2D1) is a brominated polystyrene, and the amount of the brominated polystyrene is at least 6% by mass but not more than 15% by mass relative to 100% by mass of the polyamide composition, and the flame retardant auxiliary (2D2) is $Sb_2O_3$, and the amount of the $Sb_2O_3$ is at least 0.1% by mass but not more than 4% by mass relative to 100% by mass of the polyamide composition.

The polymer (2E) containing an α,β-unsaturated dicarboxylic acid anhydride as a structural unit is preferably a maleic anhydride-modified polyphenylene ether.

The polyamide composition according to the aspect 2-1 of the present invention may also contain a filler (2F).

The filler (2F) is preferably glass fiber, and the amount of the glass fiber is preferably at least 40% by mass but not more than 60% by mass relative to 100% by mass of the polyamide composition.

The total amount of the pigment (2C), the flame retardant (2D1), the flame retardant auxiliary (2D2), the polymer (2E) containing an α,β-unsaturated dicarboxylic acid anhydride as a structural unit, and the filler (2F) is preferably at least 60% by mass but not more than 80% by mass relative to 100% by mass of the polyamide composition.

A molded article according to an aspect 2-2 of the present invention is obtained by molding the polyamide composition according to the above aspect 2-1 of the present invention, and has a surface gloss value of at least 50.

A polyamide composition according to an aspect 3-1 of the present invention contains:
(3A) an aliphatic polyamide formed from a diamine and a dicarboxylic acid,
(3B) a semi-aromatic polyamide containing a dicarboxylic acid unit that includes at least 50 mol % of isophthalic acid and a diamine unit that includes a diamine of at least 4 but not more than 10 carbon atoms,
(3C1) a flame retardant, and
(3C2) a flame retardant auxiliary, wherein
the tan δ peak temperature of the polyamide composition is at least 100° C.,
the weight average molecular weight Mw of the polyamide composition satisfies 10,000≤Mw≤40,000, and
the halogen content relative to the total mass of the polyamide composition is greater than 2% by mass but not more than 20% by mass.

The polyamide composition according to the aspect 3-1 of the present invention may also contain: (3D) a polymer containing an α,β-unsaturated dicarboxylic acid anhydride as a structural unit.

In the polyamide composition according to the aspect 3-1 of the present invention, the total amount of the aliphatic polyamide (3A) and the semi-aromatic polyamide (3B) having a number average molecular weight Mn of at least 500 but not more than 2,000 is preferably at least 0.5% by mass but less than 2.5% by mass relative to the total mass of polyamide in 100% by mass of the polyamide composition.

The molecular weight distribution Mw/Mn of the polyamide composition is preferably not more than 2.4.

In the polyamide composition, the ratio of the amount of amino ends relative to the total of the amount of amino ends and the amount of carboxyl ends {amount of amino ends/(amount of amino ends+amount of carboxyl ends)} is preferably at least 0.1 but less than 0.5.

The aliphatic polyamide (3A) is preferably a polyamide 66.

The amount of isophthalic acid in the dicarboxylic acid unit of the semi-aromatic polyamide (3B) is preferably 100 mol %.

The weight average molecular weight Mw of the semi-aromatic polyamide (3B) preferably satisfies 10,000≤Mw≤25,000.

The molecular weight distribution Mw/Mn of the semi-aromatic polyamide (3B) is preferably not more than 2.4.

The value of Mw/VR for the semi-aromatic polyamide (3B) is preferably at least 1,000 but not more than 2,000.

The semi-aromatic polyamide (3B) is preferably a polyamide 6I.

The amount of the semi-aromatic polyamide (3B) is preferably at least 30% by mass but not more than 50% by mass relative to the total mass of polyamide in the polyamide composition.

The difference {Mw(3A)–Mw(3B)} between the weight average molecular weight Mw(3A) of the aliphatic polyamide (3A) and the weight average molecular weight Mw(3B) of the semi-aromatic polyamide (3B) is preferably at least 10,000.

The ends of the semi-aromatic polyamide (3B) are preferably capped with acetic acid.

It is preferable that the flame retardant (3C1) is a brominated polystyrene, and the amount of the brominated polystyrene is at least 6% by mass but not more than 15% by mass relative to 100% by mass of the polyamide composition, and the flame retardant auxiliary (3C2) is $Sb_2O_3$, and the amount of the $Sb_2O_3$ is at least 0.1% by mass but not more than 4% by mass relative to 100% by mass of the polyamide composition.

The polymer (3D) containing an α,β-unsaturated dicarboxylic acid anhydride as a structural unit is preferably a maleic anhydride-modified polyphenylene ether.

The polyamide composition according to the aspect 3-1 of the present invention may also contain a filler (3E).

The filler (3E) is preferably glass fiber, and the amount of the glass fiber is preferably at least 40% by mass but not more than 60% by mass relative to 100% by mass of the polyamide composition.

A molded article according to an aspect 3-2 of the present invention is obtained by molding the polyamide composition according to the above aspect 3-1 of the present invention, and has a surface gloss value of at least 50.

A polyamide composition according to an aspect 4-1 of the present invention contains:

(4A) a crystalline polyamide, (4B) an amorphous semi-aromatic polyamide containing a dicarboxylic acid unit that includes at least 75 mol % of isophthalic acid and a diamine unit that includes at least 50 mol % of a diamine of 4 to 10 carbon atoms, and (4C) a polyphenylene ether, wherein the tan δ peak temperature of the polyamide composition is at least 90° C., and the weight average molecular weight Mw of the polyamide composition satisfies 15,000≤Mw≤35,000.

The total amount of polyamide having a number average molecular weight Mn of at least 500 but not more than 2,000 is preferably at least 0.5% by mass but less than 2.5% by mass relative to the total mass of polyamide in the polyamide composition (the total of the crystalline polyamide (4A) and the amorphous semi-aromatic polyamide (4B)).

In the polyamide composition according to the aspect 4-1 of the present invention, the weight average molecular weight Mw and the number average molecular weight Mn of the polyamide composition can be determined using the measurement method disclosed in the examples described below.

The molecular weight distribution Mw/Mn of the polyamide composition is preferably not more than 2.4.

The ratio of the amount of amino ends relative to the total of the amount of amino ends and the amount of carboxyl ends {amount of amino ends/(amount of amino ends+ amount of carboxyl ends)} is preferably at least 0.25 but less than 0.4.

The crystalline polyamide (4A) is preferably a polyamide 66 or a polyamide 610.

In the amorphous semi-aromatic polyamide (4B), the amount of isophthalic acid in the dicarboxylic acid unit is preferably 100 mol %.

The amorphous semi-aromatic polyamide (4B) is preferably a polyamide 6I.

The weight average molecular weight Mw of the amorphous semi-aromatic polyamide (4B) preferably satisfies 10,000≤Mw≤25,000.

The molecular weight distribution Mw/Mn of the amorphous semi-aromatic polyamide (4B) is preferably not more than 2.4.

The difference {Mw(4A)–Mw(4B)} between the weight average molecular weight Mw(4A) of the crystalline polyamide (4A) and the weight average molecular weight Mw(4B) of the amorphous semi-aromatic polyamide (4B) is preferably at least 2,000.

The polyamide composition according to the aspect 4-1 of the present invention may also contain a metal phosphite salt and/or a metal hypophosphite salt.

Further, the polyamide composition according to the aspect 4-1 of the present invention may also contain a phosphite ester compound.

The polyamide composition may also contain a compatibilizer for the polyamides (the crystalline polyamide (4A) and the amorphous semi-aromatic polyamide (4B), hereafter sometimes referred to jointly as simply "the polyamides") and the polyphenylene ether (4C).

Furthermore, the polyamide composition according to the aspect 4-1 of the present invention may also contain from 5 to 250 parts by mass of an inorganic filler per 100 parts by mass of the total of the crystalline polyamide (4A), the amorphous semi-aromatic polyamide (4B) and the polyphenylene ether (4C).

A molded article according to an aspect 4-2 of the present invention is obtained by molding the polyamide composition according to the aspect 4-1 of the present invention, and has a surface gloss value of at least 50.

Here, the "surface gloss value" is measured using a method disclosed in the examples described below.

A polyamide composition according to an aspect 5-1 of the present invention contains: (5A) an aliphatic polyamide, (5B) a semi-aromatic polyamide containing a diamine unit and a dicarboxylic acid unit, (5C1) a flame retardant, (5C2) a flame retardant auxiliary, (5D) a white pigment, and (5E) an ultraviolet absorber, wherein the tan δ peak temperature of the polyamide composition is at least 90° C., and the mass ratio (5E)/(5D) of the ultraviolet absorber (5E) relative to the white pigment (5D) in the polyamide composition is at least 0.15 but less than 2.50.

In the polyamide composition according to the above aspect 5-1, the semi-aromatic polyamide (5B) may include at least 50 mol % of isophthalic acid units among all of the dicarboxylic acid units that constitute the semi-aromatic polyamide (5B), and may include a diamine unit of at least 4 but not more than 10 carbon atoms as the diamine unit.

In the polyamide composition according to the above aspect 5-1, the aliphatic polyamide (5A) may contain a diamine unit and a dicarboxylic acid unit.

In the polyamide composition according to the above aspect 5-1, the aliphatic polyamide (5A) may be a polyamide 66.

In the polyamide composition according to the above aspect 5-1, the weight average molecular weight Mw of the polyamide composition may be at least 10,000 but not more than 50,000.

The polyamide composition according to the above aspect 5-1 may also contain: (5F) a polymer containing an α,β-unsaturated dicarboxylic acid anhydride.

In the polyamide composition according to the above aspect 5-1, the polymer (5F) containing an α,β-unsaturated dicarboxylic acid anhydride unit may be a maleic anhydride-modified polyphenylene ether.

In the polyamide composition according to the above aspect 5-1, the total amount of polyamide having a number average molecular weight Mn of at least 500 but not more than 2,000 among the aliphatic polyamide (5A) and the semi-aromatic polyamide (5B) may be at least 0.5% by mass but less than 2.5% by mass relative to the total mass of polyamide in the polyamide composition.

In the polyamide composition according to the above aspect 5-1, the molecular weight distribution Mw/Mn may be not more than 2.4.

In the polyamide composition according to the above aspect 5-1, the ratio of the molar amount of amino ends relative to the total molar amount of amino ends and carboxyl ends (amount of amino ends/(amount of amino ends+amount of carboxyl ends)) may be at least 0.1 but less than 0.5.

In the polyamide composition according to the above aspect 5-1, the semi-aromatic polyamide (5B) may include 100 mol % of isophthalic acid units among all the dicarboxylic acid units that constitute the semi-aromatic polyamide (5B).

In the polyamide composition according to the above aspect 5-1, the semi-aromatic polyamide (5B) may be a polyamide 6I.

In the polyamide composition according to the above aspect 5-1, the weight average molecular weight Mw(5B) of the semi-aromatic polyamide (5B) may be at least 10,000 but not more than 25,000.

In the polyamide composition according to the above aspect 5-1, the molecular weight distribution Mw(5B)/Mn (5B) of the semi-aromatic polyamide (5B) may be not more than 2.4.

In the polyamide composition according to the above aspect 5-1, the ratio Mw(5B)/VR(5B) of the molecular weight distribution Mw(5B) relative to the formic acid relative viscosity VR(5B) of the semi-aromatic polyamide (5B) may be at least 1,000 but not more than 2,000.

In the polyamide composition according to the above aspect 5-1, the amount of the semi-aromatic polyamide (5B) may be at least 30% by mass but not more than 50% by mass relative to the total mass of polyamide in the polyamide composition.

In the polyamide composition according to the above aspect 5-1, the difference {Mw(5A)−Mw(5B)} between the weight average molecular weight Mw(5A) of the aliphatic polyamide (5A) and the weight average molecular weight Mw(5B) of the semi-aromatic polyamide (5B) may be at least 10,000.

In the polyamide composition according to the above aspect 5-1, the ends of the semi-aromatic polyamide (5B) may be capped with acetic acid.

In the polyamide composition according to the above aspect 5-1, the amount of the white pigment (5D) may be at least 0.1% by mass but not more than 5% by mass relative to the total mass of the polyamide composition.

In the polyamide composition according to the above aspect 5-1, the white pigment (5D) may be at least one compound selected from among ZnS and ZnO.

In the polyamide composition according to the above aspect 5-1, the amount of the ultraviolet absorber (5E) may be at least 0.1% by mass but not more than 5% by mass relative to the total mass of the polyamide composition.

In the polyamide composition according to the above aspect 5-1, the ultraviolet absorber (5E) may be at least one compound selected from among benzotriazole and triazine-based ultraviolet absorbers.

In the polyamide composition according to the above aspect 5-1, the flame retardant (5C1) may be a brominated polystyrene, wherein the amount of the brominated polystyrene may be at least 6% by mass but not more than 15% by mass relative to the total mass of the polyamide composition, and the flame retardant auxiliary (5C2) may be $Sb_2O_3$, wherein the amount of the $Sb_2O_3$ may be at least 0.1% by mass but not more than 4% by mass relative to the total mass of the polyamide composition.

The polyamide composition according to the above aspect 5-1 may also contain a filler (5G).

In the polyamide composition according to the above aspect 5-1, the filler (5G) may be glass fiber, and the amount of the glass fiber may be at least 40% by mass but not more than 60% by mass relative to the total mass of the polyamide composition.

A molded article according to an aspect 5-2 of the present invention is obtained by molding the polyamide composition according to the above aspect 5-1, and has a surface gloss value of at least 50.

A polyamide composition according to an aspect 6-1 of the present invention contains: (6A) a crystalline polyamide, (6B) an amorphous semi-aromatic polyamide, and (6C) carbon fiber, wherein the amorphous semi-aromatic polyamide (6B) includes at least 75 mol % of isophthalic acid units among all of the dicarboxylic acid units that constitute the amorphous semi-aromatic polyamide (6B), and includes at least 50 mol % of a diamine unit having at least 4 but not more than 10 carbon atoms among all of the diamine units that constitute the amorphous semi-aromatic polyamide (6B).

In the polyamide composition according to the above aspect 6-1, the tan δ peak temperature may be at least 90° C.

In the polyamide composition according to the above aspect 6-1, the amount of the carbon fiber (6C) in the polyamide composition may be at least 30% by mass but not more than 65% by mass.

In the polyamide composition according to the above aspect 6-1, the crystalline polyamide (6A) may be at least one type of polyamide selected from the group consisting of polyamide 4 (poly-α-pyrrolidone), polyamide 6 (polycaproamide), polyamide 11 (polyundecanamide), polyamide 12 (polydodecanamide), polyamide 46 (polytetramethylene adipamide), polyamide 56 (polypentamethylene adipamide), polyamide 66 (polyhexamethylene adipamide), polyamide 610 (polyhexamethylene sebacamide), polyamide 612 (polyhexamethylene dodecamide), polyamide 6T (polyhexamethylene terephthalamide), polyamide 9T (polynonamethylene terephthalamide), and copolymer polyamides having any of these polyamides as constituent components.

In the polyamide composition according to the above aspect 6-1, the amount of the amorphous polyamide (6B) may be at least 10 parts by mass but not more than 50 parts by mass per 100 parts by mass of the total of the crystalline polyamide (6A) and the amorphous semi-aromatic polyamide (6B).

In the polyamide composition according to the above aspect 6-1, the amounts of the amorphous semi-aromatic polyamide (6B) and the carbon fiber (6C) may satisfy the relationship shown in the following formula (1).

[Numerical formula 1]

$$(C)/4 < (B) < (C) \tag{1}$$

In the polyamide composition according to the above aspect 6-1, the weight average molecular weight Mw of the polyamide composition may be at least 15,000 but not more than 35,000.

In the amorphous semi-aromatic polyamide (6B), the amount of isophthalic acid in the dicarboxylic acid units may be 100 mol %.

In the polyamide composition according to the above aspect 6-1, the amorphous semi-aromatic polyamide (6B) may be a polyamide 6I.

In the polyamide composition according to the above aspect 6-1, the weight average molecular weight Mw(6B) of the amorphous semi-aromatic polyamide (6B) may be at least 10,000 but not more than 25,000.

In the polyamide composition according to the above aspect 6-1, the molecular weight distribution Mw(6B)/Mn (6B) of the amorphous semi-aromatic polyamide (6B) may be not more than 2.4.

A molded article according to an aspect 6-2 of the present invention is obtained by molding the polyamide composition according to the above aspect 6-1.

A polyamide composition according to an aspect 7-1 of the present invention contains: (7A) an aliphatic polyamide, (7B) a semi-aromatic polyamide containing a diamine unit and a dicarboxylic acid unit, (7C1) a flame retardant containing a halogen element, (7C2) a flame retardant auxiliary, and (7D) an ultraviolet absorber, wherein the tan δ peak temperature of the polyamide composition is at least 90° C., and the mass ratio {(7D)/halogen element} of the ultraviolet absorber (7D) relative to the halogen element in the polyamide composition is greater than 0.10 but less than 0.75.

In the polyamide composition according to the above aspect 7-1, the semi-aromatic polyamide (7B) may include at least 50 mol % of isophthalic acid units among all of the dicarboxylic acid units that constitute the semi-aromatic polyamide (7B), and may include a diamine unit of at least 4 but not more than 10 carbon atoms as the diamine unit.

In the polyamide composition according to the above aspect 7-1, the aliphatic polyamide (7A) may include a diamine unit and a dicarboxylic acid unit.

In the polyamide composition according to the above aspect 7-1, the aliphatic polyamide (7A) may be a polyamide 66.

In the polyamide composition according to the above aspect 7-1, the weight average molecular weight Mw of the polyamide composition may be at least 10,000 but not more than 50,000.

The polyamide composition according to the above aspect 7-1 may also contain: (7E) a polymer containing an α,β-unsaturated dicarboxylic acid anhydride.

In the polyamide composition according to the above aspect 7-1, the polymer (7E) containing an α,β-unsaturated dicarboxylic acid anhydride unit may be a maleic anhydride-modified polyphenylene ether.

In the polyamide composition according to the above aspect 7-1, the total amount of polyamide having a number average molecular weight Mn of at least 500 but not more than 2,000 among the aliphatic polyamide (7A) and the semi-aromatic polyamide (7B) may be at least 0.5% by mass but less than 2.5% by mass relative to the total mass of polyamide in the polyamide composition.

In the polyamide composition according to the above aspect 7-1, the molecular weight distribution Mw/Mn may be not more than 2.4.

In the polyamide composition according to the above aspect 7-1, the ratio of the molar amount of amino ends relative to the total molar amount of amino ends and carboxyl ends {amount of amino ends/(amount of amino ends+amount of carboxyl ends)} may be at least 0.1 but less than 0.5.

In the polyamide composition according to the above aspect 7-1, the semi-aromatic polyamide (7B) may include 100 mol % of isophthalic acid units among all the dicarboxylic acid units that constitute the semi-aromatic polyamide (7B).

In the polyamide composition according to the above aspect 7-1, the semi-aromatic polyamide (7B) may be a polyamide 6I.

In the polyamide composition according to the above aspect 7-1, the weight average molecular weight Mw(7B) of the semi-aromatic polyamide (7B) may be at least 10,000 but not more than 25,000.

In the polyamide composition according to the above aspect 7-1, the molecular weight distribution Mw(7B)/Mn (7B) of the semi-aromatic polyamide (7B) may be not more than 2.4.

In the polyamide composition according to the above aspect 7-1, the ratio Mw(7B)/VR(7B) of the molecular weight distribution Mw(7B) relative to the formic acid relative viscosity VR(7B) of the semi-aromatic polyamide (7B) may be at least 1,000 but not more than 2,000.

In the polyamide composition according to the above aspect 7-1, the amount of the semi-aromatic polyamide (7B) may be at least 30% by mass but not more than 50% by mass relative to the total mass of polyamide in the polyamide composition.

In the polyamide composition according to the above aspect 7-1, the difference {Mw(7A)−Mw(7B)} between the weight average molecular weight Mw(7A) of the aliphatic polyamide (7A) and the weight average molecular weight Mw(7B) of the semi-aromatic polyamide (7B) may be at least 10,000.

In the polyamide composition according to the above aspect 7-1, the ends of the semi-aromatic polyamide (7B) may be capped with acetic acid.

In the polyamide composition according to the above aspect 7-1, the amount of the ultraviolet absorber (7D) may be at least 0.1% by mass but not more than 5% by mass relative to the total mass of the polyamide composition.

In the polyamide composition according to the above aspect 7-1, the ultraviolet absorber (7D) may be at least one compound selected from among benzotriazole and triazine-based ultraviolet absorbers.

In the polyamide composition according to the above aspect 7-1, the flame retardant (7C1) may be a brominated polystyrene, wherein the amount of the brominated polystyrene may be at least 6% by mass but not more than 15% by mass relative to the total mass of the polyamide composition, and the flame retardant auxiliary (7C2) may be $Sb_2O_3$, wherein the amount of the $Sb_2O_3$ may be at least 0.1% by mass but not more than 4% by mass relative to the total mass of the polyamide composition.

The polyamide composition according to the above aspect 7-1 may also contain a filler (7F).

In the polyamide composition according to the above aspect 7-1, the filler (7F) may be glass fiber, and the amount of the glass fiber may be at least 40% by mass but not more than 60% by mass relative to the total mass of the polyamide composition.

A molded article according to an aspect 7-2 of the present invention is obtained by molding the polyamide composition according to the above aspect 7-1, and has a surface gloss value of at least 50.

Effects of the Invention

According to the polyamide composition of an aspect described above, a polyamide composition and a molded article can be provided that exhibit excellent mechanical properties, and in particular, superior water absorption rigidity, thermal rigidity, fluidity, surface appearance, and flame retardancy and the like.

According to the polyamide composition of an aspect described above, a molded article can be formed that exhibits favorable weld strength and Rockwell hardness upon water absorption, as well as favorable surface appearance and weathering discoloration resistance. Further, the molded article of an aspect described above exhibit favorable weld strength and Rockwell hardness upon water absorption, as well as favorable surface appearance and weathering discoloration resistance.

The polyamide composition of an aspect described above is capable of forming a molded article having an excellent pellet shape, reduced cutting chip generation, and superior surface appearance. Further, the molded article of an aspect described above has excellent surface appearance.

The polyamide composition of an aspect described above is capable of forming a molded article having favorable tensile strength, flexural modulus, surface appearance and weathering discoloration resistance. Further, the molded article of an aspect described above contains the above polyamide composition, and has favorable tensile strength, flexural modulus, surface appearance and weathering discoloration resistance.

EMBODIMENTS FOR CARRYING OUT THE INVENTION

The present invention is described below in further detail.
<<Aspects 1-1 to 1-4>>
[Polyamide Composition]

A polyamide composition according to an aspect 1-1 of the present invention is a polyamide composition containing 50 to 99 parts by mass of an aliphatic polyamide (1A) formed from a diamine and a dicarboxylic acid (hereafter referred to a simply "the aliphatic polyamide (1A)"), and 1 to 50 parts by mass of a semi-aromatic polyamide (1B) containing a dicarboxylic acid unit that includes at least 75 mol % of isophthalic acid and a diamine unit that includes at least 50 mol % of a diamine of 4 to 10 carbon atoms, wherein the tan δ peak temperature of the polyamide composition is at least 90° C., and the weight average molecular weight Mw of the polyamide composition satisfies 15,000≤Mw≤35,000.
[Semi-Aromatic Polyamide]

A semi-aromatic polyamide according to an aspect 1-3 of the present invention is a semi-aromatic polyamide containing a dicarboxylic acid unit that includes at least 75 mol % of isophthalic acid and a diamine unit formed from a chain-like aliphatic diamine of 4 to 10 carbon atoms, wherein the tan δ peak temperature is at least 90° C., and the weight average molecular weight Mw satisfies 10,000≤Mw≤35,000.

A semi-aromatic polyamide according to an aspect 1-4 of the present invention is a semi-aromatic polyamide containing a dicarboxylic acid unit that includes at least 75 mol % of isophthalic acid and a diamine unit formed from a chain-like aliphatic diamine of 4 to 10 carbon atoms, wherein the total of the amount of amino ends and the amount of carboxyl ends, expressed as a number of equivalents per 1 g of the semi-aromatic polyamide, is from 160 to 300 μeq/g. The total of the amount of amino ends and the amount of carboxyl ends in the semi-aromatic polyamide is preferably from 170 to 280 μeq/g, more preferably from 180 to 270 μeq/g, and even more preferably from 190 to 260 μeq/g.

The semi-aromatic polyamide may have a tan δ peak temperature of at least 90° C., a weight average molecular weight Mw that satisfies 15,000≤Mw≤35,000, and a total of the amount of amino ends and the amount of carboxyl ends, expressed as a number of equivalents per 1 g of the semi-aromatic polyamide, that is from 160 to 300 μeq/g.

The semi-aromatic polyamide (1B) described below can be used as the above semi-aromatic polyamide.

The semi-aromatic polyamide in the present invention may be used in the form of a semi-aromatic polyamide composition that includes an inorganic filler or additives or the like described below. This semi-aromatic polyamide composition preferably contains at least 90% of the above semi-aromatic polyamide.

In the aspects described above, a "polyamide" means a polymer having an amide linkage (—NHCO—) within the main chain. Details of the aliphatic polyamide (1A) and the semi-aromatic polyamide (1B) are described below.
(Aliphatic Polyamide (1A))

The aliphatic polyamide (1A) contained in the polyamide composition of the aspect described above contains an aliphatic dicarboxylic acid unit (1A-a) and an aliphatic diamine unit (1A-b).
(Aliphatic Dicarboxylic Acid Unit (1A-a))

Examples of the aliphatic dicarboxylic acid that constitutes the aliphatic dicarboxylic acid unit include, but are not limited to, linear or branched saturated aliphatic dicarboxylic acids of 3 to 20 carbon atoms such as malonic acid, dimethylmalonic acid, succinic acid, 2,2-dimethylsuccinic acid, 2,3-dimethylglutaric acid, 2,2-diethylsuccinic acid, 2,3-diethylglutaric acid, glutaric acid, 2,2-dimethylglutaric acid, adipic acid, 2-methyladipic acid, trimethyladipic acid, pimelic acid, suberic acid, azelaic acid, sebacic acid, dodecanedioic acid, tetradecanedioic acid, hexadecanedioic acid, octadecanedioic acid, eicosanedioic acid and diglycolic acid.

Including an aliphatic dicarboxylic acid of at least 6 but not more than 20 carbon atoms in the aliphatic dicarboxylic acid unit (1A-a) is preferred, because the heat resistance, fluidity, toughness, low-water absorption property, and rigidity and the like of the polyamide composition tend to be more superior. There are no particular limitations on the aliphatic dicarboxylic acid unit having at least 6 carbon atoms, and examples include adipic acid, sebacic acid, dodecanedioic acid, tetradecanedioic acid, hexadecanedioic acid, octadecanedioic acid and eicosanedioic acid. Among these, from the viewpoint of the heat resistance and the like of the polyamide composition, adipic acid, sebacic acid and dodecanedioic acid are preferred.

For the aliphatic dicarboxylic acid that constitutes the aliphatic dicarboxylic acid unit (1A-a), a single compound may be used alone, or a combination of two or more compounds may be used.

The aliphatic polyamide (1A) may, if required, also contain a unit derived from a trivalent or higher polyvalent carboxylic acid such as trimellitic acid, trimesic acid or pyromellitic acid. A single trivalent or higher polyvalent carboxylic acid may be used alone, or a combination of two or more compounds may be used.

(Aliphatic Diamine Unit (1A-b))

The aliphatic diamine that constitutes the aliphatic diamine unit (1A-b) may be either linear or branched.

Examples of linear aliphatic diamines that may constitute the aliphatic diamine unit include, but are not limited to, linear saturated aliphatic diamines of 2 to 20 carbon atoms such as ethylenediamine, propylenediamine, tetramethylenediamine, pentamethylenediamine, hexamethylenediamine, heptamethylenediamine, octamethylenediamine, nonamethylenediamine, decamethylenediamine, undecamethylenediamine, dodecamethylenediamine and tridecamethylenediamine.

Examples of diamines that may constitute a diamine unit having a substituent branched from the main chain include, but are not limited to, branched saturated aliphatic diamines of 3 to 20 carbon atoms such as 2-methylpentamethylenediamine (also called 2-methyl-1,5-diaminopentane), 2,2,4-trimethylhexamethylenediamine, 2,4,4-trimethylhexamethylenediamine, 2-methyl-1,8-octanediamine (also called 2-methyloctamethylenediamine), and 2,4-dimethyloctamethylenediamine.

Among these, 2-methylpentamethylenediamine and 2-methyl-1,8-octanediamine are preferred, and 2-methylpentamethylenediamine is more preferred. By including this type of aliphatic diamine, a polyamide composition having more superior heat resistance and rigidity and the like tends to be obtained.

The number of carbon atoms in the aliphatic diamine unit (1A-b) is preferably at least 6 but not more than 12. Provided the number of carbon atoms is at least 6, the heat resistance is superior, whereas provided the number of carbon atoms is not more than 12, the crystallinity and mold releasability tend to be superior, which is desirable. The number of carbon atoms in the aliphatic diamine unit (1A-b) is more preferably at least 6 but not more than 10.

The aliphatic diamine unit (1A-b) may, if required, also include a trivalent or higher polyvalent aliphatic amine such as bishexamethylenetriamine.

A single aliphatic diamine unit (1A-b) may be used alone, or a combination of two or more compounds may be used.

Specific examples of the aliphatic polyamide (1A) used in the polyamide composition of the aspect described above include polyamide 66 (PA66), polyamide 46 (PA46), and polyamide 610 (PA610). PA66 exhibits particularly superior heat resistance, moldability and toughness, and is therefore thought to be a particularly suitable material for vehicle components. Long-chain aliphatic polyamides such as PA610 exhibit excellent chemical resistance.

In the aspect described above, the blend amount of the aliphatic polyamide (1A), relative to 100% by mass of all the polyamides in the polyamide composition, is at least 50.0% by mass but not more than 99.0% by mass, preferably at least 52.5% by mass but not more than 95.0% by mass, more preferably at least 54.0% by mass but not more than 90.0% by mass, even more preferably at least 55.0% by mass but not more than 85.0% by mass, still more preferably at least 56.0% by mass but not more than 80.0% by mass, particularly preferably at least 57.0% by mass but not more than 77.5% by mass, and most preferably at least 57.5% by mass but not more than 75.5% by mass. By ensuring that the blend amount of the aliphatic polyamide (A) satisfies the above range, a polyamide composition can be obtained that has excellent mechanical properties, and particularly water absorption rigidity, thermal rigidity, and fluidity and the like.

Further, a polyamide composition containing a component typified by an inorganic filler exhibits superior surface appearance.

(Semi-Aromatic Polyamide (1B))

The semi-aromatic polyamide (1B) used in the aspect described above is a polyamide containing a dicarboxylic acid unit (1B-a) that includes at least 75 mol % of isophthalic acid and a diamine unit (1B-b) that includes at least 50 mol % of a diamine of 4 to 10 carbon atoms.

The total amount of the above isophthalic acid unit and diamine unit of 4 to 10 carbon atoms, relative to 100 mol % of all the structural units in the semi-aromatic polyamide (1B), is preferably from 80 to 100 mol % and more preferably from 90 to 100 mol %, and is even more preferably 100 mol %.

The proportion of a prescribed monomer unit constituting the semi-aromatic polyamide (1B) in the aspect described above can be measured by nuclear magnetic resonance (NMR) spectroscopy or the like.

(Dicarboxylic Acid Unit (1B-a))

The dicarboxylic acid unit (1B-a) includes at least 75 mol % of isophthalic acid (based on the total number of moles of dicarboxylic acids). This proportion of isophthalic acid is preferably from 80 to 100 mol %, more preferably from 90 to 100 mol %, and is even more preferably 100 mol %.

By ensuring that the proportion of isophthalic acid units within the dicarboxylic acid unit (1B-a) is at least 75 mol %, a polyamide composition can be obtained that simultaneously satisfies various mechanical properties, and particularly the water absorption rigidity, thermal rigidity, fluidity, and surface appearance.

The dicarboxylic acid unit (1B-a) may also include other aromatic dicarboxylic acid units besides the isophthalic acid unit, aliphatic dicarboxylic acid units, and alicyclic dicarboxylic acid units.

—Aromatic Dicarboxylic Acid Units—

Examples of aromatic dicarboxylic acids that form an aromatic dicarboxylic acid unit besides the isophthalic acid unit include, but are not particularly limited to, dicarboxylic acids having a phenyl group or naphthyl group. The aromatic group of the aromatic dicarboxylic acid may be unsubstituted, or may have a substituent.

There are no particular limitations on this substituent, and examples include alkyl groups of 1 to 4 carbon atoms, aryl groups of 6 to 10 carbon atoms, arylalkyl groups of 7 to 10 carbon atoms, halogen groups such as a chloro group and bromo group, silyl groups of 1 to 6 carbon atoms, and sulfonic acid groups and salts thereof (such as sodium salts).

Specific examples include, but are not limited to, aromatic dicarboxylic acids of 8 to 20 carbon atoms that are either unsubstituted or substituted with a prescribed substituent, such as terephthalic acid, naphthalenedicarboxylic acid, 2-chloroterephthalic acid, 2-methylterephthalic acid, 5-methylisophthalic acid and 5-sodium sulfoisophthalic acid. Among these, terephthalic acid is preferred.

For the aromatic dicarboxylic acid that constitutes the aromatic dicarboxylic acid unit, a single compound may be used alone, or a combination of two or more compounds may be used.

—Aliphatic Dicarboxylic Acid Units—

Examples of aliphatic dicarboxylic acids that form an aliphatic dicarboxylic acid unit include, but are not limited to, linear or branched saturated aliphatic dicarboxylic acids of 3 to 20 carbon atoms such as malonic acid, dimethylmalonic acid, succinic acid, 2,2-dimethylsuccinic acid, 2,3-dimethylglutaric acid, 2,2-diethylsuccinic acid, 2,3-diethylglutaric acid, glutaric acid, 2,2-dimethylglutaric acid, adipic acid, 2-methyladipic acid, trimethyladipic acid, pimelic acid, suberic acid, azelaic acid, sebacic acid, dodecanedioic acid, tetradecanedioic acid, hexadecanedioic acid, octadecanedioic acid, eicosanedioic acid, and diglycolic acid.

—Alicyclic Dicarboxylic Acid Units—

Examples of alicyclic dicarboxylic acids that form an alicyclic dicarboxylic acid unit include, but are not limited to, alicyclic dicarboxylic acids having an alicyclic structure of 3 to 10 carbon atoms, and alicyclic dicarboxylic acids having an alicyclic structure of 5 to 10 carbon atoms are preferred.

Examples of this type of alicyclic dicarboxylic acid include, but are not limited to, 1,4-cyclohexanedicarboxylic acid, 1,3-cyclohexanedicarboxylic acid and 1,3-cyclopentanedicarboxylic acid. Among these, 1,4-cyclohexanedicarboxylic acid is preferred.

For the alicyclic dicarboxylic acid that constitutes an alicyclic dicarboxylic acid unit, a single compound may be used alone, or a combination of two or more compounds may be used.

The alicyclic group of the alicyclic dicarboxylic acid may be unsubstituted, or may have a substituent. Examples of the substituent include, but are not limited to, alkyl groups of 1 to 4 carbon atoms such as a methyl group, ethyl group, n-propyl group, isopropyl group, n-butyl group, isobutyl group and tert-butyl group.

The dicarboxylic acid unit other than the isophthalic acid unit preferably includes an aromatic dicarboxylic acid unit, and more preferably includes an aromatic dicarboxylic acid having at least 6 but not more than 12 carbon atoms.

By using this type of dicarboxylic acid, the mechanical properties of the polyamide composition, and particularly the water absorption rigidity, thermal rigidity, fluidity, and surface appearance and the like, tend to be more superior.

In the aspect described above, the dicarboxylic acid that constitutes the dicarboxylic acid unit (1B-a) is not limited to the compounds described above as dicarboxylic acids, and may also be a compound equivalent to a dicarboxylic acid.

Here, a "compound equivalent to a dicarboxylic acid" refers to a compound that is capable of forming a dicarboxylic acid structure the same as the dicarboxylic acid structure derived from an aforementioned dicarboxylic acid. Examples of this type of compound include, but are not limited to, dicarboxylic acid anhydrides and halides.

Further, the semi-aromatic polyamide (1B) may, if required, also contain a unit derived from a trivalent or higher polyvalent carboxylic acid such as trimellitic acid, trimesic acid or pyromellitic acid.

A single trivalent or higher polyvalent carboxylic acid may be used alone, or a combination of two or more compounds may be used.

(Diamine Unit (1B-b))

The diamine unit (b) that constitutes the semi-aromatic polyamide (1B) includes at least 50 mol % of a diamine of 4 to 10 carbon atoms. Examples of the diamine units include, but are not limited to, aliphatic diamine units, alicyclic diamine units, and aromatic diamine units.

—Aliphatic Diamine Units—

Examples of aliphatic diamines that form an aliphatic diamine unit include, but are not limited to, linear saturated aliphatic diamines of 2 to 20 carbon atoms such as ethylenediamine, propylenediamine, tetramethylenediamine, pentamethylenediamine, hexamethylenediamine, heptamethylenediamine, octamethylenediamine, nonamethylenediamine, decamethylenediamine, undecamethylenediamine, dodecamethylenediamine and tridecamethylenediamine. The linear saturated aliphatic diamine may have from 4 to 20 carbon atoms.

—Alicyclic Diamine Units—

Examples of alicyclic diamines that form an alicyclic diamine unit include, but are not limited to, 1,4-cyclohexanediamine, 1,3-cyclohexanediamine and 1,3-cyclopentanediamine.

—Aromatic Diamine Units—

Examples of aromatic diamines that form an aromatic diamine unit include any diamine having an aromatic group, and although there are no particular limitations, examples include meta-xylylenediamine.

Among the diamine units that may constitute the semi-aromatic polyamide (1B), aliphatic diamine units are preferred, diamine units having a linear saturated aliphatic group of 4 to 10 carbon atoms are more preferred, diamine units having a linear saturated aliphatic group of 6 to 10 carbon atoms are even more preferred, and hexamethylenediamine is still more preferred.

By using this type of diamine, a polyamide composition having superior mechanical properties, and particularly superior water absorption rigidity, rigidity under use at high temperature (thermal rigidity), fluidity, and surface appearance and the like tends to be obtained.

A single diamine may be used alone, or a combination of two or more diamines may be used.

The semi-aromatic polyamide (1B) is preferably a polyamide 6I, 9I or 10I, and is most preferably a polyamide 6I.

The semi-aromatic polyamide (1B) may, if required, also contain a trivalent or higher polyvalent aliphatic amine such as bishexamethylenetriamine.

A single trivalent or higher polyvalent aliphatic amine may be used alone, or a combination of two or more compounds may be used.

In the aspect described above, the blend amount of the semi-aromatic polyamide (1B), relative to 100% by mass of all the polyamides in the polyamide composition, is at least 1.0% by mass but not more than 50.0% by mass, preferably at least 5.0% by mass but not more than 47.5% by mass, more preferably at least 10.0% by mass but not more than 46.0% by mass, even more preferably at least 15.0% by mass but not more than 45.0% by mass, still more preferably at least 20.0% by mass but not more than 44.0% by mass, particularly preferably at least 22.5% by mass but not more than 43.0% by mass, and most preferably at least 24.5% by mass but not more than 42.5% by mass. By ensuring that the blend amount of the semi-aromatic polyamide (1B) satisfies the above range, a polyamide composition can be obtained that has excellent mechanical properties, and particularly water absorption rigidity, thermal rigidity, and fluidity and the like. Further, a polyamide composition containing a component typified by an inorganic filler exhibits superior surface appearance.

(Lactam Unit and/or Aminocarboxylic Acid Unit)

The aliphatic polyamide (1A) and the semi-aromatic polyamide (1B) may each also contain a lactam unit and/or an aminocarboxylic acid unit. By including this type of unit, a polyamide of more superior toughness tends to be obtained. Here, the lactam and aminocarboxylic acid that constitute the lactam unit and the aminocarboxylic acid unit refer to a (condensation) polymerizable lactam and aminocarboxylic acid.

Examples of the lactam and aminocarboxylic acid that constitute the lactam unit and the aminocarboxylic acid unit preferably include, but are not limited to, lactams and aminocarboxylic acids of 4 to 14 carbon atoms, and lactams and aminocarboxylic acids of 6 to 12 carbon atoms are more preferred.

Examples of the lactam that constitutes the lactam unit include, but are not limited to, butyrolactam, pivalolactam, ε-caprolactam, caprylolactam, enantolactam, undecanolactam, and laurolactam (dodecanolactam).

Among these, the lactam is preferably ε-caprolactam or laurolactam, and is more preferably ε-caprolactam. By including this type of lactam, a polyamide composition having more superior toughness tends to be obtained.

Examples of the aminocarboxylic acid that constitutes the aminocarboxylic acid unit include, but are not limited to, co-aminocarboxylic acid and α,β-amino acid and the like, which are compounds obtained by ring-opening of a lactam.

The aminocarboxylic acid is preferably a linear or branched saturated aliphatic carboxylic acid of 4 to 14 carbon atoms in which the ω-position is substituted with an amino group. Examples of this type of aminocarboxylic acid include, but are not limited to, 6-aminocaproic acid, 11-aminoundecanoic acid and 12-aminododecanoic acid. Further examples of the aminocarboxylic acid include para-aminomethylbenzoic acid and the like.

For both the lactam and the aminocarboxylic acid that constitute the lactam unit and the aminocarboxylic acid unit respectively, a single compound may be used alone, or a combination of two or more compounds may be used.

The total proportion (mol %) of lactam units and aminocarboxylic acid units, relative to the total of all the polyamides in the polyamide composition, is preferably from 0 to 20 mol %, more preferably from 0 to 10 mol %, and even more preferably from 0 to 5 mol %.

By ensuring that the total proportion of lactam units and aminocarboxylic acid units satisfies this range, effects such as an improvement in the fluidity tend to be obtained.

(End-Capping Agent)

The ends of the polyamides used in the aspect described above may be end-capped with a conventional end-capping agent.

This type of end-capping agent may also be added as a molecular weight adjuster during production of the polyamide from the aforementioned dicarboxylic acid and diamine, and the optionally used lactam and/or aminocarboxylic acid.

Examples of the end-capping agent include, but are not limited to, monocarboxylic acids, monoamines, acid anhydrides such as phthalic anhydride, monoisocyanates, monoacid halides, monoesters, and monoalcohols.

Among these, monocarboxylic acids and monoamines are preferred. By capping the ends of a polyamide with an and -capping agent, a polyamide composition having more superior thermal stability tends to be obtained. Further, the thermal stability of a molded article obtained from the polyamide composition tend to be more superior.

A single type of end-capping agent may be used alone, or a combination of two or more end-capping agents may be used.

Monocarboxylic acids that can be used as end-capping agents may be any compound that exhibits reactivity with an amino group that may exist at the end of a polyamide, and examples include, but are not limited to, aliphatic monocarboxylic acids such as formic acid, acetic acid, propionic acid, butyric acid, valeric acid, caproic acid, caprylic acid, lauric acid, tridecylic acid, myristic acid, palmitic acid, stearic acid, pivalic acid, and isobutyric acid; alicyclic monocarboxylic acids such as cyclohexanecarboxylic acid; and aromatic monocarboxylic acids such as benzoic acid, toluic acid, α-naphthalenecarboxylic acid, β-naphthalenecarboxylic acid, methylnaphthalenecarboxylic acid, and phenylacetic acid.

In particular, from the viewpoints of fluidity and mechanical strength, ends of the semi-aromatic polyamide (1B) are preferably capped with acetic acid.

A single monocarboxylic acid may be used alone, or a combination of two or more monocarboxylic acids may be used.

Monoamines that can be used as end-capping agents may be any monoamine that exhibits reactivity with a carboxyl group that may exist at the end of a polyamide, examples include, but are not limited to, aliphatic monoamines such as methylamine, ethylamine, propylamine, butylamine, hexylamine, octylamine, decylamine, stearylamine, dimethylamine, diethylamine, dipropylamine, and dibutylamine; alicyclic monoamines such as cyclohexylamine and dicyclohexylamine; and aromatic monoamines such as aniline, toluidine, diphenylamine, and naphthylamine.

A single monoamine may be used alone, or a combination of two or more monoamines may be used.

A polyamide composition containing a polyamide that has been end-capped with an end-capping agent tends to exhibit superior heat resistance, fluidity, toughness, low-water absorption, and rigidity.

(Method for Producing Polyamides)

When obtaining a polyamide in the aspect described above, the amount added of the dicarboxylic acid and the amount added of the diamine are preferably close to equimolar. The portion of diamine that may escape from the reaction system during the polymerization reaction is also typically considered when determining the molar ratio, and the molar amount of the total amount of diamine per 1 mol of the total amount of dicarboxylic acid is preferably from 0.9 to 1.2, more preferably from 0.95 to 1.1, and even more preferably from 0.98 to 1.05.

Although not limited to the following method, the method for producing a polyamide typically includes a step of obtaining a polymer by polymerizing a dicarboxylic acid that constitutes the dicarboxylic acid unit, a diamine that constitutes the diamine unit, and if required, a lactam and/or aminocarboxylic acid that constitute a lactam unit and/or aminocarboxylic acid unit, and preferably also includes a step of increasing the degree of polymerization of the polyamide. Further, if necessary, the method may also include an capping step of capping the ends of the obtained polymer with an end-capping agent.

Specific examples of methods for producing a polyamide include the various methods described below.

1) A method in which an aqueous solution or a water suspension of a dicarboxylic acid-diamine salt or a mixture of a dicarboxylic acid and a diamine is heated, and a polymerization is performed with a melted state maintained (hereafter also called a "hot melt polymerization method").

2) A method in which a polyamide obtained from a hot melt polymerization method is maintained in a solid state at a temperature not higher than the melting point to increase the degree of polymerization (hereafter also called a "hot melt polymerization/solid phase polymerization method").

3) A method in which a dicarboxylic acid-diamine salt or a mixture of a dicarboxylic acid and a diamine is held in a solid state and polymerized (hereafter also called a "solid phase polymerization method").

4) A method in which a polymerization is performed using a diamine component and a dicarboxylic acid halide component equivalent to a dicarboxylic acid (hereafter also called a "solution method").

Among the above methods, a production method that includes a hot melt polymerization method is preferred, and when producing a polyamide using the hot melt polymerization method, the melted state is preferably maintained until the completion of the polymerization. In order to maintain the melted state, the production must be performed under polymerization conditions suitable for the polyamide composition. For example, in one method, the polymerization pressure in the hot melt polymerization method is controlled within a range from 14 to 25 kg/cm² (gauge pressure), and heating is then continued while the pressure inside the tank is reduced over a period of at least 30 minutes to atmospheric pressure (a gauge pressure of 0 kg/cm²).

In the method for producing the polyamide, there are no particular limitations on the mode of polymerization used, and either batch or continuous polymerization may be used.

There are no particular limitations on the polymerization device used in production of the polyamide, and conventional devices may be used. For example, an autoclave reactor, a tumbler reactor, or an extruder reactor such as a kneader may be used.

A method for producing a polyamide using a batch hot melt polymerization method is described below in further detail as an example of the polyamide production method, but the method for producing the polyamide is not limited to the following method.

First, for example, an aqueous solution containing about 40 to 60% by mass of the polyamide raw material components (the dicarboxylic acid and the diamine, and if required, a lactam and/or aminocarboxylic acid) is concentrated to about 65 to 90% by mass in a concentration tank that is operated at a temperature of 110 to 180° C. and a pressure of about 0.035 to 0.6 MPa (gauge pressure), thus obtaining a concentrated solution.

The obtained concentrated solution is then transferred to an autoclave, and heating is continued until the pressure inside the autoclave reaches about 1.2 to 2.2 MPa (gauge pressure).

Subsequently, the pressure inside the autoclave is maintained at about 1.2 to 2.2 MPa (gauge pressure) while water and/or any gaseous components are removed, and when the temperature reaches about 220 to 260° C., the pressure is lowered to atmospheric pressure (gauge pressure: 0 MPa).

Once the pressure inside the autoclave has fallen to atmospheric pressure, the pressure is reduced, if required, to effectively remove any by-product water.

Subsequently, the autoclave is pressurized using an inert gas such as nitrogen, and the polyamide melt is extruded from the autoclave as a strand. The extruded strand is cooled and cut to obtain pellets of the polyamide.

(Polymer Ends of Polyamides)

Although there are no particular limitations on the polymer ends of the polyamides used in the aspect described above, the polymer ends may be classified and defined as follows.

1) Amino ends, 2) carboxyl ends, 3) capping agent ends, and 4) other ends.

1) Amino ends are polymer ends having an amino group (—NH2 group), and are derived from the raw material diamine unit.

2) Carboxyl ends are polymer ends having a carboxyl group (—COOH group), and are derived from the raw material dicarboxylic acid.

3) Capping agent ends are ends formed when a capping agent is added during the polymerization. Examples of the capping agent include the end-capping agents described above.

4) Other ends are polymer ends that cannot be classified as one of the above 1) to 3), and examples of these other ends include ends produced when an amino end undergoes a deammoniation reaction, and ends produced when a carboxyl end undergoes a decarboxylation reaction.

(Properties of Aliphatic Polyamide (1A))

The molecular weight, melting point Tm2, crystallization enthalpy ΔH and tan δ peak temperature can be measured using the specific methods disclosed in the examples described below.

Mw (weight average molecular weight) can be used as an indicator of the molecular weight of the aliphatic polyamide (1A). The Mw (weight average molecular weight) of the aliphatic polyamide (1A) is preferably from 10,000 to 50,000, more preferably from 15,000 to 45,000, even more preferably from 20,000 to 40,000, and still more preferably from 25,000 to 35,000.

By ensuring that Mw (weight average molecular weight) satisfies the above range, a polyamide composition having superior mechanical properties, and particularly superior water absorption rigidity, thermal rigidity, and fluidity and the like can be obtained. Further, a polyamide composition containing a component typified by an inorganic filler exhibits superior surface appearance. As described in the examples below, Mw (weight average molecular weight) can be measured using GPC (gel permeation chromatography).

The molecular weight distribution of the aliphatic polyamide (1A) is indicated by the value of Mw (weight average molecular weight)/Mn (number average molecular weight).

Mw (weight average molecular weight)/Mn (number average molecular weight) for the aliphatic polyamide (1A) is preferably from 1.8 to 2.2, and more preferably from 1.9 to 2.1. The lower limit for the molecular weight distribution is 1.0. By ensuring that Mw (weight average molecular weight)/Mn (number average molecular weight) satisfies the above range, a polyamide composition having superior fluidity and the like can be obtained. Further, a polyamide composition containing a component typified by an inorganic filler exhibits superior surface appearance. Furthermore, a molded article obtained from a polyamide composition containing a component typified by an inorganic filler exhibits more superior surface appearance.

Examples of the method used for controlling the value of Mw (weight average molecular weight)/Mn (number average molecular weight) for the aliphatic polyamide (1A) so as to satisfy the above range include a method in which a conventional polycondensation catalyst such as phosphoric acid or sodium hypophosphite is added as an additive during hot melt polymerization of the polyamide, and a method in which polymerization conditions such as the heating conditions and reduced pressure conditions are controlled.

In the aspect described above, the value of Mw (weight average molecular weight)/Mn (number average molecular weight) for the aliphatic polyamide (1A) can be calculated as described in the examples below, using the values for Mw (weight average molecular weight) and Mn (number average molecular weight) obtained using GPC (gel permeation chromatography).

The melting point Tm2 of the aliphatic polyamide (1A) is preferably at least 220° C., more preferably at least 230° C., and even more preferably 240° C. or higher.

Further, the melting point Tm2 of the aliphatic polyamide (1A) is preferably not more than 300° C., more preferably not more than 290° C., even more preferably not more than 280° C., and still more preferably 270° C. or lower.

By ensuring that the melting point Tm2 of the aliphatic polyamide (1A) is at least 220° C., a polyamide composition having more superior thermal rigidity and the like tends to be obtainable. Further, the thermal rigidity and the like of a molded article obtained from the polyamide composition tends to be more superior.

Furthermore, by ensuring that the melting point Tm2 of the aliphatic polyamide (1A) is not more than 300° C., thermal decomposition and the like of the polyamide composition during melt processing such as extrusion and molding tends to be able to be better suppressed.

From the viewpoint of the mechanical properties, and particularly the water absorption rigidity and thermal rigidity, the crystallization enthalpy ΔH of the aliphatic polyamide (1A) is preferably at least 30 J/g, more preferably at least 40 J/g, even more preferably at least 50 J/g, and still more preferably 60 J/g or greater. Further, there are no particular limitations on the upper limit for the crystallization enthalpy ΔH, which is preferably as high as possible.

An example of a device for measuring the melting point Tm2 and the crystallization enthalpy ΔH of the aliphatic polyamide (1A) is a Diamond-DSC device manufactured by PerkinElmer, Inc.

The tan δ peak temperature of the aliphatic polyamide (1A) is preferably at least 40° C., and is more preferably from 50 to 100° C., even more preferably from 60 to 100° C., still more preferably from 70 to 95° C., and still more preferably from 80 to 90° C. By ensuring that the tan δ peak temperature of the aliphatic polyamide (1A) is at least 40° C., a polyamide composition having superior water absorption rigidity and thermal rigidity tends to be obtainable.

As described in the examples below, the tan δ peak temperature of the aliphatic polyamide (1A) can be measured, for example, using a viscoelasticity measuring and analysis device (DVE-V4, manufactured by Rheology Co., Ltd.).

(Properties of Semi-Aromatic Polyamide (1B))

The molecular weight, formic acid relative viscosity (VR (5B)), melting point Tm2, crystallization enthalpy ΔH, tan δ peak temperature, amount of amino ends and amount of carboxyl ends can be measured using the specific methods disclosed in the examples described below.

Mw (weight average molecular weight) can be used as an indicator of the molecular weight of the semi-aromatic polyamide (1B). The Mw (weight average molecular weight) of the semi-aromatic polyamide (1B) is preferably from 10,000 to 35,000, more preferably from 10,000 to 25,000, even more preferably from 13,000 to 24,000, still more preferably from 15,000 to 23,000, particularly preferably from 18,000 to 22,000, and most preferably from 19,000 to 21,000.

By ensuring that Mw (weight average molecular weight) satisfies the above range, a polyamide composition having superior mechanical properties, and particularly superior water absorption rigidity, thermal rigidity, and fluidity and the like can be obtained. Further, a polyamide composition containing a component typified by an inorganic filler exhibits superior surface appearance. As described in the examples below, Mw (weight average molecular weight) can be measured using GPC (gel permeation chromatography).

The difference Mw(1A)–Mw(1B)) between the weight average molecular weight Mw(1A) of the aliphatic polyamide (1A) and the weight average molecular weight Mw(1B) of the semi-aromatic polyamide (1B) is preferably at least 10,000, more preferably at least 11,000, even more preferably at least 12,000, still more preferably at least 13,000, and most preferably 14,000 or greater. By ensuring that the value of {Mw(1A)–Mw(1B)} is at least 10,000, the semi-aromatic polyamide (1B) forms micro-size domains, enabling the formation of a composition having superior water absorption rigidity and thermal rigidity.

The molecular weight distribution of the semi-aromatic polyamide (1B) is indicated by the value of Mw (weight average molecular weight)/Mn (number average molecular weight).

Mw (weight average molecular weight)/Mn (number average molecular weight) for the semi-aromatic polyamide (1B) is preferably not more than 2.6 and more preferably not more than 2.4, and is even more preferably from 1.7 to 2.4, still more preferably from 1.8 to 2.3, particularly preferably from 1.9 to 2.2, and most preferably from 1.9 to 2.1. The lower limit for Mw (weight average molecular weight)/Mn (number average molecular weight) is 1.0. By ensuring that Mw (weight average molecular weight)/Mn (number average molecular weight) satisfies the above range, a polyamide composition having superior fluidity and the like can be obtained. Further, a polyamide composition containing a component typified by an inorganic filler exhibits superior surface appearance.

Examples of the method used for controlling the value of Mw (weight average molecular weight)/Mn (number average molecular weight) for the semi-aromatic polyamide (1B) so as to satisfy the above range include a method in which a conventional polycondensation catalyst such as phosphoric acid or sodium hypophosphite is added as an additive during hot melt polymerization of the polyamide. Further, controlling the polymerization conditions such as the heating conditions and reduced pressure conditions to enable the polycondensation reaction to be completed at the lowest possible temperature in the shortest possible time is also very important. In particular, if the semi-aromatic polyamide (1B) is an amorphous polyamide, then because the polyamide does not have a melting point, enabling a reduction in the reaction temperature is desirable.

If an aromatic compound unit is incorporated within the molecular structure of the polyamide, then the value of the molecular weight distribution (Mw/Mn) tends to increase as the molecular weight increases. A higher molecular weight distribution indicates a higher proportion of polyamide molecules having three-dimensional molecular structures, and this increase in three-dimensional molecular structures tends to progress further upon high-temperature heating, causing a deterioration in the fluidity, and resulting in a deterioration in the surface appearance of a polyamide composition containing a component typified by an inorganic filler.

In the aspect described above, the value of Mw (weight average molecular weight)/Mn (number average molecular weight) for the semi-aromatic polyamide (1B) can be calculated as described in the examples below, using the values for Mw (weight average molecular weight) and Mn (number average molecular weight) obtained using GPC (gel permeation chromatography).

In the aspect described above, the polyamide formic acid relative viscosity (VR) is the relative viscosity of a formic acid solution of the polyamide and can be stated to represent the relative viscosity obtained by comparing the viscosity of a formic acid solution of the polyamide and the viscosity of formic acid itself. In this description, the above VR value is used as an indicator of the molecular weight and the fluidity of the polyamide, with a higher numerical value for VR being evaluated as indicating a higher molecular weight and lower fluidity. Measurement of VR is performed in accordance with ASTM-D789. Specifically, using a solution prepared by dissolving 8.4% by mass of the polyamide in 90% by mass formic acid (water: 10% by mass), the value measured at 25° C. may be employed as the VR value. When VR is lower than 8, the color tone and the mechanical properties are unsatisfactory, whereas when VR is greater than 30, the fluidity deteriorates, and the molding workability worsens. The VR value for the semi-aromatic polyamide (2B) in the aspect described above is typically at least 8 but not more than 30, preferably at least 8 but not more than 25, more preferably at least 10 but not more than 25, and even more preferably at least 10 but not more than 20.

In the aspect described above, Mw/VR for the polyamide is an indicator of the molecular weight and the fluidity. Mw/VR for the semi-aromatic polyamide (2B) is preferably at least 1,000 but not more than 2,000, more preferably at least 1,200 but not more than 2,000, even more preferably at least 1,400 but not more than 2,000, still more preferably at least 1,500 but not more than 2,000, and most preferably at least 1,500 but not more than 1,800. When Mw/VR is less than 1,000, then for example, because the molecular weight decreases, the mechanical properties become unsatisfactory. In contrast, when Mw/VR is greater than 2,000, then for example, because the value of VR decreases, the fluidity increases, and burrs tend to occur during molding, causing molding faults.

From the viewpoint of the mechanical properties, and particularly the water absorption rigidity and thermal rigidity, the crystallization enthalpy ΔH of the semi-aromatic polyamide (1B) is preferably not more than 15 J/g, more preferably not more than 10 J/g, even more preferably not more than 5 J/g, and is still more preferably 0 J/g.

One example of a method for controlling the crystallization enthalpy ΔH of the semi-aromatic polyamide (1B) to obtain a value that satisfies the above range involves increasing the ratio of aromatic monomers relative to dicarboxylic acid units. Further, a conventional method for reducing the degree of crystallinity of the polyamide may also be used, and there are no particular limitations. Specific examples of conventional methods for reducing the degree of crystallinity of the polyamide include a method in which the ratio of meta-substituted aromatic dicarboxylic acid units relative to dicarboxylic acid units is increased, and a method in which the ratio of meta-substituted aromatic diamine units relative to diamine units is increased. From these viewpoints, the semi-aromatic polyamide (1B) preferably contains, as the dicarboxylic acid unit (1B-a), at least 50 mol %, more preferably at least 75 mol %, and even more preferably 100 mol %, of isophthalic acid among all of the dicarboxylic acid units that constitute the semi-aromatic polyamide (1B).

An example of a device for measuring the crystallization enthalpy ΔH of the semi-aromatic polyamide (1B) is a Diamond-DSC device manufactured by PerkinElmer, Inc.

The tan δ peak temperature of the semi-aromatic polyamide (1B) is preferably at least 90° C., and is more preferably from 100 to 160° C., even more preferably from 110 to 150° C., still more preferably from 120 to 145° C., and still more preferably from 130 to 140° C.

The method used for controlling the tan δ peak temperature of the semi-aromatic polyamide (1B) so as to satisfy the above range requires increasing the ratio of aromatic monomers relative to dicarboxylic acid units. Ensuring that the dicarboxylic acid units include at least 75 mol % of isophthalic acid is important, and this proportion is most preferably 100 mol %.

By ensuring that the tan δ peak temperature of the semi-aromatic polyamide (1B) is at least 90° C., a polyamide composition having superior water absorption rigidity and thermal rigidity tends to be obtainable. Further, by ensuring that the tan δ peak temperature of the semi-aromatic polyamide (1B) is not more than 160° C., a polyamide composition containing a component typified by an inorganic filler exhibits superior surface appearance.

As described in the examples below, the tan δ peak temperature of the semi-aromatic polyamide (1B) can be measured, for example, using a viscoelasticity measuring and analysis device (DVE-V4, manufactured by Rheology Co., Ltd.).

The amount of amino ends in the semi-aromatic polyamide (1B), expressed as a number of equivalents per 1 g of the polyamide, is preferably from 5 to 100 μeq/g, more preferably from 10 to 90 μeq/g, even more preferably from 20 to 80 μeq/g, still more preferably from 30 to 70 μeq/g, and still more preferably from 40 to 60 μeq/g. By ensuring that the amount of amino ends satisfies the above range, a composition can be obtained that exhibits excellent resistance to discoloration upon exposure to heat and light. The amount of amino ends can be measured by a neutralization titration.

The amount of carboxyl ends in the semi-aromatic polyamide (1B), per 1 g of the polyamide, is preferably from 50 to 300 μeq/g, more preferably from 100 to 280 μeq/g, even more preferably from 120 to 260 μeq/g, still more preferably from 150 to 250 μeq/g, and still more preferably from 180 to 240 μeq/g. By ensuring that the amount of carboxyl ends satisfies the above range, a polyamide composition having excellent fluidity and the like can be obtained. Further, a polyamide composition containing a component typified by an inorganic filler exhibits superior surface appearance. Furthermore, a molded article obtained from a polyamide composition containing a component typified by an inorganic filler exhibits more superior surface appearance. The amount of carboxyl ends can be measured by a neutralization titration.

The total of the amount of amino ends and the amount of carboxyl ends in the semi-aromatic polyamide (1B), per 1 g of the polyamide, is preferably from 150 to 350 μeq/g, more preferably from 160 to 300 μeq/g, even more preferably from 170 to 280 μeq/g, still more preferably from 180 to 270 μeq/g, and still more preferably from 190 to 260 μeq/g. By ensuring that the total of the amount of amino ends and the amount of carboxyl ends satisfies the above range, a polyamide composition having excellent fluidity and the like can be obtained. Further, a polyamide composition containing a component typified by an inorganic filler exhibits superior surface appearance. Furthermore, a molded article obtained from a polyamide composition containing a component typified by an inorganic filler exhibits more superior surface appearance.

Besides the aliphatic polyamide (1A) and the semi-aromatic polyamide (1B) described above, the polyamide composition of the aspect described above may also contain one or more components selected from the group consisting of inorganic fillers, nucleating agents, lubricants, stabilizers, polymers other than polyamides, metal phosphite salts and/or metal hypophosphite salts, and phosphite ester compounds.

(Inorganic Filler (1C))

Examples of inorganic fillers include, but are not limited to, glass fiber, carbon fiber, calcium silicate fiber, potassium titanate fiber, aluminum borate fiber, clay, glass flakes, talc, kaolin, mica, hydrotalcite, calcium carbonate, magnesium carbonate, zinc carbonate, zinc oxide, calcium monohydrogen phosphate, wollastonite, silica, zeolite, alumina, boehmite, aluminum hydroxide, titanium oxide, silicon oxide, magnesium oxide, calcium silicate, sodium aluminosilicate, magnesium silicate, Ketjen black, acetylene black, furnace black, carbon nanotubes, graphite, brass, copper, silver, aluminum, nickel, iron, calcium fluoride, montmorillonite, swellable fluorine mica, and apatite.

Among these fillers, from the viewpoint of further improving the mechanical strength, one or more fillers selected from the group consisting of glass fiber, carbon fiber, wollastonite, kaolin, mica, talc, calcium carbonate, magnesium carbonate, potassium titanate fiber, aluminum borate fiber and clay is preferred. Of these, one or more fillers selected from the group consisting of glass fiber, carbon fiber, wollastonite, kaolin, mica, talc, calcium carbonate and clay is more preferred.

From the viewpoint of improving the toughness and the surface appearance of molded articles, the number-average fiber diameter of the glass fiber or carbon fiber is preferably from 3 to 30 μm, more preferably from 3 to 20 μm, even more preferably from 3 to 12 μm, still more preferably from 3 to 9 μm, and still more preferably from 4 to 6 μm.

By ensuring that the number-average fiber diameter of the above glass fiber or carbon fiber is not more than 30 μm, a polyamide composition having excellent toughness and superior surface appearance for the molded articles can be obtained. On the other hand, by ensuring that the fiber diameter is at least 3 μm, a polyamide composition can be obtained that exhibits excellent balance between the cost and powder handling properties, and the physical properties (such as the fluidity). Moreover, by ensuring a fiber diameter of 3 to 9 μm, a polyamide composition having superior vibration fatigue properties and slidability can be obtained.

The glass fiber and carbon fiber may have a cross-section that is circular or a flattened shape. Examples of this flattened cross-sectional shape include, but are not limited to, a rectangle, an ellipse of a shape close to a rectangle, an oval, and a cocoon shape in which the central portion in the lengthwise direction has an hourglass-like shape. In this description, an "aspect ratio" refers to a value represented by D2/D1, wherein D2 is the major axis of the fiber cross-section and D1 is the minor axis of the fiber cross-section (a circular shape has an aspect ratio of approximately 1).

Among the various types of glass fiber and carbon fiber, from the viewpoint of enabling excellent mechanical strength to be imparted to the polyamide composition, fibers having a number-average fiber diameter of 3 to 30 μm, a weight-average fiber length of 100 to 750 μm, and an aspect ratio (L/D) between the weight-average fiber length (L) and the number-average fiber diameter (D) of 10 to 100 can be used particularly favorably.

Further, from the viewpoints of reducing warping of plate-like molded articles, and improving the heat resistance, toughness, low-water absorption property, and heat aging resistance, the aspect ratio is preferably at least 1.5, more preferably from 1.5 to 10.0, even more preferably from 2.5 to 10.0, and still more preferably from 3.1 to 6.0. When the aspect ratio satisfies this range, crushing of the fibers during processing such as mixing with the other components, kneading and molding can be effectively prevented, and the desired effects can be more readily obtained in the molded articles.

The thickness of glass fiber or carbon fiber having an aspect ratio of at least 1.5 preferably includes, but is not limited to, a minor axis D1 for the fiber cross-section of 0.5 to 25 μm and a major axis D2 for the fiber cross-section of 1.25 to 250 μm. When these ranges are satisfied, problems associated with the fiber spinning can be effectively avoided, and the strength of the molded articles can be increased without reducing the contact surface area with the resin (polyamide). The minor axis D1 is more preferably from 3 to 25 μm, and the aspect ratio is preferably greater than 3.

These glass fibers or carbon fibers having an aspect ratio of at least 1.5 can be produced, for example, using the methods disclosed in Japanese Examined Patent Application, Second Publication No. Hei 3-59019, Japanese Examined Patent Application, Second Publication No. Hei 4-13300, and Japanese Examined Patent Application, Second Publication No. Hei 4-32775. In particular, glass fiber having an aspect ratio of at least 1.5, produced using either an orifice plate having a plurality of orifices in the bottom surface, wherein a protruding edge that extends downward from the bottom surface is provided around the periphery of each of the plurality of orifice exits, or a nozzle tip for spinning glass fiber of irregular cross-section that has either one or a plurality of orifices and has a plurality of protruding edges extending downward from the outer peripheral tip of the nozzle tip is preferred. With these types of fibrous reinforcing materials, the fiber strand may be used directly in the form of a roving, or the fiber may be subjected to an additional cutting step and used in the form of chopped glass strands.

The number-average fiber diameter and weight-average fiber length used in the present description are values determined using the methods described below. The polyamide composition is placed in an electric furnace, and the contained organic matter is incinerated. From the residue obtained following this incineration treatment, at least 100 glass fibers (or carbon fibers) are selected randomly and observed using a scanning electron microscope (SEM), and the fiber diameter of each of these glass fibers (or carbon fibers) is measured to determine the number-average fiber diameter. In addition, using an SEM photograph of the above 100 or more glass fibers (or carbon fibers) captured at a magnification of 1,000×, the fiber length of each fiber is measured to determine the weight-average fiber length.

The glass fiber or carbon fiber described above may be surface-treated with a silane coupling agent or the like. Examples of the silane coupling agent include, but are not limited to, aminosilanes such as γ-aminopropyltriethoxysilane, γ-aminopropyltrimethoxysilane and N-β-(aminoethyl)-γ-aminopropylmethyldimethoxysilane, mercaptosilanes such as γ-mercaptopropyltrimethoxysilane and γ-mercaptopropyltriethoxysilane, epoxysilanes, and vinylsilanes. Among these, at least one compound selected from the group consisting of the components listed above is preferred, and an aminosilane is more preferred.

Further, the glass fiber or carbon fiber described above may also include, as a sizing agent, a copolymer containing a carboxylic anhydride-containing unsaturated vinyl monomer and an unsaturated vinyl monomer other than a carboxylic anhydride-containing unsaturated vinyl monomer as structural units, an epoxy compound, a polyurethane resin, an acrylic acid homopolymer, a copolymer of acrylic acid and another copolymerizable monomer, a salt of one of the above compounds with a primary, secondary or tertiary amine, or a copolymer containing a carboxylic anhydride-containing unsaturated vinyl monomer and an unsaturated vinyl monomer other than a carboxylic anhydride-containing unsaturated vinyl monomer. One of these sizing agents may be used alone, or a combination of two or more sizing agents may be used.

Among the above sizing agents, from the viewpoint of the mechanical strength of the obtained polyamide composition, copolymers containing a carboxylic anhydride-containing unsaturated vinyl monomer and an unsaturated vinyl monomer other than a carboxylic anhydride-containing unsaturated vinyl monomer as structural units, epoxy compounds, polyurethane resins, and combinations thereof are preferred. Moreover, copolymers containing a carboxylic anhydride-containing unsaturated vinyl monomer and an unsaturated vinyl monomer other than a carboxylic anhydride-containing unsaturated vinyl monomer as structural units, polyurethane resins, and combinations thereof are more preferred.

The glass fiber or carbon fiber is obtained by continuous reaction by applying the sizing agent described above to the fiber using a known method such as a roller-type applicator during a conventional fiber production process, and then drying the produced fiber strands to which the sizing agent has been applied.

The fiber strand may be used directly in the form of a roving, or the fiber may be subjected to an additional cutting step and used in the form of chopped glass strands.

The sizing agent is preferably applied (added) in a solid fraction amount equivalent to 0.2 to 3% by mass relative to 100% by mass of the glass fiber or carbon fiber, and is more preferably applied (added) in an amount equivalent to 0.3 to 2% by mass. From the viewpoint of maintaining the bundling of the fiber, the amount added of the sizing agent is preferably at least 0.2% by mass as a solid fraction relative to 100% by mass of the glass fiber or carbon fiber. On the other hand, from the viewpoint of improving the thermal stability of the obtained polyamide composition, the amount added of the sizing agent is preferably not more than 3% by mass. The drying of the strand may be performed after the cutting step, or the strand may be cut after drying.

From the viewpoint of improving the strength, rigidity and surface appearance of the molded article, examples of preferred inorganic fillers other than glass fiber and carbon fiber include, but are not limited to, wollastonite, kaolin, mica, talc, calcium carbonate, magnesium carbonate, potassium titanate fiber, aluminum borate fiber and clay. More preferred inorganic fillers include wollastonite, kaolin, mica, talc, calcium carbonate and clay, even more preferred inorganic fillers include wollastonite, kaolin, mica and talc, still more preferably inorganic fillers include wollastonite and mica, and wollastonite is particularly desirable. One of these inorganic fillers may be used alone, or a combination of two or more inorganic fillers may be used.

From the viewpoints of improving the toughness and the surface appearance of molded articles, the average particle size of inorganic fillers other than glass fiber and carbon fiber is preferably from 0.01 to 38 µm, more preferably from 0.03 to 30 µm, even more preferably from 0.05 to 25 µm, still more preferably from 0.10 to 20 µm, and particularly preferably from 0.15 to 15 µm.

By ensuring that the average particle size of the above inorganic filler other than glass fiber and carbon fiber is not more than 38 µm, a polyamide composition having superior toughness and excellent surface appearance for molded articles can be obtained. On the other hand, by ensuring that the average particle size is at least 0.1 µm, a polyamide composition can be obtained that exhibits excellent balance between the cost and powder handling properties, and the physical properties (such as the fluidity).

Among the above inorganic fillers, for fillers having a needle-like shape such as wollastonite, the number-average fiber diameter (hereafter also referred to as simply "the average fiber diameter") is used as the average particle size. Further, in the case of inorganic fillers for which the cross-section is not circular, the maximum value for length across the cross-section is used as the (number-average) fiber diameter.

In terms of the weight-average fiber length (hereafter also referred to as simply "the average fiber length") of an aforementioned inorganic filler having a needle-like shape, a numerical value range calculated from the preferred range for the number-average fiber diameter described above, and the preferred range for the aspect ratio (L/D) between the weight-average fiber length (L) and the number-average fiber diameter (D) described below is preferred.

In terms of the aspect ratio (L/D) between the weight-average fiber length (L) and the number-average fiber diameter (D) of an inorganic filler having a needle-like shape, from the viewpoints of improving the surface appearance of the molded articles, and preventing wear of metal parts of the injection molding machine and the like, the aspect ratio is preferably from 1.5 to 10, more preferably from 2.0 to 5, and even more preferably from 2.5 to 4.

Furthermore, the inorganic filler other than glass fiber and carbon fiber may be surface-treated using a silane coupling agent or a titanate-based coupling agent or the like. Examples of the silane coupling agent include, but are not limited to, aminosilanes such as γ-aminopropyltriethoxysilane, γ-aminopropyltrimethoxysilane and N-β-(aminoethyl)-γ-aminopropylmethyldimethoxysilane, mercaptosilanes such as γ-mercaptopropyltrimethoxysilane and γ-mercaptopropyltriethoxysilane, epoxysilanes, and vinylsilanes. Among these, at least one compound selected from the group consisting of the components listed above is preferred, and an aminosilane is more preferred. These types of surface treatment agents may be used to treat the surface of the inorganic filler in advance, or may be added when mixing the polyamides and the inorganic filler. The amount added of the surface treatment agent is preferably from 0.05 to 1.5% by mass relative to 100% by mass of the inorganic filler.

The amount of the inorganic filler, per 100 parts by mass of the total mass of polyamides, is preferably from 5 to 250 parts by mass, more preferably from 30 to 250 parts by mass, even more preferably from 50 to 240 parts by mass, still more preferably from 50 to 200 parts by mass, and particularly preferably from 50 to 150 parts by mass.

By ensuring that the amount of the inorganic filler is at least 5 parts by mass per 100 parts by mass of the total mass of polyamides, improvements in the strength and the rigidity of the obtained polyamide composition can be achieved. On the other hand, by ensuring that the amount of the inorganic filler is not more than 250 parts by mass per 100 parts by mass of the total mass of polyamides, a polyamide composition having excellent extrudability and moldability can be obtained.

(Nucleating Agents)

A nucleating agent means a substance which, by addition to the polyamide composition, has effects such as increasing the crystallization peak temperature, reducing the difference between the extrapolated starting temperature and the extrapolated ending temperature of the crystallization peak, and reducing the size and improving the size uniformity of spherulites within the obtained molded article.

Examples of nucleating agents include, but are not limited to, talc, boron nitride, mica, kaolin, calcium carbonate, barium sulfate, silicon nitride, carbon black, potassium titanate and molybdenum disulfide.

A single nucleating agent may be used alone, or a combination of two or more nucleating agents may be used.

From the viewpoint of the nucleating effect, the nucleating agent is preferably talc or boron nitride.

Further, in terms of achieving a superior nucleating effect, a nucleating agent having a number-average particle size of 0.01 to 10 µm is preferred.

The number-average particle size of the nucleating agent can be determined by dissolving a molded article in a solvent such as formic acid that is capable of dissolving the polyamides, randomly selecting, for example, at least 100 particles of the nucleating agent from the resulting insoluble components, and measuring each particle by observation using an optical microscope or a scanning electron microscope or the like.

In the polyamide composition of the aspect described above, the amount of the nucleating agent, per 100 parts by mass of the total mass of polyamides of the above aspect, is preferably from 0.001 to 1 part by mass, more preferably from 0.001 to 0.5 parts by mass, and even more preferably from 0.001 to 0.09 parts by mass.

By ensuring that the amount of the nucleating agent is at least 0.001 parts by mass per 100 parts by mass of the total mass of polyamides, the heat resistance of the polyamide composition can be improved, whereas by ensuring that the amount of the nucleating agent is not more than 1 part by mass per 100 parts by mass of the total mass of polyamides, a polyamide composition of superior toughness can be obtained.

(Lubricants)

Examples of lubricants include, but are not limited to, higher fatty acids, higher fatty acid metal salts, higher fatty acid esters, and higher fatty acid amides.

A single lubricant may be used alone, or a combination of two or more lubricants may be used.

Examples of the higher fatty acids include saturated or unsaturated linear or branched aliphatic monocarboxylic acids having 8 to 40 carbon atoms, such as stearic acid, palmitic acid, behenic acid, erucic acid, oleic acid, lauric acid and montanic acid, and stearic acid and montanic acid and the like are preferred.

A single higher fatty acid may be used alone, or a combination of two or more higher fatty acids may be used.

A higher fatty acid metal salt is a metal salt of a higher fatty acid.

The metal element that constitutes the higher fatty acid metal salt is preferably an elements of Group 1, 2, or 3 of the periodic table, zinc, or aluminum or the like, and is more preferably a group 1 or 2 element such as calcium, sodium, potassium or magnesium, or aluminum.

Examples of the higher fatty acid metal salts include, but are not limited to, calcium stearate, aluminum stearate, zinc stearate, magnesium stearate, calcium montanate, sodium montanate and calcium palmitate, and metal salts of montanoic acid and metal salts of stearic acid are preferred.

A single higher fatty acid metal salt may be used alone, or a combination of two or more higher fatty acid metal salts may be used.

A higher fatty acid ester is an esterified product of a higher fatty acid and an alcohol. Esters of an aliphatic carboxylic acid having 8 to 40 carbon atoms and an aliphatic alcohol having 8 to 40 carbon atoms are preferred.

Examples of the aliphatic alcohol include, but are not limited to, stearyl alcohol, behenyl alcohol and lauryl alcohol.

Examples of the fatty acid esters include, but are not limited to, stearyl stearate and behenyl behenate.

A single higher fatty acid ester may be used alone, or a combination of two or more such esters may be used.

A higher fatty acid amide is an amide compound of a higher fatty acid.

Examples of the higher fatty acid amides include, but are not limited to, stearic acid amide, oleic acid amide, erucic acid amide, ethylenebisstearamide, ethylenebisoleamide, N-stearyl stearamide, and N-stearyl erucamide.

Preferred higher fatty acid amides include stearic acid amide, erucic acid amide, ethylenebisstearamide and N-stearyl erucamide, and ethylenebisstearamide and N-stearyl erucamide are particularly preferred.

A single higher fatty acid amide may be used alone, or a combination of two or more higher fatty acid amides may be used.

From the viewpoint of the moldability improvement effect, the lubricant is preferably a higher fatty acid metal salt or a higher fatty acid amide, and is more preferably a higher fatty acid metal salt.

The amount of the lubricant in the polyamide composition of the aspect described above, per 100 parts by mass of the total mass of polyamides, is preferably from 0.001 to 1 part by mass, and more preferably from 0.03 to 0.5 parts by mass.

By ensuring that the amount of the lubricant satisfies the above range, a polyamide composition can be obtained that exhibits excellent mold releasability and plasticization time stability and superior toughness, and moreover, any dramatic reduction in the molecular weight of the polyamides caused by molecular chain severance can be prevented.

(Stabilizers)

Examples of stabilizers include, but are not limited to, phenol-based thermal stabilizers, phosphorus-based thermal stabilizers, amine-based thermal stabilizers, metal salts of elements from group 3, group 4, and groups 11 to 14 of the periodic table, and halides of alkali metals and alkaline earth metals.

Examples of the phenol-based thermal stabilizers include, but are not limited to, hindered phenol compounds. Hindered phenol compounds have a property of imparting superior heat resistance and light resistance to resins such as polyamides, and to fibers.

Examples of the hindered phenol compounds include, but are not limited to, N,N'-hexane-1,6-diylbis[3-(3,5-di-t-butyl-4-hydroxyphenylpropion)amide], pentaerythrityl-tetrakis[3-(3,5-di-t-butyl-4-hydroxyphenyl)propionate], N,N'-hexamethylenebis(3,5-di-t-butyl-4-hydroxy-hydrocinnamide), triethylene glycol-bis[3-(3-t-butyl-5-methyl-4-hydroxyphenyl)propionate], 3,9-bis {(2-[3-(3-t-butyl-4-hydroxy-5-methylphenyl)propionyloxy]-1,1-dimethylethyl}-2,4,8,10-tetraoxaspiro[5,5]undecane, 3,5-di-t-butyl-4-hydroxybenzyl phosphonate diethyl ester, 1,3,5-trimethyl-2,4,6-tris(3,5-di-t-butyl-4-hydroxybenzyl) benzene, and 1,3,5-tris(4-t-butyl-3-hydroxy-2,6-dimethylbenzyl) isocyanurate.

One of these compounds may be used alone, or a combination of two or more compounds may be used.

In particular, form the viewpoint of improving the heat aging resistance, N,N'-hexane-1,6-diylbis[3-(3,5-di-t-butyl-4-hydroxyphenylpropionamide)] is preferred.

In those cases where a phenol-based thermal stabilizer is used, the amount of the phenol-based thermal stabilizer in the polyamide composition, relative to 100% by mass of the polyamide composition, is preferably from 0.01 to 1% by mass, and more preferably from 0.1 to 1% by mass. When the amount of the phenol-based thermal stabilizer satisfies this range, the heat aging resistance of the polyamide composition can be further improved, and the amount of gas generated can be reduced.

Examples of the phosphorus-based thermal stabilizers include, but are not limited to, pentaerythritol-type phosphite compounds, trioctyl phosphite, trilauryl phosphite, tridecyl phosphite, octyl diphenyl phosphite, trisisodecyl phosphite, phenyl diisodecyl phosphite, phenyl di(tridecyl) phosphite, diphenyl isooctyl phosphite, diphenyl isodecyl phosphite, diphenyl (tridecyl) phosphite, triphenyl phosphite, tris(nonylphenyl) phosphite, tris(2,4-di-t-butylphenyl) phosphite, tris(2,4-di-t-butyl-5-methylphenyl) phosphite, tris(butoxyethyl) phosphite, 4,4'-butylidene-bis(3-methyl-6-t-butylphenyl-tetra-tridecyl) diphosphite, tetra(C12 to C15 mixed alkyl)-4,4'-isopropylidenediphenyl diphosphite, 4,4'-isopropylidenebis(2-t-butylphenyl)-di(nonylphenyl) phosphite, tris(biphenyl) phosphite, tetra(tridecyl)-1,1,3-tris(2-methyl-5-t-butyl-4-hydroxyphenyl)butane diphosphite, tetra(tridecyl)-4,4'-butylidenebis(3-methyl-6-t-butylphenyl) diphosphite, tetra(C1 to C15 mixed alkyl)-4,4'-isopropylidenediphenyl diphosphite, tris(mono-, di-mixed nonylphenyl) phosphite, 4,4'-isopropylidenebis(2-t-butylphenyl)-di(nonylphenyl) phosphite, 9,10-dihydro-9-oxa-9-oxa-10-phosphaphenanthrene-10-oxide, tris(3,5-di-t-butyl-4-hydroxyphenyl) phosphite, hydrogenated-4,4'-isopropylidenediphenyl polyphosphite, bis(octylphenyl)-bis(4,4'-butylidenebis(3-methyl-6-t-butylphenyl))-1,6-hexanol diphosphite, hexatridecyl-1,1,3-tris(2-methyl-4-hydroxy-5-t-butylphenyl) diphosphite, tris(4,4'-isopropylidenebis(2-t-butylphenyl)) phosphite, tris(1,3-stearoyloxyisopropyl) phosphite, 2,2-methylenebis(4,6-di-t-butylphenyl)octyl phosphite, 2,2-methylenebis(3-methyl-4,6-di-t-butylphenyl) 2-ethylhexyl phosphite, tetrakis(2,4-di-t-butyl-5-methylphenyl)-4,4'-biphenylene diphosphite, and tetrakis(2,4-di-t-butylphenyl)-4,4'-biphenylene diphosphite.

One of these compounds may be used alone, or a combination of two or more compounds may be used.

Of the compounds listed above, from the viewpoints of further improving the heat aging resistance of the polyamide composition and reducing the amount of generated gas, a pentaerythritol-type phosphite compound and/or tris(2,4-di-t-butylphenyl) phosphite is preferred. Examples of the pentaerythritol-type phosphite compound include, but are not limited to, 2,6-di-t-butyl-4-methylphenyl-phenyl-pentaerythritol diphosphite, 2,6-di-t-butyl-4-methylphenyl-methyl-pentaerythritol diphosphite, 2,6-di-t-butyl-4-methylphenyl-2-ethylhexyl-pentaerythritol diphosphite, 2,6-di-t-butyl-4-methylphenyl-isodecyl-pentaerythritol diphosphite, 2,6-di-t-butyl-4-methylphenyl-lauryl-pentaerythritol diphosphite, 2,6-di-t-butyl-4-methylphenyl-isotridecyl-pentaerythritol diphosphite, 2,6-di-t-butyl-4-methylphenyl-stearyl-pentaerythritol diphosphite, 2,6-di-t-butyl-4-methylphenyl-cyclohexyl-pentaerythritol diphosphite, 2,6-di-t-butyl-4-methylphenyl-benzyl-pentaerythritol diphosphite, 2,6-di-t-butyl-4-methylphenyl-ethylcellosolve-pentaerythritol diphosphite, 2,6-di-t-butyl-4-methylphenyl-butylcarbitol-pentaerythritol diphosphite, 2,6-di-t-butyl-4-methylphenyl-octylphenyl-pentaerythritol diphosphite, 2,6-di-t-butyl-4-methylphenyl-nonylphenyl-pentaerythritol diphosphite, bis(2,6-di-t-butyl-4-methylphenyl)pentaerythritol diphosphite, bis(2,6-di-t-butyl-4-ethylphenyl)pentaerythritol diphosphite, 2,6-di-t-butyl-4-methylphenyl-2,6-di-t-butylphenyl-pentaerythritol diphosphite, 2,6-di-t-butyl-4-methylphenyl-2,4-di-t-butylphenyl-pentaerythritol diphosphite, 2,6-di-t-butyl-4-methylphenyl-2,4-di-t-octylphenyl-pentaerythritol diphosphite, 2,6-di-t-butyl-4-methylphenyl-2-cycloexylphenyl-pentaerythritol diphosphite, 2,6-di-t-ambutyl-4-methylphenyl-phenyl-pentaerythritol diphosphite, bis(2,6-di-t-amyl-4-methylphenyl)pentaerythritol diphosphite, and bis(2,6-di-t-octyl-4-methylphenyl)pentaerythritol diphosphite.

One of these compounds may be used alone, or a combination of two or more compounds may be used.

Among the pentaerythritol-type phosphite compounds listed above, from the viewpoint of reducing the amount of generated gas from the polyamide composition, at least one compound selected from the group consisting of bis(2,6-di-t-butyl-4-methylphenyl)pentaerythritol diphosphite, bis(2,6-di-t-butyl-4-ethylphenyl)pentaerythritol diphosphite, bis(2,6-di-t-amyl-4-methylphenyl)pentaerythritol diphosphite, and bis(2,6-di-t-octyl-4-methylphenyl)pentaerythritol diphosphite is preferred, and bis(2,6-di-t-butyl-4-methylphenyl)pentaerythritol diphosphite is more preferred.

In those cases where a phosphorus-based thermal stabilizer is used, the amount of the phosphorus-based thermal stabilizer in the polyamide composition, relative to 100% by mass of the polyamide composition, is preferably from 0.01 to 1% by mass, and more preferably from 0.1 to 1% by mass. When the amount of the phosphorus-based thermal stabilizer satisfies this range, the heat aging resistance of the polyamide composition can be further improved, and the amount of generated gas can be reduced.

Examples of the amine-based thermal stabilizers include, but are not limited to, 4-acetoxy-2,2,6,6-tetramethylpiperidine, 4-stearoyloxy-2,2,6,6-tetramethylpiperidine, 4-acryloyloxy-2,2,6,6-tetramethylpiperidine, 4-(phenylacetoxy)-2,2,6,6-tetramethylpiperidine, 4-benzoyloxy-2,2,6,6-tetramethylpiperidine, 4-methoxy-2,2,6,6-tetramethylpiperidine, 4-stearyloxy-2,2,6,6-tetramethylpiperidine, 4-cyclohexyloxy-2,2,6,6-tetramethylpiperidine, 4-benzyloxy-2,2,6,6-tetramethylpiperidine, 4-phenoxy-2,2,6,6-tetramethylpiperidine, 4-(ethylcarbamoyloxy)-2,2,6,6-tetramethylpiperidine, 4-(cyclohexylcarbamoyloxy)-2,2,6,6-tetramethylpiperidine, 4-(phenylcarbamoyloxy)-2,2,6,6-tetramethylpiperidine, bis(2,2,6,6-tetramethyl-4-piperidyl)-carbonate, bis(2,2,6,6-tetramethyl-4-piperidyl)-oxalate, bis(2,2,6,6-tetramethyl-4-piperidyl)-malonate, bis(2,2,6,6-tetramethyl-4-piperidyl)-sebacate, bis(2,2,6,6-tetramethyl-4-piperidyl)-adipate, bis(2,2,6,6-tetramethyl-4-piperidyl)-terephthalate, 1,2-bis(2,2,6,6-tetramethyl-4-piperidyloxy)-ethane, α,α'-bis(2,2,6,6-tetramethyl-4-piperidyloxy)-p-xylene, bis(2,2,6,6-tetramethyl-4-piperidyltolylene-2,4-dicarbamate, bis(2,2,6,6-tetramethyl-4-piperidyl)-hexamethylene-1,6-dicarbarmate, tris(2,2,6,6-tetramethyl-4-piperidyl)-benzene-1,3,5-tricarboxylate, tris(2,2,6,6-tetramethyl-4-piperidyl)-benzene-1,3,4-tricarboxylate, 1-[2-{3-(3,5-di-t-butyl-4-hydroxyphenyl)propionyloxy} butyl]-4-[3-(3,5-di-t-butyl-4-hydroxyphenyl)propionyloxy]-2,2,6,6-tetramethylpiperidine, and a condensation product of 1,2,3,4-butanetetracarboxylic acid, 1,2,2,6,6-pentamethyl-4-piperidinol, and β,β,β',β'-tetramethyl-3,9-[2,4,8,10-tetraoxaspiro(5,5)undecane]diethanol. One of these compounds may be used alone, or a combination of two or more compounds may be used.

In those cases where an amine-based thermal stabilizer is used, the amount of the amine-based thermal stabilizer in the polyamide composition, relative to 100% by mass of the polyamide composition, is preferably from 0.01 to 1% by mass, and more preferably from 0.1 to 1% by mass. When the amount of the amine-based thermal stabilizer satisfies this range, the heat aging resistance of the polyamide composition can be further improved, and the amount of generated gas can be reduced.

There are no particular limitations on the metal salts of elements from group 3, group 4, and groups 11 to 14 of the periodic table, provided they are salts of metals belonging to these groups. From the viewpoint of further improving the heat aging resistance of the polyamide composition, a copper salt is preferred. Examples of such copper salts include, but are not limited to, copper halides (such as copper iodide, cuprous bromide, cupric bromide, and cuprous chloride), copper acetate, copper propionate, copper benzoate, copper adipate, copper terephthalate, copper isophthalate, copper salicylate, copper nicotinate, copper stearate, and copper complex salts in which copper is coordinated to a chelating agent such as ethylenediamine or ethylenediaminetetraacetic acid. One of these salts may be used alone, or a combination of two or more salts may be used.

Among the copper salts listed above, at least one salt selected from the group consisting of copper iodide, cuprous bromide, cupric bromide, cuprous chloride and copper acetate is preferred, and copper iodide and/or copper acetate is more preferred. When one of these more preferred copper salts is used, a polyamide composition that has excellent heat aging resistance, and can effectively suppress metallic corrosion of the screw and cylinder sections during extrusion (hereinafter, sometimes referred to simply as "metallic corrosion") can be obtained.

In those cases where a metal salt is used, the amount of the metal salt in the polyamide composition, relative to 100% by mass of the polyamide composition, is preferably from 0.01 to 0.60% by mass, and more preferably from 0.02 to 0.40% by mass. When the amount of the metal salt satisfies this range, the heat aging resistance of the polyamide composition can be further improved, and copper precipitation and metallic corrosion can be effectively suppressed.

Further, from the viewpoint of improving the heat aging resistance of the polyamide composition, the concentration of copper element derived from the above copper salt, relative to $10^6$ parts by mass of the total mass of polyamides, is preferably from 10 to 2,000 parts by mass, more preferably from 30 to 1,500 parts by mass, and even more preferably from 50 to 500 parts by mass.

Examples of the halides of alkali metals and alkaline earth metals include, but are not limited to, potassium iodide, potassium bromide, potassium chloride, sodium iodide, sodium chloride, and mixtures of these halides. Among these, from the viewpoints of improving the heat aging resistance and suppressing metallic corrosion, potassium iodide and/or potassium bromide is preferred, and potassium iodide is more preferred.

In those cases where a halide of an alkali metal or alkaline earth metal is used, the amount of the halide of an alkali metal or alkaline earth metal in the polyamide composition, per 100 parts by mass of the total mass of polyamides, is preferably from 0.05 to 20 parts by mass, and more preferably from 0.2 to 10 parts by mass. When the amount of the halide of an alkali metal or alkaline earth metal satisfies this range, the heat aging resistance of the polyamide composition can be further improved, and precipitation of copper and metallic corrosion can be effectively suppressed.

One of the stabilizer components described above may be used alone, or a combination of two or more types may be used. Of the various possibilities, from the viewpoint of further improving the heat aging resistance of the polyamide composition, a mixture of a copper salt and a halide of an alkali metal or alkaline earth metal is ideal.

The ratio between the copper salt and the halide of an alkali metal or alkaline earth metal, expressed as a molar ratio between halogen and copper (halogen/copper) is preferably within a range from 2/1 to 40/1, and more preferably from 5/1 to 30/1. When this ratio satisfies this range, the heat aging resistance of the polyamide composition can be further improved.

When the above halogen/copper ratio is at least 2/1, precipitation of copper and metallic corrosion can be effectively suppressed, which is desirable. On the other hand, when the above halogen/copper ratio is not more than 40/1, corrosion of the screw and the like of the molding machine can be prevented without substantially impairing the mechanical properties (such as the toughness), which is also desirable.

(Polymers Other than Polyamides in the Above Aspect)

Examples of polymers other than the aliphatic polyamide (1A) and the semi-aromatic polyamide (1B) described above include, but are not limited to, polyesters, liquid crystal polyesters, polyphenylene sulfides, polyphenylene ethers, polycarbonates, polyarylates, phenol resins and epoxy resins.

Examples of the polyesters include, but are not limited to, polybutylene terephthalate, polytrimethylene terephthalate, polyethylene terephthalate and polyethylene naphthalate.

The amount of polymer(s) other than the polyamides in the aspect described above, per 100 parts by mass of the total mass of polyamides, is preferably from 1 to 200 parts by mass, more preferably from 5 to 100 parts by mass, and even more preferably from 5 to 50 parts by mass. By ensuring that the amount of polymers other than the polyamides in the polyamide composition of the aspect described above satisfies the above range, a polyamide composition having excellent heat resistance and mold releasability can be obtained.

Examples of the metal phosphite salts and/or metal hypophosphite salts include salts of phosphorous acid, hypophosphorous acid, pyrophosphorous acid or diphosphorous acid with a metal of group 1 or 2 of the periodic table, manganese, zinc, aluminum, ammonia, an alkylamine, a cycloalkylamine or a diamine. Among these, sodium hypophosphite, calcium hypophosphite and magnesium hypophosphite are preferred. By including a metal phosphite salt and/or metal hypophosphite salt, a polyamide composition having excellent extrudability and molding stability can be obtained.

Examples of the phosphite ester compounds include triphenyl phosphite and tributyl phosphite. By adding a phosphite ester compound, a polyamide composition having excellent extrudability and molding stability can be obtained.

Further examples of the phosphite ester compounds include trioctyl phosphite, trilauryl phosphite, tridecyl phosphite, octyl-diphenyl phosphite, trisisodecyl phosphite, phenyl diisodecyl phosphite, phenyl di(tridecyl) phosphite, diphenyl isooctyl phosphite, diphenyl isodecyl phosphite, diphenyl tridecyl phosphite, triphenyl phosphite, tris(nonylphenyl) phosphite, tris(2,4-di-t-butylphenyl) phosphite, bis[2,4-bis(1,1-dimethylethyl)-6-methylphenyl]ethyl phosphite, bis(2,4-di-t-butylphenyl)pentaerythritol diphosphite, bis(2,6-di-t-butyl-4-methylphenyl)pentaerythritol diphosphite, 2,2-methylenebis(4,6-di-t-butylphenyl)octyl phosphite, 4,4'-butylidene-bis(3-methyl-6-t-butylphenyl-di-tridecyl) phosphite, 1,1,3-tris(2-methyl-4-ditridecyl phosphite-5-t-butyl-phenyl)butane, 4,4'-isopropylidenebis (phenyl-dialkylphosphite), tris(2,4-di-t-butylphenyl) phosphite, 2,2-methylenebis(4,6-di-t-butylphenyl)octyl phosphite, and bis(2,6-di-t-butyl-4-methylphenyl)pentaerythritol diphosphite.

A single phosphite ester compound may be used alone, or a combination of two or more phosphite ester compounds may be used.

The polyamide composition of the aspect described above may also contain additives that are typically used in polyamides, including colorants such as pigments or dyes (including colored masterbatches), flame retardants, fibrillating agents, fluorescent bleaching agents, plasticizers, antioxidants, ultraviolet absorbers, antistatic agents, fluidity improvers, spreading agents and elastomers, provided these additives do not impair the objects of the above aspect.

In those cases where the polyamide composition of the aspect described above contains the aforementioned types of other raw materials that may be included in the polyamide composition, the amounts of those other raw materials will vary depending on the type of material and the potential application of the polyamide composition, and therefore there are no particular limitations on those amounts provided the objects of the above aspect are not impaired.

[Method for Producing Polyamide Composition]

There are no particular limitations on the method for producing the polyamide composition of the aspect described above, provided the method includes a step of melt kneading raw material components that include the aliphatic polyamide (1A) and the semi-aromatic polyamide (1B) described above. For example, a method including a step of melt kneading raw material components containing the above polyamides using an extruder, wherein the temperature setting of the extruder is set to a value not higher than the melting peak temperature Tm2 of the polyamide composition +30° C., is preferred.

Examples of the method for performing the melt kneading of the raw material components containing the polyamides include a method in which the polyamides and the other raw materials are mixed using a tumbler or a Henschel mixer or the like, and the resulting mixture is supplied to and kneaded in a melt kneader, and a method in which the polyamides are converted to a melted state using a single-screw or twin-screw extruder, and the other raw materials are then blended with the polyamide melt from a side feeder.

The method for supplying the components that constitute the polyamide composition to the melt kneader may be performed by supplying all of the constituent components to the same supply port in a single batch, or by supplying the respective constituent components from different supply ports.

The melt kneading temperature, expressed as the resin temperature, is preferably about 250 to 350° C.

The melt kneading time is preferably about 0.25 to 5 minutes.

There are no particular limitations on the device used for performing the melt kneading, and conventional devices such as single-screw or twin-screw extruders, a Banbury mixer or a mixing roll may be used.

[Physical Properties of Polyamide Composition]

The molecular weight, melting point Tm2, crystallization enthalpy $\Delta H$ and tan $\delta$ peak temperature of the polyamide composition of the aspect described above can be measured using the specific methods disclosed in the examples described below.

Mw (weight average molecular weight) can be used as an indicator of the molecular weight of the polyamide composition. The Mw (weight average molecular weight) of the polyamide composition is typically from 15,000 to 35,000, preferably from 17,000 to 35,000, more preferably from 20,000 to 35,000, even more preferably from 22,000 to 34,000, still more preferably from 24,000 to 33,000, and most preferably from 25,000 to 32,000. By ensuring that Mw (weight average molecular weight) satisfies this range, a polyamide composition having superior mechanical properties, and particularly superior water absorption rigidity, thermal rigidity, and fluidity and the like can be obtained. Further, a polyamide composition containing a component typified by an inorganic filler exhibits superior surface appearance.

Examples of the method used for controlling the Mw value for the polyamide composition so as to satisfy the above range include methods that use polyamides for which the Mw values of the aliphatic polyamide (1A) and the semi-aromatic polyamide (1B) satisfy the ranges described above.

As described in the examples below, Mw (weight average molecular weight) can be measured using GPC (gel permeation chromatography).

The total amount of polyamide having a number average molecular weight Mn of at least 500 but not more than 2,000, relative to the total mass of polyamide in the polyamide composition, is preferably at least 0.5% by mass but less than 2.5% by mass, more preferably at least 0.8% by mass but less than 2.5% by mass, even more preferably at least 1.0% by mass but less than 2.5% by mass, still more preferably at least 1.2% by mass but less than 2.5% by mass, and most preferably at least 1.4% by mass but less than 2.5% by mass. By ensuring that the amount of polyamide having a number average molecular weight Mn of at least 500 but not more than 2,000 is at least 0.5% by mass, a polyamide composition having superior fluidity and containing a component typified by an inorganic filler exhibits superior surface appearance. Further, by ensuring an amount of less than 2.5% by mass, gas generation during molding can be suppressed.

In terms of the method used for controlling the total amount of polyamide having a number average molecular weight Mn of at least 500 but not more than 2,000 so as to satisfy the above range, the molecular weight of the semi-aromatic polyamide (1B) is an important factor, and the Mw (weight average molecular weight) is preferably from 10,000 to 25,000.

The total amount of polyamide having a number average molecular weight Mn of at least 500 but not more than 2,000 relative to the total mass of polyamide is determined using GPC, from an elution curve obtained under the measurement conditions used in the examples described below.

In the GPC measurement, in those cases where the polyamide composition containing the aliphatic polyamide (1A) and the semi-aromatic polyamide (1B) also contains other components that are soluble in the solvent used to dissolve the polyamide resins, those other components are first eluted and removed using a solvent in which the polyamides are insoluble but the other components are soluble, and the GPC measurement is then performed. Further, in the case of materials such as the inorganic filler that are insoluble in the solvent used to dissolve the polyamides, the polyamide composition is dissolved in the solvent capable of dissolving the polyamides, and a filtration is then performed to remove any insoluble matter before the GPC measurement is performed.

The difference {Mw(1A)−Mw(1B)} between the weight average molecular weight Mw(1A) of the aliphatic polyamide (1A) and the weight average molecular weight Mw(1B) of the semi-aromatic polyamide (1B) is preferably at least 2,000, more preferably at least 5,000, even more preferably at least 8,000, still more preferably at least 10,000, and most preferably 12,000 or greater. By ensuring that {Mw(1A)−Mw(1B)} is at least 2,000, the semi-aromatic polyamide (1B) forms micro-size domains, enabling a composition having superior water absorption rigidity and thermal rigidity to be obtained.

The value of Mw (weight average molecular weight)/Mn (number average molecular weight) is an indicator of the molecular weight distribution of the polyamide composition of the aspect described above.

The value of Mw (weight average molecular weight)/Mn (number average molecular weight) for the polyamide composition of the above aspect is preferably not more than 2.4, more preferably from 1.7 to 2.3, even more preferably from 1.8 to 2.2, and still more preferably from 1.9 to 2.1. The lower limit for the molecular weight distribution is 1.0. By ensuring that Mw (weight average molecular weight)/Mn (number average molecular weight) satisfies the above range, a polyamide composition having superior fluidity and the like can be obtained. Further, a polyamide composition containing a component typified by an inorganic filler exhibits superior surface appearance.

In terms of the method used for controlling the value of Mw (weight average molecular weight)/Mn (number average molecular weight) for the polyamide composition so as to satisfy the above range, controlling the value of Mw (weight average molecular weight)/Mn (number average molecular weight) for the semi-aromatic polyamide (1B) so that it satisfies the range described above is an important factor.

When the molecular structure of the polyamide composition contains aromatic compound units, the value for the molecular weight distribution (Mw/Mn) tends to increase as the molecular weight increases. A higher molecular weight distribution indicates a higher proportion of polyamide molecules having three-dimensional molecular structures, and this increase in three-dimensional molecular structures tends to progress further upon high-temperature heating, causing a deterioration in the fluidity, and resulting in a deterioration in the surface appearance of a polyamide composition containing a component typified by an inorganic filler.

In the aspect described above, Mw (weight average molecular weight)/Mn (number average molecular weight) for the polyamide composition can be calculated as described in the examples below, using the values for Mw (weight average molecular weight) and Mn (number average molecular weight) obtained using GPC (gel permeation chromatography).

The melting point Tm2 of the polyamide composition is preferably at least 200° C., more preferably from 220 to 270° C., even more preferably from 230 to 265° C., still more preferably from 240 to 260° C., and particularly preferably from 250 to 260° C.

By ensuring that the melting point Tm2 of the polyamide composition is at least 200° C., a polyamide composition having more superior rigidity under use at high temperature (thermal rigidity) tends to be obtainable.

Further, by ensuring that the melting point Tm2 of the polyamide composition is not more than 270° C., thermal decomposition and the like of the polyamide composition during melt processing such as extrusion and molding tends to be able to be better suppressed.

From the viewpoints of the mechanical properties, and particularly the water absorption rigidity and the thermal rigidity, the crystallization enthalpy ΔH of the polyamide composition is preferably at least 10 J/g, more preferably at least 14 J/g, even more preferably at least 18 J/g, and still more preferably 20 J/g or greater. Further, there are no particular limitations on the upper limit for the crystallization enthalpy ΔH, which is preferably as high as possible.

An example of a method for controlling the crystallization enthalpy ΔH of the polyamide composition so as to satisfy the above range is a method in which the blend ratio between the aliphatic polyamide (1A) and the semi-aromatic polyamide (1B) is controlled so as to satisfy the range described above.

An example of a device for measuring the melting point Tm2 and the crystallization enthalpy ΔH of the polyamide composition is a Diamond-DSC device manufactured by PerkinElmer, Inc.

The tan δ peak temperature of the polyamide composition is preferably at least 90° C., more preferably at least 100° C., even more preferably at least 110° C., and still more preferably 120° C. or higher.

Further, the tan δ peak temperature of the polyamide composition is preferably not more than 150° C., more preferably not more than 140° C., and even more preferably 130° C. or lower.

By ensuring that the tan δ peak temperature of the polyamide composition is at least 90° C., a polyamide composition having superior water absorption rigidity and thermal rigidity tends to be obtainable. Furthermore, by ensuring that the tan δ peak temperature of the polyamide composition is not higher than 150° C., a polyamide composition containing a component typified by an inorganic filler exhibits superior surface appearance.

An example of a method for controlling the tan δ peak temperature of the polyamide composition so as to satisfy the range described above is a method in which the blend ratio between the aliphatic polyamide (1A) and the semi-aromatic polyamide (1B) is controlled so as to satisfy the range described above.

The crystallization peak temperature Tc (° C.) obtained when the polyamide composition of the aspect described above is cooled at 20° C./min is preferably within a range from 160 to 240° C.

The crystallization peak temperature Tc (° C.) of the polyamide composition is more preferably from 170 to 230° C., even more preferably from 180 to 225° C., still more preferably from 190 to 220° C., and particularly preferably from 200 to 215° C.

By ensuring that the crystallization peak temperature Tc (° C.) of the polyamide composition is at least 160° C., a polyamide composition having excellent mold releasability during molding can be obtained. Further, by ensuring that the crystallization peak temperature Tc (° C.) of the polyamide composition is not higher than 240° C., a polyamide composition containing a component typified by an inorganic filler exhibits superior surface appearance.

Measurement of the melting point crystallization peak temperature Tc of the polyamide composition used in the above aspect can be performed in accordance with JIS-K7121, using the method described in the examples below.

An example of a device for measuring the crystallization peak temperature Tc is a Diamond-DSC device manufactured by PerkinElmer, Inc. An example of a method for controlling the crystallization peak temperature Tc of the polyamide composition so as to satisfy the above range is a method in which the blend ratio between the aliphatic polyamide (1A) and the semi-aromatic polyamide (1B) is controlled so as to satisfy the range described above.

In the polyamide composition of the aspect described above, the ratio of the amount of amino ends relative to the total of the amount of amino ends and the amount of carboxyl ends (amount of amino ends/(amount of amino ends+amount of carboxyl ends)) is preferably at least 0.25 but less than 0.4, more preferably at least 0.35 but less than 0.4, and even more preferably at least 0.25 but less than 0.35. By ensuring that the ratio of the amount of amino ends relative to the total of the amount of amino ends and the amount of carboxyl ends is at least 0.25, corrosion of the extruder and molding machine can be suppressed. By ensuring that the ratio of the amount of amino ends relative to the total of the amount of amino ends and the amount of carboxyl ends is less than 0.4, a composition having superior resistance to discoloration upon exposure to heat and light can be obtained.

The surface gloss of the polyamide composition of the aspect described above is preferably at least 50, more preferably at least 55, and even more preferably 60 or greater. By ensuring that the surface gloss of the polyamide composition is at least 50, the composition can be used favorably as a molding material for various components for vehicles, electrical and electronic components, industrial materials, engineering materials, everyday materials, and household items and the like.

[Molded Article]

A molded article according to an aspect described above is obtained by molding the polyamide composition described above.

The molded article of this aspect has excellent mechanical properties, and particularly superior water absorption rigidity, thermal rigidity, fluidity, and surface appearance and the like.

The molded article of this aspect can be obtained, for example, by molding the polyamide composition described above using a conventional molding method.

Examples of conventional molding methods include, but are not limited to, generally known plastic molding methods such as press molding, injection molding, gas-assisted injection molding, welding molding, extrusion molding, blow molding, film molding, hollow molding, multilayer molding, and melt spinning.

(Applications)

The molded article of the above aspect is obtained from the polyamide composition described above, and therefore exhibits excellent moldability and mechanical strength, low water absorption, and superior surface appearance. Accordingly, the molded article of the above aspect can be used favorably as all manner of components such as various sliding components, vehicle components, electric and electronic components, household appliance components, OA (office automation) equipment components, mobile equipment components, industrial equipment components, and everyday items and household items, as well as for extrusion applications. Among these applications, the molded article of the above aspect can be used particularly favorably for vehicle components, electronic components, household appliance components, OA equipment components, or mobile equipment components.

Examples of the vehicle components include, but are not particularly limited to, air intake system components, cooling system components, fuel system components, interior components, exterior components, and electrical components.

Examples of the vehicle air intake system components include, but are not particularly limited to, an air intake manifold, intercooler inlet, exhaust pipe cover, inner bushing, bearing retainer, engine mount, engine head cover, resonator, and throttle body.

Examples of the vehicle cooling system components include, but are not particularly limited to, a chain cover, thermostat housing, outlet pipe, radiator tank, alternator, and delivery pipe.

Examples of the vehicle fuel system components include, but are not particularly limited to, a fuel delivery pipe and a gasoline tank case.

Examples of the vehicle interior components include, but are not particularly limited to, an instrument panel, console box, glove box, steering wheel, and trim.

Examples of the vehicle exterior components include, but are not particularly limited to, a molding, lamp housing, front grill, mud guard, side bumper, door mirror stay, and roof rail.

Examples of the vehicle electrical components include, but are not particularly limited to, a connector or wire harness connector, motor components, lamp socket, sensor-mounted switch, and combination switch.

Examples of the electrical and electronic components include, but are not particularly limited to, connectors, a reflector for a light emitting device, switches, relays, printed wiring boards, electronic part housings, power points, noise filters, coil bobbins, and motor end caps. The reflector for a light emitting device can be widely used for semiconductor packages, including optical semiconductors such as light emitting diodes (LED) and laser diodes (LD), as well as photodiodes, charge coupled devices (CCD), and complementary metal oxide semiconductors (CMOS).

Examples of the mobile equipment components include, but are not particularly limited to, housings and structural components of mobile phones, smart phones, personal computers, portable video game consoles, and digital cameras and the like.

Examples of the industrial equipment components include, but are not particularly limited to, a gear, cam, insulation block, valve, power tool component, agricultural implement component, and engine cover.

Examples of the everyday items and household items include, but are not particularly limited to, buttons, food containers, and office furniture and the like.

Examples of the extrusion applications include, but are not particularly limited to, films, sheets, filaments, tubes, rods and hollow molded articles.

Among this variety of applications described above, the molded article obtained from the polyamide composition of the aspect described above is particularly ideal for exterior structural materials. An exterior structural material refers to a mechanism component or structural component that requires molded article surface workability (for example, embossability or high surface gloss) and also requires comparatively large strength and rigidity, and specific examples include furniture components such as desk legs, chair legs, seats, cabins and trolleys, OA equipment field items such as housings for notebook computers, vehicle components such as door mirror stays, wheel rims, wheel caps, wipers, motor fans, seat lock components, gears and lamp housings, electrical field items such as pulleys, gears and hot air equipment housings, and items from other fields including vehicle components such as wheel rims, wheel spokes, saddles, saddle posts, handles, stands and load-carrying racks, as well as valve housings, nails, screws, bolts and bolt nuts.

Furthermore, a molded article obtained from the polyamide composition of the aspect described above exhibits excellent surface appearance, and can therefore also be used favorably as a molded article that has a coating film formed on the surface of the molded article. There are no particular limitations on the method used for forming the coating film, and any conventional method may be used, including spraying methods and electrostatic coating methods. Further, there are no particular limitations on the coating material used for the coating, and any conventional coating material may be used, including melamine crosslinking type polyester polyol resin coating materials and acrylic urethane-based coating materials.

Among these, because the polyamide composition according to the aspect described above has excellent mechanical strength, toughness, heat resistance and vibration fatigue resistance, the composition is ideal as a material for vehicle components, and moreover, because the polyamide composition has excellent slidability, it is particularly ideal as a material for gear and bearing components. Furthermore, because the polyamide composition has excellent mechanical strength, toughness and heat resistance, the composition is also ideal as a material for electric and electronic components.

<<Aspects 2-1 and 2-2>>
[Polyamide Composition]

A polyamide composition according to an aspect 2-1 of the present invention is a polyamide composition containing:

(2A) an aliphatic polyamide formed from a diamine and a dicarboxylic acid, (2B) a semi-aromatic polyamide containing a dicarboxylic acid unit that includes at least 75 mol % of isophthalic acid and a diamine unit that includes a diamine of at least 4 but not more than 10 carbon atoms, (2C) a pigment, (2D1) a flame retardant, and (2D2) a flame retardant auxiliary, wherein the tan δ peak temperature of the polyamide composition is at least 90° C., and the weight average molecular weight Mw of the polyamide composition satisfies 10,000≤Mw≤40,000.

In the aspect described above, a "polyamide" means a polymer having an amide linkage (—NHCO—) within the main chain. Details of the aliphatic polyamide (2A) and the semi-aromatic polyamide (2B) are described below.

(Aliphatic Polyamide (2A))

The aliphatic polyamide (2A) is as described above for the "aliphatic polyamide (1A)" in the above aspect 1-1.

(Semi-Aromatic Polyamide (2B))

Details relating to the semi-aromatic polyamide (2B) are, with the exception of the points described below, as described above for the "semi-aromatic polyamide (1B)" in the above aspect 1-1.

The semi-aromatic polyamide (2B) used in the aspect described above is a polyamide containing a dicarboxylic acid unit (2B-a) that includes at least 75 mol % of isophthalic acid and a diamine unit (2B-b) that includes a diamine of at least 4 but not more than 10 carbon atoms.

The total amount of the above isophthalic acid unit and diamine unit of at least 4 but not more than 10 carbon atoms, relative to 100 mol % of all the structural units in the polyamide (2B), is preferably at least 50 mol %, more preferably from 80 to 100 mol %, even more preferably from 90 to 100 mol %, and most preferably 100 mol %.

(Lactam Unit and/or Aminocarboxylic Acid Unit)

Details relating to a lactam unit and/or an aminocarboxylic acid unit are as described above in the aspect 1-1.

(End-Capping Agent)

The ends of the polyamides used in the aspect described above may be end-capped with a conventional end-capping agent.

This end-capping agent is as described above in the aspect 1-1.

(Method for Producing Polyamides)

Methods that may be used for producing the polyamides are as described above in the aspect 1-1.

(Polymer Ends of Polyamides)

Details relating to the polymer ends of the polyamides are as described above in the aspect 1-1.

(Properties of Aliphatic Polyamide (2A))

Details relating to the properties of the aliphatic polyamide (2A) are as described above for the "properties of the aliphatic polyamide (1A)" in the above aspect 1-1.

(Properties of Semi-Aromatic Polyamide (2B))

Details relating to the properties of the semi-aromatic polyamide (2B) are as described above for the "properties of the semi-aromatic polyamide (1B)" in the above aspect 1-1.

(Pigment (2C))

The polyamide composition of the aspect described above contains a pigment.

Examples of the pigment include, but are not particularly limited to, dyes such as nigrosine, pigments such as zinc sulfide, zinc oxide, titanium oxide and carbon black; metal particles of aluminum, colored aluminum, nickel, tin, copper, gold, silver, platinum, iron oxide, stainless steel, or titanium or the like; and metallic pigments such as mica-based pearl pigments, colored graphite, colored glass fiber and colored glass flakes. Among these, in terms of the mechanical properties such as toughness, strength and rigidity, and the balance between flame retardancy and coloration, the white pigments of zinc sulfide (ZnS) and zinc oxide (ZnO) are preferred.

(Flame Retardant (2D1))

There are no particular limitations on the flame retardant (2D1) used in the aspect described above provided the flame retardant contains a halogen element, and examples include chlorine-based flame retardants and bromine-based flame retardants.

One of these flame retardants (2D1) may be used alone, or a combination of two or more flame retardants may be used.

Examples of the chlorine-based flame retardants include chlorinated paraffin, chlorinated polyethylene, dodecachloropentacyclooctadeca-7,15-diene (Dechlorane Plus 25 <a registered trademark>, manufactured by Occidental Chemical Corporation), and HET acid anhydride.

Examples of the bromine-based flame retardants include hexabromocyclododecane (HBCD), decabromodiphenyl oxide (DBDPO), octabromodiphenyl oxide, tetrabromobisphenol A (TBBA), bis(tribromophenoxy)ethane, bis(pentabromophenoxy)ethane (BPBPE), tetrabromobisphenol A epoxy resin (TBBA epoxy), tetrabromobisphenol A carbonate (TBBA-PC), ethylene(bistetrabromophthal)imide (EBT-BPI), ethylenebispentabromodiphenyl, tris(tribromophenoxy)triazine (TTBPTA), bis(dibromopropyl) tetrabromobisphenol A (DBP-TBBA), bis(dibromopropyl) tetrabromobisphenol S (DBP-TBBS), brominated polyphenylene ethers (BrPPE) (such as poly(di)bromophenylene ether), brominated polystyrenes (BrPS) (such as polydibromostyrene, polytribromostyrene, and crosslinked brominated polystyrenes), brominated crosslinked aromatic polymers, brominated epoxy resins, brominated phenoxy resins, brominated styrene-maleic anhydride polymers, tetrabromobisphenol S (TBBS), tris(tribromoneopentyl) phosphate (TTBNPP), polybromotrimethylphenylindane (PBPI), and tris(dibromopropyl)-isocyanurate (TDBPIC).

From the viewpoint of suppressing the amount of corrosive gas generated during melt processing such as extrusion and molding, and from the viewpoints of achieving favorable flame retardancy and mechanical properties such as toughness and rigidity, the flame retardant (2D1) is preferably a brominated polyphenylene ether (such as poly(di)bromophenylene ether), or a brominated polystyrene (such as polydibromostyrene, polytribromostyrene or crosslinked brominated polystyrenes), and is more preferably a brominated polystyrene.

Examples of the method used for producing the brominated polystyrene include, but are not particularly limited to, methods in which a styrene monomer is polymerized to produce a polystyrene, and the benzene rings of the polystyrene are then brominated, and methods in which a brominated styrene monomer (such as bromostyrene, dibromostyrene or tribromostyrene) is polymerized to produce a brominated polystyrene.

The bromine content of the brominated polystyrene is preferably from 55 to 75% by mass. By ensuring that the bromine content is at least 55% by mass, the amount of bromine required to achieve satisfactory flame retardancy can be achieved with only a small amount of added brominated polystyrene, and a polyamide composition can be obtained which exhibits excellent heat resistance, fluidity, toughness, low-water absorption and rigidity, with no adverse effects on the inherent properties of the polyamide copolymers. Further, by ensuring that the bromine content is not more than 75% by mass, thermal decomposition is less likely to occur during melt processing such as extrusion and molding, and gas generation and the like are able to be better suppressed, enabling a polyamide composition having excellent heat discoloration resistance to be obtained.

(Flame Retardant Auxiliary (2D2))

By including the flame retardant auxiliary (2D2) in the polyamide composition of the aspect described above, a polyamide composition having more superior flame retardancy can be obtained.

Examples of flame retardant auxiliaries (2D2) that may be used in the aspect described above include, but are not particularly limited to, antimony oxides such as diantimony trioxide ($Sb_2O_3$), diantimony tetroxide, diantimony pentoxide and sodium antimonate; tin oxides such as tin monoxide and tin dioxide; iron oxides such as ferric oxide and γ-iron oxide; as well as other metal oxides such as zinc oxide, zinc borate, calcium oxide, aluminum oxide (alumina), aluminum oxide (boehmite), silicon oxide (silica), titanium oxide, zirconium oxide, manganese oxide, molybdenum oxide, cobalt oxide, bismuth oxide, chromium oxide, nickel oxide, copper oxide and tungsten oxide; metal hydroxides such as magnesium hydroxide and aluminum hydroxide; metal powders such as aluminum, iron, titanium, manganese, zinc, molybdenum, cobalt, bismuth, chromium, tin, antimony, nickel, copper and tungsten; metal carbonates such as zinc carbonate, calcium carbonate, magnesium carbonate and barium carbonate; metal borates such as magnesium borate, calcium borate and aluminum borate; and silicones and the like.

One of these flame retardant auxiliaries (2D2) may be used alone, or a combination of two or more such auxiliaries may be used.

In terms of the flame retardancy effect, the flame retardant auxiliary (2D2) used in the aspect described above is preferably an antimony oxide such as diantimony trioxide, diantimony tetroxide, diantimony pentoxide or sodium antimonate; magnesium hydroxide; a tin oxide such as tin monoxide or tin dioxide; an iron oxide such as ferric oxide or γ-iron oxide; zinc oxide or zinc borate, is more preferably an antimony oxide such as diantimony trioxide, diantimony tetroxide or diantimony pentoxide; magnesium hydroxide or zinc borate, is even more preferably an antimony oxide and/or magnesium hydroxide, and is particularly preferably diantimony trioxide and magnesium hydroxide.

In order to improve the flame retardancy effect, a flame retardant auxiliary (2D2) having an average particle size of 0.01 to 10 μm is preferably used.

The average particle size can be measured using a laser diffraction/scattering particle size distribution analyzer or a precise particle size distribution measurement device.

(Polymer (2E) Containing an α,β-Unsaturated Dicarboxylic Acid Anhydride as a Structural Unit)

The polyamide composition of the aspect described above may also contain a polymer (2E) containing an α,β-unsaturated dicarboxylic acid anhydride as a structural unit. By including a polymer (2E) containing an α,β-unsaturated dicarboxylic acid anhydride as a structural unit, a polyamide composition having superior mechanical properties such as toughness and rigidity and superior flame retardancy can be obtained.

Examples of polymers (2E) containing an α,β-unsaturated dicarboxylic acid anhydride as a structural unit that may be used in the aspect described above include polymers containing an α,β-unsaturated dicarboxylic acid anhydride as a copolymerization component, and polymers that have been modified with an α,β-unsaturated dicarboxylic acid anhydride.

Examples of the α,β-unsaturated dicarboxylic acid anhydride include compounds represented by the general formula shown below.

[Chemical formula 1]

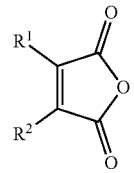

In the above general formula, each of $R^1$ and $R^2$ independently represents a hydrogen or an alkyl group of 1 to 3 carbon atoms. $R^1$ and $R^2$ may be the same or different. Of the various possibilities, in terms of ease of production, R11 and R12 are preferably the same.

Examples of the alkyl group of 1 to 3 carbon atoms for $R^1$ and $R^2$ include a methyl group, ethyl group, propyl group and isopropyl group. Of the various possibilities, each of $R^1$ and $R^2$ is preferably a hydrogen atom or a methyl group, and is more preferably a hydrogen atom.

Examples of the α,β-unsaturated dicarboxylic acid anhydride include maleic anhydride and methyl maleic anhydride, and maleic anhydride is preferred.

Examples of polymers that contain an α,β-unsaturated dicarboxylic acid anhydride as a copolymerization component include copolymers of an aromatic vinyl compound and an α,β-unsaturated dicarboxylic acid anhydride.

Examples of polymers that have been modified with an α,β-unsaturated dicarboxylic acid anhydride include polyphenylene ethers and polypropylenes that have been modified with an α,β-unsaturated dicarboxylic acid anhydride. A maleic anhydride-modified polyphenylene ether is particularly preferred.

From the viewpoint of improving the efficiency of the flame retardancy improvement (achieving an effect with a small blend amount), the polymer containing an α,β-unsaturated dicarboxylic acid anhydride as a copolymerization component is preferably a copolymer of an aromatic vinyl compound and an α,β-unsaturated dicarboxylic acid anhydride.

Examples of aromatic vinyl compounds that may be used in the aspect described above include compounds represented by the general formula shown below.

[Chemical formula 2]

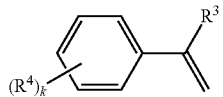

In the above general formula, each of $R^3$ and $R^4$ independently represents a hydrogen or an alkyl group of 1 to 3 carbon atoms, and k represents an integer of 1 to 5.

Examples of the aromatic vinyl compound include styrene, α-methylstyrene and p-methylstyrene, and styrene is preferred.

In the aspect described above, in those cases where the polymer containing an α,β-unsaturated dicarboxylic acid anhydride as a structural unit includes an aromatic vinyl compound component, it is thought that as a result of the aromatic vinyl compound component exhibiting affinity with the flame retardant (2D1) (such as a brominated polystyrene), and the α,β-unsaturated dicarboxylic acid anhydride portion exhibiting affinity with or reacting with the semi-aromatic polyamide (2B), dispersion of the flame retardant (2D1) within the polyamide matrix is assisted, enabling the flame retardant to be finely dispersed.

In the copolymer of an aromatic vinyl compound component and an α,β-unsaturated dicarboxylic acid anhydride component, from the viewpoints of the flame retardancy, fluidity, and thermal decomposition resistance and the like, the proportions of the aromatic vinyl compound component and the α,β-unsaturated dicarboxylic acid anhydride component are preferably from 50 to 99% by mass for the aromatic vinyl compound component and from 1 to 50% by mass for the α,β-unsaturated dicarboxylic acid anhydride component. The proportion of the α,β-unsaturated dicarboxylic acid anhydride component is more preferably from 5 to 20% by mass, and even more preferably from 8 to 15% by mass.

By ensuring that the proportion of the α,β-unsaturated dicarboxylic acid anhydride component is at least 1% by mass, a polyamide composition having excellent mechanical properties such as toughness and rigidity and superior flame retardancy can be obtained. Further, by ensuring that the proportion of the α,β-unsaturated dicarboxylic acid anhydride component is not more than 50% by mass, any degradation of the polyamide composition caused by the α,β-unsaturated dicarboxylic acid anhydride can be prevented.

The polymer that has been modified with an α,β-unsaturated dicarboxylic acid anhydride is preferably a polyphenylene ether resin or polypropylene resin that has been modified with an α,β-unsaturated dicarboxylic acid anhydride. The amount of the polymer that has been modified with an α,β-unsaturated dicarboxylic acid anhydride is preferably at least 0.05% by mass but not more than 5% by mass relative to 100% by mass of the polyamide composition.

(Filler (2F))

The polyamide composition of the aspect described above may also contain a filler (2F). By including the filler (2F), a polyamide composition having even more superior mechanical properties such as toughness and rigidity can be obtained.

Details relating to the filler (2F) are as described above for the "inorganic filler (1C)" in the above aspect 1-1.

(Amount of Each Component)

The amount of the pigment (2C) in the polyamide composition of the aspect described above, relative to 100% by mass of the polyamide composition, is preferably at least 0.5% by mass but not more than 5% by mass, and more preferably not more than 3% by mass. In particular, from the viewpoint of the color tone and the mechanical properties (and particularly the mechanical strength), the pigment (2C) is preferably a white pigment, and the amount of that white pigment is preferably at least 0.5% by mass but not more than 5% by mass relative to 100% by mass of the polyamide composition.

The amount of the flame retardant (2D1) in the polyamide composition of the aspect described above, relative to 100% by mass of the polyamide composition, is preferably at least 0.1% by mass but not more than 30% by mass, more preferably from 5 to 20% by mass, and even more preferably from 5 to 15% by mass.

The amount of the flame retardant auxiliary (2D2) in the polyamide composition, relative to 100% by mass of the polyamide composition, is preferably from 0.1 to 10% by mass, and more preferably from 1 to 10% by mass. By including the flame retardant auxiliary (2D2) in an amount that satisfies this range, a polyamide composition having even more superior flame retardancy can be obtained. By ensuring that the amount of the flame retardant auxiliary (2D2) is not more than 10% by mass, the viscosity of the composition during melt processing can be controlled to a level within a suitable range, and any increase in torque during extrusion, and any deterioration in the moldability during molding or the external appearance of the molded article can be suppressed. Further, a polyamide composition having excellent toughness and the like can be obtained without impairing the superior mechanical properties of the polyamides such as the toughness and the rigidity.

By ensuring that the amount of the flame retardant auxiliary (2D2) is at least 0.1% by mass, a polyamide composition having superior flame retardancy can be obtained. Further, by ensuring that the amount of the flame retardant (2D1) is not more than 15% by mass, any generation of decomposition gases during melt kneading, deterioration of fluidity during molding, and adhesion of contaminants to the molding mold can be suppressed. Moreover, any deterioration in the mechanical properties such as the toughness and the rigidity or the molded article surface appearance can also be suppressed.

In a particularly preferred combination, the flame retardant (2D1) is a brominated polystyrene, the amount of the brominated polystyrene is at least 6% by mass but not more than 15% by mass relative to 100% by mass of the polyamide composition, the flame retardant auxiliary (2D2) is diantimony trioxide ($Sb_2O_3$), and the amount of the diantimony trioxide ($Sb_2O_3$) is at least 0.1% by mass but not more than 4% by mass relative to 100% by mass of the polyamide composition.

The amount of the polymer (2E) containing an α,β-unsaturated dicarboxylic acid anhydride as a structural unit within the polyamide composition, relative to 100% by mass of the polyamide composition, is preferably from 0.1 to 20% by mass, more preferably from 0.5 to 20% by mass, even more preferably from 1 to 15% by mass, and particularly preferably from 2 to 10% by mass. By ensuring that the amount of the polymer (2E) containing an α,β-unsaturated dicarboxylic acid anhydride as a structural unit satisfies the above range, the fine dispersion effect of the flame retardant (2D1) within the polyamide composition as a result of improved compatibility can be enhanced, and a polyamide composition having superior improvements in flame retardancy and strength can be obtained. Further, by ensuring that the amount of the polymer (2E) containing an α,β-unsaturated dicarboxylic acid anhydride as a structural unit is not more than 20% by mass, a polyamide composition having excellent strength and the like can be obtained without impairing the superior mechanical properties of the polyamides such as the toughness and the rigidity.

The amount of the filler (2F) in the polyamide composition, relative to 100% by mass of the polyamide composition, is preferably from 1 to 80% by mass, more preferably from 10 to 70% by mass, even more preferably from 30 to 70% by mass, still more preferably from 30 to 60% by mass, and most preferably from 40 to 60% by mass.

By including the filler (2F) in an amount that satisfies the above range, the mechanical properties such as the strength and rigidity of the polyamide composition can be favorably improved, whereas by ensuring that the amount of the inorganic filler is not more than 70% by mass, a polyamide composition having excellent moldability can be obtained.

In the aspect described above, the total amount of the pigment (2C), the flame retardant (2D1), the flame retardant auxiliary (2D2), the polymer (2E) containing an α,β-unsaturated dicarboxylic acid anhydride as a structural unit, and the filler (2F) is preferably from 60 to 80% by mass relative to 100% by mass of the polyamide composition. This total amount is more preferably from 10 to 90% by mass, even more preferably from 30 to 80% by mass, and still more preferably from 40 to 80% by mass. By ensuring that this total amount is at least 10% by mass, a polyamide composition can be obtained that exhibits excellent strength, rigidity and flame retardancy, as well as superior workability with an appropriate melt viscosity.

The polyamide composition of the aspect described above may also contain additives that are typically used in polyamides, including moldability improvers, degradation inhibitors, nucleating agents, stabilizers, and polymers and the like other than the polyamides included in the above aspect, provided these additives do not impair the objects of the above aspect.

The amounts of these additives will vary depending on the type of additive and the potential application of the polyamide composition, and therefore there are no particular limitations on those amounts provided the objects of the above aspect are not impaired.

(Moldability Improvers)

A moldability improver may be added to the polyamide composition of the aspect described above if required, provided the objects of the above aspect are not impaired. Details relating to these moldability improvers are as described above for the "lubricant" in the aspect 1-1.

(Degradation Inhibitors)

A degradation inhibitor may be added to the polyamide composition of the aspect described above if required, for the purposes of suppressing thermal degradation, preventing discoloration upon heating, and improving the heat aging resistance and weather resistance, provided the objects of the above aspect are not impaired.

Examples of the degradation inhibitor include, but are not particularly limited to, copper compounds such as copper acetate and copper iodide; phenol-based stabilizers such as hindered phenol compounds; phosphite-based stabilizes; hindered amine-based stabilizers; triazine-based stabilizers; benzotriazole-based stabilizers; benzophenone-based stabilizers; cyanoacrylate-based stabilizers; salicylate-based stabilizers; and sulfur-based stabilizers.

Examples of the copper compounds include copper acetate and copper iodide. Examples of the phenol-based stabilizers include hindered phenol compounds.

One of these degradation inhibitors may be used alone, or a combination of two or more inhibitors may be used.

(Nucleating Agents)

Details relating to the nucleating agents are as described above in the aspect 1-1.

(Stabilizers)

Details relating to the stabilizers are as described above in the aspect 1-1.

(Other Resins)

Other resins may be added to the polyamide composition of the aspect described above if required, provided the objects of the above aspect are not impaired.

There are no particular limitations on these types of resins, and examples include the thermoplastic resins and rubber components described below.

Examples of the thermoplastic resins include polystyrene-based resins such as atactic polystyrene, isotactic polystyrene, syndiotactic polystyrene, AS (acrylonitrile-styrene copolymer) resins, and ABS (acrylonitrile-butadiene-styrene copolymer) resins; polyester-based resins such as polyethylene terephthalate and polybutylene terephthalate; polyamides other than the polyamides used in the aspect described above; polyether-based resins such as polycarbonate, polyphenylene ether, polysulfone and polyethersulfone; condensation-based resins such as polyphenylene sulfide and polyoxymethylene; acrylic-based resins such as polyacrylic acid, polyacrylate esters, and polymethyl methacrylate; polyolefin-based resins such as polyethylene, polypropylene, polybutene, and ethylene-propylene copolymers; halogen-containing vinyl compound-based resins such as polyvinyl chloride and polyvinylidene chloride; phenol resins; and epoxy resins.

One of these thermoplastic resins may be used alone, or a combination of two or more thermoplastic resins may be used.

Examples of the rubber components include natural rubber, polybutadiene, polyisoprene, polyisobutylene, neoprene, polysulfide rubber, Thiokol rubber, acrylic rubber, urethane rubber, silicone rubber, epichlorohydrin rubber, styrene-butadiene block copolymers (SBR), hydrogenated styrene-butadiene block copolymers (SEB), styrene-butadiene-styrene block copolymers (SBS), hydrogenated styrene-butadiene-styrene block copolymers (SEBS), styrene-isoprene block copolymers (SIR), hydrogenated styrene-isoprene block copolymers (SEP), styrene-isoprene-styrene block copolymers (SIS), hydrogenated styrene-isoprene-styrene block copolymers (SEPS), styrene-butadiene random copolymers, hydrogenated styrene-butadiene random copolymers, styrene-ethylene-propylene random copolymers, styrene-ethylene-butylene random copolymers, ethylene-propylene copolymers (EPR), ethylene-(1-butene) copolymers, ethylene-(1-hexene) copolymers, ethylene-(1-octene) copolymers, ethylene-propylene-diene copolymers (EPDM), and core-shell-type compounds such as butadiene-acrylonitrile-styrene core-shell rubber (ABS), methyl methacrylate-butadiene-styrene core-shell rubber (MBS), methyl methacrylate-butyl acrylate-styrene core-shell rubber (MAS), octyl acrylate-butadiene-styrene core-shell rubber (MABS), alkyl acrylate-butadiene-acrylonitrile-styrene core-shell rubber (AABS), butadiene-styrene core-shell rubber (SBR), and siloxane-containing core-shell rubbers such as methyl methacrylate-butyl acrylate siloxane.

One of these rubber components may be used alone, or a combination of two or more rubber components may be used.

(Method for Producing Polyamide Composition)

There are no particular limitations on the method used for producing the polyamide composition of the aspect described above, provide the method includes mixing the aliphatic polyamide (2A), the semi-aromatic polyamide (2B), the pigment (2C), the flame retardant (2D1) and the flame retardant auxiliary (2D2), and if required the polymer (2E) containing an α,β-unsaturated dicarboxylic acid anhydride as a structural unit, and the filler (2F).

Examples of the method used for mixing the aliphatic polyamide (2A), the semi-aromatic polyamide (2B), the pigment (2C), the flame retardant (2D1), the flame retardant auxiliary (2D2), the polymer (2E) containing an α,β-unsaturated dicarboxylic acid anhydride as a structural unit and the filler (2F) include a method in which the aliphatic polyamide (2A), the semi-aromatic polyamide (2B), the pigment (2C) and the flame retardant (2D1), and if required at least one component selected from the group consisting of the flame retardant auxiliary (2D2), the polymer (2E) containing an α,β-unsaturated dicarboxylic acid anhydride as a structural unit and the filler (2F), are mixed together using a Henschel mixer and then supplied to a melt kneader and subjected to kneading, and a method in which a mixture obtained in advance by mixing the aliphatic polyamide (2A), the semi-aromatic polyamide (2B), the flame retardant (2D1), and if required the pigment (2C), the flame retardant auxiliary (2D2) and/or the polymer (2E) containing an α,β-unsaturated dicarboxylic acid anhydride as a structural unit using a Henschel mixer is supplied to a melt kneader using a single-screw or twin-screw extruder, and following kneading, if required, the filler (2F) is blended with the kneaded mixture from a side feeder.

The method for supplying the components that constitute the polyamide composition to the melt kneader may be performed by supplying all of the constituent components to the same supply port in a single batch, or by supplying the respective constituent components from different supply ports.

The melt kneading temperature is a temperature that is preferably about 1 to 100° C. higher, and more preferably about 10 to 50° C. higher, than the melting point of the aliphatic polyamide (2A).

The shear rate in the kneader is preferably at least about 100 sec$^{-1}$, and the average residence time during kneading is preferably about 0.5 to 5 minutes.

A conventional device may be used as the device used for performing the melt kneading, and examples of devices that can be used favorably include single-screw or twin-screw extruders, a Banbury mixer and a mixing roll.

The blend amount of each component used when producing the polyamide composition of the aspect described above is the same as the amount of that component in the polyamide composition described above.

(Physical Properties of Polyamide Composition)

Details relating to the physical properties of the polyamide composition are as described above in the aspect 1-1.

[Molded Article]

By molding the polyamide resin composition of the aspect described above, a molded article having a surface gloss of at least 50 can be obtained. The surface gloss of the polyamide composition of the above aspect is more preferably at least 55, and even more preferably 60 or higher. By ensuring that the surface gloss of the polyamide composition is at least 50, the composition can be used favorably as a molding material for various components for vehicles, electrical and electronic materials, industrial materials, engineering materials, everyday materials, and household items and the like.

There are no particular limitations on the method used for obtaining the molded article, and a conventional molding method may be used.

Examples of the molding method include extrusion molding, injection molding, vacuum molding, blow molding, injection compression molding, decorative molding, different material molding, gas-assisted injection molding, foam injection molding, low-pressure molding, ultra-thin-wall injection molding (ultra-high-speed injection molding), and in-mold composite molding (such as insert molding and outsert molding).

(Applications)

The molded article according to the aspect 2-2 of the present invention contains the polyamide resin composition described above, has excellent mechanical properties (and particularly weld strength and hardness), surface appearance and flame retardancy and the like, and can be used in a wide variety of applications.

For example, the molded article can be used favorably in the automotive field, the electrical and electronic field, the machinery and industry field, the office equipment field, and the aerospace field.

<<Aspects 3-1 and 3-2>>

[Polyamide Composition]

A polyamide composition according to an aspect 3-1 of the present invention is a polyamide composition containing:

(3A) an aliphatic polyamide formed from a diamine and a dicarboxylic acid, (3B) a semi-aromatic polyamide containing a dicarboxylic acid unit that includes at least 50 mol % of isophthalic acid and a diamine unit that includes a diamine of at least 4 but not more than 10 carbon atoms, (3C1) a flame retardant, and (3C2) a flame retardant auxiliary, wherein the tan δ peak temperature of the polyamide composition is at least 100° C., the weight average molecular weight Mw of the polyamide composition satisfies $10{,}000 \leq Mw \leq 40{,}000$, and the halogen content relative to the total mass of the polyamide composition is greater than 2% by mass but not more than 20% by mass.

In the aspect described above, a "polyamide" means a polymer having an amide linkage (—NHCO—) within the main chain. Details of the aliphatic polyamide (3A) and the semi-aromatic polyamide (3B) are described below.

(Aliphatic Polyamide (3A))

The aliphatic polyamide (3A) is as described above for the "aliphatic polyamide (1A)" in the above aspect 1-1.

(Semi-Aromatic Polyamide (3B))

Details relating to the semi-aromatic polyamide (3B) are, with the exception of the points described below, as described above for the "semi-aromatic polyamide (1B)" in the above aspect 1-1.

The semi-aromatic polyamide (3B) used in the aspect described above is a polyamide containing a dicarboxylic acid unit (3B-a) that includes at least 50 mol % of isophthalic acid and a diamine unit (3B-b) that includes a diamine of at least 4 but not more than 10 carbon atoms.

The total amount of the above isophthalic acid unit and diamine unit of at least 4 but not more than 10 carbon atoms, relative to 100 mol % of all the structural units in the polyamide (3B), is preferably at least 50 mol %, more preferably from 80 to 100 mol %, even more preferably from 90 to 100 mol %, and particularly preferably 100 mol %.
(Dicarboxylic Acid Unit (3B-a))

The dicarboxylic acid unit (3B-a) includes at least 50 mol % of isophthalic acid (based on the total number of moles of dicarboxylic acid). The dicarboxylic acid unit preferably includes from 65 to 100% of isophthalic acid, more preferably 70 to 100 mol %, even more preferably 80 to 100 mol %, and particularly preferably contains 100 mol % of isophthalic acid.

By ensuring that the proportion of isophthalic acid units in the dicarboxylic acid unit (3B-a) is at least 50 mol %, a polyamide composition can be obtained that simultaneously satisfies various mechanical properties, and particularly the water absorption rigidity, thermal rigidity, fluidity, and surface appearance and the like.
(Lactam Unit and/or Aminocarboxylic Acid Unit)

Details relating to a lactam unit and/or aminocarboxylic acid are as described above in the aspect 1-1.
(End-Capping Agent)

The ends of the polyamides used in the aspect described above may be end-capped with a conventional end-capping agent.

This end-capping agent is as described above in the aspect 1-1.
(Method for Producing Polyamides)

Methods that may be used for producing the polyamides are as described above in the aspect 1-1.
(Polymer Ends of Polyamides)

Details relating to the polymer ends of the polyamides are as described above in the aspect 1-1.
(Properties of Aliphatic Polyamide (3A))

Details relating to the properties of the aliphatic polyamide (3A) are as described above for the "properties of the aliphatic polyamide (1A)" in the above aspect 1-1.
(Properties of Semi-Aromatic Polyamide (3B))

Details relating to the properties of the semi-aromatic polyamide (3B) are as described above for the "properties of the semi-aromatic polyamide (1B)" in the above aspect 1-1.
(Flame Retardant (3C1))

Details relating to the properties of the flame retardant (3C1) are as described above for the "flame retardant (2D1)" in the above aspect 2-1.
(Flame Retardant Auxiliary (3C2))

By including the flame retardant auxiliary (3C2) in the polyamide composition of the aspect described above, a polyamide composition having more superior flame retardancy can be obtained.

Details relating to the properties of the flame retardant auxiliary (3C2) are as described above for the "flame retardant auxiliary (2D2)" in the above aspect 2-1.
(Polymer (3D) Containing an $\alpha,\beta$-Unsaturated Dicarboxylic Acid Anhydride as a Structural Unit)

The polyamide composition of the aspect described above may also contain a polymer (3D) containing an $\alpha,\beta$-unsaturated dicarboxylic acid anhydride as a structural unit. By including a polymer (3D) containing an $\alpha,\beta$-unsaturated dicarboxylic acid anhydride as a structural unit, a polyamide composition having superior mechanical properties such as toughness and rigidity can be obtained.

Details relating to the polymer (3D) containing an $\alpha,\beta$-unsaturated dicarboxylic acid anhydride as a structural unit are as described above for the "polymer (2E) containing an $\alpha,\beta$-unsaturated dicarboxylic acid anhydride as a structural unit" in the above aspect 2-1.
(Filler (3E))

The polyamide composition of the aspect described above may also contain a filler (3E). By including the filler (3E), a polyamide composition having even more superior mechanical properties such as toughness and rigidity can be obtained.

Details relating to the filler (3E) are as described above for the "inorganic filler (1C)" in the above aspect 1-1.
(Amount of Each Component)

The amount of the flame retardant (3C1) in the polyamide composition of the aspect described above, relative to 100% by mass of the polyamide composition, is preferably at least 0.1% by mass but not more than 30% by mass, more preferably from 5 to 20% by mass, and even more preferably from 5 to 15% by mass.

By ensuring that the amount of the flame retardant (3C1) is at least 0.1% by mass, a polyamide composition having superior flame retardancy can be obtained. Further, by ensuring that the amount of the flame retardant (3C1) is not more than 15% by mass, any generation of decomposition gases during melt kneading, deterioration of fluidity during molding, and adhesion of contaminants to the molding mold can be suppressed. Moreover, any deterioration in the mechanical properties such as the toughness and the rigidity or the molded article surface appearance can also be suppressed.

The amount of the flame retardant auxiliary (3C2) in the polyamide composition, relative to 100% by mass of the polyamide composition, is preferably from 0.1 to 10% by mass, and more preferably from 1 to 10% by mass. By including the flame retardant auxiliary (3C2) in an amount that satisfies this range, a polyamide composition having even more superior flame retardancy can be obtained.

By ensuring that the amount of the flame retardant auxiliary (3C2) is not more than 10% by mass, the viscosity of the composition during melt processing can be controlled to a level within a suitable range, and any increase in torque during extrusion, and any deterioration in the moldability during molding or the external appearance of the molded article can be suppressed. Further, a polyamide composition having excellent toughness and the like can be obtained without impairing the superior mechanical properties of the polyamides such as the toughness and the rigidity.

In a particularly preferred combination, the flame retardant (3C1) is a brominated polystyrene, the amount of the brominated polystyrene is at least 6% by mass but not more than 15% by mass relative to 100% by mass of the polyamide composition, the flame retardant auxiliary (3C2) is diantimony trioxide ($Sb_2O_3$), and the amount of the diantimony trioxide ($Sb_2O_3$) is at least 0.1% by mass but not more than 4% by mass relative to 100% by mass of the polyamide composition.

The amount of the polymer (3D) containing an $\alpha,\beta$-unsaturated dicarboxylic acid anhydride as a structural unit within the polyamide composition, relative to 100% by mass of the polyamide composition, is preferably from 0.1 to 20% by mass, more preferably from 0.5 to 20% by mass, even more preferably from 1 to 15% by mass, and particularly preferably from 2 to 10% by mass. By ensuring that the amount of the polymer (3D) containing an $\alpha,\beta$-unsaturated dicarboxylic acid anhydride as a structural unit satisfies the above range, the fine dispersion effect of the flame retardant (3C1) within the polyamide composition as a result of improved compatibility can be enhanced, and a polyamide composition having superior improvements in flame retardancy and strength can be obtained. Further, by ensuring that the amount of the polymer (3D) containing an α,β-unsaturated dicarboxylic acid anhydride as a structural unit is not more than 20% by mass, a polyamide composition having excellent strength and the like can be obtained without impairing the superior mechanical properties of the polyamides such as the toughness and the rigidity.

The amount of the filler (3E) in the polyamide composition, relative to 100% by mass of the polyamide composition, is preferably from 1 to 80% by mass, more preferably from 10 to 70% by mass, even more preferably from 30 to 70% by mass, still more preferably from 30 to 60% by mass, and most preferably from 40 to 60% by mass. By including the filler (3E) in an amount that satisfies the above range, the mechanical properties such as the strength and rigidity of the polyamide composition can be favorably improved, whereas by ensuring that the amount of the inorganic filler is not more than 70% by mass, a polyamide composition having excellent moldability can be obtained.

In the aspect described above, the total amount of the flame retardant (3C1), the flame retardant auxiliary (3C2), the polymer (3D) containing an α,β-unsaturated dicarboxylic acid anhydride as a structural unit, and the filler (3E) is preferably from 10 to 90% by mass relative to 100% by mass of the polyamide composition. This total amount is more preferably from 30 to 80% by mass, and even more preferably from 40 to 80% by mass. By ensuring that this total amount is at least 10% by mass, a polyamide composition can be obtained that exhibits excellent strength, rigidity and flame retardancy, as well as superior workability with an appropriate melt viscosity.

The polyamide composition of the aspect described above may also contain additives that are typically used in polyamides, including moldability improvers, degradation inhibitors, nucleating agents, stabilizers, and polymers and the like other than the polyamides included in the above aspect, provided these additives do not impair the objects of the above aspect.

The amounts of these additives will vary depending on the type of additive and the potential application of the polyamide composition, and therefore there are no particular limitations on those amounts provided the objects of the above aspect are not impaired.

(Moldability Improvers)

A moldability improver may be added to the polyamide composition of the aspect described above if required, provided the objects of the above aspect are not impaired. Details relating to these moldability improvers are as described above for the "lubricant" in the above aspect 1-1.

(Degradation Inhibitors)

A degradation inhibitor may be added to the polyamide composition of the aspect described above if required, for the purposes of suppressing thermal degradation, preventing discoloration upon heating, and improving the heat aging resistance and weather resistance, provided the objects of the above aspect are not impaired.

These degradation inhibitors are as described above in the aspect 2-1.

(Nucleating Agents)

Details relating to the nucleating agents are as described above in the aspect 1-1.

(Stabilizers)

Details relating to the stabilizers are as described above in the aspect 1-1.

(Other Resins)

Other resins may be added to the polyamide composition of the aspect described above if required, provided the objects of the above aspect are not impaired.

Details relating to these types of resins are as described above in the aspect 2-1.

(Method for Producing Polyamide Composition)

Methods that may be used for producing the polyamide composition of the aspect described above are as described above in the aspect 2-1.

The blend amount of each component used when producing the polyamide composition of the aspect described above is the same as the amount of that component in the polyamide composition described above.

(Physical Properties of Polyamide Composition)

Details relating to the physical properties of the polyamide composition are as described above for the aspect 1-1.

[Molded Article]

By molding the polyamide resin composition of the aspect described above, a molded article having a surface gloss of at least 50 can be obtained. The surface gloss of the polyamide composition of the above aspect is more preferably at least 55, and even more preferably 60 or higher. By ensuring that the surface gloss of the polyamide composition is at least 50, the composition can be used favorably as a molding material for various components for vehicles, electrical and electronic materials, industrial materials, engineering materials, everyday materials, and household items and the like.

There are no particular limitations on the method used for obtaining the molded article, and a conventional molding method may be used.

Examples of the molding method include extrusion molding, injection molding, vacuum molding, blow molding, injection compression molding, decorative molding, different material molding, gas-assisted injection molding, foam injection molding, low-pressure molding, ultra-thin-wall injection molding (ultra-high-speed injection molding), and in-mold composite molding (such as insert molding and outsert molding).

(Applications)

The molded article according to the aspect 3-2 of the present invention contains the polyamide resin composition described above, has excellent mechanical properties (and particularly tensile strength, flexural modulus, and Charpy impact) and surface appearance and the like, and can be used in a wide variety of applications.

For example, the molded article can be used favorably in the automotive field, the electrical and electronic field, the machinery and industry field, the office equipment field, and the aerospace field.

<<Aspects 4-1 and 4-2>>

[Polyamide Composition]

A polyamide composition according to an aspect 4-1 of the present invention contains: (4A) a crystalline polyamide, (4B) an amorphous semi-aromatic polyamide containing a dicarboxylic acid unit that includes at least 75 mol % of isophthalic acid and a diamine unit that includes at least 50 mol % of a diamine of 4 to 10 carbon atoms, and (4C) a polyphenylene ether, wherein the tan δ peak temperature of the polyamide composition is at least 90° C.

In the aspect described above, a "polyamide" means a polymer having an amide linkage (—NHCO—) within the main chain. Details of the crystalline polyamide (4A) and the amorphous semi-aromatic polyamide (4B) are described below.

(Crystalline Polyamide (4A))

A crystalline polyamide is a polyamide which has a crystal heat of fusion of at least 4 J/g when measured at a rate of 20° C./min using a differential scanning calorimeter. Although not limited to the following compounds, examples of the crystalline polyamide include (a) polyamides obtained by ring-opening polymerization of a lactam, (b) polyamides obtained by self-condensation of a co-aminocarboxylic acid, (c) polyamides obtained by condensation of a diamine and a dicarboxylic acid, and copolymers of these types of polyamides. A single crystalline polyamide may be used alone, or a combination of two or more crystalline polyamides may be used.

Examples of the lactam from (a) include, but are not limited to, pyrrolidone, caprolactam, undecalactam and dodecalactam.

Examples of the co-aminocarboxylic acid from (b) include, but are not limited to, ω-amino fatty acids that are compounds produced by ring-opening of the above lactams in the presence of water. A combination of two or more lactam or ω-aminocarboxylic acid monomers may also be subjected to condensation.

Examples of the diamine (monomer) from (c) include, but are not limited to, linear aliphatic diamines such as hexamethylenediamine and pentamethylenediamine; branched aliphatic diamines such as 2-methylpentanediamine and 2-ethylhexamethylenediamine; aromatic diamines such a p-phenylenediamine and m-phenylenediamine; and alicyclic diamines such as cyclohexanediamine, cyclopentanediamine and cyclooctanediamine.

Examples of the dicarboxylic acid (monomer) from (c) include, but are not limited to, aliphatic dicarboxylic acids such as adipic acid, pimelic acid and sebacic acid; aromatic dicarboxylic acids such as phthalic acid and isophthalic acid; and alicyclic dicarboxylic acids such a cyclohexanedicarboxylic acid. For both the diamine and the dicarboxylic acid monomers described above, a single monomer may be used alone, or a combination of two or more monomers may be used.

The crystalline polyamide (4A) may, if required, also contain a unit derived from a trivalent or higher polyvalent carboxylic acid such as trimellitic acid, trimesic acid or pyromellitic acid. A single trivalent or higher polyvalent carboxylic acid may be used alone, or a combination of two or more compounds may be used.

Specific examples of crystalline polyamides (4A) that may be used in the polyamide composition of the aspect described above include polyamide 4 (poly-α-pyrrolidone), polyamide 6 (polycaproamide), polyamide 11 (polyundecanamide), polyamide 12 (polydodecanamide), polyamide 46 (polytetramethylene adipamide), polyamide 56 (polypentamethylene adipamide), polyamide 66 (polyhexamethylene adipamide), polyamide 610 (polyhexamethylene sebacamide), polyamide 612 (polyhexamethylene dodecamide), polyamide 6T (polyhexamethylene terephthalamide), polyamide 9T (polynonamethylene terephthalamide), and copolymer polyamides having any of these polyamides as constituent components.

Among these, polyamide 66 (PA66), polyamide 46 (PA46) and polyamide 610 (PA610) are preferred. PA66 exhibits excellent heat resistance, moldability and toughness, and is therefore thought to be particularly suitable for vehicle components. Long-chain aliphatic polyamides such as PA610 exhibit excellent chemical resistance, and are therefore preferred.

The amount of the crystalline polyamide (4A) in the polyamide composition of the aspect described above, relative to the total mass of all the resin contained in polyamide composition, may be set within a range from at least 50% by mass to not more than 99% by mass, from at least 60% by mass to not more than 95% by mass, or from at least 70% by mass to not more than 85% by mass.

(Amorphous Semi-Aromatic Polyamide (4B))

The semi-aromatic polyamide (4B) is as described above for the "semi-aromatic polyamide (1B)" in the above aspect 1-1.

(End-Capping Agent)

The ends of the polyamides used in the aspect described above may be end-capped with a conventional end-capping agent.

This end-capping agent is as described above in the aspect 1-1.

(Method for Producing Polyamides)

Methods that may be used for producing the polyamides are as described above in the aspect 1-1.

(Polymer Ends of Polyamides)

Details relating to the polymer ends of the polyamides are as described above in the aspect 1-1.

(Properties of Crystalline Polyamide (4A))

The properties of the crystalline polyamide (4A) are, with the exception of the points described below, as described above for the "properties of the aliphatic polyamide (1A)" in the above aspect 1-1.

From the viewpoint of the mechanical properties, and particularly the water absorption rigidity and thermal rigidity, the crystallization enthalpy ΔH of the crystalline polyamide (4A) is preferably at least 4 J/g, more preferably at least 20 J/g, even more preferably at least 30 J/g, still more preferably at least 40 J/g, particularly preferably at least 50 J/g, and most preferably 60 J/g or greater.

(Properties of Amorphous Semi-Aromatic Polyamide (4B))

The properties of the amorphous semi-aromatic polyamide (4B) are, with the exception of the points described below, as described above for the "properties of the semi-aromatic polyamide (1B)" in the above aspect 1-1.

The molecular weight distribution of the amorphous semi-aromatic polyamide (4B) is indicated by the value of weight average molecular weight Mw(4B)/number average molecular weight Mn(4B).

The value of Mw(4B)/Mn(4B) for the amorphous semi-aromatic polyamide (4B) is preferably not more than 2.4, more preferably from 1.7 to 2.4, even more preferably from 1.8 to 2.3, still more preferably from 1.9 to 2.2, and most preferably from 1.9 to 2.1. The lower limit for Mw(4B)/Mn (4B) is 1.0. By ensuring that the value of Mw(4B)/Mn(4B) satisfies the above range, a polyamide composition having superior fluidity and the like can be obtained. Further, a polyamide composition containing a component typified by an inorganic filler exhibits superior surface appearance.

Examples of the method used for controlling the value of Mw(4B)/Mn(4B) for the amorphous semi-aromatic polyamide (4B) so as to satisfy the above range include a method in which a conventional polycondensation catalyst such as phosphoric acid or sodium hypophosphite is added as an additive during hot melt polymerization of the polyamide. Further, another method involves controlling the polymerization conditions such as the heating conditions and reduced pressure conditions to enable the polycondensation reaction to be completed at the lowest possible temperature in the shortest possible time. In particular, because the amorphous semi-aromatic polyamide (4B) does not have a melting point, reducing the reaction temperature to achieve a value for Mw(4B)/Mn(4B) that satisfies the above range is preferred.

If an aromatic compound unit is incorporated within the molecular structure of the polyamide, then the value of the molecular weight distribution (Mw(4B)/Mn(4B)) tends to increase as the molecular weight increases. By ensuring that the molecular weight distribution satisfies the above range, the proportion of polyamide molecules having three-dimensional molecular structures can be reduced, the increase in three-dimensional molecular structures that occurs upon high-temperature heating can be appropriately prevented, and the fluidity can be favorably maintained, enabling the surface appearance of a polyamide composition containing a component typified by an inorganic filler to be improved.

From the viewpoint of the mechanical properties, and particularly the water absorption rigidity and thermal rigidity, the crystallization enthalpy ΔH of the amorphous semi-aromatic polyamide (4B) is preferably less than 4 J/g, is more preferably not more than 2 J/g, and is even more preferably 0 J/g.

(Polyphenylene Ether (4C))

The polyphenylene ether (4C) included in the polyamide composition of the aspect described above is a homopolymer and/or copolymer having a repeating structural unit represented by the general formula shown below.

[Chemical formula 3]

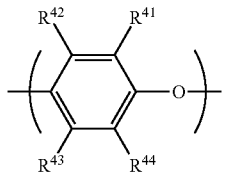

In the above general formula, O represents an oxygen atom, each of $R^{41}$, $R^{42}$, $R^{43}$ and $R^{44}$ independently represents a hydrogen, halogen, primary or secondary C1 to C17 alkyl group, phenyl group, C1 to C7 haloalkyl group, C1 to C7 aminoalkyl group, C1 to C7 hydrocarbyloxy group, or halohydrocarbyloxy group (provided that at least two carbon atoms are positioned between a halogen atom and an oxygen atom).

Specific examples of the polyphenylene ether (4C) include poly(2,6-dimethyl-1,4-phenylene ether), poly(2-methyl-6-ethyl-1,4-phenylene ether), poly(2-methyl-6-phenyl-1,4-phenylene ether), and poly(2,6-dichloro-1,4-phenylene ether). Moreover, other examples include polyphenylene ether copolymers such as copolymers of 2,6-dimethylphenol with another phenol (for example, a copolymer with 2,3,6-trimethylphenol or a copolymer with 2-methyl-6-butylphenol, as disclosed in Japanese Examined Patent Application, Second Publication No. Sho 52-17880).

Among these, particularly preferred polyphenylene ethers include poly(2,6-dimethyl-1,4-phenylene ether), copolymers of 2,6-dimethyl-1,4-phenol and 2,3,6-trimethyl-1,4-phenol, and mixtures of these polymers.

In the case of a copolymer of 2,6-dimethyl-1,4-phenol and 2,3,6-trimethyl-1,4-phenol, if the total mass of the polyphenylene ether copolymer is deemed 100% by mass, then a copolymer containing from 10 to 30% by mass of the 2,3,6-trimethyl-1,4-phenol is preferred, and this proportion is more preferably from 15 to 25% by mass, and even more preferably from 20 to 25% by mass.

From the viewpoint of the compatibility with the polyamides, the polyphenylene ether (4C) is preferably a polyphenylene ether that has been modified with an α,β-unsaturated dicarboxylic acid anhydride.

Examples of the α,β-unsaturated dicarboxylic acid anhydride include compounds represented by the general formula shown below.

[Chemical formula 4]

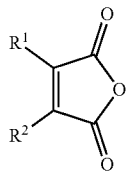

In the above general formula, each of $R^1$ and $R^2$ independently represents a hydrogen or an alkyl group of 1 to 3 carbon atoms.

Examples of the α,β-unsaturated dicarboxylic acid anhydride include maleic anhydride and methyl maleic anhydride, and maleic anhydride is preferred.

The amount of the α,β-unsaturated dicarboxylic acid anhydride in the polyphenylene ether (4C), relative to 100% by mass of the polyphenylene ether (4C), is preferably from 0.1 to 50% by mass, more preferably from 0.2 to 20% by mass, even more preferably from 0.3 to 5% by mass, particularly preferably from 0.3 to 1% by mass, and most preferably from 0.3 to 0.8% by mass.

By ensuring that the amount of the α,β-unsaturated dicarboxylic acid anhydride is at least 0.1% by mass, the compatibility with the polyamides is enhanced, and a polyamide composition having superior mechanical properties such as toughness and rigidity can be obtained. Further, by ensuring that the proportion of the α,β-unsaturated dicarboxylic acid anhydride is not more than 50% by mass, degradation of the polyamide composition caused by the α,β-unsaturated dicarboxylic acid anhydride can be prevented.

One of the features of the polyphenylene ether is a low molecular weight, narrow molecular weight distribution, and a small amount of oligomers.

The polyphenylene ether (4C) included in the polyamide composition of the aspect described above contains at least 60% by mass, and more preferably at least 65% by mass, of components having a molecular weight of not more than 30,000. By ensuring that the amount of components having a molecular weight of not more than 30,000 is at least 60% by mass, thin-wall fluidity inside the mold is excellent. Further, from the viewpoint of maintaining toughness of the molded body when forming a molded body such as a connector, a preferred upper limit for the amount of components having a molecular weight of not more than 30,000 is 95% by mass, a more preferred upper limit is 85% by mass, and an even more preferably upper limit is 80% by mass.

The amount of components having a molecular weight of not more than 30,000 within polyphenylene ethers that have generally been used conventionally is typically about 40% by mass for polyphenylene ethers of common molecular weights, and is only about 50% by mass in polyphenylene ethers known as low-molecular weight type compounds. The polyphenylene ether used in the aspect described above is a low-molecular weight type polyphenylene ether in which this amount is even lower than these conventional compounds.

The amount of components having a molecular weight of 3,000 or less on the polyphenylene ether (4C) is preferably not more than 5% by mass, more preferably not more than 4.5% by mass, and even more preferably 4% by mass or less. By ensuring that the amount of components having a molecular weight of 3,000 or less is not more than 5% by mass, change in the color of the molded body upon heat exposure is suppressed.

There are no particular limitations on the number average molecular weight of the polyphenylene ether (4C) included in the polyamide composition of the aspect described above, but a preferred lower limit is 7,000, a more preferred lower limit is 9,000, and an even more preferred lower limit is 10,000. A preferred upper limit for the number average molecular weight is 15,000, a more preferred upper limit is 14,000, and an even more preferred upper limit is 13,000. In order to ensure better suppression of change in the color of the molded body upon heat exposure, the lower limit for the number average molecular weight is preferably at least 7,000, and in order to enhance the thin-wall fluidity inside the mold, the upper limit for the number average molecular weight is preferably not more than 15,000.

There are no particular limitations on the variance ratio for the polyphenylene ether, namely the ratio (Mw/Mn) of the weight average molecular weight relative to the number average molecular weight, but a preferred upper limit is 2.50, and a more preferred upper limit is 2.40. A preferred lower limit is 2.00, and a more preferred lower limit is 2.10. A variance ratio that is not higher than 2.50 indicates a narrow molecular weight distribution, and either a reduction in the amount of low-molecular weight oligomer components, or a reduction in the amount of high-molecular weight components. In order to suppress change in the color of the molded piece upon heat exposure, reducing the amount of low-molecular weight components is preferred.

Methods for producing polyphenylene ethers can be broadly classified into two types of production methods: precipitation polymerization methods and solution polymerization methods.

The precipitation polymerization method means a polymerization mode in which a precipitate of the polyphenylene ether is obtained in the above concentration range. More specifically, in this polymerization mode, as the polymerization of the polyphenylene ether progresses, compounds that have reached a sufficient molecular weight precipitate, whereas compounds of insufficient molecular weight remain in a dissolved state. For the solvent, a mixture of a good solvent for the polyphenylene ether such as toluene, xylene or ethylbenzene, and a poor solvent for the polyphenylene ether such as methanol or butanol is used.

Because the molecular chain movement of the precipitated polyphenylene ether is suppressed and the catalyst remains dissolved in the mixed solvent, it is thought that a solid-liquid reaction develops, and the reaction rate of any additional polymerization of the precipitated polyphenylene ether slows.

On the other hand, the polymerization reaction rate is maintained for the polyphenylene ether compounds that are still in a dissolved state and have not yet undergone sufficient increase in the molecular weight, meaning the polymerization continues until a molecular weight sufficient for precipitation is reached. As a result of these factors, the molecular weight distribution of the polyphenylene ether narrows.

Furthermore, in the polymerization mode described above, if a polyphenylene ether having a small particle size precipitates, then because the surface area in the solid-liquid reaction increases, it is thought that the reaction for these small particles will be faster than particles having a large particle size. Moreover, because the polyphenylene ether precipitates during the polymerization, this offers the advantages that the viscosity of the reaction system gradually decreases, the monomer concentration (the phenol compound concentration) can be increased during the polymerization, the precipitated polyphenylene ether can be easily removed by filtration, and the reaction process can be highly simplified.

The solution polymerization method is a polymerization method in which the polymerization proceeds in a good solvent for the polyphenylene ether, with no precipitation occurring during the polymerization. In the solution polymerization method, the polyphenylene ether molecules are in a dissolved state, and therefore the molecular weight distribution tends to broaden. In the solution polymerization method, a powdered form of the polyphenylene ether can be obtained by developing the polymer solution containing the dissolved polyphenylene ether with a poor solvent for the polyphenylene ether such as methanol.

Although there are no particular limitations on the polymerization method for the polyphenylene ether, the precipitation polymerization method is preferred. The precipitation polymerization method is ideal for producing a low-molecular weight polyphenylene ether having a narrow molecular weight distribution, and enables a polyphenylene ether to be obtained in which the amount of components having a molecular weight of not more than 30,000 is at least 60% by mass, but the amount of components having a molecular weight of 3,000 or less is not more than 5% by mass.

There are no particular limitations on the intrinsic viscosity (chloroform solution, measured at 30° C.) of the polyphenylene ether (4C) included in the polyamide composition of the aspect described above, but a value within a range from 0.15 to 0.40 dL/g is preferred. The intrinsic viscosity is more preferably within a range from 0.20 to 0.35 dL/g, even more preferably within a range from 0.25 to 0.35 dL/g, and particularly preferably within a range from 0.25 to 0.30 dL/g.

In the aspect described above, a mixture of two or more polyphenylene ethers having different intrinsic viscosities may also be used. Examples of this type of mixture include, but of course are not limited to, a mixture of a polyphenylene ether having an intrinsic viscosity of not more than 0.40 dL/g and a polyphenylene ether having an intrinsic viscosity of at least 0.45 dL/g. Even in the case of this type of mixture, it is preferable that the intrinsic viscosity of the mixture satisfies the preferred intrinsic viscosity range mentioned above, as this makes it easier to achieve the desired effects.

In the aspect described above, the blend amount of the polyphenylene ether (4C), relative to 100% by mass of all the resin contained in the polyamide composition, is preferably at least 0.5% by mass but not more than 30.0% by mass, more preferably at least 1.0% by mass but not more than 15.0% by mass, even more preferably at least 2.0% by mass but not more than 10.0% by mass, still more preferably at least 3.0% by mass but not more than 8.0% by mass, and particularly preferably at least 3.0% by mass but not more than 6.0% by mass. By ensuring that the blend amount of the polyphenylene ether (4C) satisfies the above range, a polyamide composition having superior mechanical properties, and particularly superior water absorption rigidity, thermal rigidity, and fluidity and the like can be obtained. Further, a polyamide composition containing a component typified by an inorganic filler has superior surface appearance.

In the aspect described above, a compatibilizer may be included for the purpose of enhancing the compatibility between the polyamides and the polyphenylene ether. Although there are no particular limitations on compatibilizers that may be used in the above aspect, from the viewpoints of the handling properties and the economic viability, the use of one or more compounds selected from the group consisting of citric acid, maleic acid, itaconic acid, and the anhydrides of these acids is preferred. Among these, maleic acid or maleic anhydride is particularly preferred. Maleic acid or maleic anhydride can improve the compatibility between the polyamides and the polyphenylene ether with a comparatively small blend amount, and can therefore also suppress discoloration of the molded pieces.

The amount of the compatibilizer, per 100 parts by mass of all of the resins contained in the polyamide composition, is preferably at least 0.05 parts by mass but not more than 5 parts by mass, more preferably at least 0.1 parts by mass but not more than 3 parts by mass, and even more preferably at least 0.2 parts by mass but not more than 2 parts by mass. By ensuring that the amount of the compatibilizer is at least 0.05 parts by mass, the compatibility with the polyamides can be enhanced, and a polyamide composition having excellent shock resistance can be obtained. Further, by ensuring that the amount of the compatibilizer is not more than 5 parts by mass, a polyamide composition having excellent fluidity can be obtained.

By also including a polymer containing an α,β-unsaturated dicarboxylic acid anhydride in the polyamide composition of the aspect described above, the compatibility between the polyamides and the polyphenylene ether can be enhanced, and a polyamide composition having even more superior mechanical properties such as toughness and rigidity can be obtained.

Examples of the polymer containing an α,β-unsaturated dicarboxylic acid anhydride that may be used in the above aspect include polymers containing an α,β-unsaturated dicarboxylic acid anhydride as a copolymerization component, and polymers that have been modified with an α,β-unsaturated dicarboxylic acid anhydride.

From the viewpoint of improving the compatibility with the amorphous semi-aromatic polyamide (4B), the polymer containing an α,β-unsaturated dicarboxylic acid anhydride as a copolymerization component is preferably a copolymer of an aromatic vinyl compound and an α,β-unsaturated dicarboxylic acid anhydride.

Examples of aromatic vinyl compounds that may be used in the above aspect include compounds represented by the general formula shown below.

[Chemical formula 5]

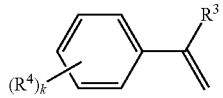

In the above general formula, each of $R^3$ and $R^4$ independently represents a hydrogen or an alkyl group of 1 to 3 carbon atoms, and k represents an integer of 1 to 5.

Specific examples of the aromatic vinyl compound include styrene, α-methylstyrene and p-methylstyrene, and styrene is preferred.

From the viewpoints of properties such as the toughness, fluidity and thermal decomposition resistance, the proportion of the α,β-unsaturated dicarboxylic acid anhydride in the copolymer of the aromatic vinyl compound and the α,β-unsaturated dicarboxylic acid anhydride, relative 100% by mass of the polyamide composition, is preferably from 0.1 to 50% by mass, more preferably from 5 to 20% by mass, and even more preferably from 8 to 15% by mass.

By ensuring that the proportion of the α,β-unsaturated dicarboxylic acid anhydride is at least 0.1% by mass, a polyamide composition having superior mechanical properties such as toughness and rigidity can be obtained. Further, by ensuring that the proportion of the α,β-unsaturated dicarboxylic acid anhydride is not more than 50% by mass, any degradation of the polyamide composition caused by the α,β-unsaturated dicarboxylic acid anhydride can be prevented.

The polymer that has been modified by an α,β-unsaturated dicarboxylic acid anhydride is preferably a polypropylene resin that has been modified by an α,β-unsaturated dicarboxylic acid anhydride.

The amount of the polymer containing the α,β-unsaturated dicarboxylic acid anhydride is preferably at least 0.1 parts by mass but not more than 5 parts by mass per 100 parts by mass of all of the resins contained in the polyamide composition.

Besides the crystalline polyamide (4A), the amorphous semi-aromatic polyamide (4B) and the polyphenylene ether (4C) described above, the polyamide composition of the aspect described above may also contain one or more components selected from the group consisting of inorganic fillers, nucleating agents, lubricants, stabilizers, polymers other than (4A), (4B) and (4C), metal phosphite salts and/or metal hypophosphite salts, and phosphite ester compounds.

(Inorganic Fillers)

The inorganic filler is, with the exception of the points described below, as described above for the "inorganic filler (1C)" in the above aspect 1-1.

The amount of the inorganic filler, per 100 parts by mass of the total mass of the crystalline polyamide (4A), the amorphous semi-aromatic polyamide (4B) and the polyphenylene ether (4C), is preferably from 5 to 250 parts by mass, more preferably from 30 to 250 parts by mass, even more preferably from 50 to 240 parts by mass, still more preferably from 50 to 200 parts by mass, and particularly preferably from 50 to 150 parts by mass.

By ensuring that the amount of the inorganic filler is at least 5 parts by mass per 100 parts by mass of the total mass of the crystalline polyamide (4A), the amorphous semi-aromatic polyamide (4B) and the polyphenylene ether (4C), improvements can be achieved in the strength and rigidity of the obtained polyamide composition. On the other hand, by ensuring that the amount of the inorganic filler is not more than 250 parts by mass, a polyamide composition having excellent extrudability and moldability can be obtained.

(Nucleating Agents)

Details relating to the nucleating agents are as described above in the aspect 1-1.

(Lubricants)

Details relating to the lubricants are as described above in the aspect 1-1.

(Stabilizers)

Details relating to the stabilizers are as described above in the aspect 1-1.

(Other Polymers)

Examples of polymers other than the crystalline polyamide (4A), the amorphous semi-aromatic polyamide (4B) and the polyphenylene ether (4C) include, but are not limited to, polyesters, liquid crystal polyesters, polyphenylene sulfides, polycarbonates, polyarylates, phenol resins and epoxy resins.

Details relating to the polyesters are as described above in the aspect 1-1.

The amount of polymers other than the crystalline polyamide (4A), the amorphous semi-aromatic polyamide (4B) and the polyphenylene ether (4C) in the above aspect, per 100 parts by mass of all of the reins contained in the polyamide composition, is preferably from 1 to 200 parts by mass, more preferably from 5 to 100 parts by mass, and even more preferably from 5 to 50 parts by mass. By ensuring that the amount of polymers other than polyamides in the polyamide composition of the above aspect satisfies the above range, a polyamide composition having superior heat resistance and mold releasability can be obtained.
(Metal Phosphite Salts and/or Metal Hypophosphite Salts)

Details relating to the metal phosphite salts and/or metal hypophosphite salts are as described above in the aspect 1-1.
(Phosphite Ester Compounds)

Details relating to the phosphite ester compounds are as described above in the aspect 1-1.

The polyamide composition of the aspect described above may also contain additives that are typically used in polyamide compositions, including colorants such as pigments or dyes (including colored masterbatches), flame retardants, fibrillating agents, fluorescent bleaching agents, plasticizers, antioxidants, ultraviolet absorbers, antistatic agents, fluidity improvers, spreading agents and elastomers, provided these additives do not impair the objects of the above aspect.

In those cases where the polyamide composition of the aspect described above contains the aforementioned types of other raw materials that may be included in the polyamide composition, the amounts of those other raw materials will vary depending on the type of material and the potential application of the polyamide composition, and therefore there are no particular limitations on those amounts provided the objects of the above aspect are not impaired.
[Method for Producing Polyamide Composition]

There are no particular limitations on the method for producing the polyamide composition of the aspect described above, provided the method includes a step of melt kneading raw material components that include the crystalline polyamide (4A), the amorphous semi-aromatic polyamide (4B) and the polyphenylene ether (4C) described above. For example, a method including a step of melt kneading raw material components containing the above polyamides using an extruder, wherein the temperature setting of the extruder is set to a value not higher than the melting peak temperature Tm2 of the polyamide composition described below +30° C., is preferred.

Details relating to the method for producing the polyamide composition are as described above in the aspect 1-1.
[Physical Properties of Polyamide Composition]

With the exception that the aliphatic polyamide (1A) is replaced with the crystalline polyamide (4A), the semi-aromatic polyamide (1B) is replaced with the amorphous semi-aromatic polyamide (4B), and excluding the other points described below, the physical properties of the polyamide composition are as described above for the aspect 1-1.

From the viewpoints of the mechanical properties, and particularly the water absorption rigidity and the thermal rigidity, the crystallization enthalpy ΔH of the polyamide composition is preferably at least 10 J/g, more preferably at least 14 J/g, even more preferably at least 18 J/g, and still more preferably 20 J/g or greater. Further, there are no particular limitations on the upper limit for the crystallization enthalpy ΔH, which is preferably as high as possible.

An example of a method for controlling the crystallization enthalpy ΔH of the polyamide composition so as to satisfy the above range is a method in which the blend ratio between the crystalline polyamide (4A), the amorphous semi-aromatic polyamide (4B) and the polyphenylene ether (4C) is controlled so as to satisfy the range described above.

An example of a device for measuring the melting point Tm2 and the crystallization enthalpy ΔH of the polyamide composition is a Diamond-DSC device manufactured by PerkinElmer, Inc.

The tan δ peak temperature of the polyamide composition is preferably at least 90° C., more preferably at least 100° C., even more preferably at least 110° C., and still more preferably 120° C. or higher.

Further, the tan δ peak temperature of the polyamide composition is preferably not more than 150° C., more preferably not more than 140° C., and even more preferably 130° C. or lower.

By ensuring that the tan δ peak temperature of the polyamide composition is at least 90° C., a polyamide composition having superior water absorption rigidity and thermal rigidity tends to be obtainable. Furthermore, by ensuring that the tan δ peak temperature of the polyamide composition is not higher than 150° C., a polyamide composition containing a component typified by an inorganic filler exhibits superior surface appearance.

An example of a method for controlling the tan δ peak temperature of the polyamide composition so as to satisfy the range described above is a method in which the blend ratio between the crystalline polyamide (4A), the amorphous semi-aromatic polyamide (4B) and the polyphenylene ether (4C) is controlled so as to satisfy the range described above.

Measurement of the melting point crystallization peak temperature Tc of the polyamide composition used in the above aspect can be performed in accordance with JIS-K7121, using the method described in the examples below.

An example of a device for measuring the crystallization peak temperature Tc is a Diamond-DSC device manufactured by PerkinElmer, Inc. An example of a method for controlling the crystallization peak temperature Tc of the polyamide composition so as to satisfy the above range is a method in which the blend ratio between the crystalline polyamide (4A), the amorphous semi-aromatic polyamide (4B) and the polyphenylene ether (4C) is controlled so as to satisfy the range described above.
[Molded Article]

A molded article according to an aspect 4-2 of the present invention is obtained by molding the polyamide composition described above.

Details relating to the molded article and applications thereof are as described above in the aspect 1-2.

<<Aspects 5-1 and 5-2>>

A polyamide composition according to an aspect 5-1 of the present invention contains components (5A) to (5E) listed below:

(5A) an aliphatic polyamide,
(5B) a semi-aromatic polyamide containing a diamine unit and a dicarboxylic acid unit,
(5C1) a flame retardant,
(5C2) a flame retardant auxiliary,
(5D) a white pigment, and
(5E) an ultraviolet absorber.

The molecular weight and tan δ peak temperature of the polyamide composition of the above aspect may be configured as described below, and can be measured using the methods described in the examples below.

<Weight Average Molecular Weight (Mw)>

The weight average molecular weight (Mw) can be used as an indicator of the molecular weight of the polyamide composition.

The weight average molecular weight (Mw) of the polyamide composition is typically at least 10,000 but not more than 50,000, preferably at least 17,000 but not more than 40,000, more preferably at least 20,000 but not more than 35,000, even more preferably at least 22,000 but not more than 34,000, still more preferably at least 24,000 but not more than 33,000, and particularly preferably at least 25,000 but not more than 32,000. Further, in other preferred aspects, the weight average molecular weight (Mw) may be at least 20,000 but not more than 38,000, at least 25,000 but not more than 36,000, at least 27,000 but not more than 35,000, or at least 29,000 but not more than 34,000.

By ensuring that the weight average molecular weight (Mw) of the polyamide composition satisfies the above range, a polyamide composition having superior mechanical properties, and particularly superior water absorption rigidity, thermal rigidity, and fluidity and the like can be obtained. Further, a molded article obtained from a polyamide composition containing a component typified by a filler exhibits more superior surface appearance.

Examples of the method used for controlling the Mw value for the polyamide composition so as to satisfy the above range include methods that use polyamides for which the Mw values of the aliphatic polyamide (5A) and the semi-aromatic polyamide (5B) satisfy the ranges described below.

As described in the examples below, Mw (weight average molecular weight) can be measured using GPC (gel permeation chromatography).

<Total Amount of Compounds Having Number Average Molecular Weight Mn of at Least 500 but not More than 2,000 Among Aliphatic Polyamide (5A) and Semi-Aromatic Polyamide (5B)>

The total amount of compounds having a number average molecular weight Mn of at least 500 but not more than 2,000 among the aliphatic polyamide (5A) and the semi-aromatic polyamide (5B), expressed relative to the total mass of polyamides within the polyamide composition, is preferably at least 0.5% by mass but less than 2.5% by mass, more preferably at least 0.8% by mass but less than 2.5% by mass, even more preferably at least 1.0% by mass but less than 2.5% by mass, still more preferably at least 1.2% by mass but less than 2.5% by mass, and particularly preferably at least 1.4% by mass but less than 2.5% by mass. Further, in other preferred aspects, this amount may be at least 1.0% by mass but not more than 2.0% by mass, at least 1.4% by mass but not more than 1.8% by mass, or at least 1.6% by mass but not more than 1.8% by mass.

By ensuring that the total amount of compounds having a number average molecular weight Mn of at least 500 but not more than 2,000 among the aliphatic polyamide (5A) and the semi-aromatic polyamide (5B) is at least as high as the above lower limit, the fluidity is more superior, and a molded article obtained from a polyamide composition containing a component typified by the filler (5G) tends to exhibit even more superior surface appearance. Further, by ensuring that the total amount is less than the above upper limit, gas generation during molding tends to be able to be more effectively suppressed.

Examples of the method used for controlling the total amount of compounds having a number average molecular weight Mn of at least 500 but not more than 2,000 among the aliphatic polyamide (5A) and the semi-aromatic polyamide (5B) so as to satisfy the above range include methods in which the molecular weight of the semi-aromatic polyamide (5B) is controlled. In this case, the weight average molecular weight (Mw(5B)) of the semi-aromatic polyamide (5B) is preferably at least 10,000 but not more than 25,000.

The total amount of compounds having a number average molecular weight Mn of at least 500 but not more than 2,000 among the aliphatic polyamide (5A) and the semi-aromatic polyamide (5B) can be determined by GPC, from an elution curve obtained under the measurement conditions used in the examples described below. 1.50

Further, in the GPC measurement, in those cases where the polyamide composition containing the aliphatic polyamide (5A) and the semi-aromatic polyamide (5B) also contains other components that are soluble in the solvent used to dissolve the polyamides, those other components are first eluted and removed using a solvent in which the polyamides are insoluble but the other components are soluble, and the GPC measurement is then performed. Further, in the case of materials such as the inorganic filler (5G) that are insoluble in the solvent used to dissolve the polyamides, the polyamide composition is dissolved in the solvent capable of dissolving the polyamides, and a filtration is then performed to remove any insoluble matter before the GPC measurement is performed.

<Molecular Weight Distribution of Polyamide Composition>

The molecular weight distribution of the polyamide composition of the aspect described above is indicated by the value of Mw (weight average molecular weight)/Mn (number average molecular weight).

The value of weight average molecular weight (Mw)/number average molecular weight (Mn) for the polyamide composition of the aspect described above is typically not more than 2.4, and is preferably at least 1.0 but not more than 2.4, more preferably at least 1.7 but not more than 2.3, even more preferably at least 1.8 but not more than 2.2, and particularly preferably at least 1.9 but not more than 2.1.

By ensuring that weight average molecular weight (Mw)/number average molecular weight (Mn) satisfies the above range, a polyamide composition having more superior fluidity and the like tends to be obtainable. Further, a molded article obtained from a polyamide composition containing a component typified by the filler (5G) tends to exhibit more superior surface appearance.

Examples of the method used for controlling the value of weight average molecular weight (Mw)/number average molecular weight (Mn) for the polyamide composition so as to satisfy the above range include a method in which the value of weight average molecular weight (Mw(5B))/number average molecular weight (Mn(5B)) for the semi-aromatic polyamide (5B) is adjusted so as to satisfy a range described below.

When the molecular structure of the polyamide composition contains aromatic compound units, the value for the molecular weight distribution (Mw/Mn) tends to increase as the molecular weight increases. A higher molecular weight distribution indicates a higher proportion of polyamide molecules having three-dimensional molecular structures. Accordingly, by controlling Mw/Mn so as to satisfy the above range, progression of the conversion of the molecules to three-dimensional structures during high-temperature processing can be suppressed, and a polyamide composition having more superior fluidity and the like can be obtained. Further, a molded article obtained from a polyamide composition containing a component typified by the filler (5G) exhibits more superior surface appearance.

As described in the examples below, the value of weight average molecular weight (Mw)/number average molecular weight (Mn) for the polyamide composition can be calculated using the values for the weight average molecular weight (Mw) and number average molecular weight (Mn) obtained using GPC.

<Polyamide Composition Tan δ Peak Temperature>

The lower limit for the tan δ peak temperature of the polyamide composition is typically 90° C., and is preferably 105° C., more preferably 110° C., and even more preferably 115° C.

On the other hand, the upper limit for the tan δ peak temperature of the polyamide composition is preferably 150° C., more preferably 140° C., and even more preferably 130° C.

In other words, the tan δ peak temperature of the polyamide composition is typically at least 90° C., preferably at least 105° C. but not more than 150° C., more preferably at least 110° C. but not more than 140° C., and even more preferably at least 115° C. but not more than 130° C.

By ensuring that the tan δ peak temperature of the polyamide composition is at least as high as the above lower limit, a polyamide composition having more superior water absorption rigidity and thermal rigidity tends to be obtainable. On the other hand, by ensuring that the tan δ peak temperature of the polyamide composition is not higher than the above upper limit, a molded article obtained from a polyamide composition containing a component typified by the filler (5G) tends to exhibit more superior surface appearance.

An example of a method for controlling the tan δ peak temperature of the polyamide composition so as to satisfy the range described above is a method in which the amounts of the aliphatic polyamide (5A) and the semi-aromatic polyamide (5B) are controlled so as to satisfy the ranges described below.

<Ratio of Molar Amount of Amino Ends Relative to Total Molar Amount of Amino Ends and Carboxyl Ends>

In the polyamide composition of the aspect described above, the ratio of the molar amount of amino ends relative to the total molar amount of amino ends and carboxyl ends (amount of amino ends/(amount of amino ends+amount of carboxyl ends)) is preferably at least 0.1 but less than 0.5, more preferably at least 0.25 but not more than 0.45, even more preferably at least 0.25 but less than 0.4, and still more preferably at least 0.25 but less than 0.35.

By ensuring that the ratio of the molar amount of amino ends relative to the total molar amount of amino ends and carboxyl ends is at least as high as the above lower limit, corrosion of the extruder and molding machine tends to be able to be more effectively suppressed. By ensuring that the ratio of the molar amount of amino ends relative to the total molar amount of amino ends and carboxyl ends is less than the above upper limit, a polyamide composition that exhibits more superior resistance to discoloration upon exposure to heat and light tends to be obtainable.

<Mass Ratio ((5E)/(5D)) of Ultraviolet Absorber (5E) Relative to White Pigment (5D)>

In the polyamide composition of the aspect described above, the mass ratio of the ultraviolet absorber (5E) relative to the white pigment (5D) (ultraviolet absorber (5E)/white pigment (5D)) is typically at least 0.15 but less than 2.50, preferably at least 0.15 but not more than 2.0, more preferably at least 0.20 but not more than 2.0, even more preferably at least 0.30 but not more than 1.5, and particularly preferably at least 0.30 but not more than 1.0.

By ensuring that (5E)/(5D) is at least as high as the above lower limit, a polyamide composition having more superior weathering discoloration resistance can be obtained. By ensuring that (5E)/(5D) is less than the above upper limit, a polyamide composition having more superior moldability, external appearance and mechanical properties can be obtained.

By using the composition described above, the polyamide composition of the above aspect is able to form a molded article that exhibits superior weld strength and Rockwell hardness upon water absorption, and favorable surface appearance and weathering discoloration resistance.

Each of the constituent components of the polyamide composition of the aspect described above is described below in further detail.

<Aliphatic Polyamide (5A)>

The aliphatic polyamide (5A) included in the polyamide composition of the aspect described above preferably contains the structural units (1) or (2) described below.

(1) The composition contains an aliphatic dicarboxylic acid unit (5A-a) and an aliphatic diamine unit (5A-b).

(2) The composition contains: (5A-c) at least one structural unit selected from the group consisting of lactam units and aminocarboxylic acid units.

[Aliphatic Dicarboxylic Acid Unit (5A-a)]

Examples of the aliphatic dicarboxylic acid that constitute the aliphatic dicarboxylic acid unit (5A-a) include linear or branched saturated aliphatic dicarboxylic acids of at least 3 but not more than 20 carbon atoms.

Examples of linear saturated aliphatic dicarboxylic acids of at least 3 but not more than 20 carbon atoms include, but are not limited to, malonic acid, succinic acid, glutaric acid, adipic acid, pimelic acid, suberic acid, azelaic acid, sebacic acid, dodecanedioic acid, tetradecanedioic acid, hexadecanedioic acid, octadecanedioic acid, eicosanedioic acid and diglycolic acid.

Examples of branched saturated aliphatic dicarboxylic acids of at least 3 but not more than 20 carbon atoms include, but are not limited to, dimethylmalonic acid, 2,2-dimethylsuccinic acid, 2,3-dimethylglutaric acid, 2,2-diethylsuccinic acid, 2,3-diethylglutaric acid, 2,2-dimethylglutaric acid, 2-methyladipic acid, and trimethyladipic acid.

For the aliphatic dicarboxylic acid that constitutes the aliphatic dicarboxylic acid unit (5A-a), a single aliphatic dicarboxylic acid may be used alone, or a combination of two or more such acids may be used.

Among these compounds, the aliphatic dicarboxylic acid that constitutes the aliphatic dicarboxylic acid unit (5A-a) is preferably a linear saturated aliphatic dicarboxylic acid of at least 6 carbon atoms, as such compounds tend to yield more superior heat resistance, fluidity, toughness, low-water absorption, and rigidity and the like for the polyamide composition.

Specific examples of preferred linear saturated aliphatic dicarboxylic acids of at least 6 carbon atoms include adipic acid, sebacic acid, dodecanedioic acid, tetradecanedioic acid, hexadecanedioic acid, octadecanedioic acid, and eicosanedioic acid.

Among these, from the viewpoint of the heat resistance and the like of the polyamide composition, the linear saturated aliphatic dicarboxylic acid of at least 6 carbon atoms is preferably adipic acid, sebacic acid or dodecanedioic acid.

Further, the aliphatic polyamide (5A) may, if required, also contain a unit derived from a trivalent or higher polyvalent carboxylic acid, provided this does not impair the effects of the polyamide composition of the above aspect. Examples of the trivalent or higher polyvalent carboxylic acid include trimellitic acid, trimesic acid and pyromellitic acid. A single trivalent or higher polyvalent carboxylic acid may be used alone, or a combination of two or more compounds may be used.

[Aliphatic Diamine Unit (5A-b)]

Examples of the aliphatic diamine that constitutes the aliphatic diamine unit (5A-b) include linear saturated aliphatic diamines of at least 2 but not more than 20 carbon atoms, and branched saturated aliphatic diamines of at least 3 but not more than 20 carbon atoms.

Examples of the linear saturated aliphatic diamines of at least 2 but not more than 20 carbon atoms include, but are not limited to, ethylenediamine, propylenediamine, tetramethylenediamine, pentamethylenediamine, hexamethylenediamine, heptamethylenediamine, octamethylenediamine, nonamethylenediamine, decamethylenediamine, undecamethylenediamine, dodecamethylenediamine and tridecamethylenediamine.

Examples of the branched saturated aliphatic diamines of at least 3 but not more than 20 carbon atoms include, but are not limited to, 2-methylpentamethylenediamine (also called 2-methyl-1,5-diaminopentane), 2,2,4-trimethylhexamethylenediamine, 2,4,4-trimethylhexamethylenediamine, 2-methyl-1,8-octanediamine (also called 2-methyloctamethylenediamine), and 2,4-dimethyloctamethylenediamine.

For the aliphatic diamine that constitutes the aliphatic diamine unit (5A-b), a single aliphatic diamine may be used alone, or a combination of two or more aliphatic diamines may be used.

Among these compounds, the aliphatic diamine that constitutes the aliphatic diamine unit (5A-b) preferably has at least 6 but not more than 12 carbon atoms, and more preferably at least 6 but not more than 10 carbon atoms. By ensuring that the number of carbon atoms in the aliphatic diamine that constitutes the aliphatic diamine unit (5A-b) is at least as large as the above lower limit, the heat resistance of the obtained molded article is more superior. On the other hand, by ensuring that the number of carbon atoms is not more than the above upper limit, the crystallinity and mold releasability of the obtained molded article are more superior.

Specific examples of preferred linear or branched saturated aliphatic diamines of at least 6 but not more than 12 carbon atoms include hexamethylenediamine, 2-methylpentamethylenediamine and 2-methyl-1,8-octanediamine.

Among these, hexamethylenediamine or 2-methylpentamethylenediamine is preferred as the linear or branched saturated aliphatic diamines of at least 6 but not more than 12 carbon atoms. By including this type of aliphatic diamine unit (5A-b), the heat resistance and rigidity and the like of molded articles obtained from the polyamide composition are more superior.

Furthermore, the aliphatic polyamide (5A) may, if required, also contain a unit derived from a trivalent or higher polyvalent aliphatic amine, provided this does not impair the effects of the polyamide composition of the above aspect. Examples of the trivalent or higher polyvalent aliphatic amine include bishexamethylenetriamine and the like.

[(5A-c) at Least One Structural Unit Selected from the Group Consisting of Lactam Units and Aminocarboxylic Acid Units]

Instead of containing the aliphatic dicarboxylic acid unit (5A-a) and the aliphatic diamine unit (5A-b), the aliphatic polyamide (5A) may contain: (5A-c) at least one structural unit selected from the group consisting of lactam units and aminocarboxylic acid units. By including this type of unit, a polyamide having superior toughness tends to be obtained.

The "lactam units" and "aminocarboxylic acid units" mentioned here refer to polymerized (and condensed) lactams and aminocarboxylic acids.

Examples of lactams that may constitute the lactam units or aminocarboxylic acid units include, but are not limited to, butyrolactam, pivalolactam, ε-caprolactanm, caprylolactam, enantolactam, undecanolactam, and laurolactam (dodecanolactam).

Among these, ε-caprolactam or laurolactam is preferred as the lactam that constitutes the lactam units or aminocarboxylic acid units, and ε-caprolactam is more preferred. By including this type of lactam, the toughness of the molded articles obtained from the polyamide composition tends to be more superior.

Examples of aminocarboxylic acids that may constitute the aminocarboxylic acid units include, but are not limited to, w-aminocarboxylic acids and α,ω-amino acids, which are compounds formed by ring-opening of a lactam.

The aminocarboxylic acid that constitutes the aminocarboxylic acid units is preferably a linear or branched saturated aliphatic carboxylic acids of at least 4 but not more than 14 carbon atoms in which the w-position has been substituted with an amino group. Examples of these types of aminocarboxylic acids include, but are not limited to, 6-aminocaproic acid, 11-aminoundecanoic acid and 12-aminododecanoic acid. Further examples of the aminocarboxylic acid include para-aminomethylbenzoic acid and the like.

For both the lactam and the aminocarboxylic acid that constitute the (5A-c) at least one structural unit selected from the group consisting of lactam units and aminocarboxylic acid units, a single compound may be used alone, or a combination of two or more compounds may be used.

Of the various possibilities, from the viewpoints of the mechanical properties, heat resistance, moldability and toughness, the aliphatic polyamide (5A) included in the polyamide composition of the aspect described above is preferably a polyamide containing a dicarboxylic acid unit and a diamine unit, and is more preferably a polyamide 66 (PA66). PA66 exhibits excellent mechanical properties, heat resistance, moldability and toughness, and is therefore thought to be a particularly suitable material for vehicle components.

The amount of the aliphatic polyamide (5A) in the polyamide composition of the aspect described above, relative to the total mass of polyamides in the polyamide composition, may be, for example, at least 10% by mass but less than 100% by mass, may be at least 13% by mass but not more than 90% by mass, may be at least 50% by mass but not more than 70% by mass, may be at least 55% by mass but not more than 70% by mass, may be at least 50% by mass but not more than 100% by mass, may be at least 55% by mass but not more than 100% by mass, or may be at least 57% by mass but not more than 100% by mass.

<Semi-Aromatic Polyamide (5B)>

The semi-aromatic polyamide (5B) included in the polyamide composition of the aspect described above is a polyamide containing a diamine unit and a dicarboxylic acid unit.

The semi-aromatic polyamide (5B) preferably contains at least 20 mol % but not more than 80 mol % of aromatic structural units, more preferably at least 30 mol % but not more than 70 mol % of aromatic structural units, and even more preferably at least 40 mol % but not more than 60 mol % of aromatic structural units, relative to the total of all the structural units in the semi-aromatic polyamide (5B). Here, an "aromatic structural unit" means an aromatic diamine unit or an aromatic dicarboxylic acid unit.

The semi-aromatic polyamide (5B) is preferably a polyamide containing a dicarboxylic acid unit (5B-a) that includes at least 50 mol % of isophthalic acid units relative to the total of all the dicarboxylic acid units in the semi-aromatic polyamide (5B), and a diamine unit (5B-b) that includes a diamine unit of at least 4 but not more than 10 carbon atoms.

Further, in this case, the total amount of the isophthalic acid units and the diamine units of at least 4 but not more than 10 carbon atoms within the semi-aromatic polyamide (5B), relative to the total of all the structural units that constitute the semi-aromatic polyamide (5B), is preferably at least 50 mol %, more preferably at least 80 mol % but not more than 100 mol %, even more preferably at east 90 mol % but not more than 100 mol %, and is particularly preferably 100 mol %.

The proportion of a prescribed monomer unit constituting the semi-aromatic polyamide (5B) can be measured by nuclear magnetic resonance (NMR) spectroscopy or the like.
[Dicarboxylic Acid Unit (5B-a)]

There are no particular limitations on the dicarboxylic acid unit (5B-a), and examples include aromatic dicarboxylic acid units, aliphatic dicarboxylic acid units and alicyclic dicarboxylic acid units.

Of these, the dicarboxylic acid unit (5B-a) preferably includes at least 50 mol % of isophthalic acid, more preferably includes at least 65 mol % but not more than 100 mol % of isophthalic acid, even more preferably includes at least 70 mol % but not more than 100 mol % of isophthalic acid, particularly preferably includes at least 80 mol % but not more than 100 mol % of isophthalic acid, and most preferably includes 100 mol % of isophthalic acid, relative to the total number of moles of dicarboxylic acid units (5B-a).

By ensuring that the proportion of isophthalic acid within the dicarboxylic acid units (5B-a) is at least as large as the above lower limit, a polyamide composition that exhibits superior mechanical properties, and in particular can simultaneously offer superior water absorption rigidity, thermal rigidity, and fluidity and the like, tends to be obtainable. Further, a molded article obtained from the polyamide composition tends to exhibit more superior surface appearance.
(Aromatic Dicarboxylic Acid Units)

Examples of aromatic dicarboxylic acids that form an aromatic dicarboxylic acid unit besides the isophthalic acid units include, but are not limited to, dicarboxylic acids having an aromatic group such as a phenyl group or a naphthyl group. The aromatic group of the aromatic dicarboxylic acid may be unsubstituted, or may have a substituent.

There are no particular limitations on this substituent, and examples include alkyl groups of at least one but not more than 4 carbon atoms, aryl groups of at least 6 but not more than 10 carbon atoms, arylalkyl groups of at least 7 but not more than 10 carbon atoms, halogen groups, silyl groups of at least one but not more than 6 carbon atoms, and sulfonic acid groups and salts thereof (such as sodium salts).

Examples of the alkyl groups of at least one but not more than 4 carbon atoms include, but are not limited to, a methyl group, ethyl group, n-propyl group, isopropyl group, n-butyl group, isobutyl group and tert-butyl group.

Examples of the aryl groups of at least 6 but not more than 10 carbon atoms include, but are not limited to, a phenyl group, tolyl group, xylyl group and naphthyl group.

Examples of the arylalkyl groups of at least 7 but not more than 10 carbon atoms include, but are not limited to, a benzyl group and the like.

Examples of the halogen groups include, but are not limited to, a fluoro group, chloro group, bromo group and iodo group.

Examples of the silyl groups of at least one but not more than 6 carbon atoms include, but are not limited to, a trimethylsilyl group and tert-butyldimethylsilyl group.

Among the various possibilities, the aromatic dicarboxylic acid that forms an aromatic dicarboxylic acid unit besides the isophthalic acid unit is preferably an aromatic dicarboxylic acid of at least 8 but not more than 20 carbon atoms that is either unsubstituted or substituted with a prescribed substituent.

Specific examples of the aromatic dicarboxylic acid of at least 8 but not more than 20 carbon atoms that is either unsubstituted or substituted with a prescribed substituent include, but are not limited to, terephthalic acid, naphthalenedicarboxylic acid, 2-chloroterephthalic acid, 2-methylterephthalic acid, 5-methylisophthalic acid and 5-sodium sulfoisophthalic acid.

For the aromatic dicarboxylic acid that constitutes the aromatic dicarboxylic acid unit, a single compound may be used alone, or a combination of two or more compounds may be used.
(Aliphatic Dicarboxylic Acid Units)

Examples of aliphatic dicarboxylic acids that form an aliphatic dicarboxylic acid unit include linear or branched saturated aliphatic dicarboxylic acids of at least 3 but not more than 20 carbon atoms.

Examples of linear saturated aliphatic dicarboxylic acids of at least 3 but not more than 20 carbon atoms include, but are not limited to, malonic acid, succinic acid, glutaric acid, adipic acid, pimelic acid, suberic acid, azelaic acid, sebacic acid, dodecanedioic acid, tetradecanedioic acid, hexadecanedioic acid, octadecanedioic acid, eicosanedioic acid, and diglycolic acid.

Examples of branched saturated aliphatic dicarboxylic acids of at least 3 but not more than 20 carbon atoms include, but are not limited to, dimethylmalonic acid, 2,2-dimethylsuccinic acid, 2,3-dimethylglutaric acid, 2,2-diethylsuccinic acid, 2,3-diethylglutaric acid, 2,2-dimethylglutaric acid, 2-methyladipic acid, and trimethyladipic acid.
(Alicyclic Dicarboxylic Acid Units)

Examples of alicyclic dicarboxylic acids that form an alicyclic dicarboxylic acid unit include, but are not limited to, alicyclic dicarboxylic acids having an alicyclic structure of at least 3 but not more than 10 carbon atoms. Among these, the alicyclic dicarboxylic acid is preferably an alicyclic dicarboxylic acid having an alicyclic structure of at least 5 but not more than 10 carbon atoms.

Examples of this type of alicyclic dicarboxylic acid include, but are not limited to, 1,4-cyclohexanedicarboxylic acid, 1,3-cyclohexanedicarboxylic acid and 1,3-cyclopentanedicarboxylic acid. Among these, the alicyclic dicarboxylic acid is preferably 1,4-cyclohexanedicarboxylic acid.

For the alicyclic dicarboxylic acid that constitutes an alicyclic dicarboxylic acid unit, a single compound may be used alone, or a combination of two or more compounds may be used.

The alicyclic group of the alicyclic dicarboxylic acid may be unsubstituted, or may have a substituent. Examples of the substituent include alkyl groups of at least one but not more than 4 carbon atoms. Examples of the alkyl groups of at least one but not more than 4 carbon atoms include the same groups as those listed above in the description of the "aromatic dicarboxylic acid units".

The dicarboxylic acid unit other than the isophthalic acid unit preferably includes an aromatic dicarboxylic acid unit, and more preferably includes an aromatic dicarboxylic acid of at least 6 carbon atoms.

By using this type of dicarboxylic acid, a polyamide composition that exhibits superior mechanical properties, and in particular can simultaneously offer superior water absorption rigidity, thermal rigidity, and fluidity and the like, tends to be obtainable. Further, a molded article obtained from the polyamide composition tends to exhibit more superior surface appearance.

In the semi-aromatic polyamide (5B), the dicarboxylic acid that constitutes the dicarboxylic acid unit (5B-a) is not limited to the compounds described above as dicarboxylic acids, and may also be a compound equivalent to a dicarboxylic acid.

Here, a "compound equivalent to a dicarboxylic acid" refers to a compound that is capable of forming a dicarboxylic acid structure the same as the dicarboxylic acid structure derived from an aforementioned dicarboxylic acid. Examples of this type of compound include, but are not limited to, dicarboxylic acid anhydrides and dicarboxylic acid halides.

Further, the semi-aromatic polyamide (5B) may, if required, also contain a unit derived from a trivalent or higher polyvalent carboxylic acid, provided this does not impair the effects of the polyamide composition of the above aspect.

Examples of the trivalent or higher polyvalent carboxylic acid include trimellitic acid, trimesic acid and pyromellitic acid. A single trivalent or higher polyvalent carboxylic acid may be used alone, or a combination of two or more compounds may be used.

[Diamine Unit (5B-b)]

There are no particular limitations on the diamine unit (5B-b) that constitutes the semi-aromatic polyamide (5B), and examples include aromatic diamine units, aliphatic diamine units, and alicyclic diamine units and the like. Among these, the diamine unit (5B-b) that constitutes the semi-aromatic polyamide (5B) preferably includes a diamine unit of at least 4 but not more than 10 carbon atoms, and more preferably includes a diamine unit of at least 6 but not more than 10 carbon atoms.

(Aliphatic Diamine Units)

Examples of aliphatic diamines that form an aliphatic diamine unit include linear saturated aliphatic diamines of at least 4 but not more than 20 carbon atoms.

Examples of the linear saturated aliphatic diamines of at least 4 but not more than 20 carbon atoms include, but are not limited to, ethylenediamine, propylenediamine, tetramethylenediamine, pentamethylenediamine, hexamethylenediamine, heptamethylenediamine, octamethylenediamine, nonamethylenediamine, decamethylenediamine, undecamethylenediamine, dodecamethylenediamine and tridecamethylenediamine.

(Alicyclic Diamine Units)

Examples of alicyclic diamines that form an alicyclic diamine unit include, but are not limited to, 1,4-cyclohexanediamine, 1,3-cyclohexanediamine and 1,3-cyclopentanediamine.

(Aromatic Diamine Units)

Examples of aromatic diamines that form an aromatic diamine unit include any diamine having an aromatic group, and there are no particular limitations. Specific examples of the aromatic diamines include meta-xylylenediamine and the like.

For the diamines that form each of these diamine units, a single diamine may be used alone, or a combination of two or more diamines may be used.

Among the various possibilities, the diamine unit (5B-b) is preferably an aliphatic diamine unit, is more preferably a linear saturated aliphatic diamine unit of at least 4 but not more than 10 carbon atoms, is even more preferably a linear saturated aliphatic diamine unit of at least 6 but not more than 10 carbon atoms, and is particularly preferably hexamethylenediamine unit.

By using this type of diamine, a polyamide composition that exhibits superior mechanical properties, and in particular can simultaneously offer superior water absorption rigidity, thermal rigidity, and fluidity and the like, tends to be obtainable. Further, a molded article obtained from the polyamide composition tends to exhibit more superior surface appearance.

The semi-aromatic polyamide (5B) contained in the polyamide composition of the aspect described above is preferably a polyamide 6I (polyhexamethylene isophthalamide), a polyamide 9I or a polyamide 10I, and is more preferably a polyamide 6I. Polyamide 6I exhibits excellent heat resistance, molding workability and flame retardancy, and is therefore thought to be a particularly suitable material for vehicle components.

The amount of the semi-aromatic polyamide (5B) in the polyamide composition of the aspect described above, relative to the total mass of polyamides in the polyamide composition, may be at least 5.0% by mass but not more than 50.0% by mass, and is preferably at least 10.0% by mass but not more than 50% by mass, more preferably at least 15.0% by mass but not more than 50% by mass, even more preferably at least 20.0% by mass but not more than 50% by mass, particularly preferably at least 30% by mass but not more than 50% by mass, and most preferably at least 30% by mass but not more than 45% by mass. Further, in other preferred aspects, the amount of the semi-aromatic polyamide (5B) may be greater than 0% by mass but not more than 90% by mass, or at least 10% by mass but not more than 87% by mass.

By ensuring that the amount of the semi-aromatic polyamide (5B) satisfies the above range, the mechanical properties of a molded article obtained from the polyamide composition are excellent. Further, by including a component typified by the filler (5G), the surface appearance of a molded article obtained from the polyamide composition is particularly superior.

<End-Capping Agent>

The ends of the polyamides (the aliphatic polyamide (5A) and the semi-aromatic polyamide (5B)) contained in the polyamide composition of the aspect described above may each be end-capped with a conventional end-capping agent.

The end-capping agent is as described above in the aspect 1-1.

<Methods for Producing Aliphatic Polyamide (5A) and Semi-Aromatic Polyamide (5B)>

With the exception that the aliphatic polyamide (1A) is replaced with the aliphatic polyamide (5A) and the semi-aromatic polyamide (1B) is replaced with the semi-aromatic polyamide (5B), the methods used for producing the polyamides are as described above for the aspect 1-1.

<Polymer Ends of Polyamides>

The polymer ends of the polyamides are as described above in the aspect 1-1.

<Properties of Polyamides>
[Properties of Aliphatic Polyamide (5A)]

The properties of the aliphatic polyamide (5A) are as described above for the "properties of the aliphatic polyamide (1A)" in the above aspect 1-1.

[Properties of Semi-Aromatic Polyamide (5B)]

The properties of the semi-aromatic polyamide (5B) are, with the exception of the points described below, as described above for the "properties of the semi-aromatic polyamide (1B)" in the above aspect 1-1.

[Weight Average Molecular Weight Mw(5B) of Semi-Aromatic Polyamide (5B)]

The weight average molecular weight (Mw(5B)) of the semi-aromatic polyamide (5B) can be used as an indicator of the molecular weight of the semi-aromatic polyamide (5B).

The weight average molecular weight (Mw(5B)) of the semi-aromatic polyamide (5B) is preferably at least 10,000 but not more than 50,000, more preferably at least 13,000 but not more than 40,000, even more preferably at least 15,000 but not more than 25,000, particularly preferably at least 18,000 but not more than 22,000, and most preferably at least 19,000 but not more than 21,000.

By ensuring that the weight average molecular weight (Mw(5B)) of the semi-aromatic polyamide (5B) satisfies the above range, a polyamide composition that exhibits more superior mechanical properties, and particularly superior water absorption rigidity, thermal rigidity, and fluidity and the like can be obtained. Further, a molded article obtained from a polyamide composition containing a component typified by the filler (5G) exhibits excellent surface appearance.

The weight average molecular weight (Mw(5B)) of the semi-aromatic polyamide (5B) can be measured using GPC.

(Tan δ Peak Temperature of Semi-Aromatic Polyamide (5B))

The tan δ peak temperature of the semi-aromatic polyamide (5B) is preferably at least 70° C., more preferably at least 100° C. but not more than 160° C., even more preferably at least 110° C. but not more than 150° C., particularly preferably at least 120° C. but not more than 145° C., and most preferably at least 130° C. but not more than 140° C.

An example of a method for controlling the tan δ peak temperature of the semi-aromatic polyamide (5B) so as to obtain a temperature that satisfies the above range is a method in which the ratio of aromatic monomers relative to the dicarboxylic acid units is increased. From this viewpoint, the semi-aromatic polyamide (5B) preferably contains, as the dicarboxylic acid unit (5B-a), at least 50 mol %, and more preferably 100 mol %, of isophthalic acid among all of the dicarboxylic acid units that constitute the semi-aromatic polyamide (5B).

By ensuring that the tan δ peak temperature of the semi-aromatic polyamide (5B) is at least as high as the above lower limit, a polyamide composition having more superior water absorption rigidity and thermal rigidity tends to be obtainable. Further, by ensuring that the tan δ peak temperature of the semi-aromatic polyamide (5B) is not higher than the above upper limit, a molded article obtained from a polyamide composition containing a component typified by the filler (5G) exhibits more superior surface appearance.

The tan δ peak temperature of the semi-aromatic polyamide (5B) can be measured, for example, using a viscoelasticity measuring and analysis device (DVE-V4, manufactured by Rheology Co., Ltd.).

[Total Amount of Amino Ends and Carboxyl Ends in Polyamides]

The total of the amount of amino ends and the amount of carboxyl ends in the polyamides (the aliphatic polyamide (5A) and the semi-aromatic polyamide (5B)), per 1 g of the polyamides, is typically at least 150 µeq but not more than 350 µeq, preferably at least 160 µeq but not more than 330 µeq, more preferably at least 170 µeq but not more than 320 µeq, even more preferably at least 180 µeq but not more than 300 µeq, and particularly preferably at least 190 µeq but not more than 280 µeq.

By ensuring that the total of the amount of amino ends and the amount of carboxyl ends in the polyamides (the aliphatic polyamide (5A) and the semi-aromatic polyamide (5B)) satisfies the above range, a polyamide composition having more superior fluidity and the like can be obtained. Further, a molded article obtained from a polyamide composition containing a component typified by the filler (5G) exhibits more superior surface appearance.

<Flame Retardant (5C1)>

Details relating to the flame retardant (5C1) are as described above for the "flame retardant (2D1)" in the above aspect 2-1.

<Flame Retardant Auxiliary (5C2)>

By including the flame retardant auxiliary (5C2) in the polyamide composition of the aspect described above, a polyamide composition having more superior flame retardancy can be obtained.

The properties of the flame retardant auxiliary (5C2) are as described above for the "flame retardant auxiliary (2D2)" in the above aspect 2-1.

<White Pigment (5D)>

The polyamide composition of the aspect described above contains a white pigment (5D).

There are no particular limitations on the white pigment, and examples include zinc sulfide, zinc oxide, titanium oxide, barium sulfate, calcium carbonate, aluminum oxide, lead carbonate, lead hydroxide, and silicon dioxide.

Among these, in terms of the mechanical properties of the polyamide composition such as the toughness, strength and rigidity, and the balance between the flame retardancy and the coloring, at least one pigment selected from among zinc sulfide (ZnS) and zinc oxide (ZnO) is preferred.

<Ultraviolet Absorber (5E)>

The polyamide composition of the aspect described above also contains an ultraviolet absorber (5E).

There are no particular limitations on the ultraviolet absorber, and examples include benzotriazole-based ultraviolet absorbers, triazine-based ultraviolet absorbers, benzophenone-based ultraviolet absorbers, cyanoacrylate-based ultraviolet absorbers, salicylate-based ultraviolet absorbers, and oxanilide-based ultraviolet absorbers.

Among these, in terms of the mechanical properties of the polyamide composition such as the toughness, strength and rigidity, and the balance between the flame retardancy and the coloring, at least one compound selected from among benzotriazole-based ultraviolet absorbers and triazine-based ultraviolet absorbers is preferred.

<Polymer (5F) Containing α,β-Unsaturated Dicarboxylic Acid Anhydride Unit)

In addition to the above components (5A) to (5E), the polyamide composition of the aspect described above may also contain a polymer (5F) containing an α,β-unsaturated dicarboxylic acid anhydride unit. By including the polymer (5F) containing an α,β-unsaturated dicarboxylic acid anhydride unit, a polyamide composition that exhibits more superior mechanical properties such as toughness and rigidity can be obtained.

Examples of the polymer (5F) containing an α,β-unsaturated dicarboxylic acid anhydride unit that may be included in the polyamide composition of the above aspect include polymers containing an α,β-unsaturated dicarboxylic acid anhydride as a copolymerization component, and polymers that have been modified with an α,β-unsaturated dicarboxylic acid anhydride.

Examples of the α,β-unsaturated dicarboxylic acid anhydride include compounds represented by the general formula (1) shown below (hereafter sometimes referred to as the "compound (I)").

[Chemical formula 6]

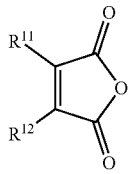

(I)

In the above general formula (I), each of $R^{11}$ and $R^{12}$ independently represents a hydrogen atom or an alkyl group of at least one but not more than three carbon atoms. $R^{11}$ and $R^{12}$ may be the same or different. Of the various possibilities, in terms of ease of production, $R^{11}$ and $R^{12}$ are preferably the same.

Examples of the alkyl group of at least one but not more than three carbon atoms for $R^{11}$ and $R^{12}$ include a methyl group, ethyl group, propyl group and isopropyl group.

Of the various possibilities, each of $R^{11}$ and $R^{12}$ is preferably a hydrogen atom or a methyl group, and is more preferably a hydrogen atom.

Examples of preferred compounds (I) (α,β-unsaturated dicarboxylic acid anhydrides) include maleic anhydride and methyl maleic anhydride. Of these, the compound (1) (α,β-unsaturated dicarboxylic acid anhydride) is preferably maleic anhydride.

[Copolymers of Aromatic Vinyl Compound and α,β-Unsaturated Dicarboxylic Acid Anhydride]

From the viewpoint of the efficiency of the flame retardancy improvement (achieving an effect with a small blend amount), the polymer containing an α,β-unsaturated dicarboxylic acid anhydride as a copolymerization component is preferably a copolymer of an aromatic vinyl compound and an α,β-unsaturated dicarboxylic acid anhydride.

Examples of aromatic vinyl compounds that may be used in the production of a copolymer of an aromatic vinyl compound and an α,β-unsaturated dicarboxylic acid anhydride include compounds represented by the general formula shown below (hereafter sometimes referred to as the "compound (II)").

[Chemical formula 7]

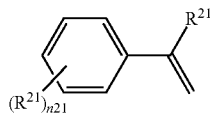

(II)

In the above general formula (II), $R^{21}$ represents a hydrogen or an alkyl group of at least one but not more than three carbon atoms. $R^{22}$ represents a substituent on the benzene ring. $R^{22}$ is an alkyl group of at least one but not more than three carbon atoms. Further, n21 represents an integer of at least 0 but not more than 5. When n21 is zero, the benzene ring is unsubstituted.

Examples of the alkyl group of at least one but not more than three carbon atoms for $R^{21}$ and $R^{22}$ include the same groups as those listed above in the compound (1).

Among the various possibilities, $R^{21}$ is preferably a hydrogen atom or a methyl group. Further, $R^{22}$ is preferably a methyl group.

Moreover, n21 represents the number of $R^{22}$ substituents on the benzene ring. The value of n21 is preferably an integer of 0 or 1, and is more preferably 0.

Examples of preferred compounds (11) (aromatic vinyl compounds) include styrene, α-methylstyrene and p-methylstyrene. Among these, the compound (II) (aromatic vinyl compound) is preferably styrene.

In those cases where the polymer (5F) containing an α,β-unsaturated dicarboxylic acid anhydride unit includes an aromatic vinyl compound unit, the aromatic vinyl compound unit exhibits affinity with the flame retardant (5C1) (such as a brominated polystyrene), and the α,β-unsaturated dicarboxylic acid anhydride unit exhibits affinity with or reacts with the semi-aromatic polyamide (5B). It is thought that, as a result, dispersion of the flame retardant (5C1) within the polyamide matrix is assisted, enabling the flame retardant to be finely dispersed.

In the copolymer of the aromatic vinyl compound and the α,β-unsaturated dicarboxylic acid anhydride, from the viewpoints of the flame retardancy, fluidity, and thermal decomposition resistance and the like of the obtained polyamide composition, the proportions of the aromatic vinyl compound unit and the α,β-unsaturated dicarboxylic acid anhydride unit are preferably at least 50% by mass but not more than 99% by mass for the aromatic vinyl compound unit and at least 1% by mass but not more than 50% by mass for the α,β-unsaturated dicarboxylic acid anhydride unit. Further, the proportion of the α,β-unsaturated dicarboxylic acid anhydride unit in the copolymer of the aromatic vinyl compound and the α,β-unsaturated dicarboxylic acid anhydride is more preferably at least 5% by mass but not more than 20% by mass, and even more preferably at least 8% by mass but not more than 15% by mass.

By ensuring that the proportion of the α,β-unsaturated dicarboxylic acid anhydride unit in the copolymer of the aromatic vinyl compound and the α,β-unsaturated dicarboxylic acid anhydride is at least as high as the above lower limit, a polyamide composition can be obtained that exhibits excellent mechanical properties such as toughness and rigidity, as well as superior flame retardancy. Further, by ensuring that the proportion of the α,β-unsaturated dicarboxylic acid anhydride unit is not more than the above upper limit, any degradation of the polyamide composition caused by the α,β-unsaturated dicarboxylic acid anhydride can be more effectively prevented.

[Polymers that have been Modified by α,β-Unsaturated Dicarboxylic Acid Anhydride]

Examples of polymers that have been modified with an α,β-unsaturated dicarboxylic acid anhydride include polyphenylene ether or polypropylene that has been modified with an α,β-unsaturated dicarboxylic acid anhydride. Of these, a maleic anhydride-modified polyphenylene ether is preferred as the polymer that has been modified with an α,β-unsaturated dicarboxylic acid anhydride.

The amount of the polymer that has been modified with an α,β-unsaturated dicarboxylic acid anhydride is preferably at least 0.05% by mass but not more than 5% by mass relative to the total mass of the polyamide composition.

<Filler (5G)>

In addition to the above components (5A) to (5F), the polyamide composition of the aspect described above may also contain a filler (5G). By including the filler (5G), a polyamide composition having even more superior mechanical properties such as toughness and rigidity can be obtained.

Examples of the filler (5G) that may be included in the polyamide composition of the aspect described above include, but are not particularly limited to, glass fiber, carbon fiber, calcium silicate fiber, potassium titanate fiber, aluminum borate fiber, glass flakes, talc, kaolin, mica, hydrotalcite, zinc carbonate, calcium monohydrogen phosphate, wollastonite, zeolite, boehmite, magnesium oxide, calcium silicate, sodium aluminosilicate, magnesium silicate, Ketjen black, acetylene black, furnace black, carbon nanotubes, graphite, brass, copper, silver, aluminum, nickel, iron, calcium fluoride, montmorillonite, swellable fluorine mica, and apatite.

One of these fillers (5G) may be used alone, or a combination of two or more fillers may be used.

Among these fillers, from the viewpoint of the rigidity and strength, the filler (5G) is preferably glass fiber, carbon fiber, glass flakes, talc, kaolin, mica, calcium monohydrogen phosphate, wollastonite, carbon nanotubes, graphite, calcium fluoride, montmorillonite, swellable fluorine mica or apatite. Further, the filler (5G) is more preferably glass fiber or carbon fiber. Glass fiber is even more preferred.

In those cases where the filler (5G) is glass fiber or carbon fiber, the number-average fiber diameter (D) is preferably at least 3 μm but not more than 30 μm. Further, the weight-average fiber length (L) is preferably at least 100 μm but not more than 750 μm. Moreover, the aspect ratio ((L)/(D)) between the weight-average fiber length (L) and the number-average fiber diameter (D) is preferably at least 10 but not more than 100. By using glass fiber or carbon fiber of the above structure, more superior properties can be achieved.

Furthermore, in those cases where the filler (5G) is glass fiber, the number-average fiber diameter (D) is more preferably at least 3 μm but not more than 30 μm. The weight-average fiber length (L) is more preferably at least 103 μm but not more than 500 μm. Moreover, the aspect ratio ((L)/(D)) is more preferably at least 3 but not more than 100.

Furthermore, the number-average fiber diameter and weight-average fiber length of the filler (5G) can be measured using the methods described below.

First, the molded article of the polyamide composition is dissolved in a solvent such as formic acid that is capable of dissolving the polyamides. At least 100 pieces of the filler are then selected randomly from the resulting insoluble components. Subsequently, these selected pieces of the filler are inspected using an optical microscope or a scanning electron microscope or the like to determine the diameter and length.

<Amounts of (5C1) to (5G) in Polyamide Composition>

[Amount of Flame Retardant (5C1)]

The amount of the flame retardant (5C1) in the polyamide composition of the aspect described above, relative to the total mass of the polyamide composition, is preferably at least 0.1% by mass but not more than 30% by mass, more preferably at least 5% by mass but not more than 20% by mass, and even more preferably at least 5% by mass but not more than 15% by mass.

By ensuring that the amount of the flame retardant (5C1) is at least as large as the above lower limit, a polyamide composition having more superior flame retardancy can be obtained. On the other hand, by ensuring that the amount of the flame retardant (5C1) is not more than the above lower limit, any generation of decomposition gases during melt kneading, deterioration of fluidity during molding, and adhesion of contaminants to the molding mold can be more effectively suppressed. Moreover, any deterioration in the mechanical properties such as the toughness and the rigidity or the molded article surface appearance can also be more effectively suppressed.

[Amount of Flame Retardant Auxiliary (5C2)]

The amount of the flame retardant auxiliary (5C2) in the polyamide composition of the aspect described above, relative to the total mass of the polyamide composition, is preferably at least 0.1% by mass but not more than 10% by mass, and more preferably at least 1% by mass but not more than 10% by mass.

By ensuring that the amount of the flame retardant auxiliary (5C2) is at least as large as the above lower limit, a polyamide composition having more superior flame retardancy can be obtained. On the other hand, by ensuring that the amount of the flame retardant auxiliary (5C2) is not more than the above upper limit, the viscosity of the composition during melt processing can be controlled to a level within a suitable range, and any increase in torque during extrusion, and any deterioration in the moldability during molding or the external appearance of the molded article can be more effectively suppressed. Further, a polyamide composition having excellent toughness and the like can be obtained without impairing the superior mechanical properties of the polyamides such as the toughness and the rigidity.

[Types and Amounts of Flame Retardant (5C1) and Flame Retardant Auxiliary (5C2)]

In a particularly preferred combination for the flame retardant (5C1) and the flame retardant auxiliary (5C2) contained in the polyamide composition of the aspect described above, the flame retardant (5C1) is a brominated polystyrene, the amount of the brominated polystyrene is at least 6% by mass but not more than 15% by mass relative to the total mass of the polyamide composition, the flame retardant auxiliary (5C2) is diantimony trioxide ($Sb_2O_3$), and the amount of the diantimony trioxide is at least 0.1% by mass but not more than 4% by mass relative to the total mass of the polyamide composition.

[Amount of White Pigment (5D)]

The amount of the white pigment (5D) in the polyamide composition of the aspect described above, relative to the total mass of the polyamide composition, is preferably at least 0.1% by mass but not more than 5% by mass, and more preferably at least 0.5% by mass but not more than 5% by mass.

By ensuring that the amount of the white pigment (5D) satisfies the above range, the coloring and the mechanical properties (and particularly the mechanical strength) of the obtained polyamide composition tend to more favorable.

[Amount of Ultraviolet Absorber (5E)]

The amount of the ultraviolet absorber (5E) in the polyamide composition of the aspect described above, relative to the total mass of the polyamide composition, is preferably at least 0.1% by mass but not more than 5% by mass, more preferably at least 0.3% by mass but not more than 3% by mass, even more preferably at least 0.4% by mass but not more than 3% by mass, and particularly preferably at least 0.5% by mass but not more than 3% by mass.

In particular, by ensuring that the ultraviolet absorber (5E) is at least one compound selected from the group consisting of benzotriazole-based and triazine-based ultraviolet absorbers, and ensuring that the amount of the ultraviolet absorber (5E) relative to the total mass of the polyamide composition satisfies the above range, a polyamide composition that exhibits more superior weathering discoloration resistance and mechanical properties (and particularly mechanical strength) can be obtained.

[Amount of Polymer (5F) Containing an α,β-Unsaturated Dicarboxylic Acid Anhydride Unit]

In those cases where the polyamide composition of the aspect described above contains the polymer (7E) containing an α,β-unsaturated dicarboxylic acid anhydride unit, the amount of the polymer (5F) containing an α,β-unsaturated dicarboxylic acid anhydride unit, relative to the total mass of the polyamide composition, is preferably at least 0.1% by mass but not more than 20% by mass, more preferably at least 0.5% by mass but not more than 20% by mass, even more preferably at least 1% by mass but not more than 15% by mass, and particularly preferably at least 1% by mass but not more than 10% by mass.

By ensuring that the amount of the polymer (5F) containing an α,β-unsaturated dicarboxylic acid anhydride unit is at least as large as the above lower limit, the fine dispersion effect of the flame retardant (5C1) within the polyamide composition as a result of improved compatibility can be further enhanced. Further, a polyamide composition having more superior improvements in flame retardancy and strength can be obtained. Furthermore, by ensuring that the amount of the polymer (5F) containing an α,β-unsaturated dicarboxylic acid anhydride unit is not more than the above upper limit, a polyamide composition having more superior strength and the like tends to be obtainable without impairing the superior mechanical properties (and particularly the toughness and rigidity) of the polyamides.

[Amount of Filler (5G)]

In those cases where the polyamide composition of the aspect described above contains the filler (7F), the amount of the filler (5G) in the polyamide composition, relative to the total mass of the polyamide composition, is preferably at least 1% by mass but not more than 80% by mass, more preferably at least 10% by mass but not more than 70% by mass, even more preferably at least 30% by mass but not more than 70% by mass, particularly preferably at least 30% by mass but not more than 60% by mass, and most preferably at least 40% by mass but not more than 60% by mass.

By ensuring that the amount of the filler (5G) is at least as large as the above lower limit, the mechanical properties of the polyamide composition such as the strength and rigidity tend to be further improved. On the other hand, by ensuring that the amount of the filler (5G) is not more than the above upper limit, a polyamide composition having more superior moldability tends to be obtainable.

In particular, by using glass fiber as the filler (5G), and ensuring that the amount of the filler (5G) relative to the total mass of the polyamide composition satisfies the above range, the mechanical properties such as the strength and rigidity of the polyamide composition tend to be further improved.

[Total Amount of Components (5C1) to (5G)]

The total amount of the flame retardant (5C1), the flame retardant auxiliary (5C2), the white pigment (5D), the ultraviolet absorber (5E), the polymer (5F) containing an α,β-unsaturated dicarboxylic acid anhydride unit, and the filler (5G), relative to the total mass of the polyamide composition, is preferably at least 10% by mass but not more than 90% by mass, more preferably at least 30% by mass but not more than 80% by mass, and even more preferably at least 40% by mass but not more than 75% by mass. By ensuring that the total amount of the above components (5C1) to (5G) in the polyamide composition of the aspect described above is at least as large as the above lower limit, a polyamide composition having more superior strength, rigidity, and flame retardancy and the like can be obtained. Further, a polyamide composition having a suitable melt viscosity and excellent workability can be obtained.

<Other Additives (5H)>

In addition to the components (5A) to (5G) described above, the polyamide composition of the aspect described above may also contain other additives (5H) that are typically used in polyamides, provided these other additives do not impair the effects of the polyamide composition of the above aspect. Examples of these other additives (5H) include: (5H1) moldability improvers and lubricants, (5H2) degradation inhibitors, (5H3) nucleating agents, (5H4) thermal stabilizers, and (5H5) other resins besides the aliphatic polyamide (5A) and semi-aromatic polyamide (5B) described above.

The amounts of these other additives (5H) in the polyamide composition of the aspect described above will vary depending on the type of material and the potential application of the polyamide composition, and therefore there are no particular limitations on those amounts provided the effects of the polyamide composition of the above aspect are not impaired, but the total amount of the other additives (6J) in the polyamide composition may, for example, be not more than 50% by mass, not more than 10% by mass, not more than 5% by mass, or 1% by mass or less.

[(5H1) Moldability Improvers and Lubricants]

The moldability improvers and lubricants of (5H1) are as described above for the "lubricants" in the above aspect 1-1.

[(5H2) Degradation Inhibitors]

A degradation inhibitor (5H2) included in the polyamide composition of the aspect described above is used for the purposes of suppressing thermal degradation, preventing discoloration upon heating, and improving the heat aging resistance.

Details relating to the degradation inhibitor (5H2) are as described above for the "degradation inhibitors" in the above aspect 2-1.

[(5H3) Nucleating Agents]

Details relating to the nucleating agents (5H3) are as described above for the "nucleating agents" in the above aspect 1-1.

[(5H4) Thermal Stabilizers]

Details relating to the thermal stabilizers (5H4) are as described above for the "stabilizers" in the above aspect 1-1.

[(5H6) Other Resins]

Details relating to the other resins (5H6) are as described above for the "other resins" in the above aspect 2-1.

<Method for Producing Polyamide Composition>

There are no particular limitations on the method used for producing the polyamide composition of the aspect described above, provided the method includes mixing the aliphatic polyamide (5A) and each of the components (5B) to (5E), and if required, the components (5F) and (5G).

Examples of the method used for mixing the above components (5A) to (5E), and if required, the components (5F) and (5G) include methods (1) and (2) described below.

(1) A method in which the above components (5A) to (5E), and if required, the components (5F) and (5G), are mixed together using a Henschel mixer or the like, and then supplied to a melt kneader and subjected to kneading.

(2) A method in which a mixture containing the components (5A) to (5E), and if required, the component (5F), which has been prepared in advance by mixing the above components (5A) to (5E), and if required the component (5F), using a Henschel mixer or the like, is supplied to a melt kneader using a single-screw or twin-screw extruder, and following kneading, if required, the filler (5G) is blended with the kneaded mixture from a side feeder.

The method for supplying the components that constitute the polyamide composition to the melt kneader may be performed by supplying all of the constituent components to the same supply port in a single batch, or by supplying the respective constituent components from different supply ports.

The melt kneading temperature is preferably at least 1° C. higher, but not more than about 100° C. higher, than the melting point of the aliphatic polyamide (5A), and is more preferably at least 10° C. higher, but not more than about 50° C. higher, than the melting point of the aliphatic polyamide (5A).

The shear rate in the kneader is preferably at least about 100 sec$^{-1}$. Further, the average residence time during kneading is preferably at least 0.5 minutes but not more than about 5 minutes.

A conventional device may be used as the device used for performing the melt kneading, and examples of devices that can be used favorably include single-screw or twin-screw extruders, a Banbury mixer, and a melt kneader (such as a mixing roll).

The blend amount of each component used when producing the polyamide composition of the aspect described above is the same as the amount of that component in the polyamide composition described above.

<<Molded Article>>

A molded article according to an aspect 5-2 of the present invention is obtained by molding the polyamide composition of the aspect described above.

Furthermore, the molded article of the above aspect has high surface gloss. The surface gloss of the molded article of the above aspect is preferably at least 50, more preferably at least 55, and even more preferably 60 or higher. By ensuring that the surface gloss of the molded article is at least as high as the above lower limit, the obtained molded article can be used favorably for various components for vehicles, electrical and electronic components, industrial materials, engineering materials, everyday materials, and household items and the like.

There are no particular limitations on the method used for obtaining the molded article, and a conventional molding method may be used.

Examples of conventional molding methods include extrusion molding, injection molding, vacuum molding, blow molding, injection compression molding, decorative molding, different material molding, gas-assisted injection molding, foam injection molding, low-pressure molding, ultra-thin-wall injection molding (ultra-high-speed injection molding), and in-mold composite molding (such as insert molding and outsert molding).

(Applications)

The molded article of the above aspect contains the polyamide composition of the aspect described above, has excellent mechanical properties (and particularly tensile strength, flexural nodulus and Charpy impact) and surface appearance and the like, and can be used in a wide variety of applications.

Examples of applications in which the molded article of the above aspect can be used favorably include applications in the automotive field, the electrical and electronic field, the machinery and industry field, the office equipment field, and the aerospace field.

<<Aspects 6-1 and 6-2>>
<<Polyamide Composition>>

A polyamide composition according to an aspect 6-1 of the present invention contains a crystalline polyamide (6A), an amorphous semi-aromatic polyamide (6B), and carbon fiber (6C). Further, the amorphous semi-aromatic polyamide (6B) includes at least 75 mol % of isophthalic acid units among all of the dicarboxylic acid units that constitute the amorphous semi-aromatic polyamide (6B), and includes at least 50 mol % of a diamine unit having at least 4 but not more than 10 carbon atoms among all of the diamine units that constitute the amorphous semi-aromatic polyamide (6B).

In the present description, a "polyamide" means a polymer having an amide linkage (—NHCO—) within the main chain.

As a result of including the crystalline polyamide (6A), the amorphous semi-aromatic polyamide (6B) and the carbon fiber (6C) described above, the polyamide composition of the above aspect is able to form an excellent pellet shape and reduce cutting chip generation, while maintaining favorable water absorption rigidity and thermal rigidity. Further, by using the polyamide composition of the above aspect, a molded article having excellent surface appearance can be obtained.

Each of the components contained in the polyamide composition of the aspect described above is described below in further detail.

<Polyamides>

The polyamide composition of the aspect described above contains the crystalline polyamide (6A) and the amorphous semi-aromatic polyamide (6B) as polyamide components. Each of these polyamide components is described below in detail.

[Crystalline Polyamide (6A)]

Details relating to the crystalline polyamide (6A) are as described above for the "crystalline polyamide (4A)" in the above aspect 4-1.

[Amorphous Semi-Aromatic Polyamide (6B)]

The amorphous semi-aromatic polyamide (6B) contained in the polyamide composition of the aspect described above is a polyamide that contains diamine units and dicarboxylic acid units. The amorphous semi-aromatic polyamide (6B) is preferably a polyamide containing a dicarboxylic acid unit (6B-a) that includes at least 75 mol % of isophthalic acid units relative to all of the dicarboxylic acid units that constitute the amorphous semi-aromatic polyamide (6B), and a diamine unit (6B-b) that includes at least 50 mol % of a diamine unit having at least 4 but not more than 10 carbon atoms relative to all of the diamine units that constitute the amorphous semi-aromatic polyamide (6B).

Further, in this case, the total amount of isophthalic acid units and diamine units of at least 4 but not more than 10 carbon atoms within the amorphous semi-aromatic polyamide (6B), relative to the total of all the structural units in the amorphous semi-aromatic polyamide (6B), is preferably at least 80 mol % but not more than 100 mol %, more preferably at least 90 mol % but not more than 100 mol %, and is even more preferably 100 mol %.

In the present description, the proportion of a prescribed monomer unit constituting the amorphous semi-aromatic polyamide (6B) can be measured by nuclear magnetic resonance (NMR) spectroscopy or the like.

(Dicarboxylic Acid Unit (6B-a))

The dicarboxylic acid unit (6B-a) may include at least 75 mol % of isophthalic acid relative to the total number of moles of the dicarboxylic acid (6B-a), and preferably includes at least 80 mol % but not more than 100 mol %, more preferably includes at least 90 mol % but not more than 100 mol %, and even more preferably contains 100 mol % of isophthalic acid.

By ensuring that the proportion of isophthalic acid units in the dicarboxylic acid unit (6B-a) is at least as large as the above lower limit, a polyamide composition can be obtained that simultaneously satisfies various mechanical properties, and particularly the water absorption rigidity, thermal rigidity, fluidity, and surface appearance and the like.

The dicarboxylic acid unit (6B-a) may also include other aromatic dicarboxylic acid units besides the isophthalic acid units, aliphatic dicarboxylic acid units, and alicyclic dicarboxylic acid units.

(1) Aromatic Dicarboxylic Acid Units

Examples of aromatic dicarboxylic acids that form an aromatic dicarboxylic acid unit besides the isophthalic acid units include, but are not particularly limited to, dicarboxylic acids having an aromatic group such as a phenyl group or naphthyl group. The aromatic group of the aromatic dicarboxylic acid may be unsubstituted, or may have a substituent.

There are no particular limitations on this substituent, and examples include alkyl groups of at least one but not more than 4 carbon atoms, aryl groups of at least 6 but not more than 10 carbon atoms, arylalkyl groups of at least 7 but not more than 10 carbon atoms, halogen groups, silyl groups of at least one but not more than 6 carbon atoms, and sulfonic acid groups and salts thereof (such as sodium salts).

Examples of the alkyl groups of at least one but not more than 4 carbon atoms include, but are not limited to, a methyl group, ethyl group, n-propyl group, isopropyl group, n-butyl group, isobutyl group, and tert-butyl group.

Examples of the aryl groups of at least 6 but not more than 10 carbon atoms include, but are not limited to, a phenyl group, tolyl group, xylyl group and naphthyl group.

Examples of the arylalkyl groups of at least 7 but not more than 10 carbon atoms include, but are not limited to, a benzyl group and the like.

Examples of the halogen groups include, but are not limited to, a fluoro group, chloro group, bromo group and iodo group.

Examples of the silyl groups of at least one but not more than 6 carbon atoms include, but are not limited to, a trimethylsilyl group and a tert-butyldimethylsilyl group.

Among the various possibilities, the aromatic dicarboxylic acid that forms an aromatic dicarboxylic acid unit besides the isophthalic acid unit is preferably an aromatic dicarboxylic acid of at least 8 but not more than 20 carbon atoms that is either unsubstituted or substituted with a prescribed substituent.

Specific examples of the aromatic dicarboxylic acid of at least 8 but not more than 20 carbon atoms that is either unsubstituted or substituted with a prescribed substituent include, but are not limited to, terephthalic acid, naphthalenedicarboxylic acid, 2-chloroterephthalic acid, 2-methylterephthalic acid, 5-methylisophthalic acid and 5-sodium sulfoisophthalic acid.

For the aromatic dicarboxylic acid that constitutes the aromatic dicarboxylic acid unit, a single compound may be used alone, or a combination of two or more compounds may be used.

(2) Aliphatic Dicarboxylic Acid Units

Examples of aliphatic dicarboxylic acids that form an aliphatic dicarboxylic acid unit include linear or branched saturated aliphatic dicarboxylic acids of at least 3 but not more than 20 carbon atoms.

Examples of linear saturated aliphatic dicarboxylic acids of at least 3 but not more than 20 carbon atoms include, but are not limited to, malonic acid, succinic acid, glutaric acid, adipic acid, pimelic acid, suberic acid, azelaic acid, sebacic acid, dodecanedioic acid, tetradecanedioic acid, hexadecanedioic acid, octadecanedioic acid, eicosanedioic acid, and diglycolic acid.

Examples of branched saturated aliphatic dicarboxylic acids of at least 3 but not more than 20 carbon atoms include, but are not limited to, dimethylmalonic acid, 2,2-dimethylsuccinic acid, 2,3-dimethylglutaric acid, 2,2-diethylsuccinic acid, 2,3-diethylglutaric acid, 2,2-dimethylglutaric acid, 2-methyladipic acid, and trimethyladipic acid.

(3) Alicyclic Dicarboxylic Acid Units

Examples of alicyclic dicarboxylic acids that form an alicyclic dicarboxylic acid unit include, but are not limited to, alicyclic dicarboxylic acids having an alicyclic structure of at least 3 but not more than 10 carbon atoms. Among these, the alicyclic dicarboxylic acid is preferably an alicyclic dicarboxylic acid having an alicyclic structure of at least 5 but not more than 10 carbon atoms.

Examples of this type of alicyclic dicarboxylic acid include, but are not limited to, 1,4-cyclohexanedicarboxylic acid, 1,3-cyclohexanedicarboxylic acid and 1,3-cyclopentanedicarboxylic acid. Among these, the alicyclic dicarboxylic acid is preferably 1,4-cyclohexanedicarboxylic acid.

For the alicyclic dicarboxylic acid that constitutes an alicyclic dicarboxylic acid unit, a single compound may be used alone, or a combination of two or more compounds may be used.

The alicyclic group of the alicyclic dicarboxylic acid may be unsubstituted, or may have a substituent. Examples of the substituent include alkyl groups of at least one but not more than 4 carbon atoms. Examples of the alkyl groups of at least one but not more than 4 carbon atoms include the same groups as those listed above in the description of the "aromatic dicarboxylic acid units".

The dicarboxylic acid units besides the isophthalic acid units preferably include an aromatic dicarboxylic acid unit, and more preferably include an aromatic dicarboxylic acid of at least 6 carbon atoms.

By using this type of dicarboxylic acid, the mechanical properties of the polyamide composition, and in particular the water absorption rigidity, thermal rigidity, fluidity, and surface appearance and the like, tend to be more superior.

In the amorphous semi-aromatic polyamide (6B), the dicarboxylic acid that constitutes the dicarboxylic acid unit (6B-a) is not limited to the compounds described above as dicarboxylic acids, and may also be a compound equivalent to a dicarboxylic acid.

Here, a "compound equivalent to a dicarboxylic acid" refers to a compound that is capable of forming a dicarboxylic acid structure the same as the dicarboxylic acid structure derived from an aforementioned dicarboxylic acid. Examples of this type of compound include, but are not limited to, dicarboxylic acid anhydrides and dicarboxylic acid halides.

Further, the amorphous semi-aromatic polyamide (6B) may, if required, also contain a unit derived from a trivalent or higher polyvalent carboxylic acid.

Examples of the trivalent or higher polyvalent carboxylic acid include trimellitic acid, trimesic acid and pyromellitic acid. A single trivalent or higher polyvalent carboxylic acid may be used alone, or a combination of two or more compounds may be used.

(Diamine Unit (6B-b))

The diamine unit (6B-b) that constitutes the amorphous semi-aromatic polyamide (6B) preferably includes a diamine unit of at least 4 but not more than 10 carbon atoms, more preferably includes a linear saturated aliphatic diamine unit of at least 4 but not more than 10 carbon atoms, even more preferably includes a linear saturated aliphatic diamine unit of at least 6 but not more than 10 carbon atoms, and is particularly preferably hexamethylenediamine unit.

By using this type of diamine, a polyamide composition that exhibits more superior mechanical properties, and particularly superior water absorption rigidity, rigidity under use at high temperature (thermal rigidity), fluidity, and surface appearance and the like tends to be obtained.

Further, in this case, the amorphous semi-aromatic polyamide (6B) may include, as the diamine unit (6B-b), at least 50 mol % of a diamine unit of at least 4 but not more than 10 carbon atoms relative to the total number of moles of the diamine unit (6B-b).

Examples of diamines other than the diamine of at least 4 but not more than 10 carbon atoms that may constitute part of the amorphous semi-aromatic polyamide (6B) include, but are not limited to, aliphatic diamine units, alicyclic diamine units, and aromatic diamine units.

(1) Aliphatic Diamine Units

Examples of aliphatic diamines that form an aliphatic diamine unit include linear saturated aliphatic diamines of at least 4 but not more than 20 carbon atoms.

Examples of the linear saturated aliphatic diamines of at least 4 but not more than 20 carbon atoms include, but are not limited to, ethylenediamine, propylenediamine, tetramethylenediamine, pentamethylenediamine, hexamethylenediamine, heptamethylenediamine, octamethylenediamine, nonamethylenediamine, decamethylenediamine, undecamethylenediamine, dodecamethylenediamine and tridecamethylenediamine.

(2) Alicyclic Diamine Units

Examples of alicyclic diamines that form an alicyclic diamine unit include, but are not limited to, 1,4-cyclohexanediamine, 1,3-cyclohexanediamine and 1,3-cyclopentanediamine.

(3) Aromatic Diamine Units

Examples of aromatic diamines that form an aromatic diamine unit include any diamine having an aromatic group, and there are no particular limitations. Specific examples of the aromatic diamines include meta-xylylenediamine and the like.

For the diamines that form each of these diamine units, a single diamine may be used alone, or a combination of two or more diamines may be used.

The amorphous semi-aromatic polyamide (6B) contained in the polyamide composition of the aspect described above is preferably a polyamide 6I (polyhexamethylene isophthalamide), 9I or 10I, and is more preferably a polyamide 6I.

Furthermore, the amorphous semi-aromatic polyamide (6B) may, if required, also include a trivalent or higher polyvalent aliphatic amine. Examples of the trivalent or higher polyvalent aliphatic amine include bishexamethylenetriamine and the like. A single trivalent or higher polyvalent aliphatic amine may be used alone, or a combination of two or more such amines may be used.

The amount of the amorphous semi-aromatic polyamide (6B) in the polyamide composition of the aspect described above, relative to 100% by mass of all the resins contained in the polyamide composition, may be at least 5.0% by mass but not more than 45.0% by mass, and is preferably at least 10.0% by mass but not more than 42.5% by mass, more preferably at least 15.0% by mass but not more than 40.0% by mass, even more preferably at least 20.0% by mass but not more than 37.5% by mass, particularly preferably at least 22.5% by mass but not more than 35.0% by mass, and most preferably at least 22.5% by mass but not more than 30.0% by mass. By ensuring that the amount of the amorphous semi-aromatic polyamide (6B) satisfies the above range, a polyamide composition having superior mechanical properties, and particularly superior water absorption rigidity, thermal rigidity, fluidity, and surface appearance and the like can be obtained.

[End-Capping Agent]

The ends of the polyamides (the crystalline polyamide (6A) and the amorphous semi-aromatic polyamide (6B)) contained in the polyamide composition of the aspect described above may each be end-capped with a conventional end-capping agent.

The end-capping agent is as described above in the aspect 1-1.

[Method for Producing Polyamides]

Details relating to the method used for producing the polyamides are as described above in the aspect 1-1.

[Polymer Ends of Polyamides]

The polymer ends of the polyamides are as described above in the aspect 1-1.

[Properties of Crystalline Polyamide (6A)]

The molecular weight, the melting point Tm2, and the crystallization enthalpy ΔH for the crystalline polyamide (6A) can be measured using the methods disclosed in the examples described below.

Further, the tan δ peak temperature for the crystalline polyamide (6A) can be measured using the method described below.

(Weight Average Molecular Weight Mw(6A) of Crystalline Polyamide (6A))

The weight average molecular weight Mw(6A) can be used as an indicator of the molecular weight of the crystalline polyamide (6A). The weight average molecular weight Mw(6A) of the crystalline polyamide (6A) is preferably at least 10,000 but not more than 50,000, more preferably at least 15,000 but not more than 45,000, even more preferably at least 20,000 but not more than 40,000, and particularly preferably at least 25,000 but not more than 35,000.

By ensuring that the weight average molecular weight Mw(6A) satisfies the above range, a polyamide composition having more superior mechanical properties, and particularly superior water absorption rigidity, thermal rigidity, fluidity, and surface appearance and the like can be obtained.

As described in the examples below, the weight average molecular weight Mw(6A) can be measured using gel permeation chromatography (GPC).

(Molecular Weight Distribution Mw(6A)/Mn(6A) for Crystalline Polyamide (6A))

The molecular weight distribution of the crystalline polyamide (6A) is indicated by the value of weight average molecular weight Mw(6A)/number average molecular weight Mn(6A).

The value of Mw(6A)/Mn(6A) for the crystalline polyamide (6A) may be at least 1.0, and is preferably at least 1.8 but not more than 2.2, and more preferably at least 1.9 but not more than 2.1.

By ensuring that Mw(6A)/Mn(6A) satisfies this range, a polyamide composition having more superior fluidity and surface appearance and the like can be obtained.

Examples of the method used for controlling the value of Mw/Mn for the crystalline polyamide (6A) so as to satisfy the above range include a method in which a conventional polycondensation catalyst such as phosphoric acid or sodium hypophosphite is added as an additive during hot melt polymerization of the polyamide, and a method in which the polymerization conditions such as the heating conditions and reduced pressure conditions are controlled.

The value of Mw(6A)/Mn(6A) for the crystalline polyamide (6A) can be calculated as described in the examples below, using the values for the weight average molecular weight Mw(6A) and the number average molecular weight Mn(6A) obtained using GPC.

(Melting Point Tm2 of Crystalline Polyamide (6A))

The lower limit for the melting point Tm2 of the crystalline polyamide (6A) is preferably 220° C., more preferably 230° C., and even more preferably 240° C.

On the other hand, the upper limit for the melting point Tm2 of the crystalline polyamide (6A) is preferably 300° C., more preferably 290° C., even more preferably 280° C., and particularly preferably 270° C.

In other words, the melting point Tm2 of the crystalline polyamide (6A) is preferably at least 220° C. but not more than 300° C., more preferably at least 230° C. but not more than 290° C., even more preferably at least 240° C. but not more than 280° C., and particularly preferably at least 240° C. but not more than 270° C.

By ensuring that the melting point Tm2 of the crystalline polyamide (6A) is at least as high as the above lower limit, the thermal rigidity and the like of a molded article obtained from the polyamide composition tends to be more superior.

Further, by ensuring that the melting point Tm2 of the crystalline polyamide (6A) is not higher than the above upper limit, thermal decomposition and the like of the polyamide composition during melt processing such as extrusion and molding tends to be able to be better suppressed.

(Crystallization Enthalpy $\Delta H$ for Crystalline Polyamide (6A))

From the viewpoint of the mechanical properties, and particularly the water absorption rigidity and thermal rigidity, the lower limit for the crystallization enthalpy $\Delta H$ of the crystalline polyamide (6A) may be 4 J/g, 20 J/g, 30 J/g, 40 J/g, 50 J/g, or 60 J/g. On the other hand, there are no particular limitations on the upper limit for the crystallization enthalpy $\Delta H$ of the crystalline polyamide (6A), which is preferably as high as possible.

An example of a device for measuring the melting point Tm2 and the crystallization enthalpy $\Delta H$ of the crystalline polyamide (6A) is a Diamond-DSC device manufactured by PerkinElmer, Inc.

(Tan $\delta$ Peak Temperature of Crystalline Polyamide (6A))

The tan $\delta$ peak temperature of the crystalline polyamide (6A) may be at least 40° C., or at least 50° C. but not more than 110° C., at least 60° C. but not more than 100° C., at least 70° C. but not more than 95° C., or at least 80° C. but not more than 90° C.

By ensuring that the tan $\delta$ peak temperature of the crystalline polyamide (6A) is at least as high as the above lower limit, a polyamide composition having more superior water absorption rigidity and thermal rigidity and the like tends to be obtainable.

The tan $\delta$ peak temperature of the crystalline polyamide (6A) can be measured, for example, using a viscoelasticity measuring and analysis device (DVE-V4, manufactured by Rheology Co., Ltd.).

[Properties of Amorphous Semi-Aromatic Polyamide (6B)]

The molecular weight of the amorphous semi-aromatic polyamide (6B) can be measured using the method described in the examples below.

Further, the melting point Tm2, the crystallization enthalpy $\Delta H$, the tan $\delta$ peak temperature, the amount of amino ends, and the amount of carboxyl ends for the amorphous semi-aromatic polyamide (6B) can be measured using the methods described below.

(Weight Average Molecular Weight Mw(6B) of Amorphous Semi-Aromatic Polyamide (6B))

The weight average molecular weight (Mw(6B)) of the amorphous semi-aromatic polyamide (6B) can be used as an indicator of the molecular weight of the amorphous semi-aromatic polyamide (6B).

The weight average molecular weight (Mw(6B)) of the amorphous semi-aromatic polyamide (6B) is preferably at least 10,000 but not more than 25,000, more preferably at least 13,000 but not more than 24,000, even more preferably at least 15,000 but not more than 23,000, particularly preferably at least 18,000 but not more than 22,000, and most preferably at least 19,000 but not more than 21,000.

By ensuring that the weight average molecular weight (Mw(6B)) of the amorphous semi-aromatic polyamide (6B) satisfies the above range, a polyamide composition having more superior mechanical properties, and particularly superior water absorption rigidity, thermal rigidity, fluidity, and surface appearance and the like can be obtained. As described in the examples below, the weight average molecular weight (Mw(6B)) of the amorphous semi-aromatic polyamide (6B) can be measured using GPC.

(Molecular Weight Distribution Mw(6B)/Mn(6B) for Amorphous Semi-Aromatic Polyamide (6B))

The molecular weight distribution of the amorphous semi-aromatic polyamide (6B) is indicated by the value of the weight average molecular weight (Mw(6B)) of the amorphous semi-aromatic polyamide (6B)/the number average molecular weight (Mn(6B)) of the amorphous semi-aromatic polyamide (6B).

Mw(6B)/Mn(6B) may be not more than 2.4, and is preferably at least 1.0 but not more than 2.4, more preferably at least 1.7 but not more than 2.4, even more preferably at least 1.8 but not more than 2.3, particularly preferably at least 1.9 but not more than 2.2, and most preferably at least 1.9 but not more than 2.1.

By ensuring that Mw(6B)/Mn(6B) satisfies the above range, a polyamide composition having more superior fluidity and surface appearance and the like can be obtained.

Examples of methods for controlling the value of Mw(6B)/Mn(6B) so as to satisfy the above range include the following methods 1) and 2).

1) A method in which a conventional polycondensation catalyst such as phosphoric acid or sodium hypophosphite is added as an additive during hot melt polymerization of the polyamide.

2) A method in which in addition to the method 1) above, the polymerization conditions such as the heating conditions and reduced pressure conditions are controlled to enable the polycondensation reaction to be completed at the lowest possible temperature and in the shortest possible time.

In particular, because the amorphous semi-aromatic polyamide (6B) does not have a melting point, the reaction temperature may be reduced to achieve a value for Mw(6B)/Mn(6B) that satisfies the above range.

Further, if an aromatic compound unit is incorporated within the molecular structure of the polyamide, then the value of the molecular weight distribution (Mw/Mn) tends to increase as the molecular weight increases. By ensuring that the molecular weight distribution (Mw(6B)/Mn(6B)) of the amorphous semi-aromatic polyamide (6B) satisfies the above range, the proportion of polyamide molecules having three-dimensional molecular structures can be reduced, the increase in three-dimensional molecular structures that occurs upon high-temperature processing can be appropriately prevented, and the fluidity can be favorably maintained. As a result, the surface appearance of a molded article obtained from the polyamide composition can be improved.

The value of Mw(6B)/Mn(6B) can be calculated as described in the examples below, using the values for Mw(6B) and Mn(6B) obtained using GPC.

(Crystallization Enthalpy ΔH for Amorphous Semi-Aromatic Polyamide (6B))

From the viewpoint of the mechanical properties, and particularly the water absorption rigidity and thermal rigidity, the crystallization enthalpy ΔH of the amorphous semi-aromatic polyamide (6B) may be not more than 15 J/g, not more than 10 J/g, not more than 5 J/g, or may be 0 J/g.

An example of a method for controlling the crystallization enthalpy ΔH for the amorphous semi-aromatic polyamide (6B) so as to obtain a value that satisfies the above range is a method in which the ratio of aromatic monomers relative to the dicarboxylic acid units is increased. From this viewpoint, the amorphous semi-aromatic polyamide (6B) preferably contains, as the dicarboxylic acid unit (6B-a), at least 75 mol %, and more preferably 100 mol %, of isophthalic acid among all of the dicarboxylic acid units that constitute the amorphous semi-aromatic polyamide (6B).

An example of a device for measuring the crystallization enthalpy ΔH of the amorphous semi-aromatic polyamide (6B) is a Diamond-DSC device manufactured by PerkinElmer, Inc.

(Tan δ Peak Temperature of Amorphous Semi-Aromatic Polyamide (6B))

The tan δ peak temperature of the amorphous semi-aromatic polyamide (6B) may be at least 90° C., or at least 100° C. but not more than 160° C., at least 110° C. but not more than 150° C., at least 120° C. but not more than 145° C., or at least 130° C. but not more than 140° C.

An example of a method for controlling the tan δ peak temperature of the amorphous semi-aromatic polyamide (6B) so as to obtain a temperature that satisfies the above range is a method in which the ratio of aromatic monomers relative to the dicarboxylic acid units is increased. From this viewpoint, the amorphous semi-aromatic polyamide (6B) preferably contains, as the dicarboxylic acid unit (6B-a), at least 75 mol %, and more preferably 100 mol %, of isophthalic acid among all of the dicarboxylic acid units that constitute the amorphous semi-aromatic polyamide (6B).

By ensuring that the tan δ peak temperature of the amorphous semi-aromatic polyamide (6B) is at least as high as the above lower limit, a polyamide composition having superior water absorption rigidity and thermal rigidity tends to be obtainable. Further, by ensuring that the tan δ peak temperature of the amorphous semi-aromatic polyamide (6B) is not higher than the above upper limit, a polyamide composition having superior surface appearance tends to be obtainable.

The tan δ peak temperature of the amorphous semi-aromatic polyamide (6B) can be measured, for example, using a viscoelasticity measuring and analysis device (DVE-V4, manufactured by Rheology Co., Ltd.).

(Amount of Amino Ends in Amorphous Semi-Aromatic Polyamide (6B))

The amount of amino ends in the amorphous semi-aromatic polyamide (6B), per 1 g of the amorphous semi-aromatic polyamide (6B), may be at least 5 μg but not more than 100 μg, at least 10 μg but not more than 90 μg, at least 20 μg but not more than 80 μg, at least 30 μg but not more than 70 μg, or at least 40 μg but not more than 60 μg.

By ensuring that the amount of amino ends in the amorphous semi-aromatic polyamide (6B) satisfies the above range, a polyamide composition that exhibits more superior resistance to discoloration upon exposure to heat and light can be obtained.

The amount of amino ends can be measured by a neutralization titration.

(Amount of Carboxyl Ends in Amorphous Semi-Aromatic Polyamide (6B))

The amount of carboxyl ends in the amorphous semi-aromatic polyamide (6B), per 1 g of the amorphous semi-aromatic polyamide (6B), may be at least 50 μg but not more than 300 μg, at least 100 μg but not more than 280 μg, at least 150 μg but not more than 260 μg, at least 180 μg but not more than 250 μg, or at least 200 μg but not more than 240 μg.

By ensuring that the amount of carboxyl ends in the amorphous semi-aromatic polyamide (6B) satisfies the above range, a polyamide composition having more superior fluidity and the like can be obtained. Further, the surface appearance of a molded article obtained from the polyamide composition is more superior.

The amount of carboxyl ends can be measured by a neutralization titration.

(Total of Amount of Amino Ends and Amount of Carboxyl Ends in Polyamides)

The total of the amount of amino ends and the amount of carboxyl ends in the polyamides (the crystalline polyamide (6A) and the amorphous semi-aromatic polyamide (6B)), per 1 g of the polyamides, may be at least 150 μg but not more than 350 μg, at least 160 μg but not more than 300 μg, at least 170 μg but not more than 280 μg, at least 180 μg but not more than 270 μg, or at least 190 μg but not more than 260 μg.

By ensuring that the total of the amount of amino ends and the amount of carboxyl ends in the polyamides (the crystalline polyamide (6A) and the amorphous semi-aromatic polyamide (6B)) satisfies the above range, a polyamide composition having more superior fluidity and the like can be obtained. Further, the surface appearance of a molded article obtained from the polyamide composition is more superior.

[Mass Ratio of Amorphous Semi-Aromatic Polyamide (6B) Relative to Total Mass of Crystalline Polyamide (6A) and Amorphous Semi-Aromatic Polyamide (6B)]

The amount of the amorphous semi-aromatic polyamide (6B) per 100 parts by mass of the total of the crystalline polyamide (6A) and the amorphous semi-aromatic polyamide (6B) is preferably at least 1.0 parts by mass but not more than 50.0 parts by mass, more preferably at least 5.0 parts by mass but not more than 47.5 parts by mass, even more preferably at least 10.0 parts by mass but not more than 46.0 parts by mass, still more preferably at least 15.0 parts by mass but not more than 45.0 parts by mass, still more preferably at least 20.0 parts by mass but not more than 44.0 parts by mass, particularly preferably at least 22.5 parts by mass but not more than 43.0 parts by mass, and most preferably at least 24.5 parts by mass but not more than 42.5 parts by mass. By ensuring that the mass ratio of the amorphous semi-aromatic polyamide (6B) relative to the total mass of the crystalline polyamide (6A) and the amorphous semi-aromatic polyamide (6B) satisfies the above range, a polyamide composition having more superior balance between the strength at 23° C. and the strength upon water absorption at high temperature can be obtained. Further, a polyamide composition having superior mechanical properties, and particularly superior water absorption rigidity, thermal rigidity, and fluidity and the like can be obtained.

<Carbon Fiber (6C)>

The carbon fiber (6C) contained in the polyamide composition of the aspect described above may have a cross-section that is either circular or a flattened shape. Examples of this flattened cross-sectional shape include, but are not limited to, a rectangle, an ellipse of a shape close to a rectangle, an oval, and a cocoon shape in which the central portion in the lengthwise direction has an hourglass-like shape. In this description, an "aspect ratio" refers to a value represented by d2/d1, wherein d2 is the major axis of the fiber cross-section and d1 is the minor axis of the fiber cross-section. For example, a circular shape has an aspect ratio of approximately 1.

Among the various possibilities, from the viewpoint of enabling excellent mechanical strength to be imparted to the polyamide composition, carbon fiber having a number-average fiber diameter of at least 3 μm but not more than 30 μm, a weight-average fiber length of at least 100 μm but not more than 750 μm, and an aspect ratio (l/d) between the weight-average fiber length (l) and the number-average fiber diameter (d) of at least 10 but not more than 100 can be used particularly favorably.

The number-average fiber diameter (d) and the weight-average fiber length (l) used in the present description can be determined using the methods described below. First, the polyamide composition is placed in an electric furnace, and the contained organic matter is incinerated. From the residue obtained following this incineration treatment, at least 100 carbon fibers are selected randomly and observed using a scanning electron microscope (SEM), and the fiber diameter of each of these carbon fibers is measured to determine the number-average fiber diameter. In addition, using an SEM photograph of the above 100 or more carbon fibers captured at a magnification of 1,000×, the fiber length of each fiber is measured to determine the weight-average fiber length.

Furthermore, the carbon fiber may also include a sizing agent.

Examples of the sizing agent include copolymers containing a carboxylic anhydride-containing unsaturated vinyl monomer and an unsaturated vinyl monomer other than a carboxylic anhydride-containing unsaturated vinyl monomer as structural units, epoxy compounds, polyurethane resins, acrylic acid homopolymers, copolymers of acrylic acid and another copolymerizable monomer, salts of one of the above compounds with a primary, secondary or tertiary amine. One of these sizing agents may be used alone, or a combination of two or more sizing agents may be used.

Among these, from the viewpoint of the mechanical strength of the obtained polyamide composition, one or more sizing agents selected from the group consisting of copolymers containing a carboxylic anhydride-containing unsaturated vinyl monomer and an unsaturated vinyl monomer other than a carboxylic anhydride-containing unsaturated vinyl monomer as structural units, epoxy compounds and polyurethane resins is preferred. Moreover, one or more sizing agents selected from the group consisting of copolymers containing a carboxylic anhydride-containing unsaturated vinyl monomer and an unsaturated vinyl monomer other than a carboxylic anhydride-containing unsaturated vinyl monomer as structural units and polyurethane resins is more preferred.

The carbon fiber is obtained by continuous reaction by applying the sizing agent described above to the fiber using a known method such as a roller-type applicator during a conventional fiber production process, and then drying the produced fiber strands to which the sizing agent has been applied.

The fiber strand may be used directly in the form of a roving, or the fiber may be subjected to an additional cutting step and used in the form of chopped glass strands.

The sizing agent is preferably applied (added) in a solid fraction amount equivalent to at least 0.2% by mass but not more than 3% by mass relative to the total mass of the carbon fiber, and is more preferably applied (added) in an amount equivalent to at least 0.3% by mass but not more than 2% by mass. By ensuring that the amount added of the sizing agent relative to the total mass of the carbon fiber is equivalent to a solid fraction that is at least as large as the above lower limit, bundling of the fiber can be more effectively maintained. On the other hand, by ensuring that the amount added of the sizing agent relative to the total mass of the carbon fiber is equivalent to a solid fraction that is not larger than the above upper limit, the thermal stability of the obtained polyamide resin composition can be further improved.

The drying of the strand may be performed after the cutting step, or the strand may be cut after drying.

From the viewpoints of improving the toughness and the surface appearance of molded articles, the number average fiber diameter of the carbon fiber is preferably at least 3 μm but not more than 30 μm, more preferably at least 3 μm but not more than 20 μm, even more preferably at least 3 μm but not more than 12 μm, particularly preferably at least 3 μm but not more than 9 μm, and most preferably at least 4 μm but not more than 6 μm.

By ensuring that the number-average fiber diameter of the carbon fiber is not larger than the above upper limit, a polyamide composition having superior toughness and more superior surface appearance for molded articles can be obtained. On the other hand, by ensuring that the number-average fiber diameter of the carbon fiber is at least as large as the above lower limit, a polyamide composition can be obtained that exhibits excellent balance between the cost and powder handling properties, and the physical properties (such as the fluidity). Moreover, by ensuring that the number-average fiber diameter of the carbon fiber is at least 3 μm but not more than 9 μm, a polyamide composition having more superior vibration fatigue properties and slidability can be obtained.

[Inorganic Filler Other than Carbon Fiber]

In addition to the carbon fiber (6C), the polyamide composition of the aspect described above may also contain an inorganic filler other than carbon fiber.

From the viewpoint of improving the strength, rigidity and surface appearance of molded articles, examples of preferred inorganic fillers other than the carbon fiber include wollastonite, kaolin, mica, talc, calcium carbonate, magnesium carbonate, potassium titanate fiber, aluminum borate fiber and clay. Wollastonite, kaolin, mica, talc, calcium carbonate and clay are more preferred. Wollastonite, kaolin, mica and talc are even more preferred, and wollastonite, mica and talc are particularly preferred. One of these inorganic fillers may be used alone, or a combination of two or more inorganic fillers may be used.

From the viewpoints of improving the toughness and the surface appearance of molded articles, the average particle size of the inorganic filler other than the carbon fiber is preferably at least 0.01 μm but not more than 38 μm, more preferably at least 0.03 μm but not more than 30 μm, even more preferably at least 0.05 μm but not more than 25 μm, still more preferably at least 0.10 µm but not more than 20 µm, and particularly preferably at least 0.15 µm but not more than 15 µm.

By ensuring that the average particle size of the inorganic filler other than the carbon fiber is not more than the above upper limit, a polyamide composition having more superior toughness and excellent surface appearance for molded articles can be obtained. On the other hand, by ensuring that the average particle size is at least as large as the above lower limit, a polyamide composition can be obtained that exhibits excellent balance between the cost and powder handling properties, and the physical properties (such as the fluidity).

Among the above inorganic fillers, for fillers having a needle-like shape such as wollastonite, the number-average particle diameter (hereafter also referred to as simply "the average particle diameter") is used as the average particle size. Further, in the case of inorganic fillers for which the cross-section is not circular, the maximum value for length across the cross-section is used as the (number-average) fiber diameter.

In terms of the number-average particle length (hereafter also referred to as simply "the average particle length") of an aforementioned inorganic filler having a needle-like shape, a numerical value range calculated from the preferred range for the number-average particle diameter described above, and the preferred range for the aspect ratio (1/d) between the number-average particle length (1) and the number-average particle diameter (d) described below is preferred.

In terms of the aspect ratio (1/d) of the number-average particle length (1) relative to the number-average particle diameter (s) of an inorganic filler having a needle-like shape, from the viewpoints of improving the surface appearance of the molded articles, and preventing wear of metal parts of the injection molding machine and the like, the aspect ratio is preferably at least 1.5 but not more than 10, more preferably at least 2.0 but not more than 5, and even more preferably from at least 2.5 but not more than 4.

Furthermore, the inorganic filler other than the carbon fiber may be surface-treated using a silane coupling agent or a titanate-based coupling agent or the like.

Examples of the silane coupling agent include, but are not limited to, aminosilanes, mercaptosilanes, epoxysilanes and vinylsilanes.

Examples of the aminosilanes include γ-aminopropyltriethoxysilane, γ-aminopropyltrimethoxysilane, and N-β-(aminoethyl)-γ-aminopropylmethyldimethoxysilane.

Examples of the mercaptosilanes include γ-mercaptopropyltrimethoxysilane and γ-mercaptopropyltriethoxysilane.

One of these silane coupling agents may be used alone, or a combination of two or more silane coupling agents may be used.

Among these, aminosilanes are preferred as the silane coupling agent.

These types of surface treatment agents may be used to treat the surface of the inorganic filler in advance, or may be added when mixing the polyamides and the inorganic filler. Further, the amount added of the surface treatment agent is preferably from at least 0.05% by mass but not more than 1.5% by mass relative to the total mass of the inorganic filler.

The total amount of the inorganic filler, per 100 parts by mass of the total mass of polyamides (the crystalline polyamide (6A) and the amorphous semi-aromatic polyamide (6B)) in the polyamide composition, is preferably at least 5 parts by mass but not more than 250 parts by mass, more preferably at least 30 parts by mass but not more than 250 parts by mass, even more preferably at least 50 parts by mass but not more than 240 parts by mass, particularly preferably at least 50 parts by mass but not more than 200 parts by mass, and most preferably at least 50 parts by mass but not more than 150 parts by mass.

By ensuring that the total amount of the inorganic filler per 100 parts by mass of the total mass of polyamides in the polyamide composition is at least as large as the above lower limit, the strength and rigidity of the obtained polyamide composition can be further improved. On the other hand, by ensuring that the total amount of the inorganic filler per 100 parts by mass of the total mass of polyamides in the polyamide composition is not more than the above upper limit, a polyamide composition having more superior extrudability and moldability can be obtained.

Further, the amount of the carbon fiber (6C), relative to the total mass of the polyamide composition, is preferably at least 30% by mass but not more than 65% by mass, more preferably at least 30% by mass but not more than 60% by mass, and even more preferably at least 35% by mass but not more than 60% by mass.

By ensuring that the amount of the carbon fiber (6C) relative to the total mass of the polyamide composition is at least as large as the above lower limit, the strength and rigidity of the obtained polyamide composition can be further improved. On the other hand, by ensuring that the amount of the carbon fiber (6C) relative to the total mass of the polyamide composition is not more than the above upper limit, a polyamide composition having more superior extrudability and moldability can be obtained.

Furthermore, the amounts of the amorphous semi-aromatic polyamide (6B) and the carbon fiber (6C) in the polyamide composition of the aspect described above preferably satisfy the relationship shown in the following formula (1).

[Numerical formula 2]

$$(C)/4 < (B) < (C) \qquad (1)$$

By ensuring that the amounts of the amorphous semi-aromatic polyamide (6B) and the carbon fiber (6C) in the polyamide composition of the aspect described above satisfy the relationship shown in the above formula (1), a polyamide composition can be obtained which exhibits excellent surface appearance and pellet shape and yields reduced cutting chip generation, while maintaining favorable water absorption rigidity and thermal rigidity.

<Nucleating Agent (6D)>

In addition to the components (6A) to (6C) described above, the polyamide composition of the above aspect may also contain a nucleating agent (6D).

Details relating to the nucleating agent are as described above in the aspect 1-1.

<Lubricant (6E)>

In addition to the components (6A) to (6C) described above, the polyamide composition of the above aspect may also contain a lubricant (6E).

Details relating to the lubricant (6E) are as described above for the "lubricants" in the above aspect 1-1.

<Thermal Stabilizer (6F)>

In addition to the components (6A) to (6C) described above, the polyamide composition of the above aspect may also contain a thermal stabilizer (6F).

Details relating to the thermal stabilizer (6F) are as described above for the "stabilizers" in the above aspect 1-1.

<Other Resins (6G)>

In addition to the components (6A) to (6C) described above, the polyamide composition of the above aspect may also contain another resin (6G).

Examples of other resins that may be included in the polyamide composition of the aspect described above include, but are not limited to, polyesters, liquid crystal polyesters, polyphenylene sulfides, polycarbonates, polyarylates, phenol resins and epoxy resins.

[Polyesters]

Examples of the polyesters include, but are not limited to, polybutylene terephthalate, polytrimethylene terephthalate, polyethylene terephthalate and polyethylene naphthalate.

The amount of other resins in the polyamide composition of the aspect described above, per 100 parts by mass of the total mass of all resin components in the polyamide composition, is preferably at least 0 parts by mass but not more than 200 parts by mass, more preferably at least 1 part by mass but not more than 200 parts by mass, even more preferably at least 5 parts by mass but not more than 100 parts by mass, and still more preferably at least 5 parts by mass but not more than 50 parts by mass.

By ensuring that the amount of other resins in the polyamide composition of the aspect described above satisfies the above range, a polyamide composition having more superior heat resistance and mold releasability can be obtained.

<(6H) at Least One Salt Selected from the Group Consisting of Metal Phosphite Salts and Metal Hypophosphite Salts>

In addition to the components (6A) to (6C) described above, the polyamide composition of the aspect described above may also contain: (6H) at least one salt selected from the group consisting of metal phosphite salts and metal hypophosphite salts.

Details relating to the at least one salt (6H) selected from the group consisting of metal phosphite salts and metal hypophosphite salts are as described above for the "metal phosphite salts and/or metal hypophosphite salts" in the above aspect 1-1.

<Phosphite Ester Compound (6I)>

In addition to the components (6A) to (6C) described above, the polyamide composition of the aspect described above may also contain a phosphite ester compound (6I).

Details relating to the phosphite ester compound (6I) are as described above for the "phosphite ester compounds" in the above aspect 1-1.

<Other Additives (6J)>

In addition to the components (6A) to (6C) described above, the polyamide composition of the aspect described above may also contain other additives (6J) that are typically used in polyamides, provided the effects of the polyamide composition of the above aspect are not impaired. Examples of these other additives (6J) include colorants such as pigments and dyes (including colored masterbatches), flame retardants, fibrillating agents, fluorescent bleaching agents, plasticizers, antioxidants, ultraviolet absorbers, antistatic agents, fluidity improvers, spreading agents and elastomers.

The amount of these other additives (6J) in the polyamide composition of the above aspect will vary depending on the type of material and the potential application of the polyamide composition, and therefore there are no particular limitations on those amounts provided the effects of the polyamide composition of the above aspect are not impaired, but for example, the total amount of other additives (6J) in the polyamide composition may be not more than 50% by mass, not more than 10% by mass, not more than 5% by mass, or 1% by mass or less.

<Method for Producing Polyamide Composition>

There are no particular limitations on the method for producing the polyamide composition of the aspect described above, provided the method includes a step of melt kneading raw material components that include the crystalline polyamide (6A) described above, the amorphous semi-aromatic polyamide (6B) described above, and the carbon fiber (6C) described above.

For example, a method including a step of melt kneading raw material components containing the crystalline polyamide (6A), the amorphous semi-aromatic polyamide (6B) and the carbon fiber (6C) using an extruder, wherein the temperature setting of the extruder is set to a value not higher than the melting peak temperature Tm2 of the polyamide composition described below +30° C., is preferred.

Examples of the method for performing the melt kneading of the raw material components containing the polyamides include methods (1) and (2) described below.

(1) A method in which the polyamides and the other raw materials are mixed using a tumbler or a Henschel mixer or the like, and the resulting mixture is supplied to and kneaded in a melt kneader.

(2) A method in which the polyamides are converted to a melted state using a single-screw or twin-screw extruder, and the other raw materials are then blended with the polyamide melt from a side feeder.

The method for supplying the components that constitute the polyamide composition to the melt kneader may be performed by supplying all of the constituent components to the same supply port in a single batch, or by supplying the respective constituent components from different supply ports.

The melt kneading temperature, expressed as the resin temperature, is preferably at least 250° C. but not more than about 350° C.

The melt kneading time is preferably at least 0.25 minutes but not longer than about 5 minutes.

There are no particular limitations on the device used for performing the melt kneading, and conventional devices such as single-screw or twin-screw extruders, a Banbury mixer or a melt kneader (such as a mixing roll) may be used.

The blend amount of each component used when producing the polyamide composition of the aspect described above is the same as the amount of that component in the polyamide composition described above.

<Physical Properties of Polyamide Composition>

The tan δ peak temperature of the polyamide composition of the aspect described above can be measured using the specific method disclosed in the examples described below.

Further, the molecular weight, melting point Tm2, crystallization enthalpy ΔH, crystallization peak temperature Tc, the value of amount of amino ends/(amount of amino ends+amount of carboxyl ends), and the surface gloss of an obtained molded article can be measured using the methods described below.

[Weight Average Molecular Weight (Mw) of Polyamide Composition]

The weight average molecular weight (Mw) can be used as an indicator of the molecular weight of the polyamide composition.

The weight average molecular weight (Mw) of the polyamide composition is preferably at least 15,000 but not more than 35,000, more preferably at least 17,000 but not more than 35,000, even more preferably at least 20,000 but not more than 35,000, particularly preferably at least 22,000 but not more than 34,000, and most preferably at least 24,000 but not more than 33,000.

By ensuring that the weight average molecular weight (Mw) of the polyamide composition satisfies the above range, a polyamide composition having more superior mechanical properties, and particularly superior water absorption rigidity, thermal rigidity, and fluidity and the like can be obtained. Further, a molded article obtained from the polyamide composition has more superior surface appearance.

Examples of the method used for controlling the Mw value for the polyamide composition so as to satisfy the above range include methods that use polyamides for which the weight average molecular weight values of the crystalline polyamide (6A) and the amorphous semi-aromatic polyamide (6B) satisfy the ranges described above.

The Mw value for the polyamide composition can be measured using GPC.

[Total Amount of Polyamides Having Number Average Molecular Weight Mn of at Least 500 but not More than 2,000 Among all Polyamides in Polyamide Composition]

Among all of the polyamides in the polyamide composition, the total amount of polyamides having a number average molecular weight Mn of at least 500 but not more than 2,000, relative to the total mass of polyamides within the polyamide composition, may be at least 0.5% by mass but less than 2.5% by mass, at least 0.8% by mass but less than 2.5% by mass, at least 1.0% by mass but less than 2.5% by mass, at least 1.2% by mass but less than 2.5% by mass, or at least 1.4% by mass but less than 2.5% by mass.

By ensuring that the total amount of polyamides having a number average molecular weight Mn of at least 500 but not more than 2,000 among all of the polyamides within the polyamide composition is at least as large as the above lower limit, the fluidity is particularly superior, and a molded article obtained from the polyamide composition exhibits more superior surface appearance. Further, by ensuring that the total amount is less than the above upper limit, gas generation during molding can be more effectively suppressed.

An example of a method for controlling the total amount of polyamides having a number average molecular weight Mn of at least 500 but not more than 2,000 among all of the polyamides within the polyamide composition so as to satisfy the above range is a method in which the molecular weight of the amorphous semi-aromatic polyamide (6B) is adjusted. In this case, the weight average molecular weight (Mw(6B)) of the amorphous semi-aromatic polyamide (6B) is preferably at least 10,000 but not more than 25,000.

The total amount of polyamides having a number average molecular weight Mn of at least 500 but not more than 2,000 among all of the polyamides within the polyamide composition can be determined from an elution curve obtained using GPC.

Furthermore, during the GPC measurement, in those cases where the polyamide composition containing the crystalline polyamide (6A) and the amorphous semi-aromatic polyamide (6B) also contains other components that are soluble in the solvent used to dissolve the polyamides, those other components are first eluted and removed using a solvent in which the polyamides are insoluble but the other components are soluble, and the GPC measurement is then performed. Further, in the case of the inorganic fillers such as the carbon fiber (6C) that are insoluble in the solvent used to dissolve the polyamides, the polyamide composition is dissolved in the solvent capable of dissolving the polyamides, and a filtration is then performed to remove the insoluble material before the GPC measurement is performed.

[Difference {Mw(6A)−Mw(6B)} Between Weight Average Molecular Weight Mw(6A) of Crystalline Polyamide (6A) and Weight Average Molecular Weight Mw(6B) of Amorphous Semi-Aromatic Polyamide (6B)]

The difference {Mw(6A)−Mw(6B)} between the weight average molecular weight Mw(6A) of the crystalline polyamide (6A) and the weight average molecular weight Mw(6B) of the amorphous semi-aromatic polyamide (6B) may be at least 2,000, at least 5,000, at least 8,000, at least 10,000, or 12,000 or greater. By ensuring that {Mw(6A)−Mw(6B)} is at least as large as the above lower limit, the amorphous semi-aromatic polyamide (6B) forms micro-size domains, enabling the formation of a polyamide composition having more superior water absorption rigidity and thermal rigidity.

[Molecular Weight Distribution of Polyamide Composition]

The molecular weight distribution of the polyamide composition of the aspect described above is indicated by the value of weight average molecular weight (Mw)/number average molecular weight (Mn).

The lower limit for weight average molecular weight (Mw)/number average molecular weight (Mn) for the polyamide composition of the above aspect may be 1.0, or may be 1.7, may be 1.8, or may be 1.9.

On the other hand, the upper limit for Mw/Mn for the polyamide composition of the above aspect may be 2.4, or may be 2.3 or 2.2.

In other words, Mw/Mn for the polyamide composition of the above aspect may be 2.4 or less, and may be at least 1.0 but not more than 2.4, at least 1.7 but not more than 2.3, at least 1.8 but not more than 2.3, or at least 1.9 but not more than 2.1.

By ensuring that Mw/Mn satisfies the above range, a polyamide composition having more superior fluidity and the like tends to be obtainable. Further, a molded article obtained from the polyamide composition tends to exhibit more superior surface appearance.

An example of a method for controlling the value of Mw/Mn for the polyamide composition so as to satisfy the above range is a method in which the value of Mw(6B)/Mn(6B) for the amorphous semi-aromatic polyamide (6B) is adjusted so as to satisfy the range described above.

When the molecular structure of the polyamide composition contains aromatic compound units, the value for the molecular weight distribution (Mw/Mn) tends to increase as the molecular weight increases. By ensuring that the molecular weight distribution satisfies the above range, the proportion of polyamide molecules having three-dimensional molecular structures can be reduced, progression of the conversion of the molecules to three-dimensional structures during high-temperature processing can be more effectively prevented, fluidity can be more favorably maintained. As a result, a molded article obtained from the polyamide composition tends to exhibit more favorable surface appearance.

The value of Mw/Mn for the polyamide composition can be calculated using the values for the weight average molecular weight (Mw) and number average molecular weight (Mn) obtained using GPC.

[Melting Point Tm2 of Polyamide Composition]

The melting point Tm2 of the polyamide composition may be at least 200° C., or may be at least 220° C. but not more than 270° C., at least 230° C. but not more than 265° C., at least 240° C. but not more than 260° C., or at least 250° C. but not more than 260° C.

By ensuring that the melting point Tm2 of the polyamide composition is at least as high as the above lower limit, a polyamide composition that exhibits more superior thermal rigidity and the like tends to be obtainable.

On the other hand, by ensuring that the melting point Tm2 of the polyamide composition is not higher than the above upper limit, thermal decomposition and the like of the polyamide composition during melt processing such as extrusion and molding tends to be able to be better suppressed.

[Crystallization Enthalpy ΔH for Polyamide Composition]

From the viewpoint of the mechanical properties, and particularly the water absorption rigidity and thermal rigidity, the lower limit for the crystallization enthalpy ΔH for the polyamide composition may be 10 J/g, 14 J/g, 18 JIg, or 20 J/g. On the other hand, there are no particular limitations on the upper limit for the crystallization enthalpy ΔH, which is preferably as high as possible.

An example of a method for controlling the crystallization enthalpy ΔH for the polyamide composition so as to satisfy the above range is a method in which the amounts of the crystalline polyamide (6A) and the amorphous semi-aromatic polyamide (6B) are controlled so as to satisfy the respective ranges described above.

An example of a device for measuring the melting point Tm2 and the crystallization enthalpy ΔH for the polyamide composition is a Diamond-DSC device manufactured by PerkinElmer, Inc.

[Tan δ Peak Temperature of Polyamide Composition]

The lower limit for the tan δ peak temperature of the polyamide composition is preferably 90° C., more preferably 100° C., even more preferably 110° C., and particularly preferably 120° C.

Further, the upper limit for the tan δ peak temperature of the polyamide composition is preferably 150° C., more preferably 140° C., and even more preferably 130° C.

In other words, the tan δ peak temperature of the polyamide composition is preferably at least 90° C. but not more than 150° C., more preferably at least 100° C. but not more than 140° C., even more preferably at least 110° C. but not more than 130° C., and particularly preferably at least 120° C. but not more than 130° C.

By ensuring that the tan δ peak temperature of the polyamide composition is at least as high as the above lower limit, a polyamide composition that exhibits more superior water absorption rigidity and thermal rigidity tends to be obtainable. Further, by ensuring that the tan δ peak temperature of the polyamide composition is not higher than the above upper limit, a molded article obtained from the polyamide composition exhibits more superior surface appearance.

An example of a method for controlling the tan δ peak temperature of the polyamide composition so as to satisfy the above range is a method in which the blend ratio between the crystalline polyamide (6A) and the amorphous semi-aromatic polyamide (6B) is controlled so as to satisfy the range described above.

[Crystallization Peak Temperature Tc Obtained by Cooling Polyamide Composition at 20° C./Min]

The crystallization peak temperature Tc (° C.) obtained when the polyamide composition is cooled at a rate of 20° C./min may be at least 160° C. but not more than 240° C., at least 170° C. but not more than 230° C., at least 180° C. but not more than 225° C., at least 190° C. but not more than 220° C., or at least 200° C. but not more than 215° C.

By ensuring that the crystallization peak temperature Tc (° C.) for the polyamide composition is at least as high as the above lower limit, a polyamide composition having excellent mold releasability during molding can be obtained.

On the other hand, by ensuring that the crystallization peak temperature Tc (° C.) for the polyamide composition is not higher than the above upper limit, the surface appearance of a molded article obtained from the polyamide composition is more superior.

Measurement of the melting point crystallization peak temperature Tc of the polyamide composition of the aspect described above can be performed in accordance with JIS-K7121.

An example of a device for measuring the crystallization peak temperature Tc is a Diamond-DSC device manufactured by PerkinElmer, Inc.

An example of a method for controlling the crystallization peak temperature Tc of the polyamide so as to satisfy the above range is a method in which the blend ratio between the crystalline polyamide (6A) and the amorphous semi-aromatic polyamide (6B) is controlled so as to satisfy the range described above.

[Ratio of Mass of Amino Ends Relative to Total Mass of Amino Ends and Carboxyl Ends in Polyamide Composition {Amount of Amino Ends/(Amount of Amino Ends+Amount of Carboxyl Ends)}]

The ratio of the mass of amino ends relative to total mass of amino ends and carboxyl ends in the polyamide composition {amount of amino ends/(amount of amino ends+ amount of carboxyl ends)} may be at least 0.25 but less than 0.4, at least 0.35 but less than 0.4, or may be at least 0.25 but less than 0.35. By ensuring that the ratio of the mass of amino ends relative to total mass of amino ends and carboxyl ends in the polyamide composition is at least as large as the above lower limit, corrosion of the extruder and molding machine can be more effectively suppressed. By ensuring that the ratio of the mass of amino ends relative to the total mass of amino ends and carboxyl ends is less than the above upper limit, a polyamide composition having more superior resistance to discoloration upon exposure to heat and light can be obtained.

The amount of amino ends and the amount of carboxyl ends can be measured by neutralization titration, and the measured values for the amount of amino ends and the amount of carboxyl ends can be used to calculate the ratio of the mass of amino ends relative to total mass of amino ends and carboxyl ends (amount of amino ends/(amount of amino ends+amount of carboxyl ends)).

[Surface Gloss of Molded Article Obtained from Polyamide Composition]

The surface gloss of a molded article obtained from the polyamide composition may be at least 50, at least 55, or 60 or greater. By ensuring that the surface gloss of the polyamide composition is at least as high as the above lower limit, the composition can be used more favorably as a molding material for various components for vehicles, electrical and electronic materials, industrial materials, engineering materials, everyday materials, and household items and the like.

The surface gloss can be measured using the method described in the examples below.

<<Molded Article>>

A molded article according to an aspect 6-2 of the present invention is obtained by molding the polyamide composition of the aspect described above.

The molded article of the above aspect has excellent mechanical properties, and particularly superior water absorption rigidity, thermal rigidity and surface appearance.

A molded article of the above aspect can be obtained by molding the polyamide composition of the aspect described above using a conventional molding method.

Examples of these conventional molding methods include, but are not limited to, generally known plastic molding methods such as press molding, injection molding, gas-assisted injection molding, welding molding, extrusion molding, blow molding, film molding, hollow molding, multilayer molding, and melt spinning.

<Applications>

The molded article of the above aspect is obtained from the polyamide composition described above, and therefore exhibits excellent water absorption rigidity, thermal rigidity and surface appearance. Accordingly, the molded article of the above aspect can be used favorably in the types of applications described above in relation to the above aspect 1-2.

<<Aspects 7-1 and 7-2>>
<<Polyamide Composition>>

A polyamide composition according to an aspect 7-1 of the present invention contains the following components (7A) to (7D):

(7A) an aliphatic polyamide, (7B) a semi-aromatic polyamide containing a diamine unit and a dicarboxylic acid unit, (7C1) a flame retardant containing a halogen element, (7C2) a flame retardant auxiliary, and (7D) an ultraviolet absorber.

In the polyamide composition of the above aspect, by ensuring that the tan δ peak temperature and the mass ratio ({(7D)/halogen element} of the ultraviolet absorber (7D) relative to the halogen element satisfy the following conditions, a molded article having favorable tensile strength, flexural modulus, surface appearance and weathering discoloration resistance can be formed. The tan δ peak temperature and the ratio of (7D)/halogen content can be measured using the specific methods described in the examples below.

<Tan δ Peak Temperature of Polyamide Composition>

Details relating to the tan δ peak temperature of the polyamide composition are as described above in the aspect 5-1.

<Mass Ratio {(7D)/Halogen Element} of Ultraviolet Absorber (7D) Relative to Halogen Element>

In the polyamide composition of the aspect described above, the mass ratio {(7D)/halogen element} of the ultraviolet absorber (7D) relative to the halogen element is greater than 0.10 but less than 0.75, and is preferably at least 0.12 but not more than 0.50, more preferably at least 0.15 but not more than 0.45, and even more preferably at least 0.15 but not more than 0.3.

By ensuring that the ratio of (7D)/halogen element exceeds (or is not more than) the above lower limit, a polyamide composition having more superior weathering discoloration resistance can be obtained. By ensuring that the ratio of (7D)/halogen element is less than (or not more than) the above upper limit, a polyamide composition having more superior moldability, external appearance and mechanical properties can be obtained.

<Weight Average Molecular Weight (Mw) of Polyamide Composition>

The weight average molecular weight (Mw) of the polyamide composition is as described above in the aspect 5-1.

<Total Amount of Compounds Having Number Average Molecular Weight Mn of at Least 500 but not More than 2,000 Among Aliphatic Polyamide (7A) and Semi-Aromatic Polyamide (7B)>

Details relating to the total amount of compounds having a number average molecular weight Mn of at least 500 but not more than 2,000 among the aliphatic polyamide (7A) and the semi-aromatic polyamide (7B) are as described above for the "total amount of compounds having number average molecular weight Mn of at least 500 but not more than 2,000 among aliphatic polyamide (5A) and semi-aromatic polyamide (5B)" in the above aspect 5-1.

<Molecular Weight Distribution for Polyamide Composition>

The molecular weight distribution for the polyamide composition is as described above in the aspect 5-1.

<Ratio of Molar Amount of Amino Ends Relative to Total Molar Amount of Amino Ends and Carboxyl Ends>

The ratio of the molar amount of amino ends relative to the total molar amount of amino ends and carboxyl ends is as described above in the aspect 5-1.

As a result of having the physical properties described above, the polyamide composition of the aspect described above is able to form a molded article having favorable tensile strength, flexural modulus, surface appearance and weathering discoloration resistance.

Each of the constituent components of the polyamide composition of the aspect described above is described below in further detail.

<Aliphatic Polyamide (7A)>

Details relating to the aliphatic polyamide (7A) are as described above for the "aliphatic polyamide (5A)" in the above aspect 5-1.

<Semi-Aromatic Polyamide (7B)>

Details relating to the semi-aromatic polyamide (7B) are as described above for the "semi-aromatic polyamide (5B)" in the above aspect 5-1.

<End-Capping Agent>

The ends of the polyamides (the aliphatic polyamide (7A) and the semi-aromatic polyamide (7B)) contained in the polyamide composition of the aspect described above may each be end-capped with a conventional end-capping agent.

The end-capping agent is as described above in the aspect 1-1.

<Methods for Producing Aliphatic Polyamide (7A) and Semi-Aromatic Polyamide (7B)>

With the exception that the aliphatic polyamide (1A) is replaced with the aliphatic polyamide (7A) and the semi-aromatic polyamide (1B) is replaced with the semi-aromatic polyamide (7B), the methods used for producing the polyamides are as described above for the aspect 1-1.

<Polymer Ends of Polyamides>

The polymer ends of the polyamides are as described above in the aspect 1-1.

<Properties of Polyamides>

[Properties of Aliphatic Polyamide (7A)]

The properties of the aliphatic polyamide (7A) are as described above for the "properties of the aliphatic polyamide (1A)" in the above aspect 1-1.

[Properties of Semi-Aromatic Polyamide (7B)]

The properties of the semi-aromatic polyamide (7B) are as described above for the "properties of the semi-aromatic polyamide (5B)" in the above aspect 5-1.

[Total Amount of Amino Ends and Carboxyl Ends in Polyamides]

The total of the amount of amino ends and the amount of carboxyl ends in the polyamides is as described above in the aspect 5-1.

<Flame Retardant (7C1)>

Details relating to the flame retardant (7C1) are as described above for the "flame retardant (2D1)" in the above aspect 2-1.

<Flame Retardant Auxiliary (7C2)>

By including the flame retardant auxiliary (7C2) in the polyamide composition of the aspect described above, a polyamide composition having more superior flame retardancy can be obtained.

The properties of the flame retardant auxiliary (7C2) are as described above for the "flame retardant auxiliary (2D2)" in the above aspect 2-1.

<Ultraviolet Absorber (7D)>

Details relating to the ultraviolet absorber (7D) are as described above for the "ultraviolet absorber (5E)" in the above aspect 5-1.

<Polymer (7E) Containing $\alpha,\beta$-Unsaturated Dicarboxylic Acid Anhydride Unit)

In addition to the above components (7A) to (7D), the polyamide composition of the aspect described above may also contain a polymer (7E) containing an $\alpha,\beta$-unsaturated dicarboxylic acid anhydride unit. By including the polymer (7E) containing an $\alpha,\beta$-unsaturated dicarboxylic acid anhydride unit, a polyamide composition that exhibits more superior mechanical properties such as toughness and rigidity can be obtained.

Details relating to the polymer (7E) containing an $\alpha,\beta$-unsaturated dicarboxylic acid anhydride unit are as described above for the "polymer (5F) containing an $\alpha,\beta$-unsaturated dicarboxylic acid anhydride unit" in the above aspect 5-1.

<Filler (7F)>

In addition to the above components (7A) to (7D), the polyamide composition of the aspect described above may also contain a filler (7F). By including the filler (7F), a polyamide composition having more superior mechanical properties such as toughness and rigidity can be obtained.

Details relating to the filler (7F) are as described above for the "filler (5G)" in the above aspect 5-1.

<Amounts of Components (7C1) to (7F) in Polyamide Composition>

[Amount of Flame Retardant (7C1)]

The amount of the flame retardant (7C1) in the polyamide composition of the aspect described above, relative to the total mass of the polyamide composition, is preferably at least 0.1% by mass but not more than 30% by mass, more preferably at least 5% by mass but not more than 20% by mass, and even more preferably at least 6% by mass but not more than 15% by mass.

By ensuring that the amount of the flame retardant (7C1) is at least as large as the above lower limit, a polyamide composition having more superior flame retardancy can be obtained. On the other hand, by ensuring that the amount of the flame retardant (7C1) is not more than the above lower limit, any generation of decomposition gases during melt kneading, deterioration of fluidity during molding, and adhesion of contaminants to the molding mold can be more effectively suppressed. Moreover, any deterioration in the mechanical properties such as the toughness and the rigidity or the molded article external appearance can also be more effectively suppressed.

[Amount of Flame Retardant Auxiliary (7C2)]

The amount of the flame retardant auxiliary (7C2) in the polyamide composition of the aspect described above, relative to the total mass of the polyamide composition, is preferably at least 0.1% by mass but not more than 10% by mass, and more preferably at least 0.1% by mass but not more than 4% by mass.

By ensuring that the amount of the flame retardant auxiliary (7C2) is at least as large as the above lower limit, a polyamide composition having more superior flame retardancy can be obtained. On the other hand, by ensuring that the amount of the flame retardant auxiliary (7C2) is not more than the above upper limit, the viscosity of the composition during melt processing can be controlled to a level within a suitable range, and any increase in torque during extrusion, and any deterioration in the moldability during molding or the external appearance of the molded article can be more effectively suppressed. Further, a polyamide composition having excellent toughness and the like can be obtained without impairing the superior mechanical properties of the polyamides such as the toughness and the rigidity.

[Types and Amounts of Flame Retardant (7C1) and Flame Retardant Auxiliary (7C2)]

Details relating to the types and amounts of the flame retardant (7C1) and the flame retardant auxiliary (7C2) are as described above for the "types and amounts of the flame retardant (5C1) and the flame retardant auxiliary (5C2)" in the above aspect 5-1.

[Amount of Ultraviolet Absorber (7D)]

The amount of the ultraviolet absorber (7D) is as described above for the "amount of the ultraviolet absorber (5E)" in the above aspect 5-1.

[Amount of Polymer (7E) Containing $\alpha,\beta$-Unsaturated Dicarboxylic Acid Anhydride Unit]

The amount of the polymer (7E) containing an $\alpha,\beta$-unsaturated dicarboxylic acid anhydride unit is as described above for the "amount of the polymer (5F) containing an $\alpha,\beta$-unsaturated dicarboxylic acid anhydride unit" in the above aspect 5-1.

[Amount of Filler (7F)]

The amount of the filler (7F) is as described above for "(5G)" in the above aspect 5-1.

[Total Amount of Components (7C1) to (7F)]

The total amount of the flame retardant (7C1), the flame retardant auxiliary (7C2), the ultraviolet absorber (7D), the polymer (7E) containing an $\alpha,\beta$-unsaturated dicarboxylic acid anhydride unit and the filler (7F) in the polyamide composition of the aspect described above, relative to the total mass of the polyamide composition, is preferably at least 10% by mass but not more than 90% by mass, more preferably at least 30% by mass but not more than 80% by mass, and even more preferably at least 55% by mass but not more than 75% by mass. By ensuring that the total amount of the above components (7C1) to (7F) in the polyamide composition of the aspect described above is at least as large as the above lower limit, a polyamide composition having more superior strength, rigidity, and flame retardancy and the like can be obtained. Further, a polyamide composition having a suitable melt viscosity and excellent workability can be obtained.

<Other Additives (7G)>

In addition to the components (7A) to (7D) described above, the polyamide composition of the aspect described above may also contain other additives (7G) that are typically used in polyamides, provided these other additives do not impair the effects of the polyamide composition of the above aspect. Examples of these other additives (7G) include: (7G1) moldability improvers, (7G2) degradation inhibitors, (7G3) nucleating agents, (7G4) thermal stabilizers, and (7G5) other resins besides the aliphatic polyamide (7A) and semi-aromatic polyamide (7B) described above.

The amounts of these other additives (7G) in the polyamide composition of the aspect described above will vary depending on the type of material and the potential application of the polyamide composition, and therefore there are no particular limitations on those amounts provided the effects of the polyamide composition of the above aspect are not impaired, but the total amount of the other additives (6J) in the polyamide composition may, for example, be not more than 50% by mass, not more than 10% by mass, not more than 5% by mass, or 1% by mass or less.

[(7G1) Moldability Improvers and Lubricants]

The moldability improvers and lubricants of (7G1) are as described above for the "lubricants" in the above aspect 1-1.

[(7G2) Degradation Inhibitors]

A degradation inhibitor (7G2) included in the polyamide composition of the aspect described above is used for the purposes of preventing thermal degradation, preventing discoloration upon heating, and improving the heat aging resistance.

Details relating to the degradation inhibitor (7G2) are as described above for the "degradation inhibitors" in the above aspect 2-1.

[(7G3) Nucleating Agents]

Details relating to the nucleating agents (7G3) are as described above for the "nucleating agents" in the above aspect 1-1.

[(7G4) Thermal Stabilizers]

Details relating to the thermal stabilizers (7G4) are as described above for the "stabilizers" in the above aspect 1-1.

[(7G5) Other Resins]

Details relating to the other resins (7G5) are as described above for the "other resins" in the above aspect 2-1.

<Method for Producing Polyamide Composition>

There are no particular limitations on the method used for producing the polyamide composition of the aspect described above, provided the method includes mixing the aliphatic polyamide (7A) and each of the components (7B) to (7D), and if required the components (7E) and (7F).

Examples of the method used for mixing the above components (7A) to (7D), and if required the components (7E) and (7F) include methods (1) and (2) described below.

(1) A method in which the above components (7A) to (7D), and if required the components (7E) and (7F), are mixed together using a Henschel mixer or the like, and then supplied to a melt kneader and subjected to kneading.

(2) A method in which a mixture containing the components (7A) to (7D), and if required the component (7E), which has been prepared in advance by mixing the above components (7A) to (7D), and if required the component (7E), using a Henschel mixer or the like, is supplied to a melt kneader using a single-screw or twin-screw extruder, and following kneading, if required, the filler (7F) is blended with the kneaded mixture from a side feeder.

The method for supplying the components that constitute the polyamide composition to the melt kneader may be performed by supplying all of the constituent components to the same supply port in a single batch, or by supplying the respective constituent components from different supply ports.

The melt kneading temperature is preferably at least 1° C. higher, but not more than about 100° C. higher, than the melting point of the aliphatic polyanmide (7A), and is more preferably at least 10° C. higher, but not more than about 50° C. higher, than the melting point of the aliphatic polyamide (7A).

The shear rate in the kneader is preferably at least about 100 sec$^1$. Further, the average residence time during kneading is preferably at least 0.5 minutes but not more than about 5 minutes.

A conventional device may be used as the device used for performing the melt kneading, and examples of devices that can be use favorably include single-screw or twin-screw extruders, a Banbury mixer, and a melt kneader (mixing roll).

The blend amount of each component used when producing the polyamide composition of the aspect described above is the same as the amount of that component in the polyamide composition described above.

<<Molded Article>>

A molded article according to an aspect 7-2 of the present invention is obtained by molding the polyamide composition of the aspect described above.

Furthermore, the molded article of the above aspect has high surface gloss. The surface gloss of the molded article of the above aspect is preferably at least 50, more preferably at least 55, and even more preferably 60 or higher. By ensuring that the surface gloss of the molded article is at least as high as the above lower limit, the obtained molded article can be used favorably for various components for vehicles, electrical and electronic components, industrial materials, engineering materials, everyday materials, and household items and the like.

There are no particular limitations on the method used for obtaining the molded article, and a conventional molding method may be used.

Examples of conventional molding methods include extrusion molding, injection molding, vacuum molding, blow molding, injection compression molding, decorative molding, different material molding, gas-assisted injection molding, foam injection molding, low-pressure molding, ultra-thin-wall injection molding (ultra-high-speed injection molding), and in-mold composite molding (such as insert molding and outsert molding).

(Applications)

The molded article of the above aspect contains the polyamide composition of the aspect described above, has excellent tensile strength, flexural nodulus, surface appearance, and weathering discoloration resistance and the like, and can be used in a wide variety of applications.

Examples of applications in which the molded article of the above aspect can be used favorably include applications in the automotive field, the electrical and electronic field, the machinery and industry field, the office equipment field, and the aerospace field.

EXAMPLES

Examples 1-1 to 1-8, Comparative Examples 1-1 to 1-6

The aspects described above are described below in further detail using a series of specific examples and comparative examples, but the above aspects are in no way limited by the following examples. In the examples, 1 kg/cm$^2$ means 0.098 MPa.

First, the aliphatic polyamides (1A), the semi-aromatic polyamides (1B), the inorganic filler (1C) and the additive (1D) used in the examples and comparative examples are described below.

(1A) Aliphatic Polyamides
   1A-1: a polyamide 66
   1A-2: a polyamide 66
   1A-3: a polyamide 66

(1B) Semi-Aromatic Polyamides
   1B-1: a polyamide 66/6I (Mw=28,000, Mw/Mn=2.3, total of amount of amino ends and amount of carboxyl ends: 154 µeq/g)

1B-2: a polyamide 6I (Mw=20,000, Mw/Mn=2.0, total of amount of amino ends and amount of carboxyl ends: 253 μeq/g)

1B-3: a polyamide 6I T-40 (manufactured by Lanxess AG, Mw=44,000, Mw/Mn=2.8, total of amount of amino ends and amount of carboxyl ends: 147 μeq/g)

1B-4: a polyamide 6I/6T Grivory 21 (manufactured by Ems Group, Mw=27,000, Mw/Mn=2.2, total of amount of amino ends and amount of carboxyl ends: 139 μeq/g, proportion of isophthalic acid in dicarboxylic acid units: 70 mol %)

1B-5: a polyamide 6I/6T (Mw=20,000, Mw/Mn=2.0, total of amount of amino ends and amount of carboxyl ends: 231 μeq/g)

1B-6: a polyamide 6I/6 (Mw=21,000, Mw/Mn=2.0, total of amount of amino ends and amount of carboxyl ends: 239 μeq/g)

(1C) Inorganic Filler (1) Glass fiber ECS03T275H, manufactured by Nippon Electric Glass Co., Ltd., number-average fiber diameter (average particle size): 10 μm (circular), cut length: 3 mm In the examples, the average fiber diameter of the glass fiber was measured in the manner described below.

First, the polyamide composition was placed in an electric furnace, and the organic matter contained in the polyamide composition was incinerated. From the residue obtained following this incineration treatment, at least 100 glass fibers were selected randomly and observed using a scanning electron microscope (SEM), and the fiber diameter of each of these glass fibers was measured to determine the number-average fiber diameter.

(1D) Additive 1D-1: Calcium montanate, product name: Licomont CaV102, manufactured by Clariant AG The aliphatic polyamides (1A) and semi-aromatic polyamides (1B) used in the examples and comparative examples were produced by appropriate use of (a) and (b) below.

((a) Dicarboxylic Acids)

(1) Adipic acid (ADA) (manufactured by Wako Pure Chemical Industries, Ltd.)

(2) Isophthalic acid (IPA) (manufactured by Wako Pure Chemical Industries, Ltd.)

((b) Diamine)

(1) 1,6-diaminohexane (hexamethylenediamine) (C6DA) (manufactured by Tokyo Chemical Industry Co., Ltd.)

((c) Lactam)

(1) ε-caprolactam (CPL) (manufactured by Wako Pure Chemical Industries, Ltd.)

[Production of Polyamides]

Next is a description of the methods used for producing the aliphatic polyamides (1A) ((1A-1), (1A-2) and (1A-3)) and the semi-aromatic polyamides (1B) ((1B-1), (1B-2), (1B-5) and (1B-6)).

(1A-1: Polyamide 66)

The polyamide polymerization reaction was performed by a "hot melt polymerization method" in the manner described below.

First, 1,500 g of an equimolar salt of adipic acid and hexamethylenediamine was dissolved in 1,500 g of distilled water to prepare an equimolar 50% by mass homogenous aqueous solution of the raw material monomers. This aqueous solution was placed in an autoclave with an internal capacity of 5.4 L, and the autoclave was flushed with nitrogen.

With the solution being stirred at a temperature of 110 to 150° C., steam was gradually extracted and the solution concentration was concentrated to 70% by mass. Subsequently, the internal temperature was raised to 220° C. At this time, the pressure inside the autoclave increased to 1.8 MPa. In this state, steam was gradually extracted to maintain the pressure at 1.8 MPa, and the reaction was continued for one hour until the internal temperature reached 245° C.

Next, the pressure was reduced over a period of one hour. Subsequently, the inside of the autoclave was held for 10 minutes at a reduced pressure of 650 torr (86.66 kPa) using a vacuum device. At this time, the final internal temperature of the polymerization was 265° C.

Subsequently, the autoclave was pressurized with nitrogen, and the polymer was discharged in a strand-like form through a lower spinneret (nozzle), cooled in water and subjected to cutting to form pellets, and the pellets were then dried at 100° C. under a nitrogen atmosphere for 12 hours to obtain a polyamide. Mw was 35,000, and Mw/Mn was 2.0.

(1A-2: Polyamide 66)

With the exception of holding the inside of the autoclave at a reduced pressure of 650 torr (86.66 kPa) for 20 minutes using a vacuum device, a polyamide polymerization reaction (a "hot melt polymerization method") was performed using the method described above for the production example of 1A-1, thus obtaining pellets of a polyamide. Mw was 40,000, and Mw/Mn was 2.0.

(1A-3: Polyamide 66)

With the exception of holding the inside of the autoclave at a reduced pressure of 300 torr (86.66 kPa) for 10 minutes using a vacuum device, a polyamide polymerization reaction (a "hot melt polymerization method") was performed using the method described above for the production example of 1A-1, thus obtaining pellets of a polyamide. Mw was 30,000, and Mw/Mn was 2.

(1B-1: Polyamide 66/6I)

The polyamide polymerization reaction was performed by a "hot melt polymerization method" in the manner described below.

First, 1,044 g of an equimolar salt of adipic acid and hexamethylenediamine, 456 g of an equimolar salt of isophthalic acid and hexamethylenediamine, and a 0.5 mol % excess of adipic acid relative to the total of all the equimolar salt components were dissolved in 1,500 g of distilled water to prepare an equimolar 50% by mass homogenous aqueous solution of raw material monomers.

With the solution being stirred at a temperature of 110 to 150° C., steam was gradually extracted and the solution concentration was concentrated to 70% by mass. Subsequently, the internal temperature was raised to 220° C. At this time, the pressure inside the autoclave increased to 1.8 MPa. In this state, steam was gradually extracted to maintain the pressure at 1.8 MPa, and the reaction was continued for one hour until the internal temperature reached 245° C.

Next, the pressure was reduced over a period of one hour. Subsequently, the inside of the autoclave was held for 10 minutes at a reduced pressure of 650 torr (86.66 kPa) using a vacuum device. At this time, the final internal temperature of the polymerization was 265° C.

Subsequently, the autoclave was pressurized with nitrogen, and the polymer was discharged in a strand-like form through a lower spinneret (nozzle), cooled in water and subjected to cutting to form pellets, and the pellets were then dried at 100° C. under a nitrogen atmosphere for 12 hours to obtain a polyamide. Mw was 28,000, Mw/Mn was 2.3, VR was 22, Mw/VR was 1,273, and the proportion of isophthalic acid among the dicarboxylic acid units was 30 mol %.

(1B-2: Polyamide 6I)

The polyamide polymerization reaction was performed by a "hot melt polymerization method" in the manner described below.

First, 1,500 g of an equimolar salt of isophthalic acid and hexamethylenediamine and a 1.5 mol % excess of adipic acid relative to the total mass of the equimolar salt component were dissolved in 1,500 g of distilled water to prepare an equimolar 50% by mass homogenous aqueous solution of raw material monomers.

With the solution being stirred at a temperature of 110 to 150° C., steam was gradually extracted and the solution concentration was concentrated to 70% by mass. Subsequently, the internal temperature was raised to 220° C. At this time, the pressure inside the autoclave increased to 1.8 MPa. In this state, steam was gradually extracted to maintain the pressure at 1.8 MPa, and the reaction was continued for one hour until the internal temperature reached 245° C.

Next, the pressure was reduced over a period of 30 minutes. Subsequently, the inside of the autoclave was held for 10 minutes at a reduced pressure of 650 torr (86.66 kPa) using a vacuum device. At this time, the final internal temperature of the polymerization was 265° C.

Subsequently, the autoclave was pressurized with nitrogen, and the polymer was discharged in a strand-like form through a lower spinneret (nozzle), cooled in water and subjected to cutting to form pellets, and the pellets were then dried at 100° C. under a nitrogen atmosphere for 12 hours to obtain a polyamide. Mw was 20,000, Mw/Mn was 2.0, VR was 12, Mw/VR was 1,667, and the proportion of isophthalic acid among the dicarboxylic acid units was 100 mol %.

(1B-5: Polyamide 6I/6T)

The polyamide polymerization reaction was performed by a "hot melt polymerization method" in the manner described below.

First, 1,200 g of an equimolar salt of isophthalic acid and hexamethylenediamine, 300 g of an equimolar salt of terephthalic acid and hexamethylenediamine, and a 1.5 mol % excess of adipic acid relative to the total of all the equimolar salt components were dissolved in 1,500 g of distilled water to prepare an equimolar 50% by mass homogenous aqueous solution of raw material monomers.

With the solution being stirred at a temperature of 110 to 150° C., steam was gradually extracted and the solution concentration was concentrated to 70% by mass. Subsequently, the internal temperature was raised to 220° C. At this time, the pressure inside the autoclave increased to 1.8 MPa. In this state, steam was gradually extracted to maintain the pressure at 1.8 MPa, and the reaction was continued for one hour until the internal temperature reached 245° C.

Next, the pressure was reduced over a period of 30 minutes. Subsequently, the inside of the autoclave was held for 10 minutes at a reduced pressure of 650 torr (86.66 kPa) using a vacuum device. At this time, the final internal temperature of the polymerization was 265° C.

Subsequently, the autoclave was pressurized with nitrogen, and the polymer was discharged in a strand-like form through a lower spinneret (nozzle), cooled in water and subjected to cutting to form pellets, and the pellets were then dried at 100° C. under a nitrogen atmosphere for 12 hours to obtain a polyamide. Mw was 20,000, Mw/Mn was 2.0, and the proportion of isophthalic acid among the dicarboxylic acid units was 80 mol %.

(B-6: Polyamide 6I/6)

First, 1,400 g of an equimolar salt of isophthalic acid and hexamethylenediamine, 100 g of ε-caprolactam, and a 1.5 mol % excess of adipic acid relative to the total mass of equimolar salt components were dissolved in 1,500 g of distilled water to prepare an equimolar 50% by mass homogenous aqueous solution of raw material monomers.

With the exception of preparing the 50% by mass homogenous aqueous solution of raw material monomers in the above manner, a polyamide polymerization reaction (a "hot melt polymerization method") was performed using the method described above for the production example of B-2, thus obtaining pellets of a polyamide. Mw was 21,000, and Mw/Mn was 2.0.

[Production of Polyamide Compositions]

Examples 1-1 to 1-8 and Comparative Examples 1-1 to 1-6

Using the above aliphatic polyamides (1A) and semi-aromatic polyamides (1B) in the formulations and proportions shown below in Table 1-1, polyamide compositions were produced in the manner described below.

The polyamides obtained above were dried under a stream of nitrogen to reduce the moisture content to about 0.2% by mass before being used as raw materials for the polyamide compositions.

A twin-screw extruder "ZSK-26MC" manufactured by Coperion GmbH (Germany) was used as the polyamide composition production apparatus.

The twin-screw extruder had an upstream supply port on the first barrel from the upstream side of the extruder, had a downstream first supply port on the sixth barrel, and had a downstream second supply port on the ninth barrel. Further, in the twin-screw extruder, LID was 48, and the number of barrels was 12.

In the twin-screw extruder, the temperature from the upstream supply port to the die was set to the melting point Tm2 of the polyamide (1A) produced in the above production example +20° C., the screw rotational rate was set to 250 rpm, and the discharge rate was set to 25 kg/h.

The aliphatic polyamide (1A) and the semi-aromatic polyamide (1B) were dry-blended using the formulations and proportions shown below in Table 1-1 and then supplied to the upstream supply port of the twin-screw extruder, and the melt-kneaded product extruded from the die head was cooled in a strand-like form and then pelletized to obtain pellets of a polyamide composition (containing no glass fiber).

Next is a description of the case in which a polyamide composition containing 60% by mass of the GF shown in Table 1-1 (polyamides: GF=100 parts by mass: 150 parts by mass) is produced. The aliphatic polyamide (1A) and the semi-aromatic polyamide (1B) were dry-blended and then supplied to the upstream supply port of the twin-screw extruder, the glass fiber was supplied as an inorganic filler from the downstream first supply port of the twin-screw extruder, and the melt-kneaded product extruded from the die head was cooled in a strand-like form and then pelletized to obtain pellets of a polyamide composition (containing glass fiber).

The obtained pellets of the polyamide composition were dried under a stream of nitrogen to reduce the moisture content within the polyamide composition to not more than 500 ppm.

[Measurement Methods for Polyamide Compositions]

Using the polyamide compositions for which the moisture content had been adjusted, each of the following evaluations was performed. The evaluation results are shown below in Table 1-1.

(Calculation of Mol % of Aromatic Dicarboxylic Acid Units)

The mol % of aromatic dicarboxylic acid units was determined by calculation using the following formula.

Formula: Aromatic dicarboxylic acid units=(number of moles of aromatic dicarboxylic acid added as raw material monomer/number of moles of all dicarboxylic acids added as raw material monomers)×100

(1) Melting Peak Temperature Tm2 (Melting Point), Crystallization Peak Temperature Tc, and Crystallization Enthalpy These values were measured using a Diamond-DSC device manufactured by PerkinElmer, Inc., in accordance with JIS-K7121. Specifically, measurements were performed in the following manner.

First, under a nitrogen atmosphere, a sample of about 10 mg was heated from room temperature to a temperature of 300 to 350° C., depending on the melting point of the sample, at a rate of temperature increase of 20° C./min. The highest peak temperature of the endothermic peak (melting peak) that appeared during this process was recorded as Tm1 (° C.). Next, the temperature was maintained at the maximum heating temperature for two minutes. At this maximum temperature, the polyamides existed in a melted state. Subsequently, the sample was cooled to 30° C. at a rate of temperature reduction of 20° C./min. The exothermic peak that appeared during this process was deemed the crystallization peak, the crystallization peak temperature was recorded as Tc, and the surface area of the crystallization peak was deemed the crystallization enthalpy ΔH (J/g). Subsequently, the sample was held at 30° C. for two minutes, and was then heated from 30° C. to a temperature of 280 to 300° C., depending on the melting point of the sample, at a rate of temperature increase of 20° C./min. The highest peak temperature of the endothermic peak (melting peak) that appeared during this process was deemed the melting point Tm2 (° C.).

(2) Tan δ Peak Temperature

Using a viscoelasticity measuring and analysis device (DVE-V4, manufactured by Rheology Co., Ltd.), a temperature variance spectrum of the dynamic viscoelasticity of a test piece prepared by cutting the parallel portion of a Type L test piece prescribed in ASTM D1822 into a short strip was measured under the conditions described below. The dimensions of the test piece were 3.1 mm (width)×2.9 mm (thickness)×15 mm (length: distance between clamps).

Measurement mode: tensile, waveform: sine wave, frequency: 3.5 Hz, temperature range: 0° C. to 180° C., temperature increase steps: 2° C./min, static load: 400 g, displacement amplitude: 0.75 μm. The ratio E2/E1 between the storage modulus E1 and the loss modulus E2 was recorded as tan δ, and the highest temperature was deemed the tan δ peak temperature.

(3) Mw (Weight Average Molecular Weight), Mn (Number Average Molecular Weight), Molecular Weight Distribution Mw/Mn, Mw(1A)−Mw(1B)

The Mw (weight average molecular weight) and Mn (number average molecular weight) were measured by GPC (gel permeation chromatography using an HLC-8020 device manufactured by Tosoh Corporation, using hexafluoroisopropanol solvent and calculated against PMMA (polymethyl methacrylate) standard samples (manufactured by Polymer Laboratories Ltd.)). Based on these values, Mw(1A)−Mw(1B) and the molecular weight distribution Mw/Mn were calculated. The amount (% by mass) of compounds having a number average molecular weight Mn of at least 500 but not more than 2,000 was calculated from the elution curve (vertical axis: signal strength obtained from detector, horizontal axis: elution time) of each sample obtained using GPC, based on the surface area of the region bounded by the baseline and the elution curve for number average molecular weights from at least 500 to less than 2,000, and the surface area of the entire region bounded by the baseline and the elution curve.

(4) [NH$_2$]/([NH$_2$]+[COOH])

Based on the amount of amino ends ([NH$_2$]) and the amount of carboxyl ends ([COOH]) measured in accordance with (4-1) and (4-2) described below, the value of [NH$_2$]/([NH$_2$]+[COOH]) was calculated.

(4-1) Amount of Amino Ends ([NH$_2$])

The amount of amino ends bonded to polymer ends of the polyamide composition was measured by a neutralization titration in the manner described below.

First, 3.0 g of the polyamide composition was dissolved in 100 mL of a 90% by mass aqueous solution of phenol, and using the thus obtained solution, a titration was performed with 0.025 N hydrochloric acid to determine the amount of amino ends (μeq/g). The end point was determined using the reading from a pH meter.

(4-2) Amount of Carboxyl Ends ([COOH])

The amount of carboxyl ends bonded to polymer ends of the polyamide composition was measured by a neutralization titration in the manner described below.

First, 4.0 g of the polyamide composition was dissolved in 50 mL of benzyl alcohol, and using the thus obtained solution, a titration was performed with 0.1 N NaOH to determine the amount of carboxyl ends (μeq/g). The end point was determined by the change in color of a phenolphthalein indicator.

Measurement of [NH$_2$]+[COOH] by NMR

The amount of polyamide carboxyl ends and amino ends in the polyamide composition or the semi-aromatic polyamide was quantified by 1H-NMR in the manner described below.

First, 15 mg of the polyamide composition or the semi-aromatic polyamide was dissolved in 0.7 g of deuterated sulfuric acid and 0.7 g of deuterated hexafluoroisopropanol, and after standing overnight, the obtained solution was used to measure the polyamide ends by 1H-NMR.

Based on the ratio between the surface area of the peak at 2.47 ppm derived from the methylene hydrogens adjacent to adipic acid, the surface area of the peak at 8.07 ppm derived from the hydrogens on the benzene ring carbons adjacent to the isophthalic acid groups, and the peak at 7.85 ppm derived from the hydrogens on the benzene ring carbons adjacent to the terephthalic acid groups, the amount of carboxyl ends was determined. Based on the ratio of the peak at 2.67 to 2.69 ppm derived from methylene carbon hydrogens adjacent to a hexamethylenediamine group, the amount of amino ends was determined. The 1H-NMR analyses were conducted using a nuclear magnetic resonance analysis apparatus JNM ECA-500 manufactured by JEOL Ltd., and the above amounts were determined by calculating integral ratios.

Based on the amount of amino ends ([NH$_2$]) and the amount of carboxyl ends ([COOH]) measured above, the value of [NH$_2$]+[COOH] was calculated.

(6) Tensile Strength

Using an injection molding machine [PS-40E, manufactured by Nissei Plastic Industrial Co., Ltd.], molded pieces of the multipurpose test piece type A were molded in accordance with ISO 3167. The specific molding conditions included an injection+holding time of 25 seconds, a cooling time of 15 seconds, a mold temperature of 80° C., and a melted resin temperature set to the high temperature-side melting peak temperature (Tm2) for the polyamides+20° C.

Using the thus obtained molded piece of multipurpose test piece type A, a tensile test was performed in accordance with ISO 527 under conditions including temperature conditions of 23° C. and a tension rate of 50 mm/min, thereby measuring the tensile yield stress, which was recorded as the tensile strength.

Further, with the temperature conditions set to 80° C. and the remaining conditions as described above, the tensile strength at 80° C. was also measured.

(7) Corrosion Resistance

The sample pellets and carbon steel (SUS400) for which the weight had been measured were placed in a sealed container made of SUS, and the inside of the container was flushed with nitrogen. Subsequently, the sealed container was heated, the internal temperature was held at 300° C. for 6 hours, and following cooling, the weight of the carbon steel was measured. The degree of corrosion was determined on the basis of the change in weight of the carbon steel.

(Evaluation Criteria)

A: no weight reduction from before to after test
B: weight reduction from before to after test of at least 0.1 g but less than 0.5 g
C: weight reduction from before to after test of at least 0.5 g but less than 1 g
D: weight reduction from before to after test of 1 g or more (8) Surface Gloss A flat plate molded piece was produced in the following manner.

Using an injection molding machine [NEX50III-5EG, manufactured by Nissei Plastic Industrial Co., Ltd.] with the cooling time set to 25 seconds, the screw rotational rate set to 200 rpm, the mold temperature set to the tan δ peak temperature+5° C., and the cylinder temperature set to (Tm2+10°) C to (Tm2+30°) C, the injection pressure and injection speed were adjusted appropriately to achieve a fill time of 1.6+0.1 seconds, and a flat plate molded piece (6 cm×9 cm, thickness: 2 mm) was produced.

The 60° gloss of the central portion of the flat plate molded piece prepared in this manner was measured in accordance with JIS-K7150 using a gloss meter (IG320, manufactured by Horiba, Ltd.).

A larger measured value was adjudged to indicate more superior surface appearance.

(9) MD (Mold Deposits) During Molding

The molding described above in (8) was repeated for 100 consecutive shots, and following completion of the molding, the gas vent was inspected visually.

The evaluation criteria for gas generation during molding were as listed below. The ability to obtain molded articles without problems was evaluated as leading to an improvement in productivity.

(Evaluation Criteria)

A: no deposits observed on gas vent
B: some deposits observed on gas vent
C: deposits observed on gas vent, with a blockage beginning to occur
D: deposits observed on gas vent, with vent blocked

(10) Flexural Modulus Retention Ratio after Water Absorption

An ISO dumbbell with a thickness of 4 mm was prepared and used as a test piece. Using the obtained test piece, the flexural modulus was measured in accordance with ISO 178. Further, the ISO dumbbell was left to stand in a constant-temperature constant-humidity (23° C., 50% RH) environment, and once water absorption equilibrium had been reached, the flexural modulus was again measured in accordance with ISO 178. The flexural modulus retention ratio after water absorption was determined using the following formula.

Flexural modulus retention ratio after water absorption (%)=flexural modulus after water absorption/flexural modulus before water absorption×100

TABLE 1-1

| | Type | Units | Example 1-1 | Example 1-2 | Example 1-3 | Example 1-4 | Example 1-5 | Example 1-6 | Example 1-7 | Example 1-8 | Example 1-9 |
|---|---|---|---|---|---|---|---|---|---|---|---|
| Polyamide (1A) | 1A-1 | parts by mass | 70 | 95 | 60 | 55 | | | | 70 | 70 |
| | 1A-2 | parts by mass | | | | | 70 | | | | |
| | 1A-3 | parts by mass | | | | | | 70 | 70 | | |
| Polyamide (1B) | 1B-1 | parts by mass | | | | | | | | | |
| | 1B-2 | parts by mass | 30 | 5 | 40 | 45 | 30 | 30 | 30 | | |
| | 1B-3 | parts by mass | | | | | | | | | |
| | 1B-4 | parts by mass | | | | | | | | | |
| | 1B-5 | parts by mass | | | | | | | | 30 | |
| | 1B-6 | parts by mass | | | | | | | | | 30 |
| Additive (1D) | 1D-1 | parts by mass | | | | | | | 0.5 | | |
| Polyamide composition physical properties | Mw | | 32,000 | 34,250 | 29,000 | 28,250 | 34,000 | 27,000 | 22,000 | 32,000 | 33,000 |
| | Mw(1A) − Mw(1B) | | 15,000 | 15,000 | 15,000 | 15,000 | 20,000 | 10,000 | 10,000 | 0 | 0 |
| | Mn 500 to 2000 | % | 1.6 | 1.6 | 1.6 | 1.6 | 1.6 | 1.6 | 1.6 | 1.6 | 1.6 |
| | Mw/Mn | | 2.1 | 2.1 | 2.1 | 2.1 | 2.1 | 2.1 | 2.1 | 2.1 | 2.0 |
| | [NH$_2$]/([NH$_2$] + [COOH]) | | 0.30 | 0.33 | 0.34 | 0.35 | 0.32 | 0.32 | 0.35 | 0.30 | 0.35 |

TABLE 1-1-continued

| | | Units | | | | | | | | | |
|---|---|---|---|---|---|---|---|---|---|---|---|
| | [NH$_2$] + [COOH] | μeq/g | 116 | 91 | 126 | 131 | 107 | 119 | 125 | 109 | 108 |
| | Tensile strength | MPa | 92 | 85 | 94 | 96 | 92 | 92 | 88 | 92 | 89 |
| | Corrosion resistance | | A | A | A | A | A | A | A | A | A |
| Polyamide composition (GF: 60% by mass) physical properties | Tm2 | °C. | 257 | 262 | 255 | 254 | 257 | 257 | 257 | 257 | 251 |
| | Tc | °C. | 210 | 225 | 205 | 203 | 210 | 210 | 213 | 210 | 200 |
| | Crystallization enthalpy | J/g | 21.0 | 24.3 | 18.1 | 15.1 | 21.0 | 21.0 | 21.4 | 19.0 | 20.3 |
| | tan δ peak temperature | °C. | 111 | 93 | 119 | 123 | 110 | 113 | 115 | 108 | 107 |
| | Surface gloss | % | 61 | 53 | 67 | 73 | 55 | 65 | 71 | 61 | 66 |
| | MD during molding | | A | A | A | A | A | A | A | A | A |
| | Flexural modulus retention ratio after water absorption | % | 100 | 85 | 100 | 100 | 100 | 100 | 100 | 98 | 99 |
| | Tensile strength | MPa | 273 | 251 | 275 | 277 | 269 | 275 | 278 | 269 | 275 |
| | 80° C. tensile strength | MPa | 162 | 154 | 159 | 153 | 162 | 163 | 163 | 158 | 156 |

| | Type | Units | Comparative Example 1-1 | Comparative Example 1-2 | Comparative Example 1-3 | Comparative Example 1-4 | Comparative Example 1-5 | Comparative Example 1-6 |
|---|---|---|---|---|---|---|---|---|
| Polyamide (1A) | 1A-1 | parts by mass | 100 | | 70 | 70 | 45 | |
| | 1A-2 | parts by mass | | | | | | 85 |
| | 1A-3 | parts by mass | | | | | | |
| Polyamide (1B) | 1B-1 | parts by mass | | 100 | | | | |
| | 1B-2 | parts by mass | | | | | 55 | 15 |
| | 1B-3 | parts by mass | | | 30 | | | |
| | 1B-4 | parts by mass | | | | 30 | | |
| | 1B-5 | parts by mass | | | | | | |
| | 1B-6 | parts by mass | | | | | | |
| Additive (1D) | 1D-1 | parts by mass | | | | | | |
| Polyamide composition physical properties | Mw | | 34,500 | 31,000 | 38,000 | 37,000 | 26,750 | 37,300 |
| | Mw(1A) − Mw(1B) | | — | — | −9,000 | 8,000 | 15,000 | 20,000 |
| | Mn 500 to 2000 | % | 1.2 | 1.0 | 1.2 | 1.3 | 1.6 | 1.6 |
| | Mw/Mn | | 2.0 | 2.0 | 2.5 | 2.4 | 2.1 | 2.1 |
| | [NH$_2$]/([NH$_2$] + [COOH]) | | 0.38 | 0.22 | 0.45 | 0.45 | 0.34 | 0.35 |
| | [NH$_2$] + [COOH] | μeq/g | 86 | 94 | 93 | 89 | 141 | 98 |
| | Tensile strength | MPa | 83 | 79 | 105 | 97 | 75 | 85 |
| | Corrosion resistance | | A | C | A | A | A | A |
| Polyamide composition (GF: 60% by mass) physical properties | Tm2 | °C. | 262 | 239 | 257 | 259 | 251 | 260 |
| | Tc | °C. | 230 | 184 | 210 | 217 | 196 | 215 |
| | Crystallization enthalpy | J/g | 26.0 | 17.5 | 20.3 | 20.5 | 12.0 | 20.0 |
| | tan δ peak temperature | °C. | 80 | 100 | 106 | 109 | 130 | 101 |
| | Surface gloss | % | 45 | 63 | 45 | 37 | 66 | 47 |
| | MD during molding | | A | A | B | B | A | A |
| | Flexural modulus retention ratio after water absorption | % | 67 | 81 | 97 | 92 | 100 | 100 |
| | Tensile strength | MPa | 240 | 269 | 251 | 261 | 233 | 249 |
| | 80° C. tensile strength | MPa | 150 | 119 | 145 | 147 | 113 | 155 |

As illustrated in Table 1-1, in Examples 1-1 to 1-9 in which a polyamide composition of an aspect described above was molded, the polyamide composition containing 50 to 99 parts by mass of an aliphatic polyamide (1A) and 1 to 50 parts by mass of a semi-aromatic polyamide (1B) containing a dicarboxylic acid unit that included at least 75 mol % of isophthalic acid and a diamine unit that included at least 50 mol % of a diamine of 4 to 10 carbon atoms, wherein the tan δ peak temperature of the polyamide composition was at least 90° C., and the weight average molecular weight Mw of the polyamide composition satisfied 15,000≤Mw≤35,000, the surface appearance, the degree of MD during retention, and the flexural modulus retention ratio after water absorption were particularly superior compared with Comparative Example 1-1 which used only a PA66, Comparative Example 1-2 which used a copolymer of a PA66 and a PA6I, Comparative Example 1-3 which used a mixture of a PA66 and a polyamide 6I (Mw=44,000), but in which the weight average molecular weight Mw of the composition exceeded 35,000, Comparative Example 1-4 which used a mixture of a polyamide 66 and a copolymer of a polyamide 6I and a polyamide 6T (6I/6T), but in which the weight average molecular weight Mw of the composition exceeded 35,000, Comparative Example 1-5 which contained less than 50 parts by mass of the aliphatic polyamide, and Comparative Example 1-6 in which the weight average molecular weight Mw of the composition exceeded 35,000.

Examples 2-1 to 2-4, Comparative Examples 2-1 to 2-7

(Constituent Components)
[(2A) Aliphatic Polyamides]
    2A-1: a polyamide 66 (the same polyamide as 1A-1 above was used)
    2A-2: a polyamide 6 (SF1013A manufactured by Ube Industries, Ltd.)
[(2B) Semi-Aromatic Polyamides]
    2B-1: a polyamide 6I (the same polyamide as 1B-2 above was used)
    2B-2: a polyamide 6I (T40 manufactured by Lanxess AG, Mw=44,000, Mw/Mn=2.8, VR31, Mw/VR=1,419)
    2B-3: a polyamide 6I/6T (G21 manufactured by Ems Group, Mw=27,000, Mw/Mn=2.2, Mw/VR=1,000, VR27, Mw/VR=1,000, proportion of isophthalic acid in dicarboxylic acid units: 70 mol %)
    2B-4: a polyamide 6I (high molecular weight)
    2B-5: a polyamide 66/6I (the same polyamide as 1B-1 above was used)
[(2C) Pigment]
    (2C) Zinc sulfide (ZnS) (SACHTOLITH HD-S) was used.
[(2D1) Flame Retardant]
    (2D1) A brominated polystyrene (product name "SAYTEX (a registered trademark) HP-7010G" manufactured by Albemarle Corporation (bromine content as determined by elemental analysis: 63% by mass)) was used.
[(2D2) Flame Retardant Auxiliary]
    (2D2) Diantimony trioxide (product name "Antimony Trioxide" manufactured by Daiichi F. R. co., Ltd.) was used.
[(2E) Polymer Containing an α,β-Unsaturated Dicarboxylic Acid Anhydride as Structural Unit]
    (2E) A maleic anhydride-modified polyphenylene ether was used.
[(2F) Filler]
    (2F) Glass fiber (GF) (product name "ECS03T275H" manufactured by Nippon Electric Glass Co., Ltd., average fiber diameter: 10 μmφ, cut length: 3 mm) was used.
[Production of Polyamides]
Next is a description of the methods used for producing the semi-aromatic polyamide (2B) (2B-4) and the polymer (2E) containing an α,β-unsaturated dicarboxylic acid anhydride as a structural unit.
(2B-4: Polyamide 6I)
The polyamide polymerization reaction was performed by a "hot melt polymerization method" in the manner described below.
First, 1,500 g of an equimolar salt of isophthalic acid and hexamethylenediamine and a 1.0 mol % excess of adipic acid relative to the total mass of the equimolar salt component were dissolved in 1,500 g of distilled water to prepare an equimolar 50% by mass homogenous aqueous solution of raw material monomers.

With the solution being stirred at a temperature of 110 to 150° C., steam was gradually extracted and the solution concentration was concentrated to 70% by mass. Subsequently, the internal temperature was raised to 220° C. At this time, the pressure inside the autoclave increased to 1.8 MPa. In this state, steam was gradually extracted to maintain the pressure at 1.8 MPa, and the reaction was continued for one hour until the internal temperature reached 245° C.

Next, the pressure was reduced over a period of 30 minutes. Subsequently, the inside of the autoclave was held for 10 minutes at a reduced pressure of 650 torr (86.66 kPa) using a vacuum device. At this time, the final internal temperature of the polymerization was 265° C.

Subsequently, the autoclave was pressurized with nitrogen, and the polymer was discharged in a strand-like form through a lower spinneret (nozzle), cooled in water and subjected to cutting to form pellets, and the pellets were then dried at 100° C. under a nitrogen atmosphere for 12 hours to obtain a polyamide. Mw was 25,000, Mw/Mn was 2.1, VR was 16, Mw/VR was 1,563, and the proportion of isophthalic acid among the dicarboxylic acid units was 100 mol %.

(2E: Maleic Anhydride-Modified Polyphenylene Ether)
One hundred parts by mass of a poly(2,6-dimethyl-1,4-phenylene ether) (hereafter abbreviated as "the polyphenylene ether") having a reduced viscosity (measured in a 0.5 g/dl chloroform solution at 30° C.) of 0.52 obtained by oxidative polymerization of 2,6-dimethylphenol and 1.0 parts by mass of maleic anhydride as a compatibilizer were supplied to a twin-screw extruder (ZSK-40, manufactured by Werner & Pfleiderer GmbH) having supply ports at a single upstream location (hereafter abbreviated as "top-F") and two other locations in the central portion of the extruder and a downstream location close to the die (hereafter the location in the central portion of the extruder is abbreviated as "side-1" and the downstream location near the die is abbreviated as "side-2"), with a dry blend of the polyphenylene ether and the maleic anhydride supplied from top-F, with side-1 and side-2 closed, under conditions including a cylinder set temperature of 320° C., a screw rotational rate of 300 rpm, and a discharge rate of 20.15 kg/hr, and following melt kneading, the polymer was discharged in a strand-like form, cooled in a strand bath (water bath) and pelletized using a cutter, thus obtaining pellets of a maleic anhydride-modified polyphenylene ether.

[Production of Polyamide Compositions]
Using the above aliphatic polyamide (2A) and semi-aromatic polyamides (2B) in the formulations and proportions shown below in Table 2-1, polyamide compositions were produced in the manner described below.

The polyamides obtained above were dried under a stream of nitrogen to reduce the moisture content to about 0.2% by mass before being used as raw materials for the polyamide compositions.

Melt kneading was performed in accordance with the method of the examples described below to obtain pellets of the polyamide composition. The obtained pellets of the polyamide composition were dried under a stream of nitrogen to reduce the moisture content within the polyamide composition to not more than 500 ppm.

[Measurement Methods for Physical Properties of Polyamide Compositions]

Using the polyamide compositions for which the moisture content had been adjusted, each of the following evaluations was performed. The evaluation results are shown below in Table 2-1.

<Tan δ Peak Temperature>

Using a PS40E injection molding machine manufactured by Nissei Plastic Industrial Co., Ltd., with the cylinder temperature set to 290° C. and the mold temperature set to 100° C., a molded body was molded in accordance with JIS-K7139 under injection conditions including an injection time of 10 seconds and a cooling time of 10 seconds. This molded body was measured under the following conditions using a dynamic viscoelasticity evaluation device (EPLEXOR 500N, manufactured by Gabo GmbH). Measurement mode: tensile, measurement frequency: 8.00 Hz, rate of temperature increase: 3° C./min, temperature range: −100 to 250° C. The ratio E2/E1 between the storage modulus E1 and the loss modulus E2 was recorded as tan δ, and the highest temperature was deemed the tan δ peak temperature.

<Molecular Weight and Ends of Polyamides>

(Polyamide Molecular Weight (Mn, Mw/Mn))

The Mw (weight average molecular weight)/Mn (number average molecular weight) values of the polyamides obtained in the examples and comparative examples were calculated using the values for Mw and Mn measured by GPC (gel permeation chromatography using an HLC-8020 device manufactured by Tosoh Corporation, using hexafluoroisopropanol solvent and calculated against PMMA (polymethyl methacrylate) standard samples (manufactured by Polymer Laboratories Ltd.)). For the GPC columns, TSKgel GMHHR-M and G1000HHR columns were used.

(Amount of Amino Ends ([NH2]))

In the polyamides obtained in the examples and comparative examples, the amount of amino ends bonded to polymer ends was measured by a neutralization titration in the manner described below.

First, 3.0 g of the polyamide was dissolved in 100 mL of a 90% by mass aqueous solution of phenol, and using the thus obtained solution, a titration was performed with 0.025 N hydrochloric acid to determine the amount of amino ends (μeq/g). The end point was determined using the reading from a pH meter.

(Amount of Carboxyl Ends ([COOH]))

In the polyamides obtained in the examples and comparative examples, the amount of carboxyl ends bonded to polymer ends was measured by a neutralization titration in the manner described below.

First, 4.0 g of the polyamide was dissolved in 50 mL of benzyl alcohol, and using the thus obtained solution, a titration was performed with 0.1 N NaOH to determine the amount of carboxyl ends (μeq/g). The end point was determined by the change in color of a phenolphthalein indicator.

Based on the amount of amino ends ([NH$_2$]) and the amount of carboxyl ends ([COOH]) measured above, the total amount of active ends ([NH$_2$]+[COOH]) and the ratio of the amount of amino ends relative to the total amount of active ends ([NH$_2$]/[(NH$_2$]+[COOH])) were calculated.

<Formic Acid Solution Viscosity VR>

The polyamide was dissolved in formic acid, and the viscosity was measured in accordance with JIS K6810.

<Evaluation of Moldability and External Appearance>

An "FN3000" apparatus manufactured by Nissei Plastic Industrial Co., Ltd. was used.

With the cylinder temperature set to 290° C. and the mold temperature set to 100° C., molding was conducted for 100 shots using the polyamide resin composition under injection molding conditions including an injection time of 10 seconds and a cooling time of 10 seconds, thus obtaining molded bodies (ISO test pieces).

The moldability was evaluated on the basis of the mold releasability following molding, and a case in which the proportion of molded bodies that stuck to the mold across the 100 shots was 10% or less was evaluated as A, a proportion of greater than 10% but not more than 20% was evaluated as B, a proportion of greater than 20% but not more than 50% was evaluated as C, and a proportion exceeding 50% was evaluated as D.

Further, in terms of the external appearance of the obtained molded bodies, a surface gloss of 60 or higher was evaluated as A, a surface gloss of at least 55 but not more than 59 was evaluated as B, a surface gloss of at least 50 but not more than 54 was evaluated as C, and a surface gloss lower than 50 was evaluated as D.

<Evaluation of Flame Retardancy>

Measurements were performed using the method UL94 (a standard prescribed by Underwriters Laboratories Inc., USA). The test piece (length: 127 mm, width: 12.7 mm, thickness: 1.6 mm) was prepared by fitting a mold for the UL test piece (mold temperature=100° C.) to an injection molding machine (PS40E manufactured by Nissei Plastic Industrial Co., Ltd.) and molding the polyamide resin composition at a cylinder temperature of 290° C. The injection pressure was set to a value of the complete filling pressure when molding the UL test piece+2%. The flame retardancy classifications used were those prescribed in the UL94 standard (vertical flame test).

<Weld Strength>

A test piece was obtained by conducting molding using an injection molding machine (PS40E manufactured by Nissei Plastic Industrial Co., Ltd.) fitted with a mold having a shape with dimensions of length: 127 mm, width: 12.7 mm and thickness: 1.6 mm, wherein the melted resin was injected from both lengthwise ends of the mold so as to form a weld in the central portion of the lengthwise direction. This molded test piece was subjected to a tensile test using the method prescribed in ASTM D638, with the exception of altering the chuck separation distance to 50 mm and the tension rate to 50 mm/min, thus determining the tensile strength. Further, the test piece was left to stand in a constant-temperature constant-humidity (23° C., 50% RH) environment, and once water absorption equilibrium had been reached, the tensile strength was again measured using the method prescribed in ASTM D638. The tensile strength retention ratio after water absorption was determined using the following formula.

Tensile strength retention ratio after water absorption (%)=tensile strength after water absorption/tensile strength before water absorption×100

<Rockwell Hardness>

An "FN3000" apparatus manufactured by Nissei Plastic Industrial Co., Ltd. was used.

With the cylinder temperature set to 290° C. and the mold temperature set to 100° C., molding was conducted using the polyamide resin composition under injection molding conditions including an injection time of 10 seconds and a cooling time of 10 seconds, thus obtaining a molded body (ISO test piece). The Rockwell hardness (M scale) was measured using a hardness meter (ARK-F3000 manufactured by Akashi Seisakusho, Ltd.). Further, the test piece was left to stand in a constant-temperature constant-humidity (23° C., 50% RH) environment, and once water absorption equilibrium had been reached, the Rockwell hardness was again measured. The Rockwell hardness retention ratio after water absorption was determined using the following formula.

Rockwell hardness retention ratio after water absorption (%)=Rockwell hardness after water absorption/Rockwell hardness before water absorption×100

Example 2-1

Using a TEM 35 mm twin-screw extruder manufactured by Toshiba Machine Co., Ltd. (temperature setting: front 280° C., screw rotational rate: 300 rpm), a mixture obtained by blending the polyamides (2A-1) and (2B-1), the pigment (2C), the flame retardant (2D1), the flame retardant auxiliary (2D2) and the polymer (2E) containing an α,β-unsaturated dicarboxylic acid anhydride as a structural unit was supplied to a top feed port provided in the most upstream portion of the extruder, the filler (2F) was supplied from a side feed port on the downstream side of the extruder (at a point where the resins supplied from the top feed port had reached a satisfactorily melted state), and the melt kneaded product extruded from the die head was cooled in a strand-like state and then pelletized to obtain pellets of the polyamide resin composition. The blend amounts were 17.5% by mass for the polyamide (2A-1), 9.5% by mass for the polyamide (2B-1), 2.0% by mass for the pigment (2C), 10.5% by mass for the flame retardant (2D1), 2.0% by mass for the flame retardant auxiliary (2D2), 3.5% by mass for the polymer (2E) containing an α,β-unsaturated dicarboxylic acid anhydride as a structural unit, and 55% by mass for the filler (2F).

Further, using the thus obtained polyamide resin composition, molded articles were produced using the methods described above, and evaluations of the moldability during molding, the external appearance, the weld strength, the Rockwell hardness and the flame retardancy were performed. The evaluation results are shown below in Table 2-1.

Example 2-2

With the exception of altering the blend amounts to include 16.2% by mass of the polyamide (2A-1) and 10.8% by mass of the polyamide (2B-1), production and evaluation were performed in the same manner as Example 2-1.

Example 2-3

With the exception of altering the blend amounts to include 16.5% by mass of the polyamide (2A-1), 11.0% by mass of the polyamide (2B-4), and 10.0% by mass of the flame retardant (2D1), production and evaluation were performed in the same manner as Example 2-1.

Example 2-4

With the exception of altering the blend amounts to include 14.8% by mass of the polyamide (2A-1) and 12.2% by mass of the polyamide (2B-1), production and evaluation were performed in the same manner as Example 2-1.

Comparative Example 2-1

With the exception of altering the blend amounts to include 27.5% by mass of the polyamide (2A-1), 0% by mass of the polyamide (2B-1), and 10.0% by mass of the flame retardant (2D1), production and evaluation were performed in the same manner as Example 2-1.

Comparative Example 2-2

With the exception of altering the blend amounts to include 0% by mass of the polyamide (2A-1), 27.5% by mass of the polyamide (2B-1), and 10.0% by mass of the flame retardant (2D1), production and evaluation were performed in the same manner as Example 2-1.

Comparative Example 2-3

With the exception of altering the blend amounts to include 0% by mass of the polyamide (2A-1), 22.5% by mass of the polyamide (2B-5), and 15.0% by mass of the flame retardant (2D1), production and evaluation were performed in the same manner as Example 2-1.

Comparative Example 2-4

With the exception of altering the blend amounts to include 22.0% by mass of the polyamide (2A-1), 9.5% by mass of the polyamide (2B-2), and 6.0% by mass of the flame retardant (2D1), production and evaluation were performed in the same manner as Example 2-1.

Comparative Example 2-5

With the exception of altering the blend amounts to include 18.4% by mass of the polyamide (2A-1), 12.1% by mass of the polyamide (2B-2), and 0% by mass of the polymer (2E) containing an α,β-unsaturated dicarboxylic acid anhydride as a structural unit, production and evaluation were performed in the same manner as Example 2-1.

Comparative Example 2-6

With the exception of altering the blend amounts to include 20.0% by mass of the polyamide (2A-1), 8.5% by mass of the polyamide (2B-3), and 9.0% by mass of the flame retardant (2D1), production and evaluation were performed in the same manner as Example 2-1.

Comparative Example 2-7

With the exception of altering the blend amounts to include 20.0% by mass of the polyamide (2A-2), 8.5% by mass of the polyamide (2B-3), and 9.0% by mass of the flame retardant (2D1), production and evaluation were performed in the same manner as Example 2-1.

TABLE 2-1

|  | Type | Units | Example 2-1 | Example 2-2 | Example 2-3 | Example 2-4 | Comparative Example 2-1 | Comparative Example 2-2 |
| --- | --- | --- | --- | --- | --- | --- | --- | --- |
| Aliphatic polyamide (2A) | 2A-1 | % by mass | 17.5 | 16.2 | 16.5 | 14.8 | 27.5 | |
|  | 2A-2 | % by mass | | | | | | |

TABLE 2-1-continued

| | Type | Units | | | | |
|---|---|---|---|---|---|---|
| Semi-aromatic polyamide (2B) | 2B-1 | % by mass | 9.5 | 10.8 | 12.2 | 27.5 |
| | 2B-2 | % by mass | | | | |
| | 2B-3 | % by mass | | | | |
| | 2B-4 | % by mass | | 11.0 | | |
| | 2B-5 | % by mass | | | | |
| Pigment (2C) | ZnS | % by mass | 2.0 | 2.0 | 2.0 | 2.0 | 2.0 | 2.0 |
| Flame retardant (2D1) | Br—PS | % by mass | 10.5 | 10.5 | 10.0 | 10.5 | 10.0 | 10.0 |
| Flame retardant auxiliary (2D2) | Sb₂O₃ | % by mass | 2.0 | 2.0 | 2.0 | 2.0 | 2.0 | 2.0 |
| Polymer (2E) containing an α,β-unsaturated dicarboxylic acid anhydride as a structural unit | Maleic anhydride-modified polyphenylene ether | % by mass | 3.5 | 35 | 3.5 | 3.5 | 3.5 | 3.5 |
| Filler (2F) | GF | % by mass | 55.0 | 55.0 | 55.0 | 55.0 | 55.0 | 55.0 |
| Total | | % by mass | 100.0 | 100.0 | 100.0 | 100.0 | 100.0 | 100.0 |
| PA physical properties in composition | tan δ peak temperature | °C. | 111 | 115 | 115 | 115 | 60 | 135 |
| | Mw | g/mol | 29,750 | 29,000 | 30,600 | 28,250 | 35,000 | 20,000 |
| | Mw(2A) − Mw(2B) | g/mol | 15,000 | 15,000 | 11,000 | 15,000 | — | — |
| | Mn 500 to 2000 | % by mass | 1.6 | 1.7 | 1.7 | 1.8 | 1.2 | 2.0 |
| | Mw/Mn | | 2.1 | 2.1 | 2.1 | 2.1 | 2.0 | 2.0 |
| | [NH₂]/([NH₂] + [COOH]) | | 0.33 | 0.32 | 0.32 | 0.32 | 0.38 | 0.24 |
| | moldability | | A | A | A | A | A | D |
| | external appearance | | A | A | A | A | D | A |
| | flame retardancy UL94 (1.6 mm) | | V-0 | V-0 | V-0 | V-0 | V-2 | V-0 |
| | weld strength (dry) | MPa | 71 | 64 | 64 | 62 | 90 | 60 |
| | weld strength (wet) | MPa | 61 | 58 | 58 | 60 | 45 | 50 |
| | weld strength (retention ratio) | % | 86 | 91 | 91 | 97 | 50 | 83 |
| | Rockwell hardness (dry) | | 100 | 101 | 101 | 102 | 100 | 103 |
| | Rockwell hardness (wet) | | 99 | 101 | 101 | 102 | 70 | 103 |
| | Rockwell hardness (retention ratio) | % | 99 | 100 | 100 | 100 | 70 | 100 |

| | Type | Units | Comparative Example 2-3 | Comparative Example 2-4 | Comparative Example 2-5 | Comparative Example 2-6 | Comparative Example 2-7 |
|---|---|---|---|---|---|---|---|
| Aliphatic polyamide (2A) | 2A-1 | % by mass | | 22.0 | 18.4 | 20.0 | |
| | 2A-2 | % by mass | | | | | 20.0 |
| Semi-aromatic polyamide (2B) | 2B-1 | % by mass | | | | | |
| | 2B-2 | % by mass | | 9.5 | 12.1 | | |
| | 2B-3 | % by mass | | | | 8.5 | 8.5 |
| | 2B-4 | % by mass | | | | | |
| | 2B-5 | % by mass | 22.5 | | | | |
| Pigment (2C) | ZnS | % by mass | 2.0 | 2.0 | 2.0 | 2.0 | 2.0 |
| Flame retardant (2D1) | Br—PS | % by mass | 15.0 | 6.0 | 10.5 | 9.0 | 9.0 |
| Flame retardant auxiliary (2D2) | Sb₂O₃ | % by mass | 2.0 | 2.0 | 2.0 | 2.0 | 2.0 |
| Polymer (2E) containing an α,β-unsaturated dicarboxylic acid anhydride as a structural unit | Maleic anhydride-modified polyphenylene ether | % by mass | 3.5 | 3.5 | 0.0 | 3.5 | 3.5 |
| Filler (2F) | GF | % by mass | 55.0 | 55.0 | 55.0 | 55.0 | 55.0 |
| Total | | % by mass | 100.0 | 100.0 | 100.0 | 100.0 | 100.0 |
| PA physical properties in composition | tan δ peak temperature | °C. | 100 | 106 | 110 | 109 | 106 |
| | Mw | g/mol | 32,000 | 40,800 | 42,000 | 50,000 | 28,860 |
| | Mw(2A) − Mw(2B) | g/mol | — | −8,600 | −8,600 | 8,400 | −600 |
| | Mn 500 to 2000 | % by mass | 1.0 | 1.2 | 1.2 | 1.4 | 1.6 |
| | Mw/Mn | | 2.0 | 2.4 | 2.4 | 2.4 | 2.2 |
| | [NH₂]/([NH₂] + [COOH]) | | 0.22 | 0.45 | 0.46 | 0.45 | 0.45 |
| | moldability | | B | A | A | A | A |
| | external appearance | | A | C | C | C | A |
| | flame retardancy UL94 (1.6 mm) | | V-0 | V-1 | V-1 | V-1 | V-1 |
| | weld strength (dry) | MPa | 63 | 71 | 55 | 73 | 63 |
| | weld strength (wet) | MPa | 38 | 56 | 45 | 58 | 48 |
| | weld strength (retention ratio) | % | 60 | 79 | 82 | 79 | 76 |
| | Rockwell hardness (dry) | | 100 | 100 | 101 | 100 | 90 |
| | Rockwell hardness (wet) | | 92 | 98 | 101 | 98 | 80 |
| | Rockwell hardness (retention ratio) | % | 92 | 98 | 100 | 98 | 89 |

As is evident from the results shown in Table 2-1, in each of the polyamide compositions of the present invention, the dicarboxylic acid units of the semi-aromatic polyamide (2B) included at least 75 mol % of isophthalic acid, and therefore the tan δ peak temperature of the polyamide composition increased. As a result, the molded articles of the polyamide compositions of Examples 2-1 to 2-4 had excellent flame retardancy, as well as superior weld strength and Rockwell hardness. Furthermore, because the weight average molecular weight Mw of the polyamide composition was within the range 10,000≤Mw≤40,000, excellent moldability and external appearance were obtained in addition to the above properties.

In contrast, Comparative Example 2-1 did not contain the semi-aromatic polyamide (2B), and in Comparative Examples 2-3, 2-6 and 2-7, the dicarboxylic acid units of the semi-aromatic polyamide (2B) included less than 75 mol % of isophthalic acid, and therefore the molded articles of the polyamide compositions exhibited unsatisfactory flame retardancy, weld strength, Rockwell hardness, moldability and external appearance.

In Comparative Example 2-2, although the dicarboxylic acid units of the semi-aromatic polyamide (2B) included at least 75 mol % of isophthalic acid, because the aliphatic polyamide (2A) was not included, the balance between the external appearance and the flame retardancy, the weld strength and the Rockwell hardness was poor and unsatisfactory. In Comparative Example 2-4, although the dicarboxylic acid units of the semi-aromatic polyamide (2B) included at least 75 mol % of isophthalic acid, because the weight average molecular weight Mw was large, the balance between the external appearance and the flame retardancy, the weld strength and the Rockwell hardness was poor and unsatisfactory. In Comparative Example 2-5, although the dicarboxylic acid units of the semi-aromatic polyamide (2B) included at least 75 mol % of isophthalic acid, because the weight average molecular weight Mw was large and the polymer (2E) containing an α,β-unsaturated dicarboxylic acid anhydride as a structural unit was not included, the balance between the physical properties of the polyamide composition molded articles was unsatisfactory.

Examples 3-1 to 3-7, Comparative Examples 3-1 to 3-9

(Constituent Components)
[(3A) Aliphatic Polyamides]
3A-1: a polyamide 66 (the same polyamide as 1A-1 above was used)
3A-2: a polyamide 6 (SF1013A manufactured by Ube Industries, Ltd.), Mw=26,000, Mw/Mn=2.0
[(3B) Semi-Aromatic Polyamides]
3B-1: a polyamide 6I (the same polyamide as 1B-2 above was used)
3B-2: a polyamide 6I (T40 manufactured by Lanxess AG, Mw=44,000, Mw/Mn=2.8, VR31, Mw/VR=1,419, proportion of isophthalic acid in dicarboxylic acid units: 100 mol %)
3B-3: a polyamide 6I/6T (G21 manufactured by Ems Group, Mw=27,000, Mw/Mn=2.2, VR27, Mw/VR=1,000, proportion of isophthalic acid in dicarboxylic acid units: 70 mol %)
3B-4: a polyamide 6I (high molecular weight) (the same polyamide as 2B-4 above was used)
3B-5: a polyamide 66/6I (the same polyamide as 1B-1 above was used)
3B-6: a polyamide MXD6 (T-600, a Toyobo Nylon manufactured by Toyobo Co., Ltd., proportion of isophthalic acid in dicarboxylic acid units: 0 mol %)
[(3C1) Flame Retardant]
(3C1) A brominated polystyrene (product name "SAYTEX (a registered trademark) HP-7010G" manufactured by Albemarle Corporation (bromine content as determined by elemental analysis: 67% by mass)) was used.
[(3C2) Flame Retardant Auxiliary]
(3C2) Diantimony trioxide (product name "Antimony Trioxide" manufactured by Daiichi F. R. co., Ltd.) was used.
[(3D) Polymer Containing an α,β-Unsaturated Dicarboxylic Acid Anhydride as Structural Unit]
(3D) A maleic anhydride-modified polyphenylene ether was used (the same compound as 2E above was used).
[(3E) Filler]
(3E) Glass fiber (GF) (product name "ECS03T275H" manufactured by Nippon Electric Glass Co., Ltd., average fiber diameter: 10 μmφ, cut length: 3 mm) was used.
[Production of Polyamides]
Using the above aliphatic polyamides (3A) and semi-aromatic polyamides (3B) in the formulations and proportions shown below in Table 3-1, polyamide compositions were produced in the manner described below.

The polyamides obtained above were dried under a stream of nitrogen to reduce the moisture content to about 0.2% by mass before being used as raw materials for the polyamide compositions.

Pellets of the polyamide composition were obtained by performing melt kneading using the method described in the example below. The obtained pellets of the polyamide composition were dried under a stream of nitrogen to reduce the moisture content within the polyamide composition to not more than 500 ppm.
[Measurement Methods for Polyamide Compositions]
Using the polyamide compositions for which the moisture content had been adjusted, each of the following evaluations was performed. The evaluation results are shown below in Table 3-1.
<Tan δ Peak Temperature>
Using a PS40E injection molding machine manufactured by Nissei Plastic Industrial Co., Ltd., with the cylinder temperature set to 290° C. and the mold temperature set to 100° C., a molded body was molded in accordance with JIS-K7139 under injection conditions including an injection time of 10 seconds and a cooling time of 10 seconds. This molded body was measured under the following conditions using a dynamic viscoelasticity evaluation device (EPLEXOR 500N, manufactured by Gabo GmbH). Measurement mode: tensile, measurement frequency: 8.00 Hz, rate of temperature increase: 3° C./min, temperature range: −100 to 250° C. The ratio E2/E1 between the storage modulus E1 and the loss modulus E2 was recorded as tan δ, and the highest temperature was deemed the tan δ peak temperature.
<Molecular Weight and Ends of Polyamide Compositions>
(Polyamide Composition Molecular Weight (Mn, Mw/Mn))
The Mw (weight average molecular weight)/Mn (number average molecular weight) values of the polyamide compositions obtained in the examples and comparative examples were calculated using the values for Mw and Mn measured by GPC (gel permeation chromatography using an HLC-8020 device manufactured by Tosoh Corporation, using hexafluoroisopropanol solvent and calculated against PMMA (polymethyl methacrylate) standard samples (manufactured by Polymer Laboratories Ltd.)). For the GPC columns, TSKgel GMHHR-M and G1000HHR columns were used.

(Amount of Amino Ends ([NH$_2$]))

In the polyamide compositions obtained in the examples and comparative examples, the amount of amino ends bonded to polymer ends was measured by a neutralization titration in the manner described below.

First, 3.0 g of the polyamide composition was dissolved in 100 mL of a 90% by mass aqueous solution of phenol, and using the thus obtained solution, a titration was performed with 0.025 N hydrochloric acid to determine the amount of amino ends (µeq/g). The end point was determined using the reading from a pH meter.

(Amount of Carboxyl Ends ([COOH]))

In the polyamide compositions obtained in the examples and comparative examples, the amount of carboxyl ends bonded to polymer ends was measured by a neutralization titration in the manner described below.

First, 4.0 g of the polyamide composition was dissolved in 50 mL of benzyl alcohol, and using the thus obtained solution, a titration was performed with 0.1 N NaOH to determine the amount of carboxyl ends (µeq/g). The end point was determined by the change in color of a phenolphthalein indicator.

Based on the amount of amino ends ([NH$_2$]) and the amount of carboxyl ends ([COOH]) measured above, the total amount of active ends ([NH$_2$]+[COOH]) and the ratio of the amount of amino ends relative to the total amount of active ends ([NH$_2$]/[(NH$_2$]+[COOH])) were calculated.

<Formic Acid Solution Viscosity VR>

The semi-aromatic polyamide (3B) was dissolved in formic acid, and the viscosity was measured in accordance with ASTM-D789.

<Quantification of Halogen Content by Elemental Analysis>

The polyamide composition was incinerated in a flask that had been flushed with high-purity oxygen, the generated gas was captured using an absorbent, and the halogen element within the capture liquid was quantified by a potentiometric titration with 1/100 N silver nitrate solution.

In those cases where the composition included a plurality of halogen elements, each element was first separated by ion chromatography, and then quantified using the above potentiometric titration method.

<Evaluation of Moldability and External Appearance>

An "FN3000" apparatus manufactured by Nissei Plastic Industrial Co., Ltd. was used.

With the cylinder temperature set to 290° C. and the mold temperature set to 100° C., molding was conducted for 100 shots using the polyamide composition under injection molding conditions including an injection time of 10 seconds and a cooling time of 10 seconds, thus obtaining molded bodies (ISO test pieces).

The moldability was evaluated on the basis of the mold releasability following molding, and a case in which the proportion of molded bodies that stuck to the mold across the 100 shots was 10% or less was evaluated as A, a proportion of greater than 10% but not more than 20% was evaluated as B, a proportion of greater than 20% but not more than 50% was evaluated as C, and a proportion exceeding 50% was evaluated as D.

Further, in terms of the external appearance of the obtained molded bodies, the 60° gloss of the grip portion of each prepared molded body was measured in accordance with JIS-K7150 using a gloss meter (IG320, manufactured by Horiba, Ltd.). A surface gloss of 60 or higher was evaluated as A, a surface gloss of at least 55 but not more than 59 was evaluated as B, a surface gloss of at least 50 but not more than 54 was evaluated as C, and a surface gloss lower than 50 was evaluated as D.

<Measurement of Tensile Strength>

Using the ISO test pieces from shots 20 to 25 obtained in the above evaluation of the moldability and external appearance, the flexural modulus was measured in accordance with ISO 527. The average value of n=6 was recorded as the measured value.

<Measurement of Flexural Modulus>

Using the ISO test pieces from shots 20 to 25 obtained in the above evaluation of the moldability and external appearance, the flexural modulus was measured in accordance with ISO 178. The average value of n=6 was recorded as the measured value.

<Measurement of Charpy Impact Strength>

Using the ISO test pieces from shots 20 to 25 obtained in the above evaluation of the moldability and external appearance, the Charpy impact strength was measured in accordance with ISO 179. The average value of n=6 was recorded as the measured value.

<Evaluation of Flame Retardancy>

Measurements were performed using the method UL94 (a standard prescribed by Underwriters Laboratories Inc., USA). The test piece (length: 127 mm, width: 12.7 mm, thickness: 1.6 mm) was prepared by fitting a mold for the UL test piece (mold temperature=100° C.) to an injection molding machine (PS40E manufactured by Nissei Plastic Industrial Co., Ltd.) and molding the polyamide composition at a cylinder temperature of 290° C. The injection pressure was set to a value of the complete filling pressure when molding the UL test piece+2%. The flame retardancy classifications used were those prescribed in the UL94 standard (vertical flame test).

Example 3-1

Using a TEM 35 mm twin-screw extruder manufactured by Toshiba Machine Co., Ltd. (temperature setting: 280° C., screw rotational rate: 300 rpm), a mixture obtained by blending the polyamides (3A-1) and (3A-2), the flame retardant (3C1), the flame retardant auxiliary (3C2) and the polymer (3D) containing an α,β-unsaturated dicarboxylic acid anhydride as a structural unit was supplied to a top feed port provided in the most upstream portion of the extruder, the filler (3E) was supplied from a side feed port on the downstream side of the extruder (at a point where the resins supplied from the top feed port had reached a satisfactorily melted state), and the melt kneaded product extruded from the die head was cooled in a strand-like state and then pelletized to obtain pellets of the polyamide composition. The blend amounts were 18.8% by mass for the polyamide (3A-1), 10.2% by mass for the polyamide (3B-1), 10.5% by mass for the flame retardant (3C1), 2.0% by mass for the flame retardant auxiliary (3C2), 3.5% by mass for the polymer (3D) containing an α,β-unsaturated dicarboxylic acid anhydride as a structural unit, and 55% by mass for the filler (3E).

Further, using the thus obtained polyamide composition pellets, molded articles were produced using the methods described above, and evaluations of the moldability during molding, the external appearance, the tensile strength, the flexural modulus, the Charpy impact strength and the flame retardancy were performed. The evaluation results are shown below in Table 3-1.

Example 3-2

With the exception of altering the blend amounts to include 17.3% by mass of the polyamide (3A-1) and 11.7% by mass of the polyamide (3B-1), production and evaluation were performed in the same manner as Example 3-1.

Example 3-3

With the exception of altering the blend amounts to include 17.6% by mass of the polyamide (3A-1), 11.9% by mass of the polyamide (3B-1) and 10.0% by mass of the flame retardant (3C1), production and evaluation were performed in the same manner as Example 3-1.

Example 3-4

With the exception of altering the blend amounts to include 18.2% by mass of the polyamide (3A-1), 12.3% by mass of the polyamide (3B-1) and 9.0% by mass of the flame retardant (3C1), production and evaluation were performed in the same manner as Example 3-1.

Example 3-5

With the exception of altering the blend amounts to include 16.5% by mass of the polyamide (3A-1), 11.0% by mass of the polyamide (3B-1) and 12.0% by mass of the flame retardant (3C1), production and evaluation were performed in the same manner as Example 3-1.

Example 3-6

With the exception of altering the blend amounts to include 15.9% by mass of the polyamide (3A-1) and 13.1% by mass of the polyamide (3B-1), production and evaluation were performed in the same manner as Example 3-1.

Example 3-7

With the exception of altering the blend amounts to include 17.1% by mass of the polyamide (3A-1), 7.4% by mass of the polyamide (3B-3) and 15.0% by mass of the flame retardant (3C1), production and evaluation were performed in the same manner as Example 3-1.

Comparative Example 3-1

With the exception of altering the blend amounts to include 29.5% by mass of the polyamide (3A-1), 0% by mass of the polyamide (3B-1) and 10.0% by mass of the flame retardant (3C1), production and evaluation were performed in the same manner as Example 3-1.

Comparative Example 3-2

With the exception of altering the blend amounts to include 0% by mass of the polyamide (3A-1), 29.5% by mass of the polyamide (3B-1) and 10.0% by mass of the flame retardant (3C1), production and evaluation were performed in the same manner as Example 3-1.

Comparative Example 3-3

With the exception of altering the blend amounts to include 0% by mass of the polyamide (3A-1), 24.5% by mass of the polyamide (3B-5) and 15.0% by mass of the flame retardant (3C1), production and evaluation were performed in the same manner as Example 3-1.

Comparative Example 3-4

With the exception of altering the blend amounts to include 23.4% by mass of the polyamide (3A-1), 10.1% by mass of the polyamide (3B-2) and 6.0% by mass of the flame retardant (3C1), production and evaluation were performed in the same manner as Example 3-1.

Comparative Example 3-5

With the exception of altering the blend amounts to include 0% by mass of the polyamide (3A-1), 20.6% by mass of the polyamide (3A-2), 8.9% by mass of the polyamide (3B-3) and 10.0% by mass of the flame retardant (3C1), production and evaluation were performed in the same manner as Example 3-1.

Comparative Example 3-6

With the exception of altering the blend amounts to include 5.9% by mass of the polyamide (3A-1), 39.2% by mass of the polyamide (3B-6), 3.0% by mass of the flame retardant (3C1), 0% by mass of the polymer (3D) containing an α,β-unsaturated dicarboxylic acid anhydride as a structural unit, and 50 by mass of the filler (3E), production and evaluation were performed in the same manner as Example 3-1.

Comparative Example 3-7

With the exception of altering the blend amounts to include 21.9% by mass of the polyamide (3A-1), 14.6% by mass of the polyamide (3B-4) and 3.0% by mass of the flame retardant (3C1), production and evaluation were performed in the same manner as Example 3-1.

Comparative Example 3-8

With the exception of altering the blend amounts to include 5.7% by mass of the polyamide (3A-1), 3.8% by mass of the polyamide (3B-4) and 30.0% by mass of the flame retardant (3C1), production and evaluation were performed in the same manner as Example 3-1.

TABLE 3-1

| | Type | Units | Example 3-1 | Example 3-2 | Example 3-3 | Example 3-4 | Example 3-5 | Example 3-6 | Example 3-7 |
|---|---|---|---|---|---|---|---|---|---|
| Aliphatic polyamide (3A) | 3A-1 | % by mass | 18.8 | 17.3 | 17.6 | 18.2 | 16.5 | 15.9 | 17.1 |
| | 3A-2 | % by mass | | | | | | | |
| Semi-aromatic polyamide (3B) | 3B-1 | % by mass | 10.2 | 11.7 | | 12.3 | 11.0 | 13.1 | |
| | 3B-2 | % by mass | | | | | | | |
| | 3B-3 | % by mass | | | | | | | 7.4 |
| | 3B-4 | % by mass | | | 11.9 | | | | |
| | 3B-5 | % by mass | | | | | | | |
| | 3B-6 | % by mass | | | | | | | |

TABLE 3-1-continued

|  | Type |  | Units |  |  |  |  |  |  |  |
|---|---|---|---|---|---|---|---|---|---|---|
| Flame retardant (3C1) | Br—PS |  | % by mass | 10.5 | 10.5 | 10.0 | 9.0 | 12.0 | 10.5 | 15.0 |
| Flame retardant auxiliary (3C2) | Sb$_2$O$_3$ |  | % by mass | 2.0 | 2.0 | 2.0 | 2.0 | 2.0 | 2.0 | 2.0 |
| Polymer (3D) containing an α,β-unsaturated dicarboxylic acid anhydride as a structural unit | Maleic anhydride-modified polyphenylene ether |  | % by mass | 3.5 | 3.5 | 3.5 | 3.5 | 3.5 | 3.5 | 3.5 |
| Filler (3E) | GF |  | % by mass | 55.0 | 55.0 | 55.0 | 55.0 | 55.0 | 55.0 | 55.0 |
|  | Total |  | % by mass | 100.0 | 100.0 | 100.0 | 100.0 | 100.0 | 100.0 | 100.0 |
| Physical properties of polyamide composition | halogen content |  | % by mass | 7.0 | 7.0 | 6.7 | 6.0 | 8.0 | 7.0 | 10.1 |
|  | tan δ peak temperature |  | °C. | 111 | 115 | 115 | 112 | 117 | 115 | 109 |
|  | Mw |  | g/mol | 29,750 | 29,000 | 31,000 | 29,000 | 29,000 | 28,250 | 31,400 |
|  | Mw(3A) − Mw(3B) |  | g/mol | 15,000 | 15,000 | 10,000 | 15,000 | 15,000 | 15,000 | 8,000 |
|  | Mn 500 to 2000 |  | % | 1.6 | 1.7 | 1.7 | 1.7 | 1.7 | 1.8 | 1.4 |
|  | Mw/Mn |  |  | 2.1 | 2.1 | 2.1 | 2.1 | 2.1 | 2.1 | 2.4 |
|  | [NH$_2$]/([NH$_2$] + [COOH]) |  |  | 0.33 | 0.32 | 0.32 | 0.32 | 0.32 | 0.32 | 0.45 |
| Characteristics of polyamide composition | moldability |  |  | A | A | A | A | A | A | A |
|  | external appearance |  |  | A | A | A | A | A | A | C |
|  | flame retardancy UL94 (1.6 mm) |  |  | V-0 | V-0 | V-0 | V-0 | V-0 | V-0 | V-0 |
|  | tensile strength |  | MPa | 240 | 231 | 233 | 236 | 227 | 225 | 225 |
|  | flexural modulus |  | GPa | 20.0 | 20.4 | 20.5 | 20.0 | 21.3 | 21.0 | 21.6 |
|  | Charpy impact strength |  |  | 19.5 | 20.1 | 20.5 | 20.0 | 20.7 | 21.0 | 19.0 |

|  | Type |  | Units | Comparative Example 3-1 | Comparative Example 3-2 | Comparative Example 3-3 | Comparative Example 3-4 | Comparative Example 3-5 | Comparative Example 3-6 | Comparative Example 3-7 | Comparative Example 3-8 |
|---|---|---|---|---|---|---|---|---|---|---|---|
| Aliphatic polyamide (3A) | 3A-1 |  | % by mass | 29.5 |  |  | 23.4 |  | 5.9 | 21.9 | 5.7 |
|  | 3A-2 |  | % by mass |  |  |  |  | 20.6 |  |  |  |
| Semi-aromatic polyamide (3B) | 3B-1 |  | % by mass |  | 29.5 |  |  |  |  |  |  |
|  | 3B-2 |  | % by mass |  |  |  |  | 10.1 |  |  |  |
|  | 3B-3 |  | % by mass |  |  |  |  | 8.9 |  |  |  |
|  | 3B-4 |  | % by mass |  |  |  |  |  |  | 14.6 | 3.8 |
|  | 3B-5 |  | % by mass |  |  | 24.5 |  |  |  |  |  |
|  | 3B-6 |  | % by mass |  |  |  |  |  | 39.2 |  |  |
| Flame retardant (3C1) | Br—PS |  | % by mass | 10.0 | 10.0 | 15.0 | 6.0 | 10.0 | 3.0 | 3.0 | 30.0 |
| Flame retardant auxiliary (3C2) | Sb$_2$O$_3$ |  | % by mass | 2.0 | 2.0 | 2.0 | 2.0 | 2.0 | 2.0 | 2.0 | 2.0 |
| Polymer (3D) containing an α,β-unsaturated dicarboxylic acid anhydride as a structural unit | Maleic anhydride-modified polyphenylene ether |  | % by mass | 3.5 | 3.5 | 3.5 | 3.5 | 3.5 | 0.0 | 3.5 | 3.5 |
| Filler (3E) | GF |  | % by mass | 55.0 | 55.0 | 55.0 | 55.0 | 55.0 | 50.0 | 55.0 | 55.0 |
|  | Total |  | % by mass | 100.0 | 100.0 | 100.0 | 100.0 | 100.0 | 100.0 | 100.0 | 100.0 |
| Physical properties of polyamide composition | halogen content |  | % by mass | 6.7 | 6.7 | 10.1 | 4.0 | 6.7 | 2.0 | 2.0 | 20.1 |
|  | tan δ peak temperature |  | °C. | 60 | 135 | 100 | 106 | 96 | 120 | 110 | 107 |
|  | Mw |  | g/mol | 35,000 | 20,000 | 32,000 | 40,800 | 28,860 | 41,000 | 31,000 | 31,000 |
|  | Mw(3A) − Mw(3B) |  | g/mol | — | — | — | −9,000 | −1,000 | 0 | 10,000 | 10,000 |
|  | Mn 500 to 2000 |  | % | 1.2 | 2.0 | 1.0 | 1.2 | 1.6 | 1.5 | 1.7 | 1.7 |
|  | Mw/Mn |  |  | 2.0 | 2.0 | 2.0 | 2.4 | 2.2 | 2.2 | 2.1 | 2.1 |
|  | [NH$_2$]/([NH$_2$] + [COOH]) |  |  | 0.38 | 0.24 | 0.22 | 0.45 | 0.45 | 0.45 | 0.32 | 0.32 |
| Characteristics of polyamide composition | moldability |  |  | A | D | B | A | A | B | A | D |
|  | external appearance |  |  | D | A | A | C | A | A | A | D |
|  | flame retardancy UL94 (1.6 mm) |  |  | V-2 | V-0 | V-0 | V-1 | V-1 | V-1 | V-2 | V-0 |

TABLE 3-1-continued

|  |  |  |  |  |  |  |  |  |  |
|---|---|---|---|---|---|---|---|---|---|
| tensile strength | MPa | 210 | 200 | 219 | 225 | 210 | 186 | 231 | 180 |
| flexural modulus | GPa | 19.0 | 22.0 | 21.6 | 19.0 | 18.4 | 18.9 | 19.0 | 22.0 |
| Charpy impact strength |  | 17.0 | 15.0 | 18.1 | 19.0 | 18.5 | 6.8 | 21.0 | 15.0 |

As is evident from the results shown in Table 3-1, in each of the polyamide compositions of the present invention, the dicarboxylic acid units of the semi-aromatic polyamide (3B) included at least 50 mol % of isophthalic acid, and therefore the tan δ peak temperature of the polyamide composition increased. As a result, the molded articles of the polyamide compositions of Examples 3-1 to 3-7 had excellent properties including superior tensile strength, flexural modulus and Charpy impact strength. Further, by ensuring that the halogen content was greater than 2% by mass but not more than 20% by mass, excellent flame retardancy was achieved in addition to the above properties. Furthermore, because the weight average molecular weight Mw of the polyamide composition was within the range 10,000≤Mw≤40,000, excellent moldability and external appearance were obtained in addition to the above properties.

In contrast, Comparative Example 3-1 did not contain the semi-aromatic polyamide (3B), and in Comparative Example 3-3, the dicarboxylic acid units of the semi-aromatic polyamide (3B) included less than 50 mol % of isophthalic acid, and therefore the molded articles of the polyamide compositions exhibited unsatisfactory flame retardancy, tensile strength, flexural modulus, Charpy impact strength, moldability and external appearance.

In Comparative Example 3-2, although the dicarboxylic acid units of the semi-aromatic polyamide (3B) included at least 50 mol % of isophthalic acid, because the aliphatic polyamide (3A) was not included, the balance between the external appearance and the flame retardancy, the tensile strength, the flexural modulus and the Charpy impact strength was poor and unsatisfactory. In Comparative Example 3-4, although the dicarboxylic acid units of the semi-aromatic polyamide (3B) included at least 50 mol % of isophthalic acid, because the weight average molecular weight Mw was large, the balance between the external appearance and the flame retardancy, the tensile strength, the flexural modulus and the Charpy impact strength was poor and unsatisfactory. In Comparative Example 3-5, although the dicarboxylic acid units of the semi-aromatic polyamide (3B) included at least 50 mol % of isophthalic acid, because the tan δ peak temperature was lower than 100° C., the balance between the physical properties of the polyamide composition molded article was unsatisfactory.

In the Comparative Example 3-6, the dicarboxylic acid units of the semi-aromatic polyamide (3B) did not include isophthalic acid, the weight average molecular weight Mw was large, the halogen content was 2% by mass or less, and the polymer (3D) containing an α,β-unsaturated dicarboxylic acid anhydride as a structural unit was not included, and the balance between the physical properties of the polyamide composition molded articles was unsatisfactory.

In Comparative Example 3-7, although the dicarboxylic acid units of the semi-aromatic polyamide (3B) included at least 50 mol % of isophthalic acid, the halogen content was 2% by mass or less, whereas in Comparative Example 3-8, although the dicarboxylic acid units of the semi-aromatic polyamide (3B) included at least 50 mol % of isophthalic acid, the halogen content was greater than 20% by mass, and in both cases the balance between the physical properties of the polyamide composition molded articles was unsatisfactory.

Examples 4-1 to 4-3, Comparative Examples 4-1 to 4-3

In the following examples, 1 kg/cm² means 0.098 MPa.

First, the crystalline polyamide (4A), the amorphous semi-aromatic polyamides (4B), the polyphenylene ethers (4C), and the inorganic filler used in the examples and comparative examples are described below.

(4A) Crystalline Polyamide 4A-1: a polyamide 66, Mw=35,000, Mw/Mn=2 (the same polyamide as 1A-1 above was used)

(4B) Amorphous Semi-Aromatic Polyamides 4B-1: a polyamide 6I, Mw=20,000, Mw/Mn=2 (the same polyamide as 1B-2 above was used)

4B-2: a polyamide 6I T-40 (manufactured by Lanxess AG, Mw=44,000, Mw/Mn=2.8)

4B-3: a polyamide 6I/6T Grivory 21 (manufactured by Ems Group, Mw=27,000, Mw/Mn=2.2, proportion of isophthalic acid in dicarboxylic acid units: 70 mol %)

(4C) Polyphenylene Ether 4C-1: a polyphenylene ether (reduced viscosity (measured in a 0.5 g/dl chloroform solution at 30° C.): 0.52)

4C-2: a maleic anhydride-modified polyphenylene ether (the same compound as 2E above was used)

Inorganic Filler (1) Glass fiber, product name: ECS03T275H, manufactured by Nippon Electric Glass Co., Ltd., average fiber diameter: 10 μm (circular), cut length: 3 mm In the examples, the average fiber diameter of the glass fiber was measured in the manner described below.

First, the polyamide composition was placed in an electric furnace, and the organic matter contained in the polyamide composition was incinerated. From the residue obtained following this incineration treatment, at least 100 glass fibers were selected randomly and observed using a scanning electron microscope (SEM), and the fiber diameter of each of these glass fibers was measured to determine the number-average fiber diameter.

The crystalline polyamide (4A) and the amorphous semi-aromatic polyamides (4B) used in these examples and comparative examples were produced by appropriate use of (a) and (b) below.

((a) Dicarboxylic acids)

(1) Adipic acid (ADA) (manufactured by Wako Pure Chemical Industries, Ltd.)

(2) Isophthalic acid (IPA) (manufactured by Wako Pure Chemical Industries, Ltd.)

((b) Diamine)

(1) 1,6-diaminohexane (hexamethylenediamine) (C6DA) (manufactured by Tokyo Chemical Industry Co., Ltd.)

[Production of Polyamides]

Examples 4-1 to 4-3, and Comparative Examples 4-1 to 4-3

Using the above crystalline polyamide (4A), amorphous semi-aromatic polyamides (4B) and polyphenylene ethers (4C) in the formulations and proportions shown below in Table 4-1, polyamide compositions were produced in the manner described below.

The polyamides obtained above were dried under a stream of nitrogen to reduce the moisture content to about 0.2% by mass before being used as raw materials for the polyamide compositions.

A twin-screw extruder "ZSK-26MC" manufactured by Coperion GmbH (Germany) was used as the polyamide composition production apparatus.

The twin-screw extruder had an upstream supply port on the first barrel from the upstream side of the extruder, had a downstream first supply port on the sixth barrel, and had a downstream second supply port on the ninth barrel. Further, in the twin-screw extruder, L/D was 48, and the number of barrels was 12.

In the twin-screw extruder, the temperature from the upstream supply port to the die was set to the melting point Tm2 of the polyamide (4A-1)+20° C., the screw rotational rate was set to 250 rpm, and the discharge rate was set to 25 kg/h.

The crystalline polyamide (4A), the amorphous semi-aromatic polyamide (4B) and the polyphenylene ether (4C) were dry-blended using the formulations and proportions shown below in Table 4-1 and then supplied to the upstream supply port of the twin-screw extruder, the glass fiber (GF) was supplied as an inorganic filler from the downstream first supply port of the twin-screw extruder, and the melt-kneaded product extruded from the die head was cooled in a strand-like form and then pelletized to obtain pellets of a polyamide composition (containing glass fiber).

The obtained pellets of the polyamide composition were dried under a stream of nitrogen to reduce the moisture content within the polyamide composition to not more than 500 ppm.

[Measurement Methods for Polyamide Compositions]

Using the polyamide compositions for which the moisture content had been adjusted, each of the following evaluations was performed. The evaluation results are shown below in Table 4-1.

(1) Melting Peak Temperature Tm2 (Melting Point), Crystallization Peak Temperature Tc, and Crystallization Enthalpy These values were measured using a Diamond-DSC device manufactured by PerkinElmer, Inc., in accordance with JIS-K7121. Specifically, measurements were performed in the following manner.

First, under a nitrogen atmosphere, a sample of about 10 mg was heated from room temperature to a temperature of 300 to 350° C., depending on the melting point of the sample, at a rate of temperature increase of 20° C./min. The highest peak temperature of the endothermic peak (melting peak) that appeared during this process was recorded as Tm1 (° C.). Next, the temperature was maintained at the maximum heating temperature for two minutes. At this maximum temperature, the polyamides existed in a melted state. Subsequently, the sample was cooled to 30° C. at a rate of temperature reduction of 20° C./min. The exothermic peak that appeared during this process was deemed the crystallization peak, the crystallization peak temperature was recorded as Tc, and the surface area of the crystallization peak was deemed the crystallization enthalpy ΔH (J/g). Subsequently, the sample was held at 30° C. for two minutes, and was then heated from 30° C. to a temperature of 280 to 300° C., depending on the melting point of the sample, at a rate of temperature increase of 20° C./min. The highest peak temperature of the endothermic peak (melting peak) that appeared during this process was deemed the melting point Tm2 (° C.).

(2) Tan δ Peak Temperature

Using a viscoelasticity measuring and analysis device (DVE-V4, manufactured by Rheology Co., Ltd.), a temperature variance spectrum of the dynamic viscoelasticity of a test piece prepared by cutting the parallel portion of a Type L test piece prescribed in ASTM D1822 into a short strip was measured under the conditions described below. The dimensions of the test piece were 3.1 mm (width)×2.9 mm (thickness)×15 mm (length: distance between clamps).

Measurement mode: tensile, waveform: sine wave, frequency: 3.5 Hz, temperature range: 0° C. to 180° C., temperature increase steps: 2° C./min, static load: 400 g, displacement amplitude: 0.75 μm. The ratio E2/E1 between the storage modulus E1 and the loss modulus E2 was recorded as tan δ, and the highest temperature was deemed the tan δ peak temperature.

(3) Mw (Weight Average Molecular Weight), Mn (Number Average Molecular Weight), Molecular Weight Distribution Mw/Mn, Mw(4A)–Mw(4B)

The Mw (weight average molecular weight), Mn (number average molecular weight), Mw(4A) and Mw(4B) were measured by GPC (gel permeation chromatography using an HLC-8020 device manufactured by Tosoh Corporation, using hexafluoroisopropanol solvent and calculated against PMMA (polymethyl methacrylate) standard samples (manufactured by Polymer Laboratories Ltd.)). Based on these values, Mw(4A)–Mn(4B) and the molecular weight distribution Mw/Mn were calculated. The amount (% by mass) of compounds having a number average molecular weight Mn of at least 500 but not more than 2,000 was calculated from the elution curve (vertical axis: signal strength obtained from detector, horizontal axis: elution time) of each sample obtained using GPC, based on the surface area of the region bounded by the baseline and the elution curve for number average molecular weights from at least 500 to less than 2,000, and the surface area of the entire region bounded by the baseline and the elution curve.

(4) Amount of Amino Ends ([$NH_2$])

The amount of amino ends bonded to polymer ends was measured by a neutralization titration in the manner described below.

First, 3.0 g of the polyamide was dissolved in 100 mL of a 90% by mass aqueous solution of phenol, and using the thus obtained solution, a titration was performed with 0.025 N hydrochloric acid to determine the amount of amino ends (μeq/g). The end point was determined using the reading from a pH meter.

(5) Amount of Carboxyl Ends ([COOH])

The amount of carboxyl ends bonded to polymer ends was measured by a neutralization titration in the manner described below.

First, 4.0 g of the polyamide was dissolved in 50 mL of benzyl alcohol, and using the thus obtained solution, a titration was performed with 0.1 N NaOH to determine the amount of carboxyl ends (μeq/g). The end point was determined by the change in color of a phenolphthalein indicator.

Based on the amount of amino ends ([$NH_2$]) and the amount of carboxyl ends ([COOH]) measured in (4) and (5) above, the value of [NH2]/([NH2]+[COOH]) was calculated.

(6) Surface Gloss

A flat plate molded piece was produced in the following manner.

Using an injection molding machine [NEX50III-5EG, manufactured by Nissei Plastic Industrial Co., Ltd.] with the cooling time set to 25 seconds, the screw rotational rate set to 200 rpm, the mold temperature set to the tan δ peak temperature+5° C., and the cylinder temperature set to (Tm2+10°) C to (Tm2+30°) C, the injection pressure and injection speed were adjusted appropriately to achieve a fill time of 1.6+0.1 seconds, and a flat plate molded piece (6 cm×9 cm, thickness: 2 mm) was produced.

The 60° gloss of the central portion of the flat plate molded piece prepared in this manner was measured in accordance with JIS-K7150 using a gloss meter (IG320, manufactured by Horiba, Ltd.).

A larger measured value was adjudged to indicate more superior surface appearance.

(7) MD (Mold Deposits) During Molding

The molding described above in (6) was repeated for 100 consecutive shots, and following completion of the molding, the gas vent was inspected visually.

The evaluation criteria for gas generation during molding were as listed below. The ability to obtain molded articles without problems was evaluated as leading to an improvement in productivity.

(Evaluation Criteria)
A: no deposits observed on gas vent
B: some deposits observed on gas vent
C: deposits observed on gas vent, with a blockage beginning to occur
D: deposits observed on gas vent, with vent blocked (8) Tensile Strength Using an injection molding machine [PS-40E, manufactured by Nissei Plastic Industrial Co., Ltd.], molded pieces of the multipurpose test piece type A were molded in accordance with ISO 3167. The specific molding conditions included an injection+holding time of 25 seconds, a cooling time of 15 seconds, a mold temperature of 80° C., and a melted resin temperature set to the high temperature-side melting peak temperature (Tm2) for the polyamides+20° C.

Using the thus obtained molded piece of multipurpose test piece type A, a tensile test was performed in accordance with ISO 527 under conditions including temperature conditions of 80° C. and a tension rate of 50 mm/min, thereby measuring the tensile yield stress, which was recorded as the tensile strength.

(9) Weld Strength

A test piece was obtained by conducting molding using an injection molding machine (PS40E manufactured by Nissei Plastic Industrial Co., Ltd.) fitted with a mold having a shape with dimensions of length: 127 mm, width: 12.7 mm and thickness: 1.6 mm, wherein the melted resin was injected from both lengthwise ends of the mold so as to form a weld in the central portion of the lengthwise direction. This molded test piece was subjected to a tensile test using the method prescribed in ASTM D638, with the exception of altering the chuck separation distance to 50 mm and the tension rate to 50 mm/min, thus determining the tensile strength.

(10) Flexural Modulus (80° C.) after Water Absorption

An ISO dumbbell with a thickness of 4 mm was prepared and used as a test piece. The ISO dumbbell was left to stand in a constant-temperature constant-humidity (23° C., 50% RH) environment, and once water absorption equilibrium had been reached, the flexural modulus was measured in accordance with ISO 178 under temperature conditions of 80° C.

TABLE 4-1

| | Type | Units | Example 4-1 | Example 4-2 | Example 4-3 | Comparative Example 4-1 | Comparative Example 4-2 | Comparative Example 4-3 |
|---|---|---|---|---|---|---|---|---|
| Polyamide (4A) | 4A-1 | parts by mass | 67 | 60 | 67 | 70 | 67 | 67 |
| Polyamide (4B) | 4B-1 | parts by mass | 29 | 26 | 29 | 30 | | |
| | 4B-2 | parts by mass | | | | | 29 | |
| | 4B-3 | parts by mass | | | | | | 29 |
| Polyphenylene ether (4C) | 4C-1 | parts by mass | 5 | 15 | | 0 | 5 | 5 |
| | 4C-2 | parts by mass | | | 5 | | | |
| Inorganic filler | GF | parts by mass | 150 | 150 | 150 | 150 | 150 | 150 |
| Physical properties of polyamide composition | Tm2 | ° C. | 257 | 257 | 257 | 257 | 257 | 259 |
| | Tc | ° C. | 210 | 210 | 210 | 210 | 210 | 217 |
| | Crystallization enthalpy | J/g | 21.0 | 21.0 | 21.0 | 21.0 | 20.3 | 20.5 |
| | tan δ peak temperature | ° C. | 111 | 111 | 111 | 111 | 106 | 109 |
| | Mw | | 32,000 | 32,000 | 32,000 | 32,000 | 38,000 | 37,000 |
| | Mw(4A) − Mw(4B) | | 15,000 | 15,000 | 15,000 | 15,000 | −9,000 | 8,000 |
| | Mn 500 to 2000 | % | 1.6 | 1.6 | 1.6 | 1.6 | 1.2 | 1.3 |
| | Mw/Mn | | 2.1 | 2.1 | 2.1 | 2.1 | 2.5 | 2.4 |
| | [NH$_2$]/([NH$_2$] + [COOH]) | | 0.30 | 0.30 | 0.30 | 0.30 | 0.45 | 0.45 |
| | Surface gloss | % | 56 | 51 | 58 | 61 | 39 | 29 |
| | MD during molding | | B | C | A | A | C | C |
| | 80° C. tensile strength | MPa | 167 | 172 | 175 | 162 | 145 | 147 |
| | Weld strength | | 86 | 88 | 91 | 92 | 88 | 84 |
| | Flexural modulus (80° C.) after water absorption | GPa | 10.6 | 11.1 | 11.5 | 9.8 | 10.4 | 10.6 |

As shown in Table 4-1, in Example 4-1 in which was formed a polyamide composition of the present invention containing the crystalline polyamide (4A), the amorphous semi-aromatic polyamide (4B) containing a dicarboxylic acid unit that included at least 75 mol % of isophthalic acid and a diamine unit that included at least 50 mol % of a diamine of 4 to 10 carbon atoms, and the polyphenylene ether (4C), wherein the tan δ peak temperature of the polyamide composition was at least 90° C., and the weight average molecular weight Mw of the polyamide composition satisfied 15,000≤Mw≤35,000, the surface appearance, the degree of MD during molding, the tensile strength and the flexural modulus after water absorption were particularly superior compared with Comparative Example 4-1 which did not contain the polyphenylene ether (4C), and Comparative Examples 4-2 and 4-3 which although containing the crystalline polyamide (4A), the amorphous semi-aromatic polyamide (4B) and the polyphenylene ether (4C), had a weight average molecular weight Mw for the polyamide composition that exceeded 35,000.

Examples 5-1 to 2-4, Comparative Examples 2-1 to 2-7

<Constituent Components>
[(5A) Aliphatic Polyamides]
5A-1: a polyamide 66 (the same polyamide as 1A-1 above was used)
5A-2: a polyamide 6 (SF1013A manufactured by Ube Industries, Ltd., Mw=26,000, Mw/Mn=2.0)
The above polyamides were dried under a stream of nitrogen to reduce the moisture content to about 0.2% by mass before being used as raw materials for the polyamide compositions.
[(5B) Semi-Aromatic Polyamides]
5B-1: a polyamide 6I (the same polyamide as 1B-2 above was used)
5B-2: a polyamide 6I/6T (G21 manufactured by Ems Group, Mw=27,000, Mw/Mn=2.2, VR=27, Mw/VR=1,000, proportion of isophthalic acid in dicarboxylic acid units: 70 mol %)
5B-3: a polyamide 6I (high molecular weight) (the same polyamide as 2B-4 above was used)
5B-4: a polyamide 66/6I (the same polyamide as 1B-1 above was used)
5B-5: a polyamide MXD6 (product name: Toyobo Nylon T-600, manufactured by Toyobo Co., Ltd., proportion of isophthalic acid in dicarboxylic acid units: 0 mol %)
The above polyamides were dried under a stream of nitrogen to reduce the moisture content to about 0.2% by mass before being used as raw materials for the polyamide compositions.
[(5C1) Flame Retardant]
5C1: a brominated polystyrene (product name "SAYTEX (a registered trademark) HP-7010G" manufactured by Albemarle Corporation (bromine content as determined by elemental analysis: 67% by mass))
[(5C2) Flame Retardant Auxiliary]
5C2: Diantimony trioxide (product name "Antimony Trioxide" manufactured by Daiichi F. R. co., Ltd.)
[(5D) White Pigment]
5D: Zinc sulfide (ZnS) (SACHTOLITH HD-S)
[(5E) Ultraviolet Absorbers]
5E-1: a benzotriazole-based ultraviolet absorber (UVA-1) (ADEKA STAB LA-31)
5E-2: a triazine-based ultraviolet absorber (UVA-2) (Tinuvin 1600)
[(5F) Polymer Containing an α,β-Unsaturated Dicarboxylic Acid Anhydride Unit]
5F: a maleic anhydride-modified polyphenylene ether (the same compound as 2E above was used)
[(5G) Filler]
5G: Glass fiber (GF) (product name "ECS03T275H" manufactured by Nippon Electric Glass Co., Ltd., average fiber diameter: 10 μmφ, cut length: 3 mm)
<Physical Properties and Evaluations>
First, the polyamide composition pellets obtained in the examples and comparative examples were dried under a stream of nitrogen to reduce the moisture content within the polyamide composition to not more than 500 ppm. Each of the polyamide compositions for which the moisture content had been adjusted was then subjected to various physical property measurements and various evaluations using the methods described below.
[Physical Property 1] Tan δ Peak Temperature
Using a PS40E injection molding machine manufactured by Nissei Plastic Industrial Co., Ltd., with the cylinder temperature set to 290° C. and the mold temperature set to 100° C., a molded article was molded in accordance with JIS-K7139 under injection molding conditions including an injection time of 10 seconds and a cooling time of 10 seconds. This molded article was measured under the following conditions using a dynamic viscoelasticity evaluation device (EPLEXOR 500N, manufactured by Gabo GmbH).
(Measurement Conditions)
Measurement mode: tensile
Measurement frequency: 8.00 Hz
Rate of temperature increase: 3° C./min
Temperature range: −100 to 250° C.
The ratio (E2/E1) between the storage modulus E1 and the loss modulus E2 was recorded as tan δ, and the highest temperature was deemed the tan δ peak temperature.
[Physical Property 2] Molecular Weight and End Structures of Polyamide Compositions (1) Number Average Molecular Weight and Weight Average Molecular Weight of Polyamide Compositions
The number average molecular weight (Mn) and weight average molecular weight (Mw) of each polyamide composition obtained in the examples and comparative examples were measured by GPC (gel permeation chromatography) under the conditions described below. Based on these values, Mw(5A)−Mn(5B) and the molecular weight distribution Mw/Mn were calculated. Further, the amount (% by mass) of polyamides having a number average molecular weight Mn of at least 500 but not more than 2,000 among all of the polyamides in the polyamide composition was calculated from the elution curve (vertical axis: signal strength obtained from detector, horizontal axis: elution time) of each sample obtained using GPC, based on the surface area of the region bounded by the baseline and the elution curve for number average molecular weights from at least 500 to less than 2,000, and the surface area of the region bounded by the baseline and the elution curve for all the number average molecular weights.
(Measurement Conditions)
Measurement apparatus: HLC-8020 manufactured by Tosoh Corporation
Solvent: hexafluoroisopropanol solvent
Standard samples: PMMA (polymethyl methacrylate) standard samples (manufactured by Polymer Laboratories Ltd.)
GPC columns: TSKgel GMHHR-M and G1000HHR
(2) Amount of Amino Ends ([NH$_2$])
In the polyamide compositions obtained in the examples and comparative examples, the amount of amino ends bonded to polymer ends was measured by a neutralization titration in the manner described below.
First, 3.0 g of each polyamide composition was dissolved in 100 mL of a 90% by mass aqueous solution of phenol, and using the thus obtained solution, a titration was performed with 0.025 N hydrochloric acid to determine the amount of amino ends (μeq/g). The end point was determined using the reading from a pH meter.
(3) Amount of Carboxyl Ends ([COOH])
In the polyamide compositions obtained in the examples and comparative examples, the amount of carboxyl ends bonded to polymer ends was measured by a neutralization titration in the manner described below.

First, 4.0 g of the polyamide composition was dissolved in 50 mL of benzyl alcohol, and using the thus obtained solution, a titration was performed with 0.1 N NaOH to determine the amount of carboxyl ends (µeq/g). The end point was determined by the change in color of a phenolphthalein indicator.

(4) Ratio of Amount of Amino Ends to Total Amount of Active Ends ([NH2]/[(NH2]+[COOH])

Based on the amount of amino ends ([NH2]) and the amount of carboxyl ends ([COOH]) obtained in (2) and (3), the total amount of active ends ([NH$_2$]+[COOH]) and the ratio of the amount of amino ends relative to the total amount of active ends ([NH$_2$]/[(NH$_2$]+[COOH])) were calculated.

[Physical Property 3] Formic Acid Solution Viscosity VR

Each of the semi-aromatic polyamides 5B-1 to 5B-5 was dissolved in formic acid, and measurement was performed in accordance with ASTM-D789.

[Evaluation 1] Moldability and External Appearance (1) Production of Molded Articles An "FN3000" apparatus manufactured by Nissei Plastic Industrial Co., Ltd. was used. With the cylinder temperature set to 290° C. and the mold temperature set to 100° C., molding was conducted for 100 shots using each polyamide composition under injection molding conditions including an injection time of 10 seconds and a cooling time of 10 seconds, thus obtaining molded articles (ISO test pieces).

(2) Evaluation of Moldability

The moldability was evaluated against the following evaluation criteria, on the basis of the percentage of the 100 shots in which the molded article stuck to the mold during mold release following molding.

(Evaluation Criteria)
A: 10% or less
B: greater than 10% but not more than 20%
C: greater than 20% but not more than 50%
D: greater than 50%

(3) Evaluation of External Appearance

In terms of the external appearance of the obtained molded articles, the 60° gloss of the grip portion of each molded article was measured in accordance with JIS-K7150 using a gloss meter (IG320, manufactured by Horiba, Ltd.). Based on the measured surface gloss, the external appearance was evaluated against the following criteria.

(Evaluation Criteria)
A: at least 60
B: at least 55 but less than 60
C: at least 50 but less than 55
D: less than 50

[Evaluation 2] Weathering Discoloration Resistance

Using a WEL-SUN-DCH sunshine carbon-arc lamp weather resistance testing apparatus manufactured by Suga Test Instruments Co., Ltd., a molded article obtained in [Evaluation 1] was exposed for 100 hours under conditions including a black panel temperature of 65° C., a humidity of 50% RH, and no water spray. The evaluation method used following the weather resistance test involved measuring the color tone of the molded article before and after exposure, and determining the color difference using a color difference meter ND-300A manufactured by Nippon Denshoku Industries Co., Ltd. A smaller color difference (ΔE) was evaluated as indicating more favorable weather resistance.

[Evaluation 3] Flame Retardancy

Measurements were performed using the method UL94 (a standard prescribed by Underwriters Laboratories Inc., USA). The test piece (length: 127 mm, width: 12.7 mm, thickness: 1.6 mm) was prepared by fitting a mold for the UL test piece (mold temperature=100° C.) to an injection molding machine (PS40E manufactured by Nissei Plastic Industrial Co., Ltd.) and molding each polyamide composition at a cylinder temperature of 290° C. The injection pressure was set to a value of the complete filling pressure when molding the UL test piece+2%. The flame retardancy classifications used were those prescribed in the UL94 standard (vertical flame test).

[Evaluation 4] Weld Strength

A test piece was obtained by conducting molding of each polyamide composition using an injection molding machine (PS40E manufactured by Nissei Plastic Industrial Co., Ltd.) fitted with a mold having a shape with dimensions of length: 127 mm, width: 12.7 mm and thickness: 1.6 mm, wherein the melted resin was injected from both lengthwise ends of the mold so as to form a weld in the central portion of the lengthwise direction. This molded test piece was subjected to a tensile test using the method prescribed in ASTM D638, with the exception of altering the chuck separation distance to 50 mm and the tension rate to 50 mm/min, thus determining the tensile strength. Further, the test piece was left to stand in a constant-temperature constant-humidity (23° C., 50% RH) environment, and once water absorption equilibrium had been reached, the tensile strength was again measured using the method prescribed in ASTM D638. The tensile strength retention ratio after water absorption was determined using the following formula (i).

Tensile retention ratio after water absorption (%)=tensile strength after water absorption/tensile strength before water absorption×100    (i)

[Evaluation 5] Rockwell Hardness

An "FN3000" apparatus manufactured by Nissei Plastic Industrial Co., Ltd. was used. With the cylinder temperature set to 290° C. and the mold temperature set to 100° C., molding was conducted using each polyamide resin composition under injection molding conditions including an injection time of 10 seconds and a cooling time of 10 seconds, thus obtaining a molded article (ISO test piece). The Rockwell hardness (M scale) was measured using a hardness meter (ARK-F3000 manufactured by Akashi Seisakusho, Ltd.). Further, the test piece was left to stand in a constant-temperature constant-humidity (23° C., 50% RH) environment, and once water absorption equilibrium had been reached, the Rockwell hardness was again measured. The Rockwell hardness retention ratio after water absorption was determined using the following formula (ii).

Rockwell hardness retention ratio after water absorption (%)=Rockwell hardness after water absorption/Rockwell hardness before water absorption×100    (ii)

[Example 5-1] Production of Polyamide Composition 5-1

Using a TEM 35 mm twin-screw extruder manufactured by Toshiba Machine Co., Ltd. (temperature setting: 280° C., screw rotational rate: 300 rpm), a mixture obtained by blending: (5A) the aliphatic polyamide 5A-1, (5B) the semi-aromatic polyamide 5B-1, (5C1) the flame retardant, (5C2) the flame retardant auxiliary, (5D) the white pigment, (5E) the ultraviolet absorber 5E-1, and (5F) the polymer containing an α,β-unsaturated dicarboxylic acid anhydride unit was supplied to a top feed port provided in the most upstream portion of the extruder. Further, the filler (5G) was supplied from a side feed port on the downstream side of the extruder (at a point where the resins supplied from the top feed port had reached a satisfactorily melted state). The melt kneaded product extruded from the die head was cooled in a strand-like state and then pelletized to obtain pellets of a polyamide composition 5-1. The blend amounts were 18.8% by mass for (5A) the aliphatic polyamide 5A-1, 10.2% by mass for (5B) the semi-aromatic polyamide 5B-1, 10.0% by mass for the flame retardant (5C1), 2.0% by mass for the flame retardant auxiliary (5C2), 2.0% by mass for the white pigment (5D), 1.0% by mass for (5E) the ultraviolet absorber 5E-1, 1.0% by mass for (5F) the polymer containing an $\alpha,\beta$-unsaturated dicarboxylic acid anhydride unit, and 55% by mass for the filler (5G).

Further, using the pellets of the thus obtained polyamide composition 5-1, molded articles were produced using the methods described above, and measurements of the various physical properties and various evaluations were performed. The evaluation results are shown below in Table 5-1.

[Example 5-2] Production of Polyamide Composition 5-2

With the exception of altering the blend amounts to include 17.3% by mass of (5A) the aliphatic polyamide 5A-1 and 11.7% by mass of (5B) the semi-aromatic polyamide 5B-1, pellets of a polyamide composition 5-2 were obtained using the same method as Example 5-1. Using the pellets of the thus obtained polyamide composition 5-2, molded articles were produced using the methods described above, and measurements of the various physical properties and various evaluations were performed. The evaluation results are shown below in Table 5-1.

[Example 5-3] Production of Polyamide Composition 5-3

With the exception of altering the blend amounts to include 17.3% by mass of (5A) the aliphatic polyamide 5A-1, 0% by mass of (5B) the semi-aromatic polyamide 5B-1, and 11.7% by mass of (5B) the semi-aromatic polyamide 5B-3, pellets of a polyamide composition 5-3 were obtained using the same method as Example 5-1. Using the pellets of the thus obtained polyamide composition 5-3, molded articles were produced using the methods described above, and measurements of the various physical properties and various evaluations were performed. The evaluation results are shown below in Table 5-1.

[Example 5-4] Production of Polyamide Composition 5-4

With the exception of altering the blend amounts to include 18.0% by mass of (5A) the aliphatic polyamide 5A-1, 12.0% by mass of (5B) the semi-aromatic polyamide 5B-1, and 9.0% by mass of the flame retardant (5C1), pellets of a polyamide composition 5-4 were obtained using the same method as Example 5-1. Using the pellets of the thus obtained polyamide composition 5-4, molded articles were produced using the methods described above, and measurements of the various physical properties and various evaluations were performed. The evaluation results are shown below in Table 5-1.

[Example 5-5] Production of Polyamide Composition 5-5

With the exception of altering the blend amounts to include 15.9% by mass of (5A) the aliphatic polyamide 5A-1, 10.6% by mass of (5B) the semi-aromatic polyamide 5B-1, 12.0% by mass of the flame retardant (5C1) and 1.5% by mass of (5E) the ultraviolet absorber 5E-1, pellets of a polyamide composition 5-5 were obtained using the same method as Example 5-1. Using the pellets of the thus obtained polyamide composition 5-5, molded articles were produced using the methods described above, and measurements of the various physical properties and various evaluations were performed. The evaluation results are shown below in Table 5-1.

[Example 5-6] Production of Polyamide Composition 5-6

With the exception of altering the blend amounts to include 15.9% by mass of (5A) the aliphatic polyamide 5A-1 and 13.1% by mass of (5B) the semi-aromatic polyamide 5B-1, pellets of a polyamide composition 5-6 were obtained using the same method as Example 5-1. Using the pellets of the thus obtained polyamide composition 5-6, molded articles were produced using the methods described above, and measurements of the various physical properties and various evaluations were performed. The evaluation results are shown below in Table 5-1.

[Example 5-7] Production of Polyamide Composition 5-7

With the exception of altering the blend amounts to include 18.0% by mass of (5A) the aliphatic polyamide 5A-1, 12.0% by mass of (5B) the semi-aromatic polyamide 5B-1, and 1.0% by mass of the white pigment (5D), pellets of a polyamide composition 5-7 were obtained using the same method as Example 5-1. Using the pellets of the thus obtained polyamide composition 5-7, molded articles were produced using the methods described above, and measurements of the various physical properties and various evaluations were performed. The evaluation results are shown below in Table 5-1.

[Example 5-8] Production of Polyamide Composition 5-8

With the exception of altering the blend amounts to include 16.8% by mass of (5A) the aliphatic polyamide 5A-1, 11.2% by mass of (5B) the semi-aromatic polyamide 5B-1, and 3.0% by mass of the white pigment (5D), pellets of a polyamide composition 5-8 were obtained using the same method as Example 5-1. Using the pellets of the thus obtained polyamide composition 5-8, molded articles were produced using the methods described above, and measurements of the various physical properties and various evaluations were performed. The evaluation results are shown below in Table 5-1.

[Example 5-9] Production of Polyamide Composition 5-9

With the exception of altering the blend amounts to include 17.6% by mass of (5A) the aliphatic polyamide 5A-1, 11.9% by mass of (5B) the semi-aromatic polyamide 5B-1, and 0.5% by mass of (5E) the ultraviolet absorber 5E-1, pellets of a polyamide composition 5-9 were obtained using the same method as Example 5-1. Using the pellets of the thus obtained polyamide composition 5-9, molded articles were produced using the methods described above, and measurements of the various physical properties and various evaluations were performed. The evaluation results are shown in Table 5-1.

[Example 5-10] Production of Polyamide Composition 5-10

With the exception of altering the blend amounts to include 16.2% by mass of (5A) the aliphatic polyamide 5A-1, 10.8% by mass of (5B) the semi-aromatic polyamide 5B-1, and 3.0% by mass of (5E) the ultraviolet absorber 5E-1, pellets of a polyamide composition 5-10 were obtained using the same method as Example 5-1. Using the pellets of the thus obtained polyamide composition 5-10, molded articles were produced using the methods described above, and measurements of the various physical properties and various evaluations were performed. The evaluation results are shown below in Table 5-1.

[Example 5-11] Production of Polyamide Composition 5-11

With the exception of altering the blend amounts to include 38.9% by mass of (5A) the aliphatic polyamide 5A-1, 25.6% by mass of (5B) the semi-aromatic polyamide 5B-1, 22.2% by mass of the flame retardant (5C1), 4.4% by mass of the flame retardant auxiliary (5C2), 4.4% by mass of the white pigment (5D), 2.2% by mass of (5E) the ultraviolet absorber 5E-1, 2.2% by mass of the polymer (5F) containing an α,β-unsaturated dicarboxylic acid anhydride unit, and 0% by mass of the filler (5G), pellets of a polyamide composition 5-11 were obtained using the same method as Example 5-1. Using the pellets of the thus obtained polyamide composition 5-11, molded articles were produced using the methods described above, and measurements of the various physical properties and various evaluations were performed. The evaluation results are shown below in Table 5-1.

[Example 5-12] Production of Polyamide Composition 5-12

With the exception of altering the blend amounts to include 17.3% by mass of (5A) the aliphatic polyamide 5A-1, 11.7% by mass of (5B) the semi-aromatic polyamide 5B-1, 0% by mass of (5E) the ultraviolet absorber 5E-1, and 1.0% by mass of (5E) the ultraviolet absorber 5E-2, pellets of a polyamide composition 5-12 were obtained using the same method as Example 5-1. Using the pellets of the thus obtained polyamide composition 5-12, molded articles were produced using the methods described above, and measurements of the various physical properties and various evaluations were performed. The evaluation results are shown below in Table 5-1.

[Example 5-13] Production of Polyamide Composition 5-13

With the exception of altering the blend amounts to include 18.5% by mass of (5A) the aliphatic polyamide 5A-1, 0% by mass of (5B) the semi-aromatic polyamide 5B-1, 8.0% by mass of (5B) the semi-aromatic polyamide 5B-2, 12.0% by mass of the flame retardant (5C1), and 1.5% by mass of (5E) the ultraviolet absorber 5E-1, pellets of a polyamide composition 5-13 were obtained using the same method as Example 5-1. Using the pellets of the thus obtained polyamide composition 5-13, molded articles were produced using the methods described above, and measurements of the various physical properties and various evaluations were performed. The evaluation results are shown below in Table 5-3.

[Example 5-14] Production of Polyamide Composition 5-14

With the exception of altering the blend amounts to include 4.7% by mass of (5A) the aliphatic polyamide 5A-1, 0% by mass of (5B) the semi-aromatic polyamide 5B-1, 31.9% by mass of (5B) the semi-aromatic polyamide 5B-5, 3.0% by mass of the flame retardant (5C1), and 0.4% by mass of (5E) the ultraviolet absorber 5E-1, pellets of a polyamide composition 5-14 were obtained using the same method as Example 5-1. Using the pellets of the thus obtained polyamide composition 5-14, molded articles were produced using the methods described above, and measurements of the various physical properties and various evaluations were performed. The evaluation results are shown below in Table 5-3.

[Example 5-15] Production of Polyamide Composition 5-15

With the exception of altering the blend amounts to include 0% by mass of (5A) the aliphatic polyamide 5A-1, 18.5% by mass of (5A) the aliphatic polyamide 5A-2, 0% by mass of (5B) the semi-aromatic polyamide 5B-1, 8.0% by mass of (5B) the semi-aromatic polyamide 5B-2, 12.0% by mass of the flame retardant (5C1), and 1.5% by mass of (5E) the ultraviolet absorber 5E-1, pellets of a polyamide composition 5-15 were obtained using the same method as Example 5-1. Using the pellets of the thus obtained polyamide composition 5-15, molded articles were produced using the methods described above, and measurements of the various physical properties and various evaluations were performed. The evaluation results are shown below in Table 5-3.

[Comparative Example 5-1] Production of Polyamide Composition 5-16

With the exception of altering the blend amounts to include 29.0% by mass of (5A) the aliphatic polyamide 5A-1 and 0% by mass of (5B) the semi-aromatic polyamide 5B-1, pellets of a polyamide composition 5-16 were obtained using the same method as Example 5-1. Using the pellets of the thus obtained polyamide composition 5-16, molded articles were produced using the methods described above, and measurements of the various physical properties and various evaluations were performed. The evaluation results are shown below in Table 5-2.

[Comparative Example 5-2] Production of Polyamide Composition 5-17

With the exception of altering the blend amounts to include 0% by mass of (5A) the aliphatic polyamide 5A-1 and 29.0% by mass of (5B) the semi-aromatic polyamide 5B-1, pellets of a polyamide composition 5-17 were obtained using the same method as Example 5-1. Using the pellets of the thus obtained polyamide composition 5-17, molded articles were produced using the methods described above, and measurements of the various physical properties and various evaluations were performed. The evaluation results are shown below in Table 5-2.

[Comparative Example 5-3] Production of Polyamide Composition 5-18

With the exception of altering the blend amounts to include 0% by mass of (5A) the aliphatic polyamide 5A-1, 0% by mass of (5B) the semi-aromatic polyamide 5B-1, and 29.0% by mass of (5B) the semi-aromatic polyamide 5B-4, pellets of a polyamide composition 5-18 were obtained using the same method as Example 5-1. Using the pellets of the thus obtained polyamide composition 5-18, molded articles were produced using the methods described above, and measurements of the various physical properties and various evaluations were performed. The evaluation results are shown below in Table 5-2.

[Comparative Example 5-4] Production of Polyamide Composition 5-19

With the exception of altering the blend amounts to include 18.5% by mass of (5A) the aliphatic polyamide 5A-1, 12.4% by mass of (5B) the semi-aromatic polyamide 5B-1, and 0.1% by mass of the white pigment (5D), pellets of a polyamide composition 5-19 were obtained using the same method as Example 5-1. Using the pellets of the thus obtained polyamide composition 5-19, molded articles were produced using the methods described above, and measurements of the various physical properties and various evaluations were performed. The evaluation results are shown below in Table 5-2.

[Comparative Example 5-5] Production of Polyamide Composition 5-20

With the exception of altering the blend amounts to include 14.4% by mass of (5A) the aliphatic polyamide 5A-1, 9.6% by mass of (5B) the semi-aromatic polyamide 5B-1, and 7.0% by mass of the white pigment (5D), pellets of a polyamide composition 5-20 were obtained using the same method as Example 5-1. Using the pellets of the thus obtained polyamide composition 5-20, molded articles were produced using the methods described above, and measurements of the various physical properties and various evaluations were performed. The evaluation results are shown below in Table 5-2.

[Comparative Example 5-6] Production of Polyamide Composition 5-21

With the exception of altering the blend amounts to include 18.0% by mass of (5A) the aliphatic polyamide 5A-1, 12.0% by mass of (5B) the semi-aromatic polyamide 5B-1, and 0% by mass of (5E) the ultraviolet absorber 5E-1, pellets of a polyamide composition 5-21 were obtained using the same method as Example 5-1. Using the pellets of the thus obtained polyamide composition 5-21, molded articles were produced using the methods described above, and measurements of the various physical properties and various evaluations were performed. The evaluation results are shown below in Table 5-2.

[Comparative Example 5-7] Production of Polyamide Composition 5-22

With the exception of altering the blend amounts to include 15.0% by mass of (5A) the aliphatic polyamide 5A-1, 10.0% by mass of (5B) the semi-aromatic polyamide 5B-1, and 5.0% by mass of (5E) the ultraviolet absorber 5E-1, pellets of a polyamide composition 5-22 were obtained using the same method as Example 5-1. Using the pellets of the thus obtained polyamide composition 5-22, molded articles were produced using the methods described above, and measurements of the various physical properties and various evaluations were performed. The evaluation results are shown below in Table 5-2.

[Comparative Example 5-8] Production of Polyamide Composition 5-23

With the exception of altering the blend amounts to include 19.4% by mass of (5A) the aliphatic polyamide 5A-1, 0% by mass of (5B) the semi-aromatic polyamide 5B-1, 8.4% by mass of (5B) the semi-aromatic polyamide 5B-2, 12.0% by mass of the flame retardant (5C1), and 0.2% by mass of (5E) the ultraviolet absorber 5E-1, pellets of a polyamide composition 5-23 were obtained using the same method as Example 5-1. Using the pellets of the thus obtained polyamide composition 5-23, molded articles were produced using the methods described above, and measurements of the various physical properties and various evaluations were performed. The evaluation results are shown below in Table 5-3.

[Comparative Example 5-9] Production of Polyamide Composition 5-24

With the exception of altering the blend amounts to include 4.5% by mass of (5A) the aliphatic polyamide 5A-1, 0% by mass of (5B) the semi-aromatic polyamide 5B-1, 30.8% by mass of (5B) the semi-aromatic polyamide 5B-5, 3.0% by mass of the flame retardant (5C1), 3.5% by mass of the white pigment (5D), and 0.2% by mass of (5E) the ultraviolet absorber 5E-1, pellets of a polyamide composition 5-24 were obtained using the same method as Example 5-1. Using the pellets of the thus obtained polyamide composition 5-24, molded articles were produced using the methods described above, and measurements of the various physical properties and various evaluations were performed. The evaluation results are shown below in Table 5-3.

[Comparative Example 5-10] Production of Polyamide Composition 5-25

With the exception of altering the blend amounts to include 0% by mass of (5A) the aliphatic polyamide 5A-1, 19.6% by mass of (5A) the aliphatic polyamide 5A-2, 0% by mass of (5B) the semi-aromatic polyamide 5B-1, 8.4% by mass of (5B) the semi-aromatic polyamide 5B-2, 12.0% by mass of the flame retardant (5C1), and 0% by mass of (5E) the ultraviolet absorber 5E-1, pellets of a polyamide composition 5-25 were obtained using the same method as Example 5-1. Using the pellets of the thus obtained polyamide composition 5-25, molded articles were produced using the methods described above, and measurements of the various physical properties and various evaluations were performed. The evaluation results are shown below in Table 5-3.

TABLE 5-1

| | Type | Units | Example 5-1 | Example 5-2 | Example 5-3 | Example 5-4 | Example 5-5 | Example 5-6 |
|---|---|---|---|---|---|---|---|---|
| Aliphatic polyamide (5A) | 5A-1 | % by mass | 18.8 | 17.3 | 17.3 | 18.0 | 15.9 | 15.9 |
| | 5A-2 | % by mass | | | | | | |
| Semi-aromatic polyamide (5B) | 5B-1 | % by mass | 10.2 | 11.7 | | 12.0 | 10.6 | 13.1 |
| | 5B-2 | % by mass | | | | | | |
| | 5B-3 | % by mass | | | 11.7 | | | |
| | 5B-4 | % by mass | | | | | | |
| | 5B-5 | % by mass | | | | | | |
| Flame retardant (5C1) | Br—PS | % by mass | 10.0 | 10.0 | 10.0 | 9.0 | 12.0 | 10.0 |
| Flame retardant auxiliary (5C2) | Sb$_2$O$_3$ | % by mass | 2.0 | 2.0 | 2.0 | 2.0 | 2.0 | 2.0 |
| White pigment (5D) | ZnS | % by mass | 2.0 | 2.0 | 2.0 | 2.0 | 2.0 | 2.0 |
| Ultraviolet absorber (5E) | 5E-1 | % by mass | 1.0 | 1.0 | 1.0 | 1.0 | 1.5 | 1.0 |
| | 5E-2 | % by mass | | | | | | |
| Polymer (5F) containing α,β-unsaturated dicarboxylic acid anhydride unit | Maleic anhydride-modified polyphenylene ether | % by mass | 1.0 | 1.0 | 1.0 | 1.0 | 1.0 | 1.0 |
| Filler (5G) | GF | % by mass | 55.0 | 55.0 | 55.0 | 55.0 | 55.0 | 55.0 |
| | Total | % by mass | 100.0 | 100.0 | 100.0 | 100.0 | 100.0 | 100.0 |
| PA properties in PA composition | UVA (5E)/pigment (5D) | | 0.50 | 0.50 | 0.50 | 0.50 | 0.75 | 0.50 |
| | tan δ peak temperature | °C. | 111 | 115 | 115 | 112 | 117 | 115 |
| | Mw | g/mol | 29,750 | 29,000 | 31,000 | 29,000 | 29,000 | 28,250 |
| | Mw(5A) − Mw(5B) | g/mol | 15,000 | 15,000 | 10,000 | 15,000 | 15,000 | 15,000 |
| | Mn 500 to 2000 | % | 1.6 | 1.7 | 1.7 | 1.7 | 1.7 | 1.8 |
| | Mw/Mn | | 2.1 | 2.1 | 2.1 | 2.1 | 2.1 | 2.1 |
| | [NH$_2$]/([NH$_2$] + [COOH]) | | 0.33 | 0.32 | 0.32 | 0.32 | 0.32 | 0.32 |
| Properties of PA composition | moldability | | A | A | A | A | A | A |
| | external appearance | | A | A | A | A | A | A |
| | weathering discoloration resistance (ΔE) | | 27.0 | 30.0 | 30.0 | 28.0 | 37.0 | 35.0 |
| | flame retardancy UL94 (1.6 mm) | | V-0 | V-0 | V-0 | V-0 | V-0 | V-0 |
| | weld strength (dry) | MPa | 71 | 64 | 64 | 64 | 64 | 62 |
| | weld strength (wet) | MPa | 61 | 58 | 58 | 58 | 58 | 60 |
| | weld strength (retention ratio) | % | 86 | 91 | 91 | 91 | 91 | 97 |
| | Rockwell hardness (dry) | | 100 | 101 | 101 | 101 | 101 | 102 |
| | Rockwell hardness (wet) | | 99 | 101 | 101 | 101 | 101 | 102 |
| | Rockwell hardness (retention ratio) | % | 99 | 100 | 100 | 100 | 100 | 100 |

| | Type | Units | Example 5-7 | Example 5-8 | Example 5-9 | Example 5-10 | Example 5-11 | Example 5-12 |
|---|---|---|---|---|---|---|---|---|
| Aliphatic polyamide (5A) | 5A-1 | % by mass | 18.0 | 16.8 | 17.6 | 16.2 | 38.9 | 17.3 |
| | 5A-2 | % by mass | | | | | | |
| Semi-aromatic polyamide (5B) | 5B-1 | % by mass | 12.0 | 11.2 | 11.9 | 10.8 | 25.6 | 11.7 |
| | 5B-2 | % by mass | | | | | | |
| | 5B-3 | % by mass | | | | | | |
| | 5B-4 | % by mass | | | | | | |
| | 5B-5 | % by mass | | | | | | |
| Flame retardant (5C1) | Br—PS | % by mass | 10.0 | 10.0 | 10.0 | 10.0 | 22.2 | 10.0 |
| Flame retardant auxiliary (5C2) | Sb$_2$O$_3$ | % by mass | 2.0 | 2.0 | 2.0 | 2.0 | 4.4 | 2.0 |
| White pigment (5D) | ZnS | % by mass | 1.0 | 3.0 | 2.0 | 2.0 | 4.4 | 2.0 |
| Ultraviolet absorber (5E) | 5E-1 | % by mass | 1.0 | 1.0 | 0.5 | 3.0 | 2.2 | |
| | 5E-2 | % by mass | | | | | | 1.0 |
| Polymer (5F) containing α,β-unsaturated dicarboxylic acid anhydride unit | Maleic anhydride-modified polyphenylene ether | % by mass | 1.0 | 1.0 | 1.0 | 1.0 | 2.2 | 1.0 |
| Filler (5G) | GF | % by mass | 55.0 | 55.0 | 55.0 | 55.0 | 0.0 | 55.0 |
| | Total | % by mass | 100.0 | 100.0 | 100.0 | 100.0 | 100.0 | 100.0 |
| PA properties in PA composition | UVA (5E)/pigment (5D) | | 1.00 | 0.33 | 0.25 | 1.50 | 0.50 | 0.50 |
| | tan δ peak temperature | °C. | 115 | 115 | 115 | 115 | 106 | 115 |
| | Mw | g/mol | 29,000 | 29,000 | 29,000 | 29,000 | 29,000 | 29,000 |
| | Mw(5A) − Mw(5B) | g/mol | 15,000 | 15,000 | 15,000 | 15,000 | 15,000 | 15,000 |
| | Mn 500 to 2000 | % | 1.7 | 1.7 | 1.7 | 1.7 | 1.7 | 1.7 |
| | Mw/Mn | | 2.1 | 2.1 | 2.1 | 2.1 | 2.1 | 2.1 |
| | [NH$_2$]/([NH$_2$] + [COOH]) | | 0.32 | 0.32 | 0.32 | 0.32 | 0.32 | 0.32 |
| Properties of PA composition | moldability | | A | A | A | A | C | A |
| | external appearance | | A | A | A | A | A | A |
| | weathering discoloration resistance (ΔE) | | 20.0 | 40.0 | 48.0 | 10.0 | 30.0 | 25.0 |
| | flame retardancy UL94 (1.6 mm) | | V-0 | V-0 | V-0 | V-0 | V-0 | V-0 |
| | weld strength (dry) | MPa | 66 | 62 | 64 | 64 | 64 | 64 |
| | weld strength (wet) | MPa | 60 | 56 | 60 | 53 | 58 | 58 |
| | weld strength (retention ratio) | % | 91 | 90 | 94 | 83 | 91 | 91 |

TABLE 5-1-continued

|  |  |  |  |  |  |  |
|---|---|---|---|---|---|---|
| Rockwell hardness (dry) | 101 | 101 | 101 | 101 | 100 | 101 |
| Rockwell hardness (wet) | 101 | 101 | 101 | 99 | 100 | 101 |
| Rockwell hardness (retention ratio) % | 100 | 100 | 100 | 98 | 100 | 100 |

TABLE 5-2

|  | Type | Units | Comparative Example 5-1 | Comparative Example 5-2 | Comparative Example 5-3 | Comparative Example 5-4 | Comparative Example 5-5 | Comparative Example 5-6 | Comparative Example 5-7 |
|---|---|---|---|---|---|---|---|---|---|
| Aliphatic polyamide (5A) | 5A-1 | % by mass | 29.0 |  |  | 18.5 | 14.4 | 18.0 | 15.0 |
|  | 5A-2 | % by mass |  |  |  |  |  |  |  |
| Semi-aromatic polyamide (5B) | 5B-1 | % by mass |  | 29.0 |  | 12.4 | 9.6 | 12.0 | 10.0 |
|  | 5B-2 | % by mass |  |  |  |  |  |  |  |
|  | 5B-3 | % by mass |  |  |  |  |  |  |  |
|  | 5B-4 | % by mass |  |  | 29.0 |  |  |  |  |
|  | 5B-5 | % by mass |  |  |  |  |  |  |  |
| Flame retardant (5C1) | Br—PS | % by mass | 10.0 | 10.0 | 10.0 | 10.0 | 10.0 | 10.0 | 10.0 |
| Flame retardant auxiliary (5C2) | $Sb_2O_3$ | % by mass | 2.0 | 2.0 | 2.0 | 2.0 | 2.0 | 2.0 | 2.0 |
| White pigment (5D) | ZnS | % by mass | 2.0 | 2.0 | 2.0 | 0.1 | 7.0 | 2.0 | 2.0 |
| Ultraviolet absorber (5E) | 5E-1 | % by mass | 1.0 | 1.0 | 1.0 | 1.0 | 1.0 | 0.0 | 5.0 |
|  | 5E-2 | % by mass |  |  |  |  |  |  |  |
| Polymer (5F) containing α,β-unsaturated dicarboxylic acid anhydride unit | Maleic anhydride-modified polyphenylene ether | % by mass | 1.0 | 1.0 | 1.0 | 1.0 | 1.0 | 1.0 | 1.0 |
| Filler (5G) | GF | % by mass | 55.0 | 55.0 | 55.0 | 55.0 | 55.0 | 55.0 | 55.0 |
|  | Total | % by mass | 100.0 | 100.0 | 100.0 | 100.0 | 100.0 | 100.0 | 100.0 |
| PA properties in PA composition | UVA (5E)/pigment (5D) |  | 0.50 | 0.50 | 0.50 | 10.00 | 0.14 | 0.00 | 2.50 |
|  | tan δ peak temperature | °C. | 60 | 135 | 100 | 115 | 115 | 115 | 115 |
|  | Mw | g/mol | 35,000 | 20,000 | 32,000 | 29,000 | 29,000 | 29,000 | 29,000 |
|  | Mw(5A) − Mw(5B) | g/mol | — | — | — | 15,000 | 15,000 | 15,000 | 15,000 |
|  | Mn 500 to 2000 | % | 1.2 | 2.0 | 1.0 | 1.7 | 1.7 | 1.7 | 1.7 |
|  | Mw/Mn |  | 2.0 | 2.0 | 2.0 | 2.1 | 2.1 | 2.1 | 2.1 |
|  | $[NH_2]/([NH_2] + [COOH])$ |  | 0.38 | 0.24 | 0.22 | 0.32 | 0.32 | 0.32 | 0.32 |
| Properties of PA composition | moldability |  | A | D | B | A | A | A | A |
|  | external appearance |  | D | A | A | A | B | B | A |
|  | weathering discoloration resistance (ΔE) |  | 10.0 | 50.0 | 25.0 | 51.0 | 60.0 | 55.0 | 8.0 |
|  | flame retardancy UL94 (1.6 mm) |  | V-2 | V-0 | V-0 | V-0 | V-0 | V-0 | V-0 |
|  | weld strength (dry) | MPa | 90 | 60 | 63 | 66 | 55 | 64 | 53 |
|  | weld strength (wet) | MPa | 45 | 50 | 38 | 60 | 50 | 58 | 45 |
|  | weld strength (retention ratio) | % | 50 | 83 | 60 | 91 | 91 | 91 | 85 |
|  | Rockwell hardness (dry) |  | 100 | 103 | 100 | 101 | 101 | 101 | 101 |
|  | Rockwell hardness (wet) |  | 70 | 103 | 92 | 101 | 101 | 101 | 97 |
|  | Rockwell hardness (retention ratio) | % | 70 | 100 | 92 | 100 | 100 | 100 | 96 |

TABLE 5-3

|  | Type | Units | Example 5-13 | Comparative Example 5-8 | Example 5-14 | Comparative Example 5-9 | Example 5-15 | Comparative Example 5-10 |
|---|---|---|---|---|---|---|---|---|
| Aliphatic polyamide (5A) | 5A-1 | % by mass | 18.5 | 19.4 | 4.7 | 4.5 |  |  |
|  | 5A-2 | % by mass |  |  |  |  | 18.5 | 19.6 |
| Semi-aromatic polyamide (5B) | 5B-1 | % by mass |  |  |  |  |  |  |
|  | 5B-2 | % by mass | 8.0 | 8.4 |  |  | 8.0 | 8.4 |
|  | 5B-3 | % by mass |  |  |  |  |  |  |
|  | 5B-4 | % by mass |  |  |  |  |  |  |
|  | 5B-5 | % by mass |  |  | 31.9 | 30.8 |  |  |
| Flame retardant (5C1) | Br—PS | % by mass | 12.0 | 12.0 | 3.0 | 3.0 | 12.0 | 12.0 |
| Flame retardant auxiliary (5C2) | $Sb_2O_3$ | % by mass | 2.0 | 2.0 | 2.0 | 2.0 | 2.0 | 2.0 |

TABLE 5-3-continued

|  | Type | Units | Example 5-13 | Comparative Example 5-8 | Example 5-14 | Comparative Example 5-9 | Example 5-15 | Comparative Example 5-10 |
|---|---|---|---|---|---|---|---|---|
| White pigment (5D) | ZnS | % by mass | 2.0 | 2.0 | 2.0 | 3.5 | 2.0 | 2.0 |
| Ultraviolet absorber (5E) | 5E-1 | % by mass | 1.5 | 0.2 | 0.4 | 0.2 | 1.5 | 0.0 |
|  | 5E-2 | % by mass |  |  |  |  |  |  |
| Polymer (5F) containing α,β-unsaturated dicarboxylic acid anhydride unit | Maleic anhydride-modified polyphenylene ether | % by mass | 1.0 | 1.0 | 1.0 | 1.0 | 1.0 | 1.0 |
| Filler (5G) | GF | % by mass | 55.0 | 55.0 | 55.0 | 55.0 | 55.0 | 55.0 |
|  | Total | % by mass | 100.0 | 100.0 | 100.0 | 100.0 | 100.0 | 100.0 |
| PA properties in PA composition | UVA (5E)/pigment (5D) |  | 0.75 | 0.10 | 0.20 | 0.06 | 0.75 | 0.00 |
|  | tan δ peak temperature | °C. | 109 | 109 | 120 | 120 | 96 | 96 |
|  | Mw | g/mol | 32,600 | 32,600 | 41,000 | 41,000 | 28,860 | 28,860 |
|  | Mw(5A) − Mw(5B) | g/mol | 8,000 | 8,000 | — | — | −1,000 | −1,000 |
|  | Mn 500 to 2000 | % | 1.4 | 1.4 | 1.5 | 1.5 | 1.6 | 1.6 |
|  | Mw/Mn |  | 2.4 | 2.4 | 2.2 | 2.2 | 2.2 | 2.2 |
|  | [NH$_2$]/([NH$_2$] + [COOH]) |  | 0.45 | 0.45 | 0.45 | 0.45 | 0.45 | 0.45 |
| Properties of PA composition | moldability |  | A | A | A | B | B | B |
|  | external appearance |  | B | C | B | B | A | A |
|  | weathering discoloration resistance (ΔE) |  | 38.0 | 50.0 | 35.0 | 40.0 | 38.0 | 80.0 |
|  | flame retardancy UL94 (1.6 mm) |  | V-0 | V-0 | V-1 | V-1 | V-0 | V-0 |
|  | weld strength (dry) | MPa | 73 | 73 | 78 | 78 | 63 | 63 |
|  | weld strength (wet) | MPa | 56 | 54 | 48 | 46 | 47 | 45 |
|  | weld strength (retention ratio) | % | 77 | 74 | 62 | 59 | 75 | 71 |
|  | Rockwell hardness (dry) |  | 100 | 100 | 103 | 103 | 90 | 90 |
|  | Rockwell hardness (wet) |  | 98 | 98 | 102 | 102 | 80 | 80 |
|  | Rockwell hardness (retention ratio) | % | 98 | 98 | 99 | 99 | 89 | 89 |

Tables 5-1 to 5-3 revealed that the molded articles obtained from the polyamide compositions 5-1 to 5-15 (Examples 5-1 to 5-15), which contained the aliphatic polyamide (5A) and the semi-aromatic polyamide (5B), and had a mass ratio (5E)/(5D) for the ultraviolet absorber (5E) relative to the white pigment (5D) that satisfied a range from at least 0.15 to less than 2.5 (0.15≤((5E)/(5D))<2.5), had properties including excellent external appearance, superior weld strength and Rockwell hardness upon water absorption, and excellent weathering discoloration resistance.

In contrast, the molded article obtained from the polyamide composition 5-16 (Comparative Example 5-1), which did not contain the semi-aromatic polyamide (5B), had unsatisfactory external appearance, and unsatisfactory weld strength and Rockwell hardness upon water absorption.

Further, the molded articles obtained from the polyamide compositions 5-17 and 5-18 (Comparative Examples 5-2 and 5-3), which contained the semi-aromatic polyamide (5B) but did not contain the aliphatic polyamide (5A), exhibited unsatisfactory results for at least one of the properties among the weathering discoloration resistance, and the weld strength and Rockwell hardness upon water absorption.

Furthermore, the molded articles obtained from the polyamide compositions 5-19 to 5-25 (Comparative Examples 5-4 to 5-10), which although containing the semi-aromatic polyamide (5B), had a mass ratio (5E)/(5D) for the ultraviolet absorber (5E) relative to the white pigment (5D) that was either less than 0.15 ((5E)/(5D)<0.15) or 2.50 or greater (2.5≤(5E)/(5D)), exhibited unsatisfactory results for at least one of the properties among the external appearance, the weathering discoloration resistance, and the weld strength and Rockwell hardness upon water absorption.

The above results confirmed that by using a polyamide composition of the aspect described above, a molded article having favorable weld strength and Rockwell hardness upon water absorption, favorable surface appearance, and favorable weathering discoloration resistance could be obtained.

Examples 6-1 to 2-4, Comparative Examples 2-1 to 2-7

<Constituent Components>
[(6A) Crystalline Polyamides]
6A-1 to 6A-5: polyamides 66 (production method as described below)
6A-6: a polyamide MXD6 resin "RENY" (a registered trademark) #6002 (manufactured by Mitsubishi Engineering-Plastics Corporation) (Tm: 238° C., Tc: 161° C.)
6A-7: a polyamide 6 SF1013A (manufactured by Ube Industries, Ltd.), (Tm: 224° C.)
[(6B) Amorphous Semi-Aromatic Polyamides]
6B-1: a polyamide 6I, Mw(6B)=35,000, Mw(6B)/Mn(6B)=2
6B-2: a polyamide 6I, T-40 (manufactured by Lanxess AG), Mw(6B)=44,000, Mw(6B)/Mn(6B)=2.8
[(6C) Carbon Fiber]
6C-1: carbon fiber HTC413 (manufactured by Toho Tenax Co., Ltd.)
6C-2: carbon fiber TR60NE (manufactured by Mitsubishi Rayon Co., Ltd.)
<Methods for Producing Crystalline Polyamide (6A) and Amorphous Semi-Aromatic Polyamide (6B)>
[Raw Materials]
The crystalline polyamides (6A) and amorphous semi-aromatic polyamides (6B) used in the examples and comparative examples were produced using the compounds (a) and (b) below as appropriate.
((a) Dicarboxylic Acids)
a-1: Adipic acid (ADA) (manufactured by Wako Pure Chemical Industries, Ltd.)

a-2: Isophthalic acid (IPA) (manufactured by Wako Pure Chemical Industries, Ltd.)
((b) Diamine)
b-1: 1,6-diaminohexane (hexamethylenediamine) (C6DA) (manufactured by Tokyo Chemical Industry Co., Ltd.)

[Synthesis Example 6-1] Synthesis of Crystalline Polyamide 6A-1 (a Polyamide 66)

The polyamide polymerization reaction was performed by a "hot melt polymerization method" in the manner described below.

First, 1,500 g of an equimolar salt of adipic acid and hexamethylenediamine was dissolved in 1,500 g of distilled water to prepare an equimolar 50% by mass homogenous aqueous solution of the raw material monomers. This aqueous solution was placed in an autoclave with an internal capacity of 5.4 L, and the autoclave was flushed with nitrogen.

With the solution being stirred at a temperature of at least 110° C. but not more than 150° C., steam was gradually extracted and the solution concentration was concentrated to 70% by mass. Subsequently, the internal temperature was raised to 220° C. At this time, the pressure inside the autoclave increased to 1.8 MPa. In this state, steam was gradually extracted to maintain the pressure at 1.8 MPa, and the reaction was continued for one hour until the internal temperature reached 245° C.

Next, the pressure was reduced over a period of one hour. Subsequently, the inside of the autoclave was held for 10 minutes at a reduced pressure of 650 torr (86.66 kPa) using a vacuum device. At this time, the final internal temperature of the polymerization was 265° C.

Subsequently, the autoclave was pressurized with nitrogen, and the polymer was discharged in a strand-like form through a lower spinneret (nozzle), cooled in water and subjected to cutting to form pellets, and the pellets were then dried at 100° C. under a nitrogen atmosphere for 12 hours to obtain a crystalline polyamide 6A-1.

The thus obtained crystalline polyamide 6A-1 (polyamide 66) had a weight average molecular weight (Mw) of 35,000, and weight average molecular weight (Mw(6A))/number average molecular weight (Mn(6A)) was 2. The polyamide 6A-1 (polyamide 66) had an amino end group concentration of 45 µmol/g, and a carboxyl end group concentration of 60 µmol/g.

[Synthesis Example 6-2] Synthesis of Crystalline Polyamide 6A-2 (a Polyamide 66)

With the exception of adding an additional 900 g of adipic acid to the equimolar 50% by mass homogenous aqueous solution of the raw material monomers prepared in Synthesis Example 6-1, a crystalline polyamide 6A-2 was obtained using the same method as Synthesis Example 6-1.

For the thus obtained crystalline polyamide 6A-2 (polyamide 66), Mw(6A)=35,000, and Mw(6A)/Mn(6A)=2. The crystalline polyamide 6A-2 (polyamide 66) had an amino end group concentration of 33 µmol/g, and a carboxyl end group concentration of 107 µmol/g.

[Synthesis Example 6-3] Synthesis of Crystalline Polyamide 6A-3 (a Polyamide 66)

With the exception of adding an additional 900 g of hexamethylenediamine to the equimolar 50% by mass homogenous aqueous solution of the raw material monomers prepared in Synthesis Example 6-1, a crystalline polyamide 6A-3 was obtained using the same method as Synthesis Example 6-1.

For the thus obtained crystalline polyamide 6A-3 (polyamide 66), Mw=35,000, and Mw/Mn=2. The crystalline polyamide 6A-3 (polyamide 66) had an amino end group concentration of 78 µmol/g, and a carboxyl end group concentration of 52 µmol/g.

[Synthesis Example 6-4] Synthesis of Crystalline Polyamide 6A-4 (a Polyamide 66)

The polyamide polymerization reaction was performed by a "hot melt polymerization method" in the manner described below.

First, 1,500 g of an equimolar salt of adipic acid and hexamethylenediamine was dissolved in 1,500 g of distilled water to prepare an equimolar 50% by mass homogenous aqueous solution of the raw material monomers. This aqueous solution was placed in an autoclave with an internal capacity of 5.4 L, and the autoclave was flushed with nitrogen.

With the solution being stirred at a temperature of at least 110° C. but not more than 150° C., steam was gradually extracted and the solution concentration was concentrated to 70% by mass. Subsequently, the internal temperature was raised to 220° C. At this time, the pressure inside the autoclave increased to 1.8 MPa. In this state, steam was gradually extracted to maintain the pressure at 1.8 MPa, and the reaction was continued for one hour until the internal temperature reached 245° C.

Next, the pressure was reduced over a period of one hour. Subsequently, the inside of the autoclave was held for 10 minutes at a reduced pressure of 650 torr (86.66 kPa) using a vacuum device. At this time, the final internal temperature of the polymerization was 265° C.

Subsequently, the autoclave was pressurized with nitrogen, and the polymer was discharged in a strand-like form through a lower spinneret (nozzle), cooled in water and subjected to cutting to form pellets, and the pellets were then dried at 100° C. under a nitrogen atmosphere for 12 hours to obtain a polyamide. For the obtained polyamide, Mw=35,000 and Mw/Mn=2. Pellets of this polyamide were then subjected to a solid-phase polymerization at 200° C. for 6 hours, thus obtaining a crystalline polyamide 6A-4.

For the thus obtained crystalline polyamide 6A-4 (polyamide 66), Mw(6A)=70,000, and Mw(6A)/Mn(6A)=3.0. The crystalline polyamide 6A-4 (polyamide 66) had an amino end group concentration of 45 µmol/g, and a carboxyl end group concentration of 60 µmol/g.

[Synthesis Example 6-5] Synthesis of Crystalline Polyamide 6A-5 (a Polyamide 66)

The polyamide polymerization reaction was performed by a "hot melt polymerization method" in the manner described below.

First, 1,500 g of an equimolar salt of adipic acid and hexamethylenediamine was dissolved in 1,500 g of distilled water to prepare an equimolar 50% by mass homogenous aqueous solution of the raw material monomers. This aqueous solution was placed in an autoclave with an internal capacity of 5.4 L, and the autoclave was flushed with nitrogen.

With the solution being stirred at a temperature of at least 110° C. but not more than 150° C., steam was gradually extracted and the solution concentration was concentrated to 70% by mass. Subsequently, the internal temperature was raised to 220° C. At this time, the pressure inside the autoclave increased to 1.8 MPa. In this state, steam was gradually extracted to maintain the pressure at 1.8 MPa, and the reaction was continued for one hour until the internal temperature reached 245° C.

Next, the pressure was reduced over a period of one hour. Subsequently, the inside of the autoclave was held for 5 minutes at a reduced pressure of 650 torr (86.66 kPa) using a vacuum device. At this time, the final internal temperature of the polymerization was 265° C.

Subsequently, the autoclave was pressurized with nitrogen, and the polymer was discharged in a strand-like form through a lower spinneret (nozzle), cooled in water and subjected to cutting to form pellets, and the pellets were then dried at 100° C. under a nitrogen atmosphere for 12 hours to obtain a crystalline polyamide 6A-5.

For the thus obtained crystalline polyamide 6A-5 (polyamide 66), Mw(6A)=25,000, and Mw(6A)/Mn(6A)=2. The crystalline polyamide 6A-5 (polyamide 66) had an amino end group concentration of 60 µmol/g, and a carboxyl end group concentration of 80 µmol/g.

[Synthesis Example 6-6] Synthesis of Amorphous Semi-Aromatic Polyamide 6B-1 (a polyamide 6I)

The polyamide polymerization reaction was performed by a "hot melt polymerization method" in the manner described below.

First, 1,500 g of an equimolar salt of isophthalic acid and hexamethylenediamine, and a 1.5 mol % excess of adipic acid relative to the total of all the equimolar salt components were dissolved in 1,500 g of distilled water to prepare an equimolar 50% by mass homogenous aqueous solution of raw material monomers.

With the solution being stirred at a temperature of at least 110° C. but not more than 150° C., steam was gradually extracted and the solution concentration was concentrated to 70% by mass. Subsequently, the internal temperature was raised to 220° C. At this time, the pressure inside the autoclave increased to 1.8 MPa. In this state, steam was gradually extracted to maintain the pressure at 1.8 MPa, and the reaction was continued for one hour until the internal temperature reached 245° C.

Next, the pressure was reduced over a period of 30 minutes. Subsequently, the inside of the autoclave was held for 10 minutes at a reduced pressure of 650 torr (86.66 kPa) using a vacuum device. At this time, the final internal temperature of the polymerization was 265° C.

Subsequently, the autoclave was pressurized with nitrogen, and the polymer was discharged in a strand-like form through a lower spinneret (nozzle), cooled in water and subjected to cutting to form pellets, and the pellets were then dried at 100° C. under a nitrogen atmosphere for 12 hours, thus obtaining an amorphous semi-aromatic polyamide 6B-1.

For the obtained amorphous semi-aromatic polyamide 6B-1 (polyamide 6I), Mw(6B)=35,000, and Mw(6B)/Mn(6B)=2.

<Physical Properties and Evaluations>

Measurements of the physical properties of the crystalline polyamides 6A-1 to 6A-7, the amorphous semi-aromatic polyamides 6B-1 and 6B-2, and each of the polyamide compositions were performed using the methods described below.

Further, each of the polyamide compositions and molded articles obtained in the examples and comparative examples were subjected to various evaluations using the methods described below.

[Various Physical Properties of Crystalline Polyamides (6A) and Amorphous Semi-Aromatic Polyamides (6B)]

[Physical Property 1] Melting Peak Temperature Tm2 (Melting Point), Crystallization Peak Temperature Tc, and Crystallization Enthalpy ΔH These values were measured using a Diamond-DSC device manufactured by PerkinElmer, Inc., in accordance with JIS-K7121. Specifically, measurements were performed in the following manner.

First, under a nitrogen atmosphere, a sample of about 10 mg of each polyamide was heated from room temperature to a temperature of at least 300 but not more than about 350° C., depending on the melting point of the sample, at a rate of temperature increase of 20C/min. The highest peak temperature of the endothermic peak (melting peak) that appeared during this process was recorded as Tm1 (° C.). Next, the temperature was maintained at the maximum heating temperature for two minutes. At this maximum temperature, the polyamide existed in a melted state. Subsequently, the sample was cooled to 30° C. at a rate of temperature reduction of 20° C./min. The exothermic peak that appeared during this process was deemed the crystallization peak, the crystallization peak temperature was recorded as Tc, and the surface area of the crystallization peak was deemed the crystallization enthalpy ΔH (J/g). Subsequently, the sample was held at 30° C. for two minutes, and was then heated from 30° C. to a temperature of at least 280 but not more than about 300° C., depending on the melting point of the sample, at a rate of temperature increase of 20° C./min. The highest peak temperature of the endothermic peak (melting peak) that appeared during this process was deemed the melting point Tm2 (° C.).

[Physical Property 2] Weight Average Molecular Weight (Mw), Number Average Molecular Weight (Mn), Molecular Weight Distribution Mw/Mn The weight average molecular weight (Mw) and the number average molecular weight (Mn) were measured using gel permeation chromatography (GPC). The measurement conditions were as follows.

(Measurement Conditions)

Apparatus: HLC-8020 manufactured by Tosoh Corporation

Solvent: hexafluoroisopropanol

Standard samples: PMMA (polymethyl methacrylate) standard samples (manufactured by Polymer Laboratories Ltd.)

Further, based on the obtained values, the molecular weight distribution Mw/Mn was calculated.

[Physical Property 3] Polyamide Amino End Group Concentration and Carboxyl End Group Concentration (1) Amino End Group Concentration ([NH2])

The amount of amino ends bonded to polymer ends was measured by a neutralization titration in the manner described below.

First, 3.0 g of the polyamide was dissolved in 100 mL of a 90% by mass aqueous solution of phenol, and using the thus obtained solution, a titration was performed with 0.025 N hydrochloric acid to determine the amount of amino ends (µeq/g). The end point was determined using the reading from a pH meter.

(1) Carboxyl End Group Concentration ([COOH])

The amount of carboxyl ends bonded to polymer ends was measured by a neutralization titration in the manner described below.

First, 4.0 g of the polyamide was dissolved in 50 mL of benzyl alcohol, and using the thus obtained solution, a titration was performed with 0.1 N NaOH to determine the amount of carboxyl ends (μeq/g). The end point was determined by the change in color of a phenolphthalein indicator.

[Physical Properties of Polyamide Compositions]

[Physical Property 4] Polyamide Composition Tan δ Peak Temperature

Using a viscoelasticity measuring and analysis device (DVE-V4, manufactured by Rheology Co., Ltd.), a temperature variance spectrum of the dynamic viscoelasticity of a test piece prepared from each polyamide composition by cutting the parallel portion of a Type L test piece prescribed in ASTM D1822 into a short strip was measured under the conditions described below. The dimensions of the test piece were 3.1 mm (width)×2.9 mm (thickness)×15 mm (length: distance between clamps). The ratio E2/E1 between the storage modulus E1 and the loss modulus E2 was recorded as tan δ, and the highest temperature was deemed the tan δ peak temperature.

(Measurement Conditions)

Measurement mode: tensile
Waveform: sine wave
Frequency: 3.5 Hz
Temperature range: at least 0° C. to not more than 180° C.
Temperature increase steps: 2° C./min
Static load: 400 g
Displacement amplitude: 0.75 μm

[Evaluations of Polyamide Compositions and Molded Articles]

[Evaluation 1] Surface Gloss

The 600 gloss of the central portion of a flat plate molded piece obtained in the examples and comparative examples was measured in accordance with JIS-K7150 using a gloss meter (1G320, manufactured by Horiba, Ltd.). A larger measured value was evaluated as indicating superior surface appearance.

[Evaluation 2] Pellet Shape

The shape of the pellets of each of the polyamide compositions obtained in the examples and comparative examples was inspected visually. The evaluation criteria for the pellet shape were as follows. Obtaining a favorable pellet shape was evaluated as leading to an improvement in productivity.

(Evaluation Criteria)

5: no fluff, circular cylindrical pellets of substantially uniform shape
4: no fluff, circular cylindrical pellets of mostly uniform shape
3: some slight fluff, circular cylindrical pellets of mostly uniform shape
2: fluff occurs, circular cylindrical pellets of non-uniform shape
1: fluff occurs, pellets of irregular shape

[Evaluation 3] Amount of Cutting Chips

The amount of cutting chips generated when producing each of the polyamide compositions in the examples and comparative examples was evaluated visually. The evaluation criteria for the amount of cutting chips were as follows. A smaller amount of cutting chips was evaluated as leading to an improvement in productivity.

(Evaluation Criteria)

5: almost no cutting chips
4: some fine cutting chips exist
3: fine cutting chips are noticeable, but no large cutting chips exist
2: considerable number of fine cutting chips, and some large cutting chips exist
1: considerable numbers of fine cutting chips and large cutting chips exist

[Evaluation 4] Tensile Strength

Using the molded piece of multipurpose test piece type A obtained in each of the examples and comparative examples, a tensile test was performed in accordance with ISO 527 under conditions including temperature conditions of 80° C. and a tension rate of 50 mm/min, thereby measuring the tensile yield stress, which was recorded as the tensile strength.

[Evaluation 5] Flexural Strength

The multipurpose test piece type A obtained in each of the examples and comparative examples was cut to obtain a test piece having dimensions of length: 80 mm×width: 10 mm×thickness: 4 mm. Using this test piece, the flexural strength was measured in accordance with ISO 178.

[Evaluation 6] Notched Charpy Impact Strength

The multipurpose test piece type A obtained in each of the examples and comparative examples was cut to obtain a test piece having dimensions of length: 80 mm×width: 10 mm×thickness: 4 mm. Using this test piece, the notched Charpy impact strength ($kJ/m^2$) was measured in accordance with ISO 179.

<Production of Polyamide Compositions>

Examples 6-1 to 6-11 and Comparative Examples 6-1 to 6-5

(1) Production of Polyamide Composition

Using the crystalline polyamides (6A) described above, the amorphous semi-aromatic polyamides (6B) described above, and the carbon fiber (6C) described above in the formulations and proportions shown below in Table 6-1, various polyamide compositions were produced using the methods described below.

The crystalline polyamides 6A-1 to 6A-5 and the amorphous semi-aromatic polyamide 6B-1 synthesized above were dried under a stream of nitrogen to reduce the moisture content to about 0.2% by mass before being used as raw materials for the polyamide compositions.

A twin-screw extruder "ZSK-26MC" manufactured by Coperion GmbH (Germany) was used as the polyamide composition production apparatus.

The twin-screw extruder had an upstream supply port on the first barrel from the upstream side of the extruder, had a downstream first supply port on the sixth barrel, and had a downstream second supply port on the ninth barrel. Further, in the twin-screw extruder, the value of extruder length (L1)/screw diameter (D1) was 48, and the number of barrels was 12.

In the twin-screw extruder, the temperature from the upstream supply port to the die was set to the melting point Tm2 of each polyamide +20° C., the screw rotational rate was set to 250 rpm, and the discharge rate was set to 25 kg/h.

In a specific production method using the above production apparatus, the crystalline polyamide (6A) and the amorphous semi-aromatic polyamide (6B) were dry-blended and then supplied to the upstream supply port of the twin-screw extruder, while the carbon fiber (6C) was supplied from the downstream first supply port of the twin-screw extruder, and the melt-kneaded product extruded from the die head was cooled in a strand-like form and then pelletized to obtain pellets of a polyamide composition. The obtained pellets of the polyamide composition were dried under a stream of nitrogen to reduce the moisture content within the polyamide composition to not more than 500 ppm.

(2) Production of Molded Article 1 (Flat Plate Molded Piece)

Next, using the pellets of each of the obtained polyamide compositions, and using an injection molding machine (NEX50III-5EG, manufactured by Nissei Plastic Industrial Co., Ltd.) with the production conditions set as described below, the injection pressure and injection speed were adjusted appropriately to achieve a fill time of 1.6±0.1 seconds, and a flat plate molded piece (6 cm×9 cm, thickness: 2 mm) was produced. The surface gloss of the thus obtained flat plate molded piece was evaluated using the method described above. The results are shown in Table 6-1 and Table 6-2.

(Production Conditions)

Cooling time: 25 seconds
Screw rotational rate: 200 rpm
Mold temperature: tan δ peak temperature+5° C.
Cylinder temperature: at least (Tm2+10°) C but not more than (Tm2+30°) C (3) Production of Molded Article 2 (Multipurpose Test Piece Type A Molded Piece)

Next, using the pellets of each of the obtained polyamide compositions, and using an injection molding machine (PS-40E, manufactured by Nissei Plastic Industrial Co., Ltd.), molded pieces of the multipurpose test piece type A were molded in accordance with ISO 3167. The specific molding conditions included an injection+holding time of 25 seconds, a cooling time of 15 seconds, a mold temperature of 80° C., and a melted resin temperature set to the high temperature-side melting peak temperature (Tm2) for the polyamides+20° C. Using the thus obtained molded pieces of multipurpose test piece type A, the tensile strength, the flexural strength and the notched Charpy impact strength were evaluated using the methods described above. The results are shown in Table 6-1 and Table 6-2. In Table 6-1 and Table 6-2, the symbol "-" for the weight average molecular weight (Mw) indicates that no measurement was performed.

TABLE 6-1

| | Example 6-1 | Example 6-2 | Example 6-3 | Example 6-4 | Example 6-5 | Example 6-6 | Example 6-7 | Example 6-8 | Comparative Example 6-1 | Comparative Example 6-2 |
|---|---|---|---|---|---|---|---|---|---|---|
| Component | | | | | | | | | | |
| 6A-1 | 45 | 45 | | | | | | 45 | 60 | |
| 6A-2 | | | 45 | | | | | | | |
| 6A-3 | | | | 45 | | | | | | |
| 6A-4 | | | | | 45 | | | | | |
| 6A-5 | | | | | | 45 | | | | |
| 6A-6 | | | | | | | 45 | | | |
| 6A-7 | | | | | | | | | | 60 |
| 6B-1 | 15 | 15 | 15 | 15 | 15 | 15 | 15 | | | |
| 6B-2 | | | | | | | | 15 | | |
| 6C-1 | 40 | | 40 | 40 | 40 | 40 | 40 | 40 | 40 | 40 |
| 6C-2 | | 40 | | | | | | | | |
| Evaluation results | | | | | | | | | | |
| Mw | 32,000 | 32,000 | 32,000 | 32,000 | 33,500 | 30,000 | — | 34,500 | 32,000 | — |
| tan δ peak temperature | 125 | 125 | 125 | 125 | 125 | 125 | 120 | 125 | 80 | 85 |
| Surface gloss | 4 | 4 | 4 | 4 | 4 | 5 | 4 | 4 | 1 | 3 |
| Pellet shape | 3 | 3 | 3 | 3 | 4 | 3 | 4 | 3 | 1 | 2 |
| Cutting chips | 4 | 4 | 5 | 4 | 4 | 4 | 4 | 3 | 1 | 3 |
| Tensile strength [MPa] | 287 | 289 | 285 | 291 | 290 | 284 | 275 | 283 | 249 | 265 |
| Flexural strength [MPa] | 451 | 453 | 454 | 450 | 449 | 452 | 420 | 455 | 394 | 390 |
| Notched Charpy [kJ/m$^2$] | 8.7 | 8.5 | 8.7 | 8.9 | 8.8 | 8.7 | 9.0 | 8.9 | 10.2 | 8.8 |

TABLE 6-2

| | Example 6-9 | Example 6-10 | Example 6-11 | Comparative Example 6-3 | Comparative Example 6-4 | Comparative Example 6-5 |
|---|---|---|---|---|---|---|
| Component | | | | | | |
| 6A-1 | 67.5 | 60 | 52.5 | 90 | 80 | 70 |
| 6A-2 | | | | | | |
| 6A-3 | | | | | | |
| 6A-4 | | | | | | |
| 6A-5 | | | | | | |
| 6A-6 | | | | | | |
| 6A-7 | | | | | | |
| 6B-1 | 13.5 | 20 | 17.5 | | | |
| 6B-2 | | | | | | |
| 6C-1 | 10 | 20 | 30 | 10 | 20 | 30 |
| 6C-2 | | | | | | |
| Evaluation results | | | | | | |
| Mw | 32,000 | 32,000 | 32,000 | 32,000 | 32,000 | 32,000 |
| tan δ peak temperature | 125 | 125 | 125 | 80 | 80 | 80 |
| Surface gloss | 5 | 5 | 5 | 5 | 3 | 1 |
| Pellet shape | 5 | 4 | 4 | 4 | 3 | 2 |

TABLE 6-2-continued

|  | Example 6-9 | Example 6-10 | Example 6-11 | Comparative Example 6-3 | Comparative Example 6-4 | Comparative Example 6-5 |
|---|---|---|---|---|---|---|
| Cutting chips | 5 | 4 | 3 | 3 | 2 | 1 |
| Tensile strength [MPa] | 181 | 241 | 269 | 179 | 238 | 267 |
| Flexural strength [MPa] | 256 | 335 | 399 | 255 | 332 | 394 |
| Notched Charpy [kJ/m$^2$] | 4.8 | 8.1 | 10.8 | 4.6 | 7.9 | 10.8 |

Table 6-1 and Table 6-2 revealed that the polyamide compositions (of Examples 6-1 to 6-11), which contained the crystalline polyamide (6A), the amorphous semi-aromatic polyamide (6B) and the carbon fiber (6C), wherein the amorphous semi-aromatic polyamide (6B) included at least 75 mol % of isophthalic acid units among all of the dicarboxylic acid units that constituted the amorphous semi-aromatic polyamide (6B), and included at least 50 mol % of a diamine unit having at least 4 but not more than 10 carbon atoms among all of the diamine units that constituted the amorphous semi-aromatic polyamide (6B), exhibited superior surface appearance and pellet shape, and reduced cutting chip generation, while maintaining favorable results for each of the mechanical properties (the tensile strength, flexural strength and notched Charpy strength), when compared with the polyamide compositions (of Comparative Examples 6-1 to 6-5) that did not have the above composition.

Further, based on a comparison of the polyamide compositions having differing amounts of the crystalline polyamide 6A-1 (Examples 6-1, and 6-9 to 6-11), it was evident that increasing the amount of the crystalline polyamide 6A-1 tended to yield more favorable results for the pellet shape, better reduction of cutting chips, and improved surface gloss for the molded articles.

Examples 7-1 to 2-4, Comparative Examples 2-1 to 2-7

<Constituent Components>
[(7A) Aliphatic Polyamides]
  7A-1: a polyamide 66 (the same polyamide as 1A-1 above was used)
  7A-2: a polyamide 6 (SF1013A manufactured by Ube Industries, Ltd., Mw=26,000, Mw/Mn=2.0)
  The above polyamides were dried under a stream of nitrogen to reduce the moisture content to about 0.2% by mass before being used as raw materials for the polyamide compositions.
[(7B) Semi-Aromatic Polyamides]
  7B-1: a polyamide 6I (the same polyamide as 1B-2 above was used)
  7B-2: a polyamide 6I/6T (G21 manufactured by Ems Group, Mw=27,000, Mw/Mn=2.2, VR=27, Mw/VR=1,000, proportion of isophthalic acid in dicarboxylic acid units: 70 mol %)
  7B-3: a polyamide 6I (high molecular weight) (the same polyamide as 2B-4 above was used)
  7B-4: a polyamide 66/6I (the same polyamide as 1B-1 above was used)
  7B-5: a polyamide MXD6 (product name: Toyobo Nylon T-600, manufactured by Toyobo Co., Ltd., Mw=43,000, Mw/Mn=2.2, VR=28, Mw/VR=1,536, proportion of isophthalic acid in dicarboxylic acid units: 0 mol %)
  The above polyamides were dried under a stream of nitrogen to reduce the moisture content to about 0.2% by mass before being used as raw materials for the polyamide compositions.
[(7C1) Flame Retardant]
  7C1: a brominated polystyrene (product name "SAYTEX (a registered trademark) HP-7010G" manufactured by Albemarle Corporation (bromine content as determined by elemental analysis: 67% by mass)) (hereafter sometimes abbreviated as "Br-PS")
[(7C2) Flame Retardant Auxiliary]
  7C2: Diantimony trioxide (product name "Antimony Trioxide" manufactured by Daiichi F. R. co., Ltd.) (hereafter sometimes abbreviated as "Sb$_2$O$_3$")
[(7D) Ultraviolet Absorbers]
  7D-1: a benzotriazole-based ultraviolet absorber (UVA-1) (ADEKA STAB LA-31)
  7D-2: a triazine-based ultraviolet absorber (UVA-2) (Tinuvin 1600)
[(7E) Polymer Containing an α,β-Unsaturated Dicarboxylic Acid Anhydride Unit]
  7E: a maleic anhydride-modified polyphenylene ether (the same compound as 2E above was used)
[(7F) Filler]
  7F: Glass fiber (GF) (product name "ECS03T275H" manufactured by Nippon Electric Glass Co., Ltd., average fiber diameter: 10 μmφ, cut length: 3 mm)
<Physical Properties and Evaluations>

First, the polyamide composition pellets obtained in the examples and comparative examples were dried under a stream of nitrogen to reduce the moisture content within the polyamide composition to not more than 500 ppm. Each of the polyamide compositions for which the moisture content had been adjusted was then subjected to various physical property measurements and various evaluations using the methods described below.

[Physical Property 1] Tan δ Peak Temperature
  Using a PS40E injection molding machine manufactured by Nissei Plastic Industrial Co., Ltd., with the cylinder temperature set to 290° C. and the mold temperature set to 100° C., a molded article was molded in accordance with JIS-K7139 under injection molding conditions including an injection time of 10 seconds and a cooling time of 10 seconds. This molded article was measured under the following conditions using a dynamic viscoelasticity evaluation device (EPLEXOR 500N, manufactured by Gabo GmbH).
(Measurement Conditions)
  Measurement mode: tensile
  Measurement frequency: 8.00 Hz
  Rate of temperature increase: 3° C./min
  Temperature range: −100 to 250° C.
  The ratio (E2/E1) between the storage modulus E1 and the loss modulus E2 was recorded as tan δ, and the highest temperature was deemed the tan δ peak temperature.

[Physical Property 2] Molecular Weight and End Structures of Polyamide Compositions (1) Number Average Molecular Weight and Weight Average Molecular Weight of Polyamide Compositions
  The number average molecular weight (Mn) and weight average molecular weight (Mw) of each polyamide composition obtained in the examples and comparative examples were measured by GPC (gel permeation chromatography) under the conditions described below. Based on these values, Mw(7A)–Mw(7B) and the molecular weight distribution Mw/Mn were calculated. Further, the amount (% by mass) of polyamides having a number average molecular weight Mn of at least 500 but not more than 2,000 among all of the polyamides in the polyamide composition was calculated from the elution curve (vertical axis: signal strength obtained from detector, horizontal axis: elution time) of each sample obtained using GPC, based on the surface area of the region bounded by the baseline and the elution curve for number average molecular weights from at least 500 to less than 2,000, and the surface area of the region bounded by the baseline and the elution curve for all the number average molecular weights.

(Measurement Conditions)

Measurement apparatus: HLC-8020 manufactured by Tosoh Corporation

Solvent: hexafluoroisopropanol solvent

Standard samples: PMMA (polymethyl methacrylate) standard samples (manufactured by Polymer Laboratories Ltd.)

GPC columns: TSKgel GMHHR-M and G1000HHR (2) Amount of Amino Ends ([NH2])

In the polyamide compositions obtained in the examples and comparative examples, the amount of amino ends bonded to polymer ends was measured by a neutralization titration in the manner described below.

First, 3.0 g of each polyamide composition was dissolved in 100 mL of a 90% by mass aqueous solution of phenol, and using the thus obtained solution, a titration was performed with 0.025 N hydrochloric acid to determine the amount of amino ends (μeq/g). The end point was determined using the reading from a pH meter.

(3) Amount of Carboxyl Ends ([COOH])

In the polyamide compositions obtained in the examples and comparative examples, the amount of carboxyl ends bonded to polymer ends was measured by a neutralization titration in the manner described below.

First, 4.0 g of the polyamide composition was dissolved in 50 mL of benzyl alcohol, and using the thus obtained solution, a titration was performed with 0.1 N NaOH to determine the amount of carboxyl ends (μeq/g). The end point was determined by the change in color of a phenolphthalein indicator.

(4) Ratio of Amino Ends to Total Amount of Active Ends ([NH2]/[(NH2]+[COOH])

Based on the amount of amino ends ([NH$_2$]) and the amount of carboxyl ends ([COOH]) obtained in (2) and (3), the total amount of active ends ([NH2]+[COOH]) and the ratio of the amount of amino ends relative to the total amount of active ends ([NH$_2$]/[(NH$_2$]+[COOH])) were calculated.

[Physical Property 3] Formic Acid Solution Viscosity VR

Each of the semi-aromatic polyamides 7B-1 to 7B-5 was dissolved in formic acid, and measurement was performed in accordance with ASTM-D789.

[Physical Property 4] Mass Ratio of Ultraviolet Absorber (7D) Relative to Halogen Element ((7D)/Halogen Element)

(1) Quantification of Halogen Content by Elemental Analysis>

The polyamide composition was incinerated in a flask that had been flushed with high-purity oxygen, the generated gas was captured using an absorbent, and the halogen element within the capture liquid was quantified by a potentiometric titration with 1/100 N silver nitrate solution.

In those cases where the composition included a plurality of halogen elements, each element was first separated by ion chromatography, and then quantified using the above potentiometric titration method.

(2) Calculation of (7D)/Halogen Element

Using the halogen content quantified in (1) above, and the blend amount of the ultraviolet absorber (7D) added to each polyamide composition, the value of {(7D)/Halogen Element} was calculated.

[Evaluation 1] Moldability and External Appearance (1) Production of Molded Articles An "FN3000" apparatus manufactured by Nissei Plastic Industrial Co., Ltd. was used. With the cylinder temperature set to 290° C. and the mold temperature set to 100° C., molding was conducted for 100 shots using each polyamide composition under injection molding conditions including an injection time of 10 seconds and a cooling time of 10 seconds, thus obtaining molded articles (ISO test pieces).

(2) Evaluation of Moldability

The moldability was evaluated against the following evaluation criteria, on the basis of the percentage of the 100 shots in which the molded article stuck to the mold during mold release following molding.

(Evaluation Criteria)

A: 10% or less

B: greater than 10% but not more than 20%

C: greater than 20% but not more than 50%

D: greater than 50%

(3) Evaluation of MD (Mold Deposits) During Molding

The molding described above in (1) was repeated for 100 consecutive shots, and following completion of the molding, the gas vent was inspected visually.

The evaluation criteria for MD during molding were as listed below. The ability to obtain molded articles without problems was evaluated as leading to an improvement in productivity.

(Evaluation Criteria)

A: no deposits observed on gas vent

B: some deposits observed on gas vent

C: deposits observed on gas vent, with a blockage beginning to occur

D: deposits observed on gas vent, with vent blocked (4) Evaluation of External Appearance In terms of the external appearance of the obtained molded articles, the 60° gloss of the grip portion of each molded article was measured in accordance with JIS-K7150 using a gloss meter (1G320, manufactured by Horiba, Ltd.). Based on the measured surface gloss, the external appearance was evaluated against the following criteria.

(Evaluation Criteria)

A: at least 60

B: at least 55 but less than 60

C: at least 50 but less than 55

D: less than 50

[Evaluation 2] Weathering Discoloration Resistance

Using a WEL-SUN-DCH sunshine carbon-arc lamp weather resistance testing apparatus manufactured by Suga Test Instruments Co., Ltd., a molded article obtained in [Evaluation 1] was exposed for 100 hours under conditions including a black panel temperature of 65° C., a humidity of 50% RH, and no water spray. The evaluation method used following the weather resistance test involved measuring the color tone of the molded article before and after exposure, and determining the color difference using a color difference meter ND-300A manufactured by Nippon Denshoku Industries Co., Ltd. A smaller color difference (ΔE) was evaluated as indicating more favorable weather resistance.

[Evaluation 3] Tensile Strength

Using the ISO test pieces from shots 20 to 25 obtained in the above evaluation of the moldability and external appearance, the flexural modulus was measured in accordance with ISO 527. The average value of n=6 was recorded as the measured value.

[Evaluation 4] Flexural Modulus

Using the ISO test pieces from shots 20 to 25 obtained in the above evaluation of the moldability and external appearance, the flexural modulus was measured in accordance with ISO 178. The average value of n=6 was recorded as the measured value.

[Evaluation 5] Flame Retardancy

Measurements were performed using the method UL94 (a standard prescribed by Underwriters Laboratories Inc., USA). The test piece (length: 127 mm, width: 12.7 mm, thickness: 1.6 mm) was prepared by fitting a mold for the UL test piece (mold temperature=100° C.) to an injection molding machine (PS40E manufactured by Nissei Plastic Industrial Co., Ltd.) and molding each polyamide composition at a cylinder temperature of 290° C. The injection pressure was set to a value of the complete filling pressure when molding the UL test piece+2%. The flame retardancy classifications used were those prescribed in the UL94 standard (vertical flame test).

[Example 7-1] Production of Polyamide Composition 7-1

Using a TEM 35 mm twin-screw extruder manufactured by Toshiba Machine Co., Ltd. (temperature setting: 280° C., screw rotational rate: 300 rpm), a mixture obtained by blending (7A) the aliphatic polyamide 7A-1, (7B) the semi-aromatic polyamide 7B-1, (7C1) flame retardant, (7C2) the flame retardant auxiliary, (7D) the ultraviolet absorber 7D-1, and (7E) the polymer containing an α,β-unsaturated dicarboxylic acid anhydride unit was supplied to a top feed port provided in the most upstream portion of the extruder. Further, the filler (7F) was supplied from a side feed port on the downstream side of the extruder (at a point where the resins supplied from the top feed port had reached a satisfactorily melted state). The melt kneaded product extruded from the die head was cooled in a strand-like state and then pelletized to obtain pellets of a polyamide composition 7-1. The blend amounts were 20.1% by mass for (7A) the aliphatic polyamide 7A-1, 10.9% by mass for (7B) the semi-aromatic polyamide 7B-1, 10.0% by mass for the flame retardant (7C1), 2.0% by mass for the flame retardant auxiliary (7C2), 1.0% by mass for (7D) the ultraviolet absorber 7D-1, 1.0% by mass for (7F) the polymer containing an α,β-unsaturated dicarboxylic acid anhydride unit, and 55% by mass for the filler (7F).

Further, using the pellets of the thus obtained polyamide composition 7-1, molded articles were produced using the methods described above, and measurements of the various physical properties and various evaluations were performed. The evaluation results are shown below in Table 7-1.

[Example 7-2] Production of Polyamide Composition 7-2

With the exception of altering the blend amounts to include 18.5% by mass of (7A) the aliphatic polyamide 7A-1 and 12.5% by mass of (7B) the semi-aromatic polyamide 7B-1, pellets of a polyamide composition 7-2 were obtained using the same method as Example 7-1. Using the pellets of the thus obtained polyamide composition 7-2, molded articles were produced using the methods described above, and measurements of the various physical properties and various evaluations were performed. The evaluation results are shown below in Table 7-1.

[Example 7-3] Production of Polyamide Composition 7-3

With the exception of altering the blend amounts to include 18.5% by mass of (7A) the aliphatic polyamide 7A-1, 0% by mass of (7B) the semi-aromatic polyamide 7A-1, and 12.5% by mass of (7B) the semi-aromatic polyamide 7B-3, pellets of a polyamide composition 7-3 were obtained using the same method as Example 7-1. Using the pellets of the thus obtained polyamide composition 7-3, molded articles were produced using the methods described above, and measurements of the various physical properties and various evaluations were performed. The evaluation results are shown below in Table 7-1.

[Example 7-4] Production of Polyamide Composition 7-4

With the exception of altering the blend amounts to include 19.2% by mass of (7A) the aliphatic polyamide 7A-1, 12.8% by mass of (7B) the semi-aromatic polyamide 7B-1, and 9.0% by mass of the flame retardant (7C1), pellets of a polyamide composition 7-4 were obtained using the same method as Example 7-1. Using the pellets of the thus obtained polyamide composition 7-4, molded articles were produced using the methods described above, and measurements of the various physical properties and various evaluations were performed. The evaluation results are shown below in Table 7-1.

[Example 7-5] Production of Polyamide Composition 7-5

With the exception of altering the blend amounts to include 17.1% by mass of (7A) the aliphatic polyamide 7A-1, 11.4% by mass of (7B) the semi-aromatic polyamide 7B-1, 12.0% by mass of the flame retardant (7C1), and 1.5% by mass of (7D) the ultraviolet absorber 7D-1, pellets of a polyamide composition 7-5 were obtained using the same method as Example 7-1. Using the pellets of the thus obtained polyamide composition 7-5, molded articles were produced using the methods described above, and measurements of the various physical properties and various evaluations were performed. The evaluation results are shown below in Table 7-1.

[Example 7-6] Production of Polyamide Composition 7-6

With the exception of altering the blend amounts to include 17.3% by mass of (7A) the aliphatic polyamide 7A-1, 11.7% by mass of (7B) the semi-aromatic polyamide 7B-1, and 12.0% by mass of the flame retardant (7C1), pellets of a polyamide composition 7-6 were obtained using the same method as Example 7-1. Using the pellets of the thus obtained polyamide composition 7-6, molded articles were produced using the methods described above, and measurements of the various physical properties and various evaluations were performed. The evaluation results are shown in Table 7-1.

[Example 7-7] Production of Polyamide Composition 7-7

With the exception of altering the blend amounts to include 18.7% by mass of (7A) the aliphatic polyamide 7A-1, 12.5% by mass of (7B) the semi-aromatic polyamide 7B-1, and 0.8% by mass of (7D) the ultraviolet absorber 7D-1, pellets of a polyamide composition 7-7 were obtained using the same method as Example 7-1. Using the pellets of the thus obtained polyamide composition 7-7, molded articles were produced using the methods described above, and measurements of the various physical properties and various evaluations were performed. The evaluation results are shown in Table 7-1.

[Example 7-8] Production of Polyamide Composition 7-8

With the exception of altering the blend amounts to include 18.0% by mass of (7A) the aliphatic polyamide 7A-1, 12.0% by mass of (7B) the semi-aromatic polyamide 7B-1, and 2.0% by mass of (7D) the ultraviolet absorber 7D-1, pellets of a polyamide composition 7-8 were obtained using the same method as Example 7-1. Using the pellets of the thus obtained polyamide composition 7-8, molded articles were produced using the methods described above, and measurements of the various physical properties and various evaluations were performed. The evaluation results are shown in Table 7-1.

[Example 7-9] Production of Polyamide Composition 7-9

With the exception of altering the blend amounts to include 17.4% by mass of (7A) the aliphatic polyamide 7A-1, 11.6% by mass of (7B) the semi-aromatic polyamide 7B-1, and 3.0% by mass of (7D) the ultraviolet absorber 7D-1, pellets of a polyamide composition 7-9 were obtained using the same method as Example 7-1. Using the pellets of the thus obtained polyamide composition 7-9, molded articles were produced using the methods described above, and measurements of the various physical properties and various evaluations were performed. The evaluation results are shown in Table 7-1.

[Example 7-10] Production of Polyamide Composition 7-10

With the exception of altering the blend amounts to include 17.0% by mass of (7A) the aliphatic polyamide 7A-1 and 14.0% by mass of (7B) the semi-aromatic polyamide 7B-1, pellets of a polyamide composition 7-10 were obtained using the same method as Example 7-1. Using the pellets of the thus obtained polyamide composition 7-10, molded articles were produced using the methods described above, and measurements of the various physical properties and various evaluations were performed. The evaluation results are shown below in Table 7-1.

[Example 7-11] Production of Polyamide Composition 7-11

With the exception of altering the blend amounts to include 18.5% by mass of (7A) the aliphatic polyamide 7A-1, 12.5% by mass of (7B) the semi-aromatic polyamide 7B-1, and 1.0% by mass of (7D) the ultraviolet absorber 7D-2, pellets of a polyamide composition 7-11 were obtained using the same method as Example 7-1. Using the pellets of the thus obtained polyamide composition 7-11, molded articles were produced using the methods described above, and measurements of the various physical properties and various evaluations were performed. The evaluation results are shown in Table 7-1.

[Example 7-12] Production of Polyamide Composition 7-12

With the exception of altering the blend amounts to include 19.9% by mass of (7A) the aliphatic polyamide 7A-1, 0% by mass of (7B) the semi-aromatic polyamide 7B-1, 8.6% by mass of the semi-aromatic polyamide 7B-2, 12.0% by mass of the flame retardant (7C1), and 1.5% by mass of (7D) the ultraviolet absorber 7D-1, pellets of a polyamide composition 7-12 were obtained using the same method as Example 7-1. Using the pellets of the thus obtained polyamide composition 7-12, molded articles were produced using the methods described above, and measurements of the various physical properties and various evaluations were performed. The evaluation results are shown below in Table 7-3.

[Example 7-13] Production of Polyamide Composition 7-13

With the exception of altering the blend amounts to include 5.0% by mass of (7A) the aliphatic polyamide 7A-1, 0% by mass of (7B) the semi-aromatic polyamide 7B-1, 33.6% by mass of (7B) the semi-aromatic polyamide 7B-5, 3.0% by mass of the flame retardant (7C1), and 0.4% by mass of (7D) the ultraviolet absorber 7D-1, pellets of a polyamide composition 7-13 were obtained using the same method as Example 7-1. Using the pellets of the thus obtained polyamide composition 7-13, molded articles were produced using the methods described above, and measurements of the various physical properties and various evaluations were performed. The evaluation results are shown below in Table 7-3.

[Example 7-14] Production of Polyamide Composition 7-14

With the exception of altering the blend amounts to include 0% by mass of (7A) the aliphatic polyamide 7A-1, 19.9% by mass of (7A) the aliphatic polyamide 7A-2, 0% by mass of (7B) the semi-aromatic polyamide 7B-1, 8.6% by mass of (7B) the semi-aromatic polyamide 7B-2, 12.0% by mass of the flame retardant (7C1), and 1.5% by mass of (7D) the ultraviolet absorber 7D-1, pellets of a polyamide composition 7-14 were obtained using the same method as Example 7-1. Using the pellets of the thus obtained polyamide composition 7-14, molded articles were produced using the methods described above, and measurements of the various physical properties and various evaluations were performed. The evaluation results are shown below in Table 7-3.

[Comparative Example 7-1] Production of Polyamide Composition 7-15

With the exception of altering the blend amounts to include 31.0% by mass of (7A) the aliphatic polyamide 7A-1 and 0% by mass of (7B) the semi-aromatic polyamide 7B-1, pellets of a polyamide composition 7-15 were obtained using the same method as Example 7-1. Using the pellets of the thus obtained polyamide composition 7-15, molded articles were produced using the methods described above, and measurements of the various physical properties and various evaluations were performed. The evaluation results are shown below in Table 7-2.

[Comparative Example 7-2] Production of Polyamide Composition 7-16

With the exception of altering the blend amounts to include 0% by mass of (7A) the aliphatic polyamide 7A-1 and 31.0% by mass of (7B) the semi-aromatic polyamide 7B-1, pellets of a polyamide composition 7-16 were obtained using the same method as Example 7-1. Using the pellets of the thus obtained polyamide composition 7-16, molded articles were produced using the methods described above, and measurements of the various physical properties and various evaluations were performed. The evaluation results are shown below in Table 7-2.

[Comparative Example 7-3] Production of Polyamide Composition 7-17

With the exception of altering the blend amounts to include 0% by mass of (7A) the aliphatic polyamide 7A-1, 0% by mass of (7B) the semi-aromatic polyamide 7B-1, and 31.0% by mass of (7B) the semi-aromatic polyamide 7B-4, pellets of a polyamide composition 7-17 were obtained using the same method as Example 7-1. Using the pellets of the thus obtained polyamide composition 7-17, molded articles were produced using the methods described above, and measurements of the various physical properties and various evaluations were performed. The evaluation results are shown below in Table 7-2.

[Comparative Example 7-4] Production of Polyamide Composition 7-18

With the exception of altering the blend amounts to include 19.2% by mass of (7A) the aliphatic polyamide 7A-1, 12.8% by mass of (7B) the semi-aromatic polyamide 7B-1, and 0% by mass of (7D) the ultraviolet absorber 7D-1, pellets of a polyamide composition 7-18 were obtained using the same method as Example 7-1. Using the pellets of the thus obtained polyamide composition 7-18, molded articles were produced using the methods described above, and measurements of the various physical properties and various evaluations were performed. The evaluation results are shown below in Table 7-2.

[Comparative Example 7-5] Production of Polyamide Composition 7-19

With the exception of altering the blend amounts to include 16.2% by mass of (7A) the aliphatic polyamide 7A-1, 10.8% by mass of (7B) the semi-aromatic polyamide 7B-1, and 5.0% by mass of (7D) the ultraviolet absorber 7D-1, pellets of a polyamide composition 7-19 were obtained using the same method as Example 7-1. Using the pellets of the thus obtained polyamide composition 7-19, molded articles were produced using the methods described above, and measurements of the various physical properties and various evaluations were performed. The evaluation results are shown below in Table 7-2.

[Comparative Example 7-6] Production of Polyamide Composition 7-20

With the exception of altering the blend amounts to include 20.8% by mass of (7A) the aliphatic polyamide 7A-1, 0% by mass of (7B) the semi-aromatic polyamide 7B-1, 9.0% by mass of (7B) the semi-aromatic polyamide 7B-2, 12.0% by mass of the flame retardant (7C1), and 0.2% by mass of (7D) the ultraviolet absorber 7D-1, pellets of a polyamide composition 7-20 were obtained using the same method as Example 7-1. Using the pellets of the thus obtained polyamide composition 7-20, molded articles were produced using the methods described above, and measurements of the various physical properties and various evaluations were performed. The evaluation results are shown below in Table 7-3.

[Comparative Example 7-7] Production of Polyamide Composition 7-21

With the exception of altering the blend amounts to include 5.0% by mass of (7A) the aliphatic polyamide 7A-1, 0% by mass of (7B) the semi-aromatic polyamide 7B-1, 33.8% by mass of (7B) the semi-aromatic polyamide 7B-5, 3.0% by mass of the flame retardant (7C1), and 0.2% by mass of (7D) the ultraviolet absorber 7D-1, pellets of a polyamide composition 7-21 were obtained using the same method as Example 7-1. Using the pellets of the thus obtained polyamide composition 7-21, molded articles were produced using the methods described above, and measurements of the various physical properties and various evaluations were performed. The evaluation results are shown below in Table 7-3.

[Comparative Example 7-8] Production of Polyamide Composition 7-22

With the exception of altering the blend amounts to include 0% by mass of (7A) the aliphatic polyamide 7A-1, 20.9% by mass of (7A) the aliphatic polyamide 7A-2, 0% by mass of (7B) the semi-aromatic polyamide 7B-1, 8.9% by mass of (7B) the semi-aromatic polyamide 7B-2, 12.0% by mass of the flame retardant (7C1), and 0.2% by mass of (7D) the ultraviolet absorber 7D-1, pellets of a polyamide composition 7-22 were obtained using the same method as Example 7-1. Using the pellets of the thus obtained polyamide composition 7-22, molded articles were produced using the methods described above, and measurements of the various physical properties and various evaluations were performed. The evaluation results are shown below in Table 7-3.

TABLE 7-1

|  | Type | Units | Example 7-1 | Example 7-2 | Example 7-3 | Example 7-4 | Example 7-5 | Example 7-6 |
|---|---|---|---|---|---|---|---|---|
| Aliphatic polyamide (7A) | 7A-1 | % by mass | 20.1 | 18.5 | 18.5 | 19.2 | 17.1 | 17.3 |
|  | 7A-2 | % by mass |  |  |  |  |  |  |

TABLE 7-1-continued

| | | | | | | | | |
|---|---|---|---|---|---|---|---|---|
| Semi-aromatic polyamide (7B) | 7B-1 | % by mass | 10.9 | 12.5 | | 12.8 | 11.4 | 11.7 |
| | 7B-2 | % by mass | | | | | | |
| | 7B-3 | % by mass | | | 12.5 | | | |
| | 7B-4 | % by mass | | | | | | |
| | 7B-5 | % by mass | | | | | | |
| Flame retardant (7C1) | Br—PS | % by mass | 10.0 | 10.0 | 10.0 | 9.0 | 12.0 | 12.0 |
| Flame retardant auxiliary (7C2) | $Sb_2O_3$ | % by mass | 2.0 | 2.0 | 2.0 | 2.0 | 2.0 | 2.0 |
| Ultraviolet absorber (7D) | 7D-1 | % by mass | 1.0 | 1.0 | 1.0 | 1.0 | 1.5 | 1.0 |
| | 7D-2 | % by mass | | | | | | |
| Polymer (7E) containing α,β-unsaturated dicarboxylic acid anhydride unit | Maleic anhydride-modified polyphenylene ether | % by mass | 1.0 | 1.0 | 1.0 | 1.0 | 1.0 | 1.0 |
| Filler (7F) | GF | % by mass | 55.0 | 55.0 | 55.0 | 55.0 | 55.0 | 55.0 |
| | Total | % by mass | 100.0 | 100.0 | 100.0 | 100.0 | 100.0 | 100.0 |
| PA properties in PA composition | UVA (7D)/halogen content | | 0.15 | 0.15 | 0.15 | 0.17 | 0.19 | 0.12 |
| | tan δ peak temperature | °C. | 111 | 115 | 115 | 112 | 117 | 117 |
| | Mw | g/mol | 33,000 | 32,000 | 34,000 | 32,000 | 32,000 | 32,000 |
| | Mw(7A) − Mw(7B) | g/mol | 20,000 | 20,000 | 15,000 | 20,000 | 20,000 | 20,000 |
| | Mn 500 to 2000 | % | 1.6 | 1.7 | 1.7 | 1.7 | 1.7 | 1.7 |
| | Mw/Mn | | 2.1 | 2.1 | 2.1 | 2.1 | 2.1 | 2.1 |
| | $[NH_2]/([NH_2] + [COOH])$ | | 0.33 | 0.32 | 0.32 | 0.32 | 0.32 | 0.32 |
| Properties of PA composition | moldability | | A | A | A | A | A | A |
| | MD during molding | | A | A | A | A | A | A |
| | external appearance | | A | A | A | A | A | A |
| | weathering discoloration resistance (ΔE) | | 27.0 | 30.0 | 30.0 | 28.0 | 37.0 | 48.0 |
| | flame retardancy UL94 (1.6 mm) | | V-0 | V-0 | V-0 | V-0 | V-0 | V-0 |
| | tensile strength | MPa | 240 | 231 | 233 | 236 | 227 | 222 |
| | flexural modulus | GPa | 20.0 | 20.4 | 20.5 | 20.0 | 21.3 | 21.2 |

| | Type | Units | Example 7-7 | Example 7-8 | Example 7-9 | Example 7-10 | Example 7-11 |
|---|---|---|---|---|---|---|---|
| Aliphatic polyamide (7A) | 7A-1 | % by mass | 18.7 | 18.0 | 17.4 | 17.0 | 18.5 |
| | 7A-2 | % by mass | | | | | |
| Semi-aromatic polyamide (7B) | 7B-1 | % by mass | 12.5 | 12.0 | 11.6 | 14.0 | 12.5 |
| | 7B-2 | % by mass | | | | | |
| | 7B-3 | % by mass | | | | | |
| | 7B-4 | % by mass | | | | | |
| | 7B-5 | % by mass | | | | | |
| Flame retardant (7C1) | Br—PS | % by mass | 10.0 | 10.0 | 10.0 | 10.0 | 10.0 |
| Flame retardant auxiliary (7C2) | $Sb_2O_3$ | % by mass | 2.0 | 2.0 | 2.0 | 2.0 | 2.0 |
| Ultraviolet absorber (7D) | 7D-1 | % by mass | 0.8 | 2.0 | 3.0 | 1.0 | |
| | 7D-2 | % by mass | | | | | 1.0 |
| Polymer (7E) containing α,β-unsaturated dicarboxylic acid anhydride unit | Maleic anhydride-modified polyphenylene ether | % by mass | 1.0 | 1.0 | 1.0 | 1.0 | 1.0 |
| Filler (7F) | GF | % by mass | 55.0 | 55.0 | 55.0 | 55.0 | 55.0 |
| | Total | % by mass | 100.0 | 100.0 | 100.0 | 100.0 | 100.0 |
| PA properties in PA composition | UVA (7D)/halogen content | | 0.12 | 0.30 | 0.45 | 0.15 | 0.15 |
| | tan δ peak temperature | °C. | 115 | 115 | 115 | 115 | 115 |
| | Mw | g/mol | 32,000 | 32,000 | 32,000 | 31,000 | 29,000 |
| | Mw(7A) − Mw(7B) | g/mol | 20,000 | 20,000 | 20,000 | 20,000 | 15,000 |
| | Mn 500 to 2000 | % | 1.7 | 1.7 | 1.7 | 1.8 | 1.7 |
| | Mw/Mn | | 2.1 | 2.1 | 2.1 | 2.1 | 2.1 |
| | $[NH_2]/([NH_2] + [COOH])$ | | 0.32 | 0.32 | 0.32 | 0.31 | 0.32 |
| Properties of PA composition | moldability | | A | A | A | A | A |
| | MD during molding | | A | A | B | A | A |
| | external appearance | | A | A | A | A | A |
| | weathering discoloration resistance (ΔE) | | 45.0 | 25.0 | 10.0 | 35.0 | 25.0 |
| | flame retardancy UL94 (1.6 mm) | | V-0 | V-0 | V-0 | V-0 | V-0 |
| | tensile strength | MPa | 230 | 230 | 228 | 225 | 233 |
| | flexural modulus | GPa | 20.5 | 20.3 | 20.1 | 21.0 | 20.5 |

TABLE 7-2

| | Type | Units | Comparative Example 7-1 | Comparative Example 7-2 | Comparative Example 7-3 | Comparative Example 7-4 | Comparative Example 7-5 |
|---|---|---|---|---|---|---|---|
| Aliphatic polyamide (7A) | 7A-1 | % by mass | 31.0 | | | 19.2 | 16.2 |
| | 7A-2 | % by mass | | | | | |
| Semi-aromatic polyamide (7B) | 7B-1 | % by mass | | 31.0 | | 12.8 | 10.8 |
| | 7B-2 | % by mass | | | | | |
| | 7B-3 | % by mass | | | | | |
| | 7B-4 | % by mass | | | 31.0 | | |
| | 7B-5 | % by mass | | | | | |
| Flame retardant (7C1) | Br—PS | % by mass | 10.0 | 10.0 | 10.0 | 10.0 | 10.0 |
| Flame retardant auxiliary (7C2) | $Sb_2O_3$ | % by mass | 2.0 | 2.0 | 2.0 | 2.0 | 2.0 |
| Ultraviolet absorber (7D) | 7D-1 | % by mass | 1.0 | 1.0 | 1.0 | 0.0 | 5.0 |
| | 7D-2 | % by mass | | | | | |
| Polymer (7E) containing α,β-unsaturated dicarboxylic acid anhydride unit | Maleic anhydride-modified polyphenylene ether | % by mass | 1.0 | 1.0 | 1.0 | 1.0 | 1.0 |
| Filler (7F) | GF | % by mass | 55.0 | 55.0 | 55.0 | 55.0 | 55.0 |
| | Total | % by mass | 100.0 | 100.0 | 100.0 | 100.0 | 100.0 |
| PA properties in PA composition | UVA (7D)/halogen content | | 0.15 | 0.15 | 0.15 | 0.00 | 0.75 |
| | tan δ peak temperature | °C. | 60 | 135 | 100 | 115 | 115 |
| | Mw | g/mol | 40,000 | 20,000 | 32,000 | 32,000 | 32,000 |
| | Mw(7A) − Mw(7B) | g/mol | — | — | — | 20,000 | 20,000 |
| | Mn 500 to 2000 | % | 1.2 | 2.0 | 1.0 | 1.7 | 1.7 |
| | Mw/Mn | | 2.0 | 2.0 | 2.0 | 2.1 | 2.1 |
| | $[NH_2]/([NH_2] + [COOH])$ | | 0.38 | 0.24 | 0.22 | 0.32 | 0.32 |
| Properties of PA composition | moldability | | A | D | B | A | A |
| | MD during molding | | A | C | A | A | C |
| | external appearance | | D | A | A | B | A |
| | weathering discoloration resistance (ΔE) | | 10.0 | 50.0 | 25.0 | 55.0 | 8.0 |
| | flame retardancy UL94 (1.6 mm) | | V-2 | V-0 | V-0 | V-0 | V-0 |
| | tensile strength | MPa | 210 | 200 | 219 | 229 | 223 |
| | flexural modulus | GPa | 19.0 | 22.0 | 19.5 | 20.4 | 19.6 |

TABLE 7-3

| | Type | Units | Example 7-12 | Comparative Example 7-6 | Example 7-13 | Comparative Example 7-7 | Example 7-14 | Comparative Example 7-8 |
|---|---|---|---|---|---|---|---|---|
| Aliphatic polyamide (7A) | 7A-1 | % by mass | 19.9 | 20.8 | 5.0 | 5.0 | | |
| | 7A-2 | % by mass | | | | | 19.9 | 20.9 |
| Semi-aromatic polyamide (7B) | 7B-1 | % by mass | | | | | | |
| | 7B-2 | % by mass | 8.6 | 9.0 | | | 8.6 | 8.9 |
| | 7B-3 | % by mass | | | | | | |
| | 7B-4 | % by mass | | | | | | |
| | 7B-5 | % by mass | | | 33.6 | 33.8 | | |
| Flame retardant (7C1) | Br—PS | % by mass | 12.0 | 12.0 | 3.0 | 3.0 | 12.0 | 12.0 |
| Flame retardant auxiliary (7C2) | $Sb_2O_3$ | % by mass | 2.0 | 2.0 | 2.0 | 2.0 | 2.0 | 2.0 |
| Ultraviolet absorber (7D) | 7D-1 | % by mass | 1.5 | 0.2 | 0.4 | 0.2 | 1.5 | 0.2 |
| | 7D-2 | % by mass | | | | | | |
| Polymer (7E) containing α,β-unsaturated dicarboxylic acid anhydride unit | Maleic anhydride-modified polyphenylene ether | % by mass | 1.0 | 1.0 | 1.0 | 1.0 | 1.0 | 1.0 |
| Filler (7F) | GF | % by mass | 55.0 | 55.0 | 55.0 | 55.0 | 55.0 | 55.0 |
| | Total | % by mass | 100.0 | 100.0 | 100.0 | 100.0 | 100.0 | 100.0 |
| PA properties in PA composition | UVA (7D)/halogen content | | 0.19 | 0.02 | 0.20 | 0.10 | 0.19 | 0.02 |
| | tan δ peak temperature | °C. | 109 | 109 | 120 | 120 | 96 | 96 |
| | Mw | g/mol | 36,100 | 36,100 | 41,000 | 41,000 | 26,300 | 26,300 |
| | Mw(7A) − Mw(7B) | g/mol | 13,000 | 13,000 | — | — | −1,000 | −1,000 |
| | Mn 500 to 2000 | % | 1.4 | 1.4 | 1.5 | 1.5 | 1.6 | 1.6 |
| | Mw/Mn | | 2.4 | 2.4 | 2.2 | 2.2 | 2.2 | 2.2 |
| | $[NH_2]/([NH_2] + [COOH])$ | | 0.45 | 0.45 | 0.45 | 0.45 | 0.45 | 0.45 |
| Properties of PA composition | moldability | | A | A | A | B | B | B |
| | MD during molding | | A | A | A | A | B | B |
| | external appearance | | B | C | B | B | A | A |
| | weathering discoloration resistance (ΔE) | | 38.0 | 50.0 | 35.0 | 40.0 | 38.0 | 80.0 |
| | flame retardancy UL94 (1.6 mm) | | V-0 | V-0 | V-0 | V-0 | V-0 | V-0 |

TABLE 7-3-continued

| Type | Units | Example 7-12 | Comparative Example 7-6 | Example 7-13 | Comparative Example 7-7 | Example 7-14 | Comparative Example 7-8 |
|---|---|---|---|---|---|---|---|
| tensile strength | MPa | 228 | 225 | 188 | 186 | 183 | 180 |
| flexural modulus | GPa | 19.0 | 19.0 | 19.0 | 18.9 | 18.4 | 18.4 |

Tables 7-1 to 7-3 revealed that molded articles obtained from the polyamide compositions 7-1 to 7-14 (Examples 7-1 to 7-14), which contained the aliphatic polyamide (7A) and the semi-aromatic polyamide (7B), wherein the mass ratio of the ultraviolet absorber (7D) relative to the halogen element {(7D)/halogen element} is greater than 0.10 but less than 0.75 [0.10<{(7D)/halogen element}<0.75], had excellent properties, including no noticeable MD during molding, and superior external appearance, tensile strength, flexural modulus and weathering discoloration resistance.

In contrast, molded articles obtained from the polyamide composition 7-15 (Comparative Example 7-1), which did not contain the semi-aromatic polyamide (7B), exhibited unsatisfactory external appearance and flexural modulus.

Further, molded articles obtained from polyamide compositions 7-16 and 7-17 (Comparative Examples 7-2 and 7-3), which although containing the semi-aromatic polyamide (7B), did not contain the aliphatic polyamide (7A), exhibited unsatisfactory results for at least one of the degree of MD during molding, the weathering discoloration resistance, the tensile strength and the flexural modulus.

Furthermore, molded articles obtained from polyamide compositions 7-18 to 7-22 (Comparative Examples 7-4 to 7-8), which although containing the semi-aromatic polyamide (7B), had a mass ratio of the ultraviolet absorber (7D) relative to the halogen element {(7D)/halogen element} that was 0.10 or less [{(7D)/halogen element}≤0.10] or 0.75 or greater [0.75≤{(7D)/halogen element)}], exhibited unsatisfactory results for at least one of the degree of MD during molding, the external appearance, the weathering discoloration resistance, the tensile strength and the flexural modulus.

Further, based on a comparison of the molded articles obtained from the polyamide compositions 7-1, 7-2, and 7-4 to 7-9 (Examples 7-1, 7-2, and 7-4 to 7-9), it was evident that large values for the mass ratio of the ultraviolet absorber (7D) relative to the halogen element {(7D)/halogen element} tended to yield more superior weathering discoloration resistance.

The above results confirmed that by using a polyamide composition of the aspect described above, a molded article having favorable tensile strength, flexural modulus, surface appearance, MD during molding and weathering discoloration resistance could be obtained.

The invention claimed is:

1. A polyamide composition comprising:
50 to 99 parts by mass of an aliphatic polyamide (1A) formed from a diamine and a dicarboxylic acid, and
1 to 50 parts by mass of a semi-aromatic polyamide (1B) with respect to 100 parts by mass of the total amount of the polyamide (1A) and polyamide (1B) containing a dicarboxylic acid unit that includes at least 75 mol % of isophthalic acid, and a diamine unit that includes at least 50 mol % of a diamine of 4 to 10 carbon atoms, wherein
the tan δ peak temperature of the polyamide composition is at least 90° C., and
the weight average molecular weight Mw of the polyamide composition satisfies 15,000≤Mw≤35,000.

2. The polyamide composition according to claim 1, wherein the total amount of polyamide having a number average molecular weight Mn of at least 500 but not more than 2,000 is at least 0.5% by mass but less than 2.5% by mass relative to the total mass of polyamide in the polyamide composition.

3. The polyamide composition according to claim 1, wherein the molecular weight distribution Mw/Mn for the polyamide composition is not more than 2.6.

4. The polyamide composition according to claim 1, wherein the total of the amount of amino ends and the amount of carboxyl ends, expressed as a number of equivalents per 1 g of polyamide in the polyamide composition, is from 100 to 175 µeq/g.

5. The polyamide composition according to claim 1, wherein the ratio of the amount of amino ends relative to the total of the amount of amino ends and the amount of carboxyl ends {amount of amino ends/(amount of amino ends+amount of carboxyl ends)} is at least 0.25 but less than 0.4.

6. The polyamide composition according to claim 1, wherein the aliphatic polyamide (1A) is a polyamide 66 or a polyamide 610.

7. The polyamide composition according to claim 1, wherein in the semi-aromatic polyamide (1B), an amount of the isophthalic acid in the dicarboxylic acid unit is 100 mol %.

8. The polyamide composition according to claim 1, wherein the semi-aromatic polyamide (1B) is a polyamide 6I.

9. The polyamide composition according to claim 1, wherein the weight average molecular weight Mw of the semi-aromatic polyamide (1B) satisfies 10,000≤Mw≤25,000.

10. The polyamide composition according to claim 1, wherein the molecular weight distribution Mw/Mn of the semi-aromatic polyamide (1B) is not more than 2.4.

11. The polyamide composition according to claim 1, wherein the difference {Mw(1A)−Mw(1B)} between the weight average molecular weight Mw(1A) of the aliphatic polyamide (1A) and the weight average molecular weight Mw(1B) of the semi-aromatic polyamide (1B) is at least 10,000.

12. The polyamide composition according to claim 1, further comprising a metal phosphite salt and/or a metal hypophosphite salt.

13. The polyamide composition according to claim 1, further comprising a phosphite ester compound.

14. The polyamide composition according to claim 1, further comprising from 5 to 250 parts by mass of an inorganic filler (1C) per 100 parts by mass of the total of the aliphatic polyamide (1A) and the semi-aromatic polyamide (1B).

15. The polyamide composition according to claim 1, further comprising:
(2C) a pigment,
(2D1) a flame retardant, and
(2D2) a flame retardant auxiliary.

16. The polyamide composition according to claim 1, further comprising:
(3C1) a flame retardant, and
(3C2) a flame retardant auxiliary, wherein
the tan δ peak temperature of the polyamide composition is at least 100° C., and
the halogen content relative to a total mass of the polyamide composition is greater than 2% by mass but not more than 20% by mass.

17. The polyamide composition according to claim 1, further comprising: (4C) a polyphenylene ether.

18. The polyamide composition according to claim 1, further comprising: (5C1) a flame retardant, (5C2) a flame retardant auxiliary, (5D) a white pigment, and (5E) an ultraviolet absorber, wherein
the mass ratio (5E)/(5D) of the ultraviolet absorber (5E) relative to the white pigment (5D) in the polyamide composition is at least 0.15 but less than 2.50.

19. The polyamide composition according to claim 1, further comprising: (6C) carbon fiber.

20. The polyamide composition according to claim 1, further comprising: (7C1) a flame retardant containing a halogen element, (7C2) a flame retardant auxiliary, and (7D) an ultraviolet absorber, wherein
the mass ratio {(7D)/halogen element} of the ultraviolet absorber (7D) relative to the halogen element in the polyamide composition is greater than 0.10 but less than 0.75.

* * * * *